(12) United States Patent
Gibbs

(10) Patent No.: US 11,758,879 B2
(45) Date of Patent: Sep. 19, 2023

(54) ANIMAL FOOD AND WATER BOWL SYSTEM

(71) Applicant: Andy H. Gibbs, Tucson, AZ (US)

(72) Inventor: Andy H. Gibbs, Tucson, AZ (US)

( * ) Notice: Subject to any disclaimer, the term of this patent is extended or adjusted under 35 U.S.C. 154(b) by 471 days.

(21) Appl. No.: 16/895,626

(22) Filed: Jun. 8, 2020

(65) Prior Publication Data
US 2020/0305387 A1 Oct. 1, 2020

Related U.S. Application Data

(63) Continuation of application No. 14/987,080, filed on Jan. 4, 2016, now Pat. No. 10,674,702.

(60) Provisional application No. 62/254,223, filed on Nov. 12, 2015, provisional application No. 62/243,389, filed on Oct. 19, 2015, provisional application No. 62/199,761, filed on Jul. 31, 2015, provisional application No. 62/192,137, filed on Jul. 14, 2015, provisional application No. 62/191,587, filed on Jul. 13, 2015, provisional application No. 62/190,805, filed on Jul. 10, 2015, provisional application No. 62/109,188, filed on Jan. 29, 2015, provisional application No. 62/108,160, filed on Jan. 27, 2015, provisional application No. 62/108,154, filed on Jan. 27, 2015, provisional application No. 62/100,058, filed on Jan. 5, 2015.

(51) Int. Cl.
*A01K 5/00* (2006.01)
*A01K 29/00* (2006.01)
*A01K 7/00* (2006.01)

(52) U.S. Cl.
CPC .............. *A01K 5/00* (2013.01); *A01K 7/00* (2013.01); *A01K 29/005* (2013.01)

(58) Field of Classification Search
CPC .......... A01K 5/00; A01K 7/00; A01K 29/005
See application file for complete search history.

(56) References Cited

U.S. PATENT DOCUMENTS

| 3,611,998 A | 10/1971 | Loscalzo |
| 5,022,626 A | 6/1991 | Nozel |
| 5,975,016 A | 11/1999 | Wesenhagen |
| 6,179,377 B1 | 1/2001 | Harper |

(Continued)

FOREIGN PATENT DOCUMENTS

GB 2475583 A 5/2011

OTHER PUBLICATIONS http://www.ottopetcaresystems.com/; Webpage for Integrated Well-being Solutions for Your Pet.

(Continued)

*Primary Examiner* — Ebony E Evans
(74) *Attorney, Agent, or Firm* — Neustel Law Offices

(57) ABSTRACT

An animal food and water bowl system for effectively dispensing food and water to an animal such as a pet. The animal food and water bowl system generally includes a platform having a support member and at least one leg extending downwardly from the support member. The support member includes an upper surface and a recessed portion within the upper surface that removably receives a lower surface of bowl. A first connector is adapted for removably connecting the first bowl to the upper surface of the support member in a substantially non-movable manner. At least a portion of the front upper edge of the bowl is below the rear upper edge of the bowl.

20 Claims, 76 Drawing Sheets

(56) References Cited

U.S. PATENT DOCUMENTS

| | | | |
|---|---|---|---|
| D439,707 S | 3/2001 | Hansen | |
| 6,318,291 B1 | 11/2001 | Wolanski | |
| 6,691,639 B2 | 2/2004 | Singh | |
| 6,868,804 B1 | 3/2005 | Huisma | |
| D506,294 S | 6/2005 | Boje | |
| 7,152,036 B2 | 12/2006 | Gizzio | |
| 7,380,518 B2 * | 6/2008 | Kates | G01S 13/86 119/51.01 |
| 7,513,216 B2 * | 4/2009 | Neckel | A01K 5/0114 119/51.01 |
| D607,616 S | 1/2010 | Newsome | |
| D647,668 S | 10/2011 | Siklosi | |
| 8,148,651 B1 * | 4/2012 | Coppola | A01K 5/0114 119/51.01 |
| D662,674 S | 6/2012 | Tsengas | |
| D669,231 S | 10/2012 | Chance | |
| 8,342,129 B2 | 1/2013 | Harper | |
| D679,455 S | 4/2013 | Chance | |
| D683,190 S | 5/2013 | Shields | |
| 8,627,786 B2 * | 1/2014 | Arthur | A01K 5/0114 119/61.5 |
| D706,995 S | 6/2014 | Modi | |
| 8,797,166 B2 * | 8/2014 | Triener | G01G 21/22 340/573.3 |
| 9,149,022 B2 | 10/2015 | Triener | |
| D761,494 S * | 7/2016 | Gibbs | D30/132 |
| D774,834 S | 12/2016 | Breit | |
| 10,091,972 B1 * | 10/2018 | Jensen | A01K 7/02 |
| 10,506,798 B2 * | 12/2019 | Gibbs | G08B 21/182 |
| 2003/0106498 A1 | 6/2003 | Mersits | |
| 2004/0118618 A1 * | 6/2004 | Davidson | G01G 19/4146 128/921 |
| 2005/0039690 A1 | 2/2005 | Sage, Jr. | |
| 2005/0279287 A1 | 12/2005 | Kroeker | |
| 2007/0137584 A1 | 6/2007 | Travis | |
| 2007/0181068 A1 | 8/2007 | McKeown | |
| 2009/0095223 A1 * | 4/2009 | Szutu | A01K 5/0291 119/51.5 |
| 2009/0299821 A1 | 12/2009 | Willcocks | |
| 2010/0038149 A1 * | 2/2010 | Corel | G01G 19/4146 177/25.16 |
| 2010/0263596 A1 * | 10/2010 | Schumann | A01K 5/0275 119/51.02 |
| 2010/0299074 A1 * | 11/2010 | Chang | A01K 29/00 702/19 |
| 2010/0332140 A1 * | 12/2010 | Joyce | A01K 5/0114 119/51.01 |
| 2011/0139076 A1 * | 6/2011 | Pu | A01K 5/02 119/51.02 |
| 2011/0192351 A1 | 8/2011 | Jackson | |
| 2011/0253054 A1 | 10/2011 | Hargrove | |
| 2012/0089340 A1 | 4/2012 | Huisma | |
| 2012/0199076 A1 | 8/2012 | Biede | |
| 2012/0325156 A1 * | 12/2012 | Abramson | A01K 5/0208 119/51.01 |
| 2015/0373951 A1 | 12/2015 | Kelly | |
| 2016/0012748 A1 * | 1/2016 | Donavon | G09B 19/0092 434/225 |
| 2017/0330194 A1 * | 11/2017 | Gibbs | G06K 7/10366 |

OTHER PUBLICATIONS htps://www.indiegogo.com/projects/otto-petcare-systems-for-dogs-and-cats#/; Webpage for Activity Tracker + Connected Food Dispenser.

* cited by examiner

"Smart" Bowl (LAN) Predetermined Weight of Specified Food Type is downloaded from a wireless device to a Smart Bowl.

"Smart" Bowl (WAN) Network inputs desired weight measurement to "Smart" Bowl, The bowl weighs, then provides for Indicia when food weight = desired weight.

| Food Type | Energy (kcal/gm) | Moisture Content |
|---|---|---|
| Brand A Chicken and Rice Adult | 3.71 | 8.5% |
| Brand A Rich Puppy Formula | 5.20 | 10.2% |
| Brand A Senior Select | 3.24 | 7.8% |
| Brand B Chicken and Rice Adult | 3.26 | 7.5% |
| Brand B Range Beef | 4.29 | 8.2% |
| Brand B Vegetarian | 2.76 | 10.7% |
| Brand C Weight Loss | 3.11 | 8.5% |

| Animal ID | RER (kcal/day) | MER (kcal/day) |
|---|---|---|
| 100001 | 422 | 422 |
| 100002 | 1412 | 1784 |
| 100003 | 650 | 763 |
| 100004 | 653 | 884 |
| 100005 | 248 | 272 |
| 100006 | 1180 | 2870 |
| 100007 | 550 | 588 |
| 100008 | 300 | 312 |

FIG. 10

| CHARACTERISTIC | MAY CHANGE OVER TIME | CHANGE IS PREDICTABLE | POSSIBLE SPEED OF CHANGE | PRIMARY NUTRITIONAL IMPACT |
|---|---|---|---|---|
| Daily Food Consumed (kcal) | Yes | No | Daily | Short / Long Term Comparable Metric |
| Daily Water Consumed (ml) | Yes | No | Hourly | Short / Long Term Comparable Metric |
| Activity Level - Typical Daily | Yes | No | Daily/Monthly | Increase/Decrease MER |
| Activity Level - Intermittent | Yes | No | Immediate | Increase/Decrease MER |
| Age | Yes | Yes | Years | Modifies MER Over Lifetime |
| Breed | No | N/A | N/A | No Significant Impact |
| Environment | Yes | No | Minutes | Increase/Decrease MER |
| Medical Condition | Yes | No | Varies | Increase/Decrease MER |
| Medications | Yes | No | Varies | Increase/Decrease MER |
| Neuter Status | Yes | Yes | Immediate Once | Changes Baseline MER |
| Physiology | Yes | No | Varies | Increase/Decrease MER |
| Sex | No | N/A | N/A | No Significant Impact |
| Size | Yes | Yes | Slow | Inversely proportional - smaller animals expend more energy pound |
| Stage of Life | Yes | Yes | Slow | Increase/Decrease MER |
| Weight | Yes | No | Varies | Increase/Decrease RER and MER |

TABLE OF TYPICAL ANIMAL PROFILE CHARACTERISTICS

FIG. 11a

| PET'S AGE ACTUAL YEARS | ANIMAL WEIGHT | | | |
|---|---|---|---|---|
| | ≤ 20 lbs | 21-50 lbs | 51-90 lbs | ≥91 lbs |
| | Approximate Relative Age in Human Calendar Years | | | |
| 1 | 17 | 16 | 14 | 13 |
| 2 | 24 | 23 | 21 | 20 |
| 3 | 28 | 28 | 29 | 28 |
| 4 | 32 | 34 | 35 | 35 |
| 5 | 36 | 38 | 40 | 42 |
| 6 | 40 | 42 | 45 | 49 |
| 7 | 44 | 47 | 50 | 56 |
| 8 | 48 | 51 | 55 | 64 |
| 9 | 52 | 56 | 61 | 71 |
| 10 | 56 | 60 | 66 | 78 |
| 11 | 60 | 65 | 72 | 86 |
| 12 | 64 | 69 | 77 | 93 |
| 13 | 68 | 74 | 82 | 101 |
| 14 | 72 | 78 | 88 | 108 |
| 15 | 76 | 83 | 93 | 115 |
| 16 | 80 | 87 | 99 | 123 |
| 17 | 84 | 92 | 104 | |
| 18 | 88 | 96 | 109 | |
| 19 | 92 | 101 | 115 | |
| 20 | 96 | 105 | 120 | |

1100

1101 Growth Stage
1102 Adult Stage
1103 Senior Stage
1104 Geriatric Stage

| HUMAN AGE EQUIVALENT AND LIFESPAN (Calendar Years) | | | | | | | |
|---|---|---|---|---|---|---|---|
| | Yorkshire Terrier | Poodle | Irish Setter | Beagle | Golder Retriever | Doberman Pincher | Great Dane |
| "Human Age" @ 1 yr. | 10 | 14.6 | 16.9 | 20.0 | 20.0 | 22.4 | 26.8 |
| Life Expectancy | 14-16 | 12-15 | 12-14 | 12-14 | 10-13 | 10-12 | 7-10 |
| Lifespan if Obese | 12-14 | 10-13 | 10-12 | 10-12 | 9-11 | 9-10 | 6-9 |

FIG. 12

| WEIGHT | | | Growth Stage | | Adult Stage | | | Adult or Senior Stage | | | | Hydration |
|---|---|---|---|---|---|---|---|---|---|---|---|---|
| (Example List) | | | Puppy ≤4 Months RER X 3 | Puppy 4 Mo-Adult RER X 2 | Neutered Adult RER X 1.6 | Intact Adult RER X 1.8 | Lactating Bitch RER X 3 | Inactive, Obese RER X 1.3 | Loose Weight RER X 1.0 | Gain Weight RER X 1.5 | Highly Active RER X 2-5 | Daily Water ~1 oz / lb |
| lbs. | kg. | RER* | | | | | | | | | | |
| 10 | 5 | 218 | 653 | 435 | 348 | 392 | 653 | 283 | 218 | 305 | 761 | 10 |
| 11 | 5 | 234 | 701 | 467 | 374 | 421 | 701 | 304 | 234 | 327 | 818 | 11 |
| 12 | 5 | 249 | 748 | 499 | 399 | 449 | 748 | 324 | 249 | 349 | 873 | 12 |
| 13 | 6 | 265 | 795 | 530 | 424 | 477 | 795 | 344 | 265 | 371 | 927 | 13 |
| 14 | 6 | 280 | 840 | 560 | 448 | 504 | 840 | 364 | 280 | 392 | 980 | 14 |
| 15 | 7 | 295 | 885 | 590 | 472 | 531 | 885 | 383 | 295 | 413 | 1032 | 15 |
| 16 | 7 | 310 | 929 | 619 | 495 | 557 | 929 | 402 | 310 | 433 | 1083 | 16 |
| 17 | 8 | 324 | 972 | 648 | 518 | 583 | 972 | 421 | 324 | 453 | 1134 | 17 |
| 18 | 8 | 338 | 1014 | 676 | 541 | 609 | 1014 | 440 | 338 | 473 | 1183 | 18 |
| 19 | 9 | 352 | 1056 | 704 | 563 | 634 | 1056 | 458 | 352 | 493 | 1232 | 19 |
| 20 | 9 | 366 | 1098 | 732 | 585 | 659 | 1098 | 476 | 366 | 512 | 1281 | 20 |

DAILY METABOLIC ENERGY REQUIREMENT (MER) BASED ON ACTIVITY LEVEL OR OBJECTIVE (kcal)

\* Resting Energy Requirements (RER) computed using an accepted formula: RER = 70 (Animal Weight in kg)$^{3/4}$

NOTES:

The growth stage for large breed dogs extends up to 24 months. The weight-based RER and growth stage are modified for larger dogs to accommodate for a longer growth period.

Larger dogs require a lower MER factor than smaller dogs on a per-pound basis. Activity level based MER computations are therefore modified to accommodate lower multiplication factors for larger dogs.

| Food Type | Energy (kcal/gm) | Moisture Content |
|---|---|---|
| Brand A Chicken and Rice Adult | 3.71 | 8.5% |
| Brand A Rich Puppy Formula | 5.20 | 10.2% |
| Brand A Senior Select | 3.24 | 7.8% |
| Brand B Chicken and Rice Adult | 3.26 | 7.5% |
| Brand B Range Beef | 4.29 | 8.2% |
| Brand B Vegetarian | 2.76 | 10.7% |
| Brand C Weight Loss | 3.11 | 8.5% |

*Image generally reflects the results of a Purina study which was published for public use. Fair Use is claimed for public use. Fair Use is claimed for copyrighted image.*

WEIGHT GAIN daily kcal modification is based on the ideal TARGET weight for the animal.

WEIGHT LOSS daily kcal modification is based on the RER for the animal's CURRENT weight.

| WEIGHT CHANGE TO ENERGY PORTION MANAGEMENT | | |
|---|---|---|
| WEIGHT LOSS w/ SAME PORTIONS (= MER kcal) | Disease/Illness Symptom | Non-disease Indicator |
| *(graph: Animal's Actual Weight; PORTION (kcals) vs TIME (DAYS))* | \|---- Alert Message Sent To Owner ----\| | |
| | Hyperthyroidism | Temperature Drop |
| | Gastrointestinal Parasites | Increase in Activity |
| | Pancreatic Exocrine Inefficiency | Pregnancy |
| | Diabetes | Nursing |
| | Cushing's Disease | |
| | Addison's Disease | |
| EATING LESS THAN FULL PORTION (< MER kcal) | Disease/Illness Symptom | Non-disease Indicator |
| *(graph: Monitor, create alert at 10% drop; PORTION (kcals) vs TIME (DAYS))* | \|---- Alert Message Sent To Owner ----\| | |
| | Systemic Infection | Recent Vaccination? |
| | Cancer | Picky Eater? |
| | Dental Problems | Recent Travel / Stress? |
| | Mouth Lesions | Animal may have found an un-monitored food source. |
| | Liver Dysfunction | |
| | Generalized Pain | |
| | Kidney Failure | |

Contacting a Veterinarian is indicated if a 10 percent short-term weight drop is recognized.

—1601

Reference Signature expressed as: oz/sec or ml/sec
(water volume consumed) ÷ (reference data pattern duration in seconds)

DETERMINING ANIMAL DAILY WATER NEEDS

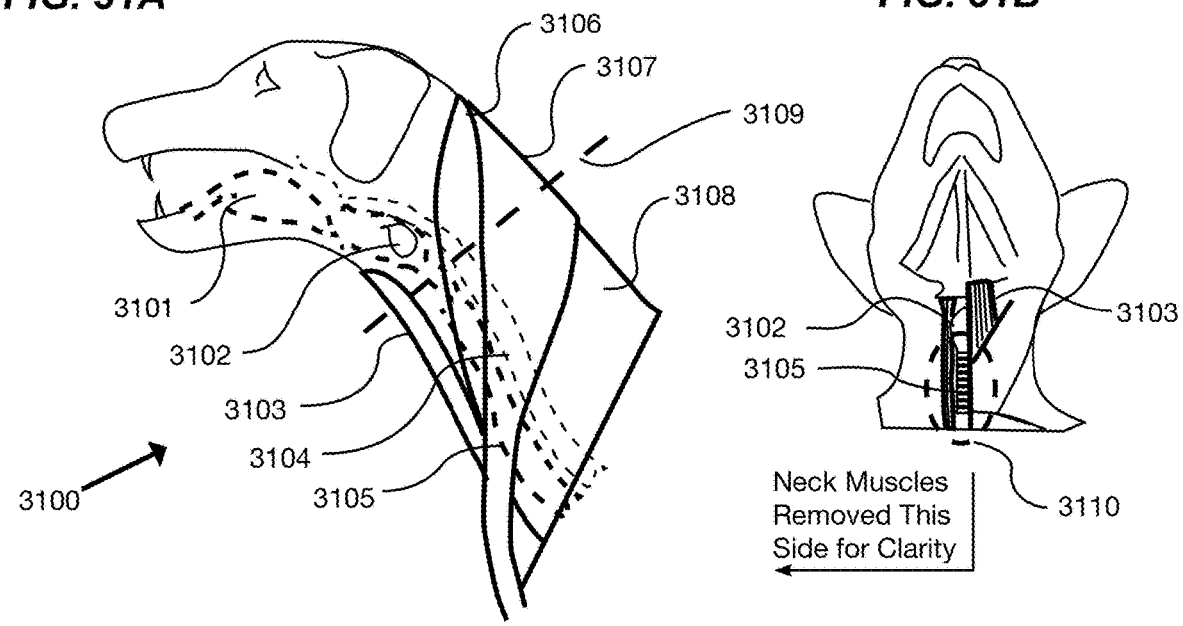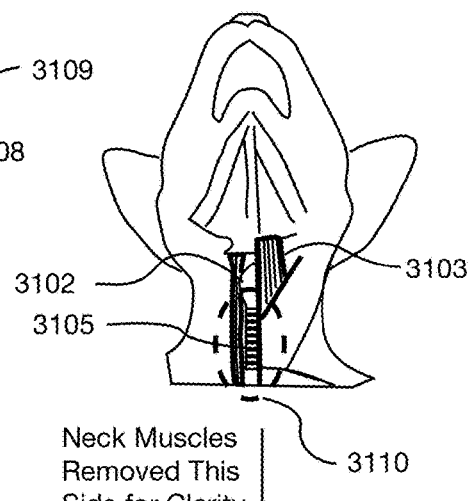
FIG. 31A
FIG. 31B
Neck Muscles Removed This Side for Clarity
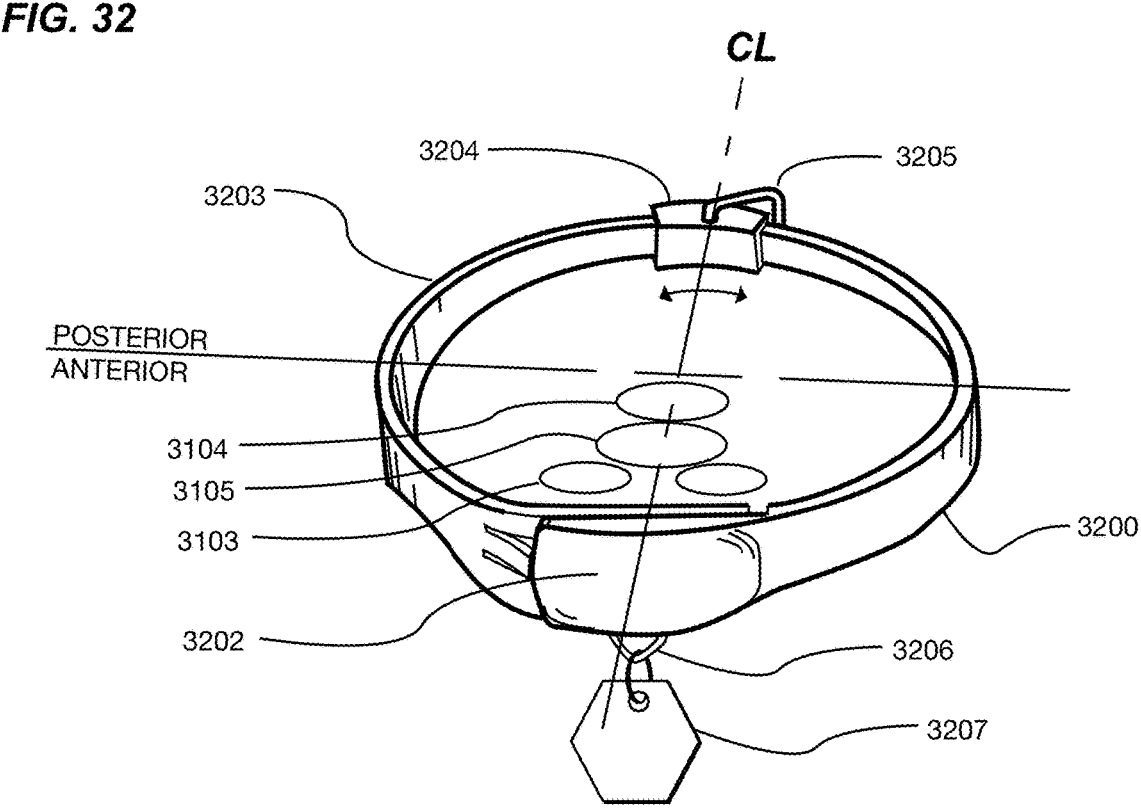
FIG. 32

FIG. 35A  FIG. 35B  FIG. 35C
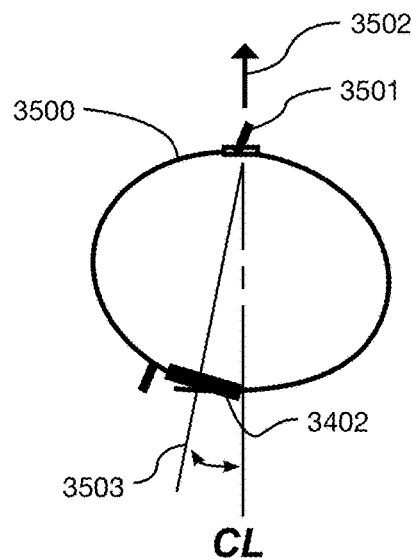
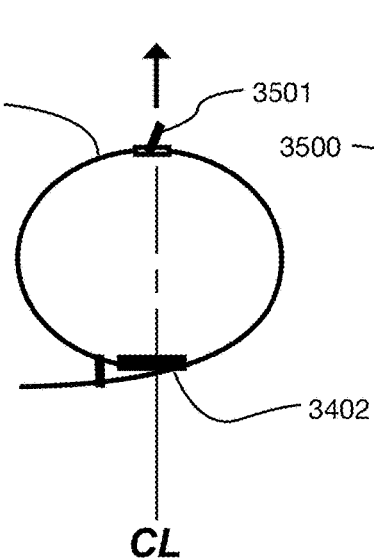
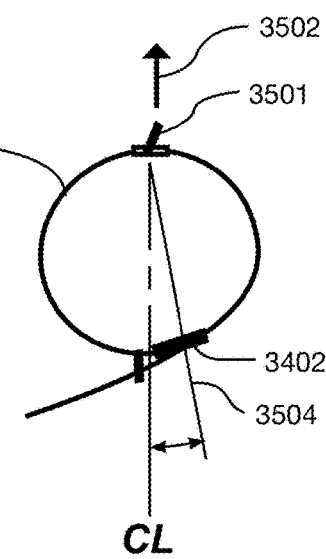
FIG. 36
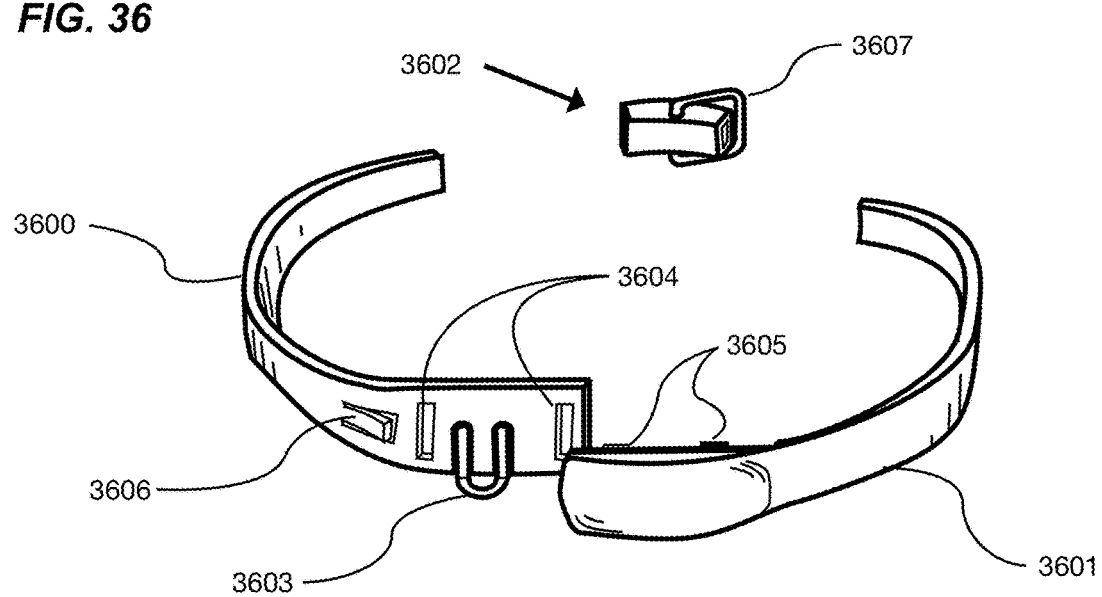

Front of Feeding Station: Pet position during feeding.

latch at front of bowl

SECTION B-B

Access to a Traditional Food Bowl

Access to the Interior of an Improved Food Bowl 6600
6601
6602
6603

6604

6605      6606

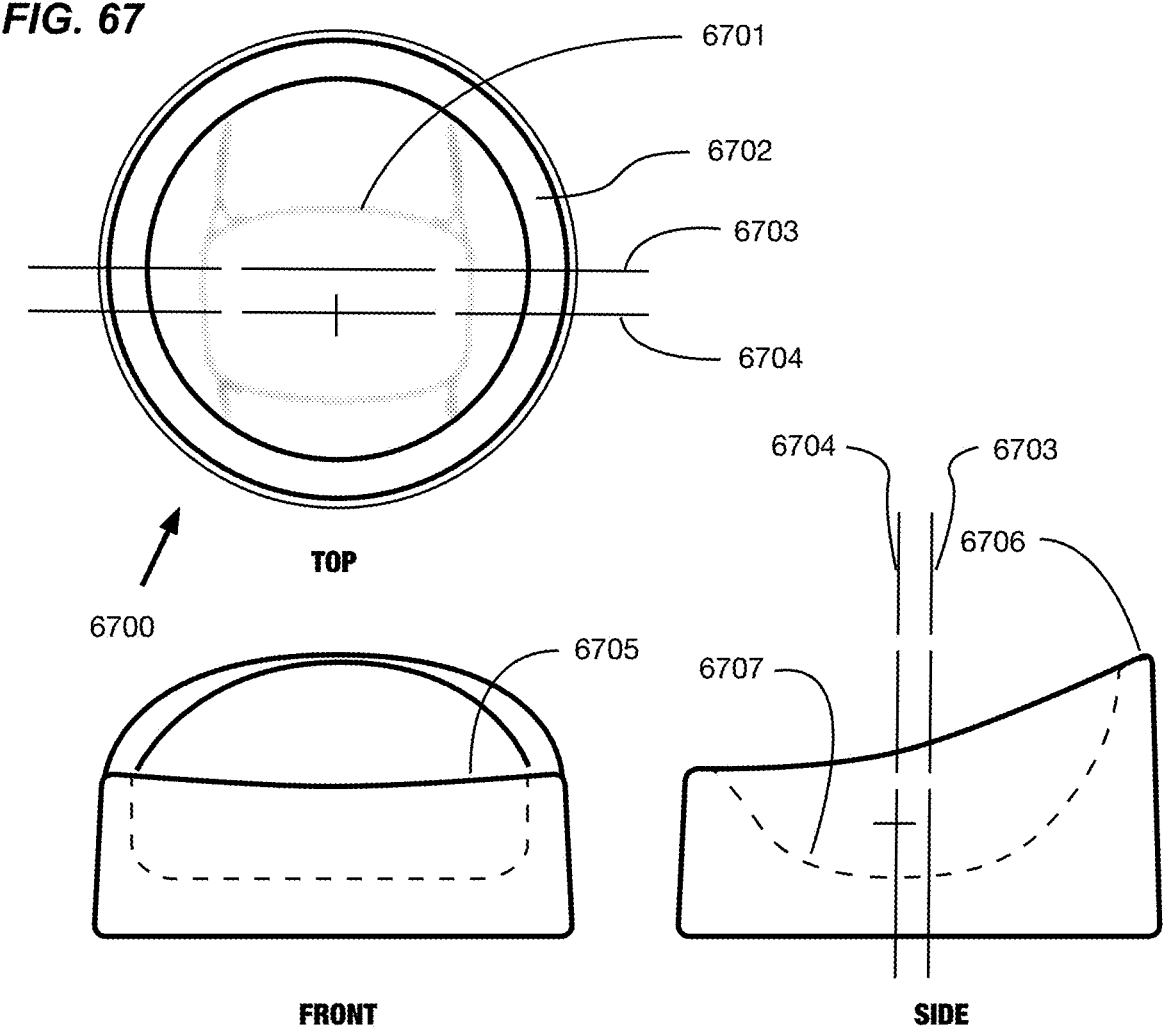

SECTION A-A

FIG. 76
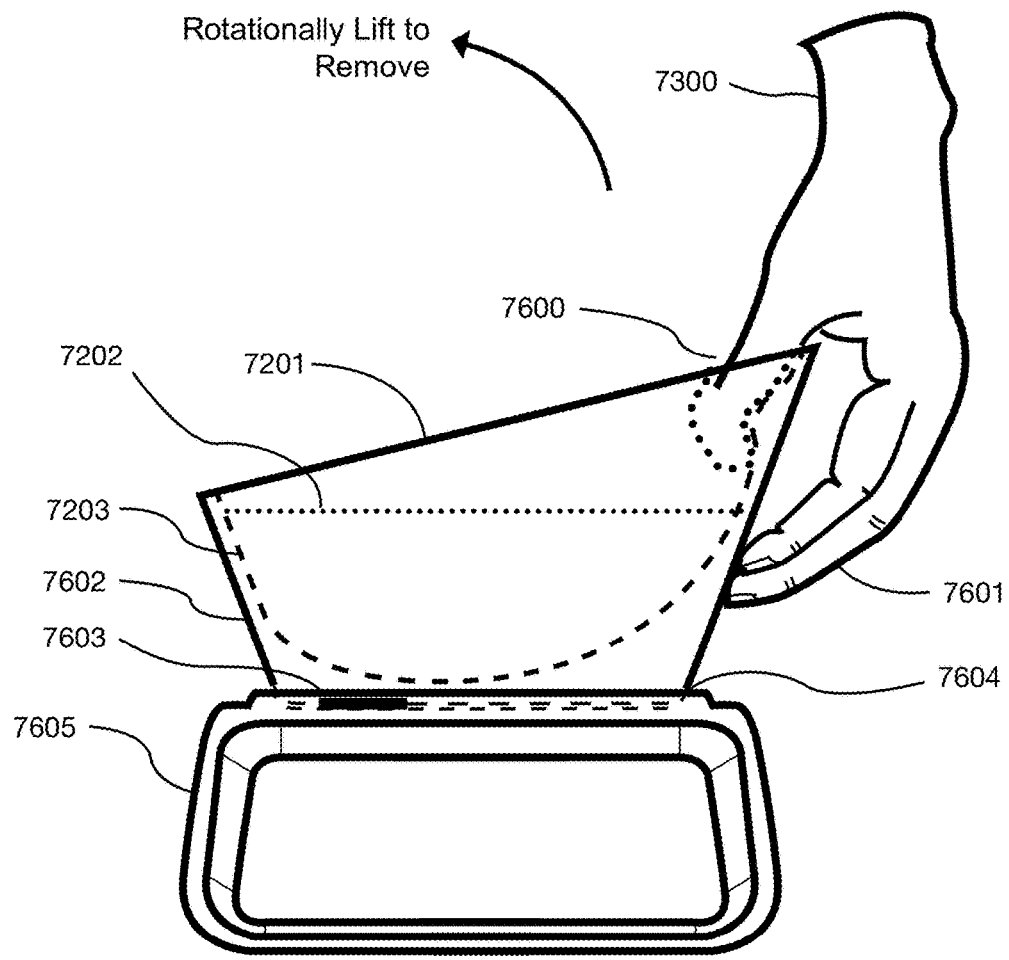
FIG. 77A
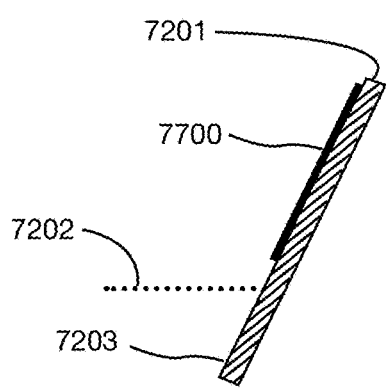
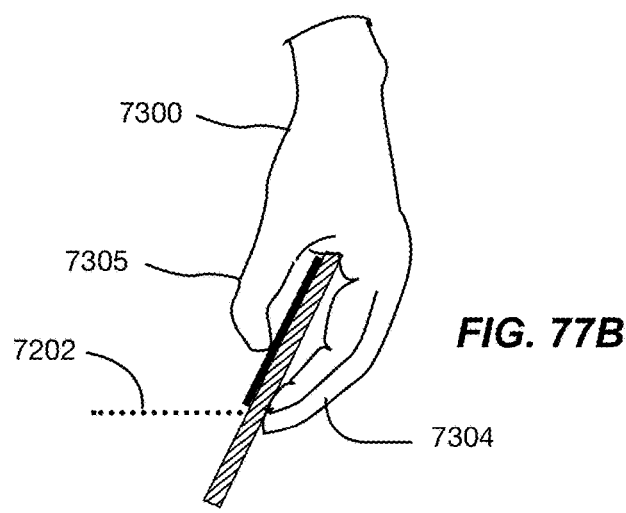
FIG. 77B

FIG. 78
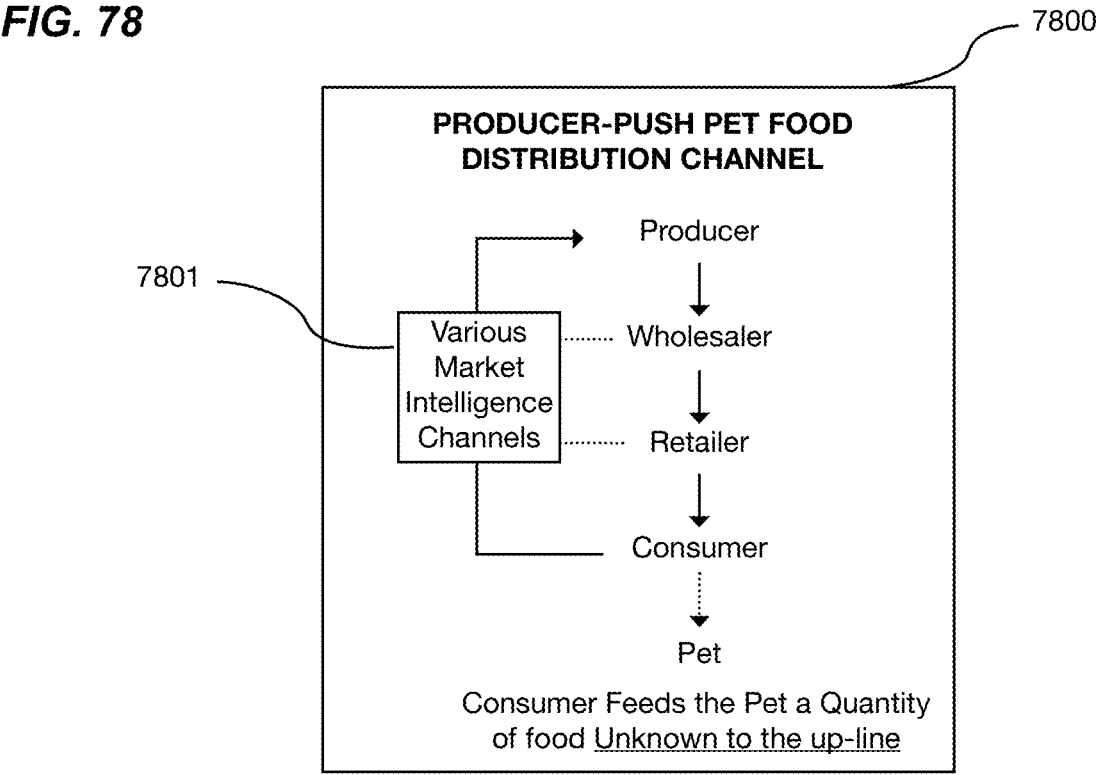
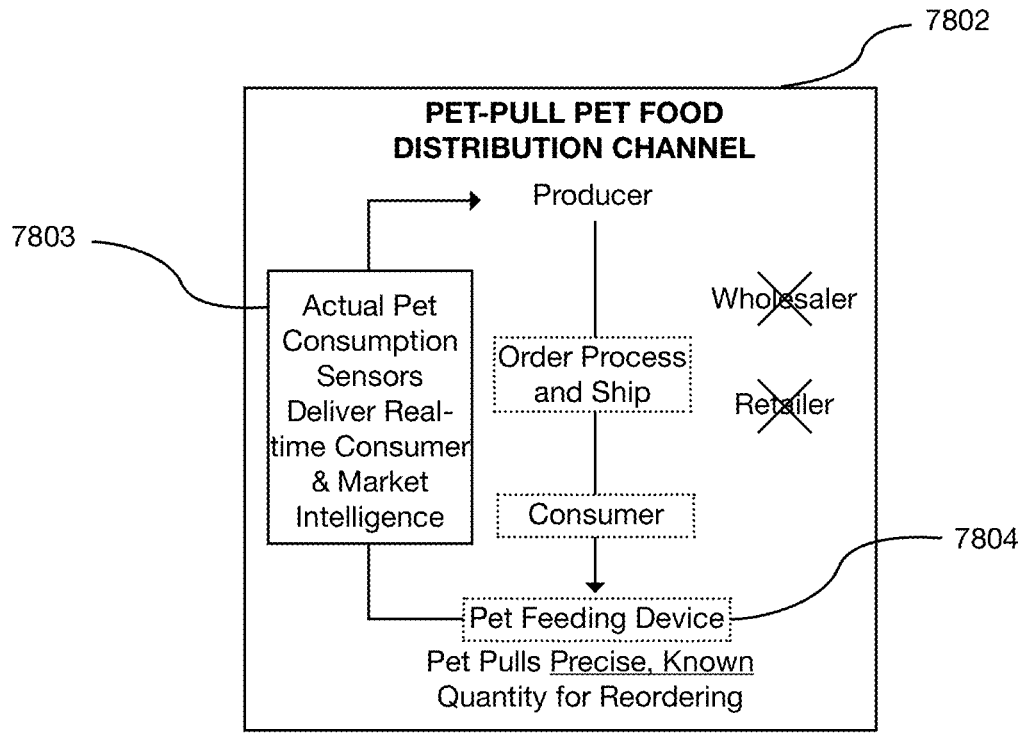

FIG. 90

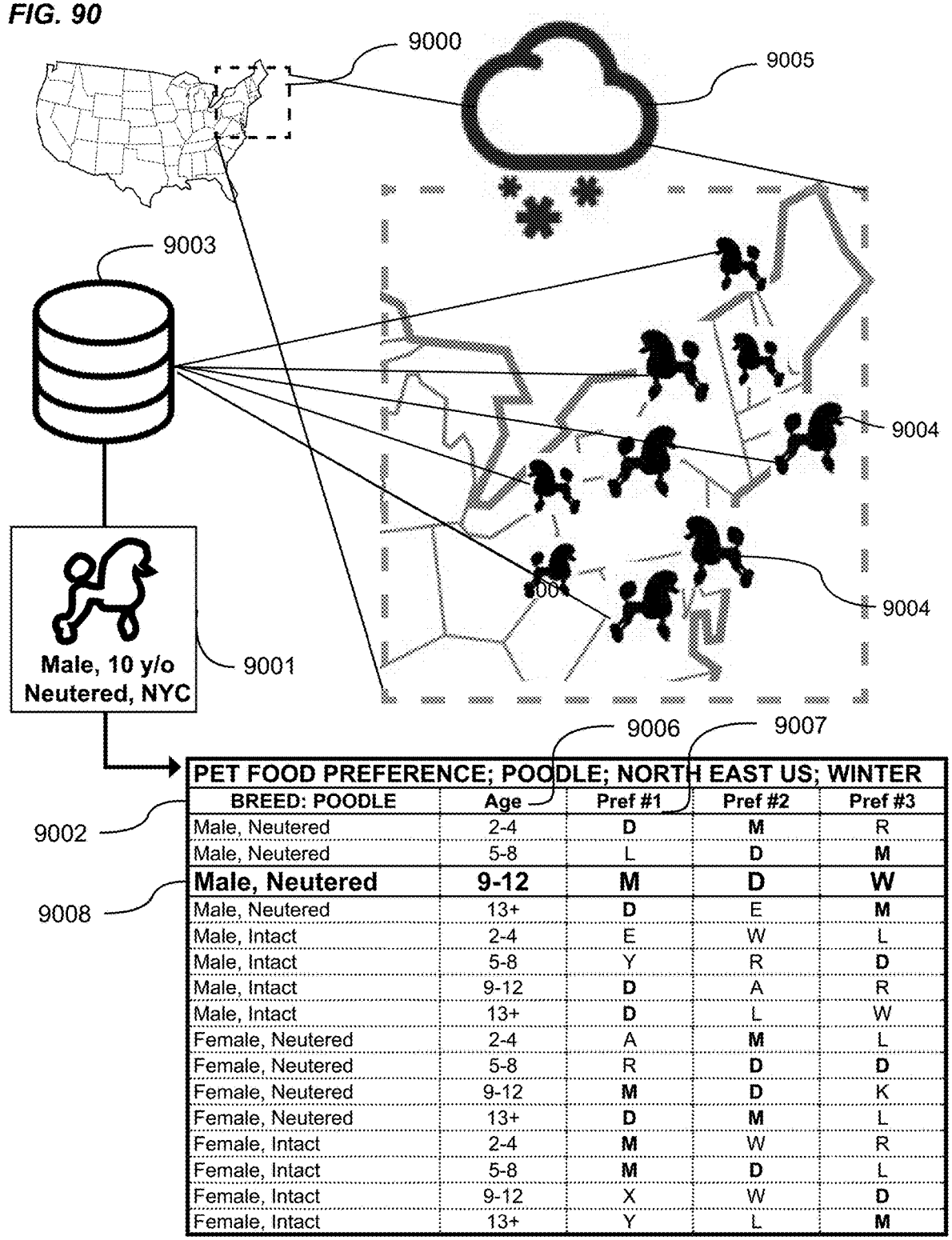

| PET FOOD PREFERENCE; POODLE; NORTH EAST US; WINTER | | | | |
|---|---|---|---|---|
| BREED: POODLE | Age | Pref #1 | Pref #2 | Pref #3 |
| Male, Neutered | 2-4 | D | M | R |
| Male, Neutered | 5-8 | L | D | M |
| Male, Neutered | 9-12 | M | D | W |
| Male, Neutered | 13+ | D | E | M |
| Male, Intact | 2-4 | E | W | L |
| Male, Intact | 5-8 | Y | R | D |
| Male, Intact | 9-12 | D | A | R |
| Male, Intact | 13+ | D | L | W |
| Female, Neutered | 2-4 | A | M | L |
| Female, Neutered | 5-8 | R | D | D |
| Female, Neutered | 9-12 | M | D | K |
| Female, Neutered | 13+ | D | M | L |
| Female, Intact | 2-4 | M | W | R |
| Female, Intact | 5-8 | M | D | L |
| Female, Intact | 9-12 | X | W | D |
| Female, Intact | 13+ | Y | L | M |

FIG. 92

| | | | | | | |
|---|---|---|---|---|---|---|
| (CORPORATION NAME) PET-DRIVEN PRODUCTION PLANNING ||||||||
| PET FOOD; ALL DOGS' PREFERENCE TRENDS - UNITED STATES ||||||||
| | HISTORICAL Preference Trends ||| | PREDICTED PRODUCTION CNG |
| Food Product (SKUs) | Q1 | Q2 | Q3 | Q4 |
| 1234-1000-hearty | 0 | -9% | -4% | -5% |
| 1234-1002-liver | -12% | -11% | -15% | # DISCONTINUE # |
| 1234-1004-chicken | N/A - Intro. | 12% | 42% | 50% |
| 1234-1006-beef | 0% | 0% | 2% | 1% |
| 1234-1008-pork | -1% | 0% | 1% | 0% |
| 1234-1010-venison | 5% | 0% | 3% | 3% |
| 1234-1012-salmon | 9% | -5% | 2% | 2% |
| 1234-1014-turkey | 1% | 1% | 1% | 1% |
| 1234-1016-pea-carrot | 0% | 1% | -1% | 0% |
| 1234-1018-lamb | -3% | -2% | 6% | 0% |
| 1234-1020-veggie | -8% | -1% | -1% | -3% |
| 1234-1022-diabetic | 7% | 9% | 5% | 7% |

FIG. 94

REVERSE COMPETITIVE ANALYSIS: PALATABILITY OF CANINE-PREFERRED FOODS

Breed: POODLE

Food Type: KIBBLE, DRY

Market / Territory: UNITED STATES, WESTERN STATES

Total Number of Dogs Tracked in Market / Territory: 1,238,757

BREED Cohort Tested: Tracked in Market / Territory: 26,585 (2.1% of Market)

| Manufacturer / Product SKU | Rank Overall* | % of Poodles | Kibble Size | Coating Oil | pH Adjusted | Report #: Gas Chromatograph | Report #: E-tongue | Observed Texture A-N | Predominant Flavor | Other Metrics |
|---|---|---|---|---|---|---|---|---|---|---|
| P-Food-Corp 864325110 | 1 | 37 | *Large 16 mm* | *Canola* | NO | #412640.13 | #AHP214 | G | *Chicken* | As Needed |
| P-Food-Corp 335458455 | 2 | 26 | *Large 15mm* | *Canola* | Succinic | #412640.14 | #AFR002 | B | *Chicken* | As Needed |
| B-Food-Corp 111877823 | 3 | 18 | Med 11 mm | Canola | Sorbic | #810019.13 | #BBX981 | F | Beef | As Needed |
| M-Food-Corp 868245571 | 4 | 6 | Med 12 mm | Palm | Fumaric | #319285.13 | #AXP611 | L | Chicken | As Needed |
| M-Food-Corp 234552786 | 5 | 2 | Large 16 mm | Canola | Sorbic | #121818.14 | #AZX418 | G | Pork | As Needed |
| B-Food-Corp 001104688 | 6 | 1 | Med 11 mm | Palm | NO | #000311.11 | #BLR069 | K | Beef | As Needed |
| Not Tested | N/A | >1 | Not statistically relevant. Foods with under 1% market adoption not tested. | | | | | | | |

Rank: Determined by lowest consumption times by (specified breed) within the subject Market / Territory.

NOTES:
1. All consumption times are collected in real time from in-home automated weight / time feeding systems. Consumption times for the respective foods were averaged over the previous 30 consecutive days / 30 feeding events per each dog analyzed.
2. Adjustments have been made to account for caloric values of the tested food products relative to the volume of food consumed by the (breed) tested.

*FIG. 95*

| REVERSE ENGINEERED RECIPE - #1 & #2 PREFERRED BY ALL <u>SENIOR</u> DOGS |||||||||||
|---|---|---|---|---|---|---|---|---|---|---|
| Breed: ALL ||||||||||||
| Food Type: KIBBLE, DRY ||||||||||
| Market / Territory: UNITED STATES, ALL ||||||||||
| Total Number of Dogs Tracked in Market / Territory: 11,839,440 ||||||||||
| SENIOR DOG Cohort Tested: Tracked in Market / Territory: 2,441,744 (20% of Market) ||||||||||
| Manufacturer / Product SKU | % of Seniors | Kibble Size | Coating Oil | Weekly portion | pH Adjust | Report #: Gas ChromatO | Report #: E-tongue | Texture A-N | Flavor | Protein Source |
| H-Food-Corp 555586422 | 26 | Med 11 mm | Canola | 2.13 kg | NO | #5839237.12 | #BAD785 | G | *Chick* | Meat |
| H-Food-Corp 658713745 | 21 | Med 12 mm | Canola | 2.4 kg | NO | #468857.14 | #ATL322 | B | *Chick* | Meat |

SENIOR DOG REPORT DATA EXTRACTION AND ANALYSES

ENGINEERING ANALYSIS

1) Baseline Product Recipe Features:
   a) Kibble Size: Medium
   b) Texture between G and B grade
   c) General Flavor: Chicken
   d) Protein Source: Meat
   e) Taste: Target Match E-tongue profile to Overlay #BAD785 and ATL322
   f) Aroma: Target Match Gas Chromatograph profile to Overlay #5839237.12 and #468857.14
   g) Kibble Coating: Canola, Non pH Adjusted
   h) Kibble Size: 11-12 mm

PRODUCTION ANALYSIS

1) Package Size: 1 week package = 2.5kg // 1 month package = 10 kg / dog / month average.

BUSINESS CASE ANALYSIS:

1) Objective: Displace suppliers of Senior Dog #1 & #2 preferred products.
2) Target Customers: 1.1 million (47% of senior dogs on the in-home system)
3) Average Consumption per Dog per Week: ~2.25 kg.
4) Weekly Production Req'd at Full Scale-up: ~2.5 million kg. (425,000 kg X 6 production days)
5) Estimated time to convert 80% of target to new food: 90 days.

FIG. 96

COMPARISON OF LIMITATIONS OF PET FOOD PALATABILITY TESTS

| TEST METHOD | In-Home Pet Testing | Typical Size of Cohort | Can Over / Under Feed | Uses Trained "test" Pets | Trained Test Moderator | Multi-pet Households | Test Across All Pet Breeds | Typical Test Duration | Time: Test to Results | Tight Test Protocols | # Foods that can be Tested Simultaneously | Data Collected | Data Analysis Method | Geographic Preferences | Environmental Pref. | Finds New Foods |
|---|---|---|---|---|---|---|---|---|---|---|---|---|---|---|---|---|
| PRESENT INVENTION | Yes - 100% in-home | <1,000 | No | No | Yes | Yes | Yes | Ongoing Perpetually Self-Adjusting | On Demand | No | <1,000 | Big Data Quantitative | Large Scale Regression Analysis, Data Maps | Yes | Yes | Yes |
| Two-Bowl | No | 30 +/- | Yes | Yes | Yes | No | No | Days - Weeks | Weeks-Months | Yes | 2 | Qualitative | Descriptive Statistics | No | Yes | No |
| One-Bowl | Maybe | 30 +/- | Yes | Yes | No | No | No | Days - Weeks | Many Weeks | Yes | 1 | Qualitative | Descriptive Statistics | No | No | No |
| Liking Test | Maybe | 30 +/- | No | Yes | No | No | No | 2-3 days | Many Weeks | Yes | 1 | Qualitative | Descriptive Statistics | No | Yes | No |
| Exploratory Behavior | No | 30 +/- | No | Yes | No | N/A | No | Varies | Many Weeks | Yes | ≥2 | Subjective, Qualitative | Subjective, Some Statistics | No | No | No |
| CPAP | No | 30 +/- | No | Yes | No | No | No | Weeks | Many Weeks | Yes | >4 | Qualitative, Limited Quantitative | Descriptive Statistics | No | No | No |
| CSP | No | 30 +/- | No | Yes | No | No | No | Varies | Months | Yes | >6 | Qualitative, Limited Quantitative | Descriptive Statistics | No | No | No |
| Kinetics | No | 30 +/- | No | Yes | No | No | No | 20 Hours | Many Weeks | Yes | >4 | Qualitative, Limited Quantitative | Descriptive Statistics | No | No | No |

ANIMAL FOOD AND WATER BOWL SYSTEM

CROSS REFERENCE TO RELATED APPLICATIONS

The present application is a continuation of U.S. application Ser. No. 14/987,080 filed on Jan. 4, 2016 which issues as U.S. Pat. No. 10,674,702 on Jun. 9, 2020, which claims priority to the following U.S. provisional patent applications: U.S. Ser. No. 62/100,058 filed Jan. 5, 2015, U.S. Ser. No. 62/108,154 filed Jan. 27, 2015, U.S. Ser. No. 62/108,160 filed Jan. 27, 2015, U.S. Ser. No. 62/109,188 filed Jan. 29, 2015, U.S. Ser. No. 62/190,805 filed Jul. 10, 2015, U.S. Ser. No. 62/191,587 filed Jul. 13, 2015, U.S. Ser. No. 62/192,137 filed Jul. 14, 2015, U.S. Ser. No. 62/199,761 filed Jul. 31, 2015, U.S. Ser. No. 62/243,389 filed Oct. 19, 2015, and U.S. Ser. No. 62/254,223 filed Nov. 12, 2015. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to an animal health monitoring, diagnosis and maintenance system for automated nutrition and hydration data collection, food and water consumption tracking, reporting, and to pet food production, distribution and supply chain management to maximize the health of animals.

Related Art

Any discussion of the related art throughout the specification should in no way be considered as an admission that such related art is widely known or forms part of common general knowledge in the field.

It is well known that pet animals, such as pet dogs and cats, should consume appropriate amounts of food and water each day as a means of improving or maintaining proper health and weight throughout their lives. Poor pet nutrition management increases long term health care costs for pet owners, and shortens the pets' lives considerably when compared to the pets' healthy peers.

Literature teaches that improper pet nourishment and hydration are largely attributable to pet owner ignorance because there exists no simple and reliable system or method of precisely calculating the correct daily calories and water that should be, or in fact are consumed by each unique animal.

Another problem in the pet food industry is the high frequency, liability exposure and expense of food recalls by manufacturers due to the discovery of food contaminants harmful or potentially fatal to the pets. Today, pet food passes through many links in the supply chain, and the time it takes to move the food from producer to consumer can be many months resulting in broad geographic distribution of pet food, and leaving food producers and pets vulnerable to poor and untimely supply chain management.

Yet another problem is the ergonomically incorrect design and positioning of cat and dog food and water bowls for the most comfortable and natural eating. Additionally, poor design contributes to poor sanitation and the transfer of potentially harmful pathogens or contaminates between the food and water bowls to the owner's hands, or the transfer of contaminates form the owners' hands to the pet food or water.

SUMMARY

An example embodiment of the present invention is directed to food or water bowl system for an animal including a platform having a support member and at least one leg extending downwardly from the support member. The support member includes an upper surface and a recessed portion within the upper surface that removably receives a lower surface of bowl. A first connector is adapted for removably connecting the first bowl to the upper surface of the support member in a substantially non-movable manner. At least a portion of the front upper edge of the bowl is below the rear upper edge of the bowl.

There has thus been outlined, rather broadly, some of the features of the animal health monitoring, diagnosis and maintenance system in order that the detailed description thereof may be better understood, and in order that the present contribution to the art may be better appreciated. There are additional features of the animal health monitoring, diagnosis and maintenance system that will be described hereinafter and that will form the subject matter of the claims appended hereto. In this respect, before explaining at least one embodiment of the animal health monitoring, diagnosis and maintenance system in detail, it is to be understood that the animal health monitoring, diagnosis and maintenance system is not limited in its application to the details of construction or to the arrangements of the components set forth in the following description or illustrated in the drawings. The animal health monitoring, diagnosis and maintenance system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 10 is an exemplary diagram illustrating a plurality of animal and environmental conditions, changes in which drive changes in daily food energy portioning.

FIG. 11a is an exemplary diagram illustrating four stages of life for domesticated dogs and cats.

FIG. 11b is an exemplary diagram illustrating the differences in estimated life spans for certain breeds of dogs.

FIG. 12 is an exemplary diagram showing a portion of an animal energy requirements chart, in particular illustrating the variable energy requirements of an animal based on changing conditions throughout the animal's life.

FIG. 16 is an exemplary diagram showing weight fluctuations relative to unchanged food energy portions, and correlating to reduced food portions.

FIG. 31A is an exemplary diagram illustrating the side view of a canine bust highlighting selected anatomical features.

FIG. 31B is an exemplary diagram illustrating the underside of a canine head and neck.

FIG. 32 is an exemplary diagram illustrating an improved pet collar.

FIG. 35A is an exemplary diagram illustrating a top view of a center pull collar with adjusted to the largest diameter.

FIG. 35B is an exemplary diagram illustrating a top view of a center pull collar with adjusted to a median diameter.

FIG. 35C is an exemplary diagram illustrating a top view of a center pull collar with adjusted to the smallest diameter.

FIG. 36 is an exemplary diagram illustrating an exploded isometric view of an improved collar assembly.

FIG. 67 is an exemplary diagram illustrating three views of an improved food bowl.

FIG. 76 is an exemplary diagram illustrating a representative hand removing an improved water or food bowl from a purpose-designed elevated food or water bowl stand.

FIG. 77A is an exemplary diagram illustrating a sectional view of a portion of the back wall of a food or water bowl, above the water line, with a high friction material applied to the inner surface of a bowl wall.

FIG. 77B is an exemplary diagram illustrating hand placement on a food bowl with a high friction material applied to the inner surface.

FIG. 78 is an exemplary diagram showing a traditional food distribution channel, and an improved distribution channel.

FIG. 90 is an exemplary diagram illustrating a population of pets a pet-monitoring network.

FIG. 91 is an exemplary diagram illustrating pet food consumption trends for a pet upon a pet-monitoring network.

FIG. 92 is an exemplary diagram illustrating a food manufacturing planning analysis extracted from food consumption data recorded from a pet-monitoring network.

FIG. 93 is an exemplary diagram illustrating a food manufacturer competitive analysis extracted from food consumption data recorded from a pet-monitoring network.

FIG. 94 is an exemplary diagram illustrating a food manufacturer competitive analysis extracted from breed-specific food consumption data recorded from a subgroup of pets on a pet-monitoring network.

FIG. 95 is an exemplary diagram illustrating a food manufacturer competitive analysis extracted from breed-specific food consumption data recorded from a senior-aged subgroup of pets on a pet-monitoring network.

FIG. 96 is an exemplary diagram comparing the palatability testing features and capabilities of the present invention to the features and capabilities of all palatability test methods in standardized use in the pet food industry.

DETAILED DESCRIPTION

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments" is not exhaustive and does not require that all embodiments include the discussed feature, advantage or mode of operation.

The term "pet" as used herein shall include any and all types of animals including, but not limited to, non-domesticated animals, domesticated animals, non-domesticated mammals and/or domesticated mammals (e.g. canine, feline, bovine or equine species, male or female).

Figure 1:
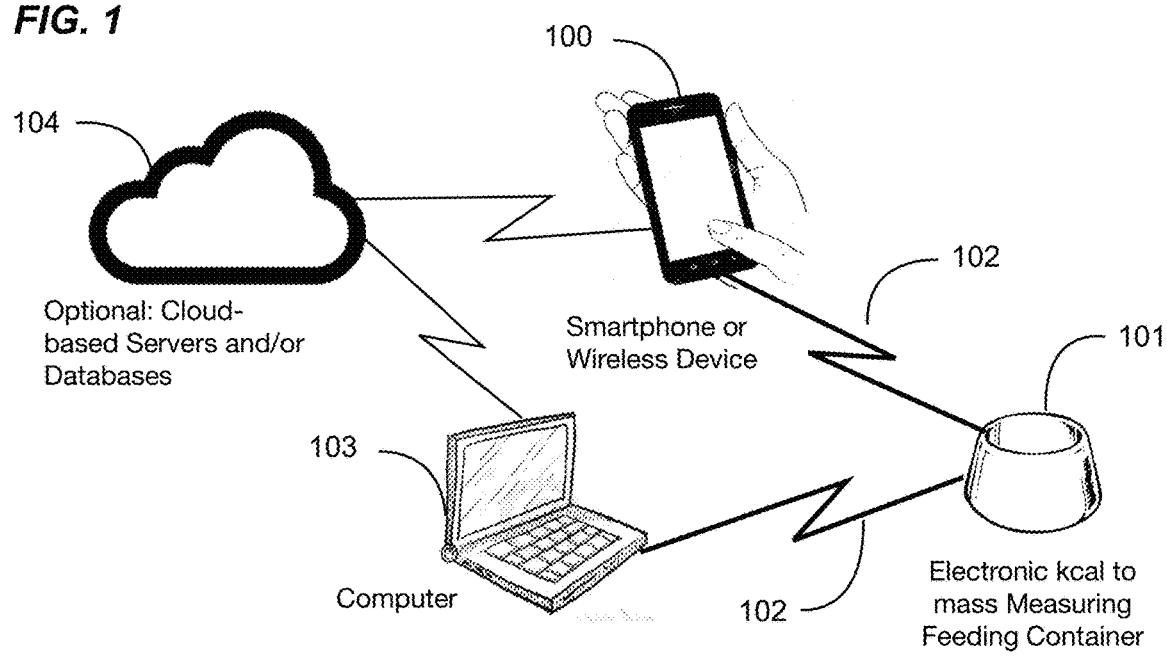
FIG. 1 is an exemplary diagram showing a food portion management system comprising a communication network and measuring feeding container.

FIG. 1 is an exemplary diagram showing a food portion management system comprising a communication network and measuring food bowl. More specifically, a food bowl 101 provides for measuring the weight of dry or wet food material by use of an integral scale. Within a network, the food bowl is in wired or wireless communication 102 with at least a smartphone 100, a wireless device or computer 103, one or more of which may be in communication with servers or databases within the network.

In one instance, a software application installed upon the "Cloud" 104, computer 103 or other wireless device on the network provides for a specified weight of food to be communicated to the food bowl. A food bowl containing a scale and an electronic circuit retains the instant desired weight in a memory, and measures the weight of food entered into the bowl in real time. At such time as the desired weight equals the instant weight, the bowl provides a means not shown to notify the person filling the bowl that the desired weight has been achieved.

In another instance, a food bowl containing a scale and an electronic circuit provides for measuring the weight of food entered into the bowl, and in real time communicating the measurement to a computer or other wireless device on the network. The computer or device, having been previously installed with software to compare a desired weight with actual weight of food entered into a bowl, provides for a means not shown to notify the owner that the desired measure of food has been entered into the food bowl.

In yet another instance, a food bowl containing a scale and an electronic circuit provides for measuring the weight of food entered into the bowl, and in real time communicating the measurement to a computer or other wireless device on the network that, in turn communicates the measurement data to servers 104 upon a network. The servers, having been previously installed with software to compare a desired weight with actual weight of food entered into a bowl, provides for a means not shown to communicate back to the communicating computer or wireless device to notify the owner that the desired measure of food has been entered into the food bowl.

Figure 2:
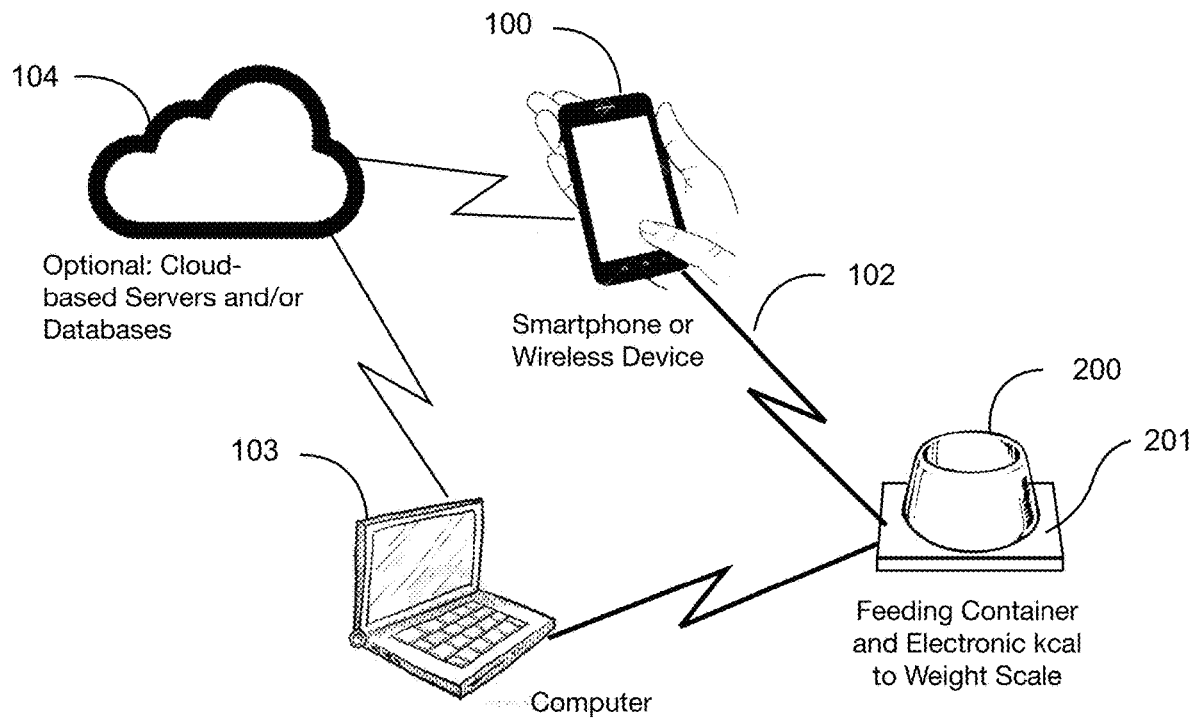
FIG. 2 is an exemplary diagram showing a food portion management system comprising a communication network and measuring scale.

FIG. 2 is an exemplary diagram showing a food portion management system comprising a communication network and measuring scale. More specifically, a scale 201 provides for measuring the weight of dry or wet food material entered into a food bowl 200 in physical communication with the scale. Within a network, the scale is in wired or wireless communication 102 with at least a smartphone 100, a wireless device or computer 103, one or more of which may be in communication with servers or databases 104 within the network, and operates in substantially the same manner as the just described food bowl.

As one point of differentiation, the scale provides for zeroing the tare weight of the bowl prior to filling the bowl with food, thereby ensuring that only the food weight is measured ensuring the food measurement process.

Figure 3:
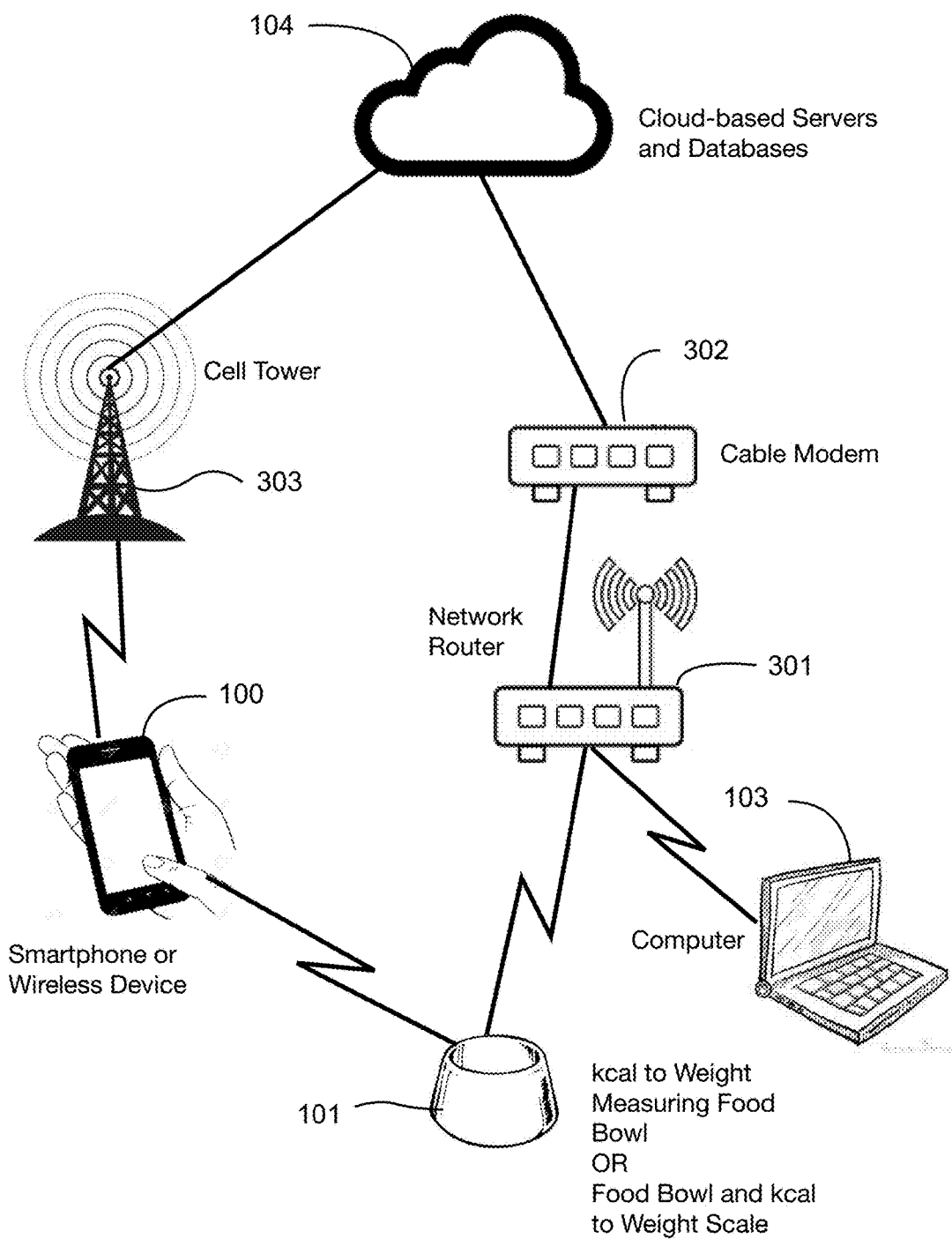
FIG. 3 is an exemplary diagram showing a representative digital communication network for a food portion management system.

FIG. 3 is an exemplary diagram showing a representative digital communication network for a food portion management system. More specifically, the diagram illustrates various configurations that provide for communication to or from a measuring food bowl 101 and a computer program not shown that may be installed upon a computer 103, smartphone or other hand-held wireless device 100, or upon a cloud-based server 104, the software therefore providing for receiving weight measurement information from a food bowl 101, and comparing in real time the weight against a desired weight of food for the specific animal as would have been previously determined the computer program. Those skilled in the art will appreciate that various means not shown may be used to inform the animal owner when the actual food measurement equals the desired measurement, those means including audible alerts, visual alerts such as indicator lights upon the food bowl, or digital messages that may be delivered to a smartphone by text or SMS, or messages delivered by email to a computer or other client device capable of receiving email messages. The present invention is not meant to be limited to the method of informing the owner when the proper measure of food has been entered into the bowl, but is intended to provide the means of owner notification so that the food portion actually delivered to the animal supports the healthiest weight objectives.

Further, the diagram illustrates various means of communication between a food bowl 101 and various devices within the facility where the animal meal is prepared, namely a Bluetooth connection between a food bowl and smartphone 100, a wireless WIFI connection between a bowl and network router 301, a network connection between a food bowl and computer 103, or a connection to the cloud 104 via router 301 and cable modem 302, or Bluetooth and cellular connection via smartphone 100, and cellular station 303.

The configuration just described is not meant to be limiting, and indicated merely a few of the many possible communication structures that may connect a measuring food bowl to a software program providing for the comparative analysis between the desired food measure for any particular animal, and the actual food being entered into a food bowl that will be presented to that animal for consumption.

Figure 4:
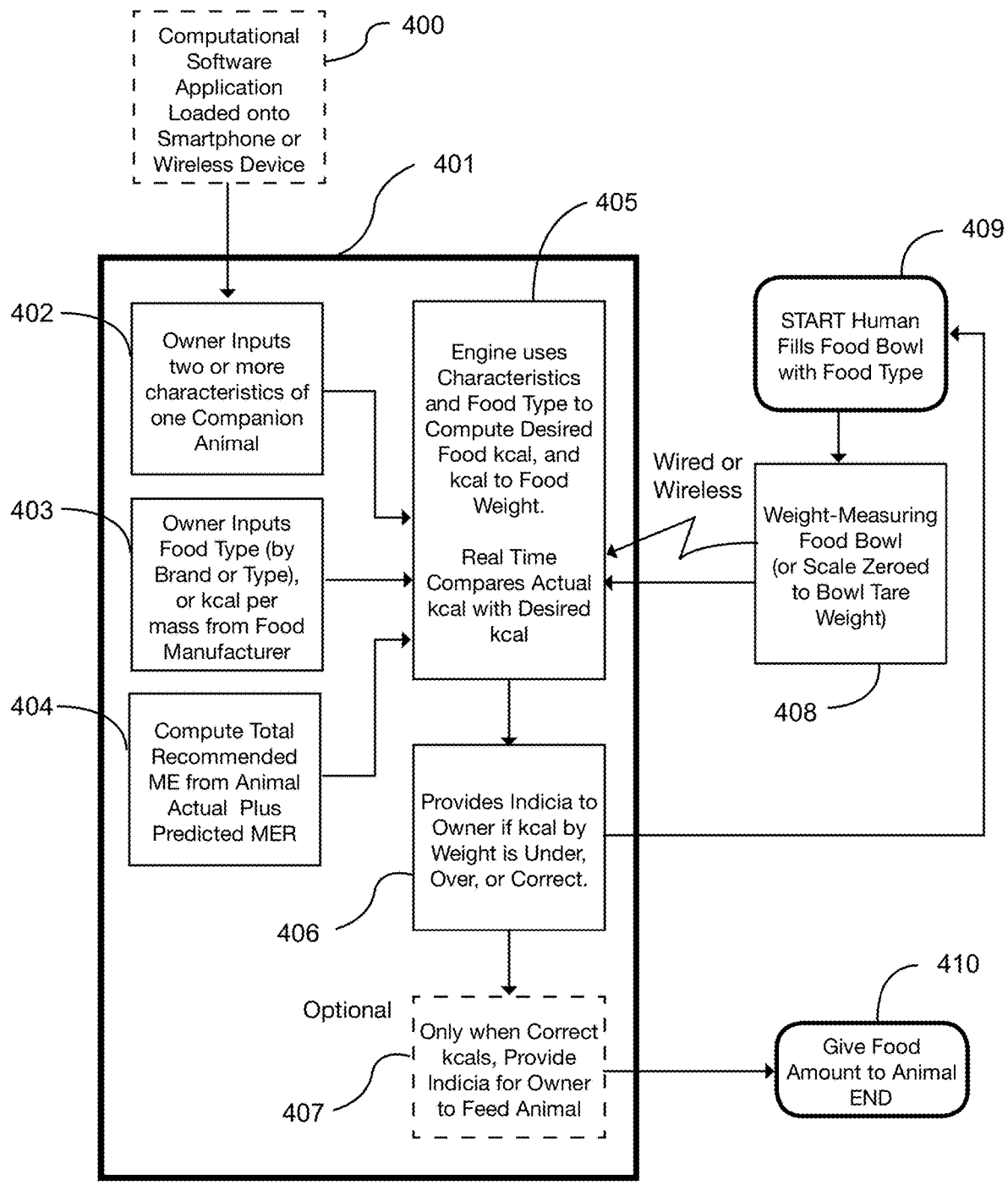
FIG. 4 is an exemplary diagram illustrating a food portion management system comprising a "dumb" feeding bowl on a local area network (LAN).

FIG. 4 is an exemplary diagram illustrating a food portion management system comprising a "dumb" feeding bowl on a local area network (LAN). A food bowl 408 provides primarily for the outbound communication of the measured weight of food being entered into the bowl. In the case where a container containing no electronics is used for delivering the food, an electronic scale shall server the same function as the food bowl just described.

It should be noted that each time a meal is prepared for an animal, the bowl will be presumed to be empty, and the weight of the contents in the empty bowl is resettable to "zero" prior to entering food for the next meal.

The food bowl is in wired or wireless communication with a food measuring system and method 401.

In the drawing, a software program 400, sometimes referred to as a "mobile app" is installed upon a smartphone or wireless device not shown. After installing the program, the owner launches the program and populates the memory partition of the program with certain characteristics of their animal 402, for instance, if the animal is a dog, notable characteristics may include current weight, target weight, age, whether the animal is neutered, and the level of typical daily activity. The program will use this information to compute the estimated nutritional requirements of the dog, usually expressed in kilocalories, or "kcal".

Further, the owner will input the type of food 403 usually fed to the dog for which the characteristics were just entered. The food type may include the food brand name, and product name, or alternatively, the energy content of the food in kcal per serving measurement. If the owner enters the food type by brand, the program will access a database of known brands snot shown, but incorporated into the program, to determine the energy content per food measure as was previously installed in the program.

The program then uses the entered characteristics 402 and the food type 403 to compute the estimated daily energy requirements that must be replaced by food consumption in order to maintain a healthy weight. Those skilled in the art will recognize this as a Metabolic Energy Requirement, or "MER", typically expressed in kcal.

A computational engine 405 correlates the estimated daily MER of the animal (in kcal), with the kcal contained in the selected type of food, thereby establishing the appropriate amount of the selected type of food that will deliver to the animal the full MER.

As an example of the foregoing description, a dog owner may enter that his dog is a neutered 5-year old (adult), 30 pounds in weight, with a 25 pound target weight, the animal being mildly active as typical of a house pet with 30 minutes or so of daily play activity.

With a targeted weight of 25 pounds, activity being unchanged, the program will retrieve from an energy database not shown, but having been previously loaded into the computer program, a daily MER of 460 kcal.

Separately, and apart from the MER analysis for the owner's particular dog, the food type, having been selected from the previously described food database as being JAMS® ProActive Health™ Adult MiniChunks, indicates an energy content of 3,638 kcal/kg.

The computational engine 405 therefore computes the actual food measure of JAMS® ProActive Health MiniChunks by dividing the dog's 460 kcal MER requirements by the JAMS® energy content of 3.638 kcal/gm, or a portion size of 126.4 gm (or approximately 4.44 oz). Therefore, the daily recommended food volume of this type of food, for this unique dog is estimated at 126.4 gm.

Now then, the owner begins to fill the empty food bowl 408 with the selected type and brand of food. As the bowl scale senses an increase in pressure from the food, it communicates the measurement to the program 405 wherein the engine 405 compares the actual food measurement against the desired 126.4 gm measurement as just described.

The program further provides for the engine to create one or more output signals to indicate at least when the actual measurement of food is substantially the same as the desired measurement of 126.4 gm. The program may further communicate a signal indicating that not enough food has been entered into the bowl, or that too much food has been entered into the bowl.

In all cases where the engine makes a comparison and determines a ratio of desired food amount to actual food amount, it may communicate the information to the owner so that the owner knows when to stop pouring food into the bowl (or informs the owner that food should be removed if too much food was entered into the bowl).

The methods by which the present invention informs the owner may be visual indicia in the form of a graphic illustration presented on the screen of the wireless device or computer upon which the program is installed, or by an audible means, the sound being played over a speaker on the wireless device or computer.

If the indicia is presented only when the correct amount of food is entered into the bowl, as determined by the program 407, the indicia then correlates to an instruction to feed the animal 410.

The benefit of the foregoing system and method just described is that for the first time, owners of domesticated animals have a precise method of ensuring that they are feeding their animal an amount of food that more accurately corresponds to the animal's actual energy requirements, based on actual energy contained in the type of food that the owner is feeding the animal.

This solves the problem of over or under-feeding the animal, a situation evidenced by pet obesity and overweight conditions that effect more than 50 percent of the dogs and cats in the United States, and for the first time provides a higher level of precision in feeding protocol that uses weight-based kcal content of the food, rather than the broad and imprecise general feeding guidelines that rely on volume-based portion management.

Figure 5:
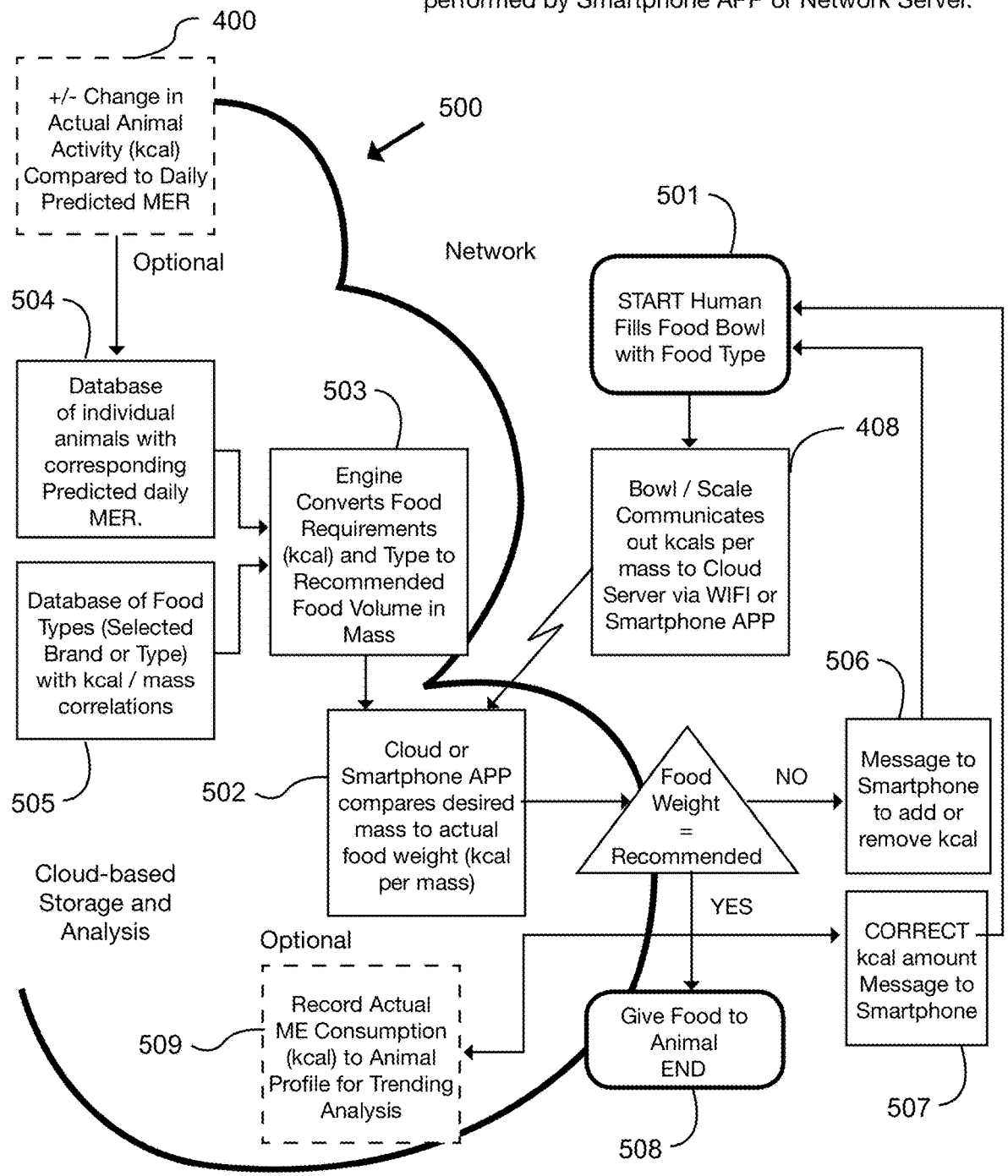
FIG. 5 is an exemplary diagram illustrating a food portion management system comprising a "dumb" feeding bowl on a wide area network (WAN).

FIG. 5 is an exemplary diagram illustrating a food portion management system comprising a "dumb" feeding bowl 408 on a wide area network (WAN) 500. In some instances, a more robust animal energy requirements and food analysis may be desired. As previously described, the present invention provides for the MER of unique animals to be determined and used to compute the estimated daily weight of a portion of a specified food. However, non-typical activities for dogs, such as going for a long hike with its owner, consume additional energy beyond the animal's typical MER. In these instances, it is desirable to enter the additional activity level 409 into the animal's MER profile in order to adjust the food amount upward.

In other instances, since the owner's dog characteristics and food type require a small data storage, it may be desired to reduce the larger memory requirements imposed on wireless devices or computers created by including large databases of all known food types or MERs by age, weight and other characteristics of a reasonably broad population of dogs of all types and breeds. In these instances, it is preferred to include the comprehensive food and MER databases representing all food types and all dog types on larger servers upon a network, and retrieving the appropriate small bits of data only when needed.

In the drawing, a cloud-based network 500 comprises at least one database 504 containing characteristic profiles of two or more unique animals, the characteristics including at least each animal's MER.

It should be noted that the MER for each animal is computed by multiplying the Resting Energy Requirement by one of a number of factors that adjust an average RER to a more accurate MER estimation for an animal taking into consideration its typical daily activity level, age, whether female lactating or neutered, and other factors well known to those in the veterinary community.

A second database 505 is shown containing at least two food types typically fed to domesticated dogs. Preferably, the food types comprise a list of all manufacturers' brands of different dry or moist food, bagged, boxed or canned, and further comprising the caloric content per specific measure of food associated with that brand, the measure preferably being in kcal/gm.

Now then, a first processor 503 within the network is programmed to at least retrieve the food type and MER records for any particular animal from the appropriate databases, and using formulae previously described, compute the estimated mass of food corresponding to the animal's daily ME requirements. For later efficiency, the ME may be recorded in the animal's profile for future look-up, rather than re-computing the ME for each daily food preparation.

A second processor 502, the functions thereupon optionally performed on the first processor in lieu of requiring a second processor, receives communication from a food bowl 408 specifically containing a measurement reading of the amount of food that an owner 501 pours into the food bowl. Upon receiving the food measurement data, the processor compares the actual food measure with the computed estimated measure 503, and provides real-time or near real-time feedback to the owner.

If an insufficient amount of food has been entered into the bowl, or if too much food has been entered into the bowl, the apparent under-feeding or over-feeding conditions will result in a message 506 alerting the owner to either add more food, or remove food. Healthy weight management requires that caloric intake should approximate daily energy expenditure.

On the other hand, the moment that an amount approximating the recommended daily amount of food has been entered into the food bowl a message 507 is provided to the owner to stop filling the fowl, and to now feed the animal 508.

At the end of the feeding cycle, another measurement not shown may be taken by the food bowl and communicated to the network, the message 509 being data recorded in the daily food log of the animal's individual profile. It is important to note that if less than the entire amount of food was consumed, the actual food measure is compared to the recommended measure for future analysis. Chronic undereating may signal the onset of a medical condition, at which time, another database not shown, containing at least lookup tables correlating eating disorders with underlying health reasons, informs the owner of the possible causes and remedies, or to seek veterinary care.

There are a number of advantages to hosting the databases and software applications in a cloud-based network, particularly the benefit of infrastructure scalability to accommodate a virtually unlimited number of pet profiles and pet owners engaging with the present invention, as well as the benefits of being able to update food definitions, animal profiles or algorithms based relatively on changes that a food manufacturer may make in the caloric content per measure of their food brands, changes in animal MERs based on ever-changing age, activity level or medical conditions and the like, and based on refinements in computation of recommended food mass based on self-correcting, feedback obtained from a plurality of pet owners engaging with the network based on observed weight change results.

Figure 6:
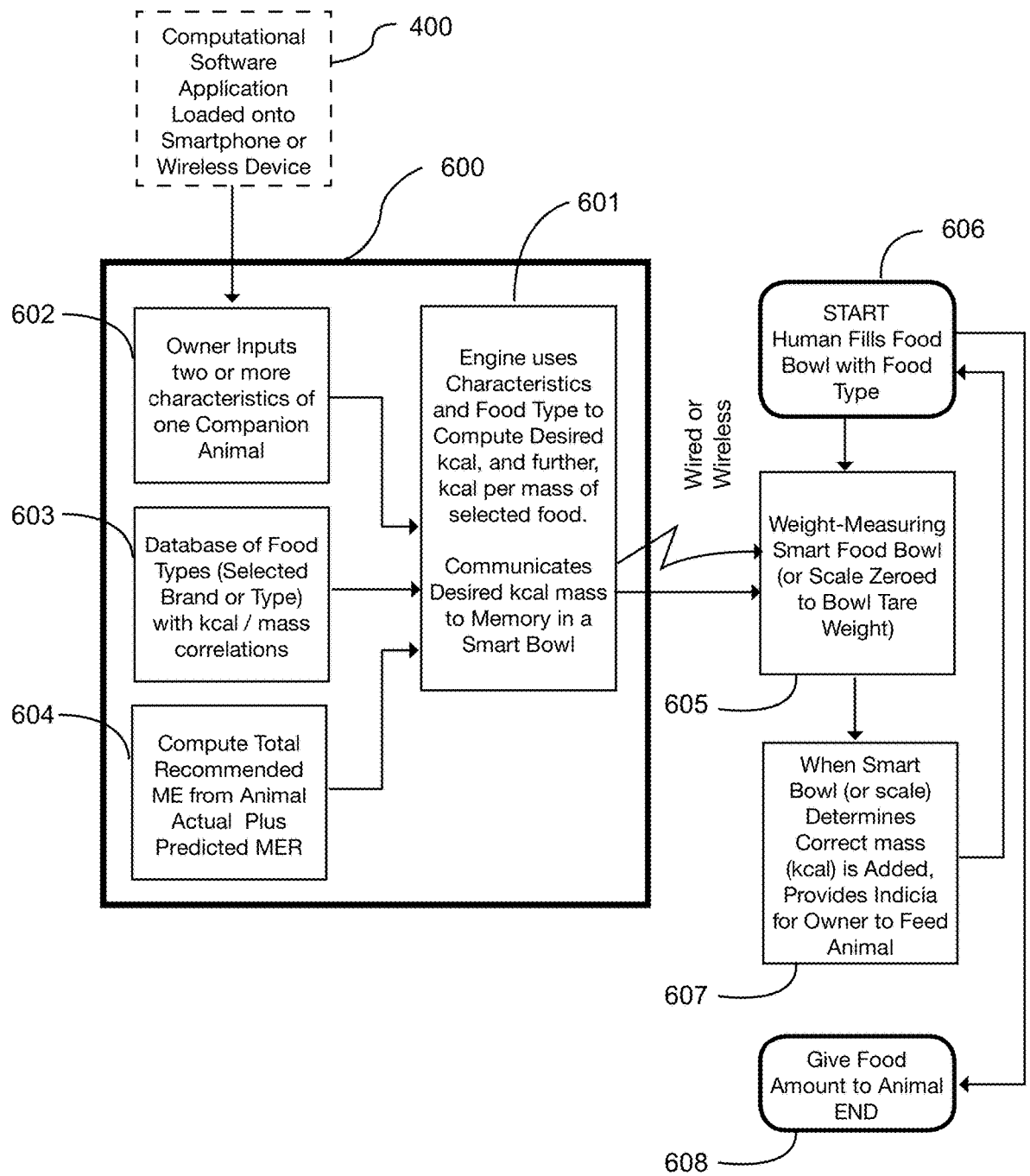
FIG. 6 is an exemplary diagram illustrating a food portion management system comprising a "smart" feeding bowl on a local area network (LAN).

FIG. 6 is an exemplary diagram illustrating a food portion management system comprising a "smart" feeding bowl on a local area network (LAN). More specifically, it may be preferable for an owner to receive immediate feedback as to proper food amounts in the bowl while pouring food into the bowl, without having to reference a computer, smartphone or other device on the network. In such instances, a portion of the present system and method functionality is removed from the network servers or devices to a smart food bowl 605.

In contrast to the previous descriptions relating to a food bowl that merely communicates measurement out to the network, the smart bowl is preferably duplex, or at least a receiving device on the network wherein the daily food measurement requirements are communicated to the food bowl from a processor 601.

The software program, having been loaded onto a computer or wireless device 600 comprises a database of food types 603 and associated energy content per unit of measure and/or means allowing the owner to enter energy per unit measure of a food type not contained in the database, and further provides for an owner to create an animal profile 602 consisting of various animal physiological, environmental or activity level characteristics as previously described.

In the event that the animal has experienced a substantial increase or decrease in daily activity compared to its typical daily activity, the system further provides for the owner to add an activity to the profile, the program further engaging a processor 604 to compute a new daily MER accounting for the activity change.

Finally, the processor 601 having finalized the suggested daily measure of of the specified food type communicates the measurement data to the food bowl where the data is stored at least until the food bowl is filled to the recommended measurement.

Now then, by interfacing only with the smart food bowl, the owner 606 begins filling the bowl. As the bowl is being filled, and the integrated scale measures the change in content within the bowl, the processor on the food bowl not shown compares the actual measure with the stored measure recommendation previously received fro the processor 601. At such time as the actual measure approximates the recommended measure, the program of the food bowl activates an alert informing the owner that the proper amount of food has been entered into the bowl, the alert being in the form of visual indicia, an audible sound, or digital message or email delivered to a device on the local network. Upon receiving the alert, the owner feeds the animal 608.

Figure 7:
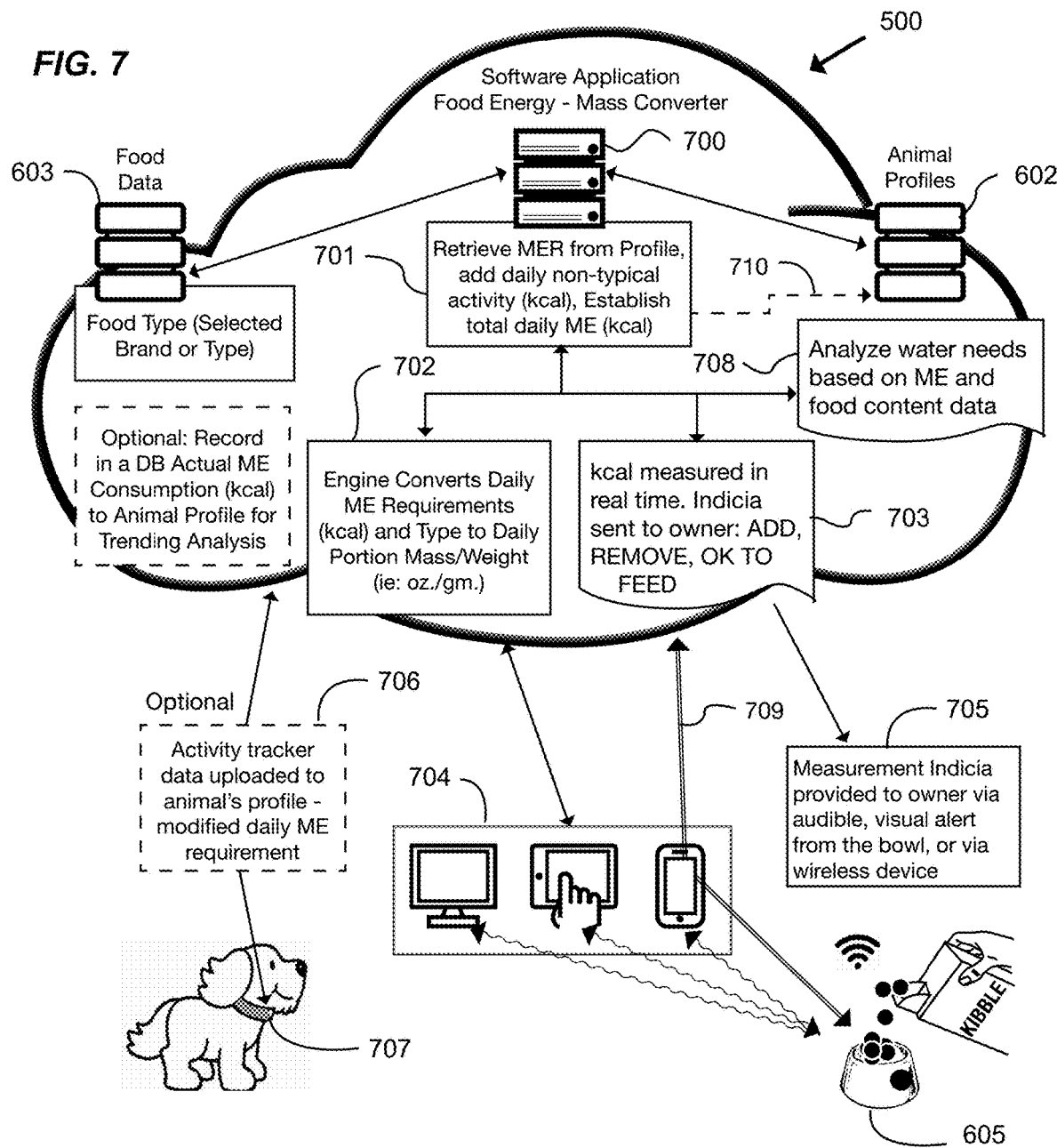
FIG. 7 is an exemplary diagram showing a food portion management system and method.

FIG. 7 is an exemplary diagram showing a food portion management system and method. More specifically, a wide area network is shown comprising a cloud-based IT infrastructure 500 comprising a plurality of databases, servers and processors. In the drawing, the system and method provides for a food database 603 scalable to provide for the storage of virtually any and all manufactured animal food by brand and type, including associated nutritional and caloric content, and specifically including at least sufficient information to allow the processor to compute the energy content in kcal per unit of measure, the preferred unit of measure being grams.

It should be noted that the food database may also contain raw food types not manufactured by animal food manufacturers. For instance, an owner may prefer feeding their animal a more primitive, non-manufactured diet that may consist of raw hamburger intended generally for human consumption, beef bones, animal fat, or certain vegetables or grains. The database 603 is further intended to scale to include energy content per unit of weight measure for non-manufactured foods.

The drawing further shows a database of animal profiles 602. Each profile of each animal comprises physiological, health, typical activity levels and other attributes unique to the animal. The importance of establishing and maintaining individual profiles is to ensure that the dietary intake of any particular food or food type is not generalized as instructed by animal food manufacturers, but tailored to the actual requirements of each animal.

One or more servers 700, in response to a dietary information request by an animal owner, also referred to as a system "user", or network "member", retrieve at least the recommended daily ME of the user's unique animal from the animal's profile, and further retrieves the energy content of the user-specified food he/she will be feeding to the animal 701.

In the event that the owner's animal has created additional activity data during the day 706, the data being created by any number of various pet activity tracking devices 707 commercially available to dog and cat owners, the additional activity is converted into kcal expended otherwise in excess of the typical energy expenditure of the animal, the additional energy requirements being added to the retrieved ME for the animal, and recomputed by the processor 701 to create a daily food energy computation more precisely correlating to the actual energy output of the animal.

Therefore, with the total ME having been established, the processor finally computes the daily food portion 702 by mathematically considering the energy content of the food, and the energy requirements of the animal, thereby establishing the unit of measure of food to enter into the food bowl.

As previously described, the food bowl of the drawing 605 may be a smart bowl with integral processing and user alert capability providing for self-contained means of notifying an owner at the time the proper measure of food is in the bowl, or a dumb bowl providing for communicating the measure to a separate wired or wireless device wherein the processing of food measure in the bowl is compared to the recommended measure, the comparison occurring on a network device separate from the food bowl.

It should be noted that those skilled in the art will recognize many communication structures that would result in food bowl measurements and food measurement requirements being compared on a network. Therefore, the foregoing description is not meant to be limiting, but is provided merely to illustrate some of the communication traffic and data processing options that may be employed in the present invention.

Therefore, with the recommended food measurement known, an owner pours food into a food bowl 605, the bowl being in communication with a computer or wireless device 704 more precise by various means just described, or being in communication with the cloud indirectly 709 via a local device, the measurement change is communicated to a processor 703 that compares the actual food measure with the recommended daily measure. Upon analysis, the processor communicates to the owner 705 using a variety of means previously described, whether the amount is under, over, or approximately equal to the recommended food portion to be fed to the animal.

Veterinary professionals have long recognized that water consumption is equally as important as caloric consumption, and many would agree that water is a more important nutritional component than food. Therefore, it is equally important for an owner to understand how much water their animal is consuming on a daily basis.

A large body of works teaches us a variety of methods well known for determining the daily hydration requirements of domesticated animals. The hydration requirements, having been determined by means now shown, generally establish the clear water consumption requirements of an animal.

On the other hand, various types of food deliver widely varying volumes of water per caloric unit of measure, For instance, canned food consists of approximately 80 percent water, while dry kibble consists of approximately 8 percent water. Therefore, an animal being fed canned food will obtain a considerable percentage of daily water requirements through the food.

Therefore, the present invention may provide for the food database 603 to further list the percentage of moisture content for each food type. The processor, upon establishing the unit measure of food for the daily portion of the specified food, further computes the total moisture content more precise 708 of the food in a unit of measure, preferably milliliters, or "ml". The number of ml of food-borne fluid may be reasonably subtracted from the total daily hydration requirement, thereby delivering a mathematical difference for the amount of additional clear water the animal should drink during the day.

Figure 8:
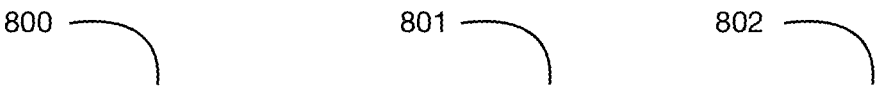
FIG. 8 is an exemplary diagram showing the representative example of a database table containing a plurality of discrete animal food types.

FIG. 8 is an exemplary diagram showing the representative example of a database table containing a plurality of discrete animal food types.

More specifically, a food record is created for each food type 800, the food types including but not limited to each variation of foods manufactured food by each manufacturing brand, and raw foods typically fed to domesticated animals. It is preferable that all nutritional content associated with each food type be included as a data field for each record, the nutritional content including vitamins, minerals, elements, caloric content, ingredients, and moisture content, but minimally, caloric content 801 expressed in energy per measured unit, and moisture content 802.

The food database, being populated with food items as just described, therefore provides for the energy content per measure as required to compute the proper measure of food energy portions to be delivered to domesticated animals corresponding to their daily ME requirements.

Figure 9:
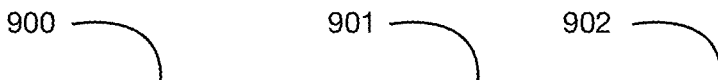
FIG. 9 is an exemplary diagram showing a representative example of a database table containing a plurality of individual companion animals.

FIG. 9 is an exemplary diagram showing a representative example of a database table containing a plurality of individual companion animals. More specifically, a database record 900 is created for each unique animal contained in an animal profile database, the profile consisting of characteristics that may impact the daily ME requirements of the animal. Such characteristics preferably include breed, age, weight, physiological condition, listings of medical or health conditions, sex, whether a female is pregnant or lactating, typical activity level, and any daily activity in excess of its typical activity level, but minimally, the animal's MER would correspond to each unique animal ID.

Using a variety of well-known means, and using various combinations of the characteristics just mentioned, a daily RER 901 can be reasonably computed for each animal record in the database. Further, based on changes in any of the characteristics, a more illuminating expression of each animal's energy requirements on any given day can be more closely approximated and expressed as its MER 902.

At such time as a pet owner is preparing the animal's daily food portion, a server retrieves, and if required re-computes the animal's MER to determine the approximate number of kcal that must be consumed to replace the energy expended during the day.

The system and method of the present invention as just described therefore provides for a new and novel method of establishing healthy food energy portions for domesticated animals based on energy replacement needs and energy content of the specific food types fed to the animal.

Veterinary professionals and those skilled in the art will immediately appreciate the benefits never before available to the average pet owner, namely the ability to simply and precisely determine the most healthy and appropriate portion of food to be fed to their animal on a daily basis, the healthier portion providing for a clinically significant reduction in long term medical problems, and an increase in the quality of life and life expectancy of the animal.

Further, they will immediate recognize the significant commercial value and competitive advantage that the system and method of the present invention delivers when compared to traditional food bowls and generalized feeding instructions provided by food manufacturers.

FIG. 10 is an exemplary diagram illustrating a plurality of animal and environmental conditions, changes in which drive changes in daily food energy portioning. For all domestic cats and dogs, change is inevitable. Whether it's physiological change ranging from birth to death, temporary change such as an injury or unplanned day retrieving a ball at the local park, or experiencing everyday environmental changes such as temperature or humidity changes over the short or long term, animals, just like humans, will experience corresponding variations in energy expenditure.

As a simple example, a normally lazy animal that expends 500 kcal per day, could expend an unplanned additional 125 kcal (25%) is stimulated for a full day while on a trip to a zoo. Now then, those skilled in the art will appreciate that animals replenish expended energy through food consumption, and will further appreciate that for this animal to maintain a substantially equal energy input=energy output ration for this extra-activity day, they will require a portion modification that delivers an additional 125 kcal portion.

Various columns in the chart 1000 show a partial list of animal characteristics 1001 that can routinely change on a daily basis, or over a longer term, any or a combination of which will directly drive the requirement to modify an animal's food portion.

One column 1002 illustrates many of the characteristics that may, or may not change over time. In particular, "breed" and "sex" are listed as not changing over time, since a female poodle will normally be expected to remain a female poodle throughout her life. Nevertheless, these two characteristics in fact drive more nuanced factors that drive portion modification, especially when compared to a male Great Dane.

All of the other characteristics are expected to change over time, and all of them will most likely require food portion modification in response to the change.

Another column 1003 provides a "predictability" attribute to each characteristic, specifically indicating the predictability of the occurrence of a change in a certain characteristic. One can appreciate that age is predictable; a 1-year old dog today will be a 2-year old dog next year. On the other hand, a dog that discovers a new squirrel in the back yard, will spend the entire day chasing the new "friend", thereby substantially increasing the day's energy expenditure over its normal, lower daily activity level.

It is important to understand that the predictability, unpredictability, or the actual occurrence of the inevitable change is traditionally not considered by pet owners when they prepare the pet's daily food, and more importantly, is completely ignored by feeding instructions provided by pet food manufacturers.

Another column 1004 predicts the speed at which any animal's characteristics may change. In some cases, such as with "age", one understands that dogs and cats get older year over year. Correspondingly, the animals' nutritional needs, and corresponding portion modifications, change somewhat predictably over time. However, it is more important on a day-to-day basis to modify portions based on fast-changing, unpredictable change, such as a change in temperature. For instance, a dog sitting in front of the fireplace in a cabin in the snow may, in mere minutes, be accompanying it owner on a day of snowshoeing. The moment the dog is exposed to a 20° C. temperature drop (72° F. in the cabin, to 38° F. on the snow course), its energy needs for the period of time on the snow are 100% of the energy needs at 72° F.

Portion modification for this dog must replenish its above-average energy expenditure for the duration of time it was exposed to the 20° C. lower temperature.

A final column 1005 is a partial list of nutritional impact that may be caused by the change. As can readily be understood, nearly every changeable characteristic, when changed, has a direct and corresponding impact on nutrition. More specifically, every change could result in an increase or decrease in daily nutritional needs, or in other words, more, or fewer calories when compared to the animal's normal daily caloric intake.

Understanding the foregoing, those skilled in the art will immediately appreciate that predicting the daily food portion that equals the energy expenditure of dogs and cats, especially considering the inevitable change, and unpredictability thereof, is exceedingly difficult, and for the majority of adult pet owners, mathematically out of reach.

They will further appreciate the value and novelty of the system and method the present invention that provides for computing modified portions for an animal based on changes in characteristics as just described.

FIG. 11*a* is an exemplary diagram illustrating four stages of life for domesticated dogs and cats.

Ask most pet owners how many human years equal one "dog year", and they will most likely say "seven". It's true that the generalization that the ratio of dog to man years is 1:7 is integrated into society, however, it's false.

The fact is that larger dogs age faster than smaller dogs. When considering changes in life, it's also critical to consider life expectancy, especially as it pertains to changes in nutritional requirements as pet dogs and cats age.

In the chart 1100, four columns are shown categorized by animal weight. The left-most column lists animal age (in human years), from one to 110 years.

The right side of the figure lists what are commonly referred to by the veterinary world as "Life Stages". The first life stage is the "Growth Stage" 1101, the period between birth, and when the animal is clinically considered an adult. It is during this time that animal nutritional needs on a kcal/pound of body weight are the highest they will experience during their life time. It is also during this period that the actual number of calories the animal should consume literally change on a daily basis. As a consequence, pet owners should change the daily portion amount to meet the growth requirements for each day. But they don't.

Food manufacturers generalize by recommending "let them eat until they are full".

Since, until the present invention, there has not previously existed a reliable system and method to advise pet owners the precise portion to feed to growing puppies and kittens on a daily basis, pet owners had to rely on the generalized recommendation just described.

One disadvantage with the old method is that pet owners could not compare the predicted portion amount for the particular stage of growth with the actual portion consumed by the animal. Therefore, if the animal was under or over eating, when compared to the predicted "normal" nutritional requirement for the particular breed of cat or dog, the owner would be unaware of possible medical problems that were causing the over/under portion consumption.

Further, the risk of under-feeding exists when the owner provides a small scoop portion in the first few weeks, but does not use a larger scoop the moment the animal is "cleaning it's plate". In such instances, the animal is being under-fed, a condition that retards bone, organ and muscle growth, and promotes cognitive development.

Now then as the animal ages, it enters the adult stage 1102, generally considered its most active years. During this time, the animal will experience many of the daily and longer-term changes as previously described, and although the animal will generally be on a "daily diet routine", this is the period during which many of the daily changes will require day-to-day portion modification to match the wide variations in energy expenditure when compared to their "normal".

During the senior stage 1103, as with humans, metabolic function slows, activity level diminishes when compared to their adult stage activity, and the occurrence of chronic diseases creep in. Every condition just mentioned has a direct, and oftentimes daily impact on portion modification.

The final stage of life, the geriatric stage 1104 is the end of life stage during which very old animals will need special attention paid to their nutritional needs. Over-feeding animals at this stage can accelerate or exacerbate medical problems, and under-feeding can result in loss of organ function, cognitive function, or other maladies.

Understanding the foregoing description of the various stages of life, as well as the variations in "dog years" and life spans corresponding to animals of different weight, those skilled in the are will immediately appreciate the difficulties in managing appropriate food portions based on changes throughout a pet's life, and will further appreciate the value and benefit of more precisely managing daily portions as provided by the present invention.

FIG. 11*b* is an exemplary diagram illustrating the differences in estimated life spans for certain breeds of dogs.

More specifically, based on decades of data from the American Kennel Association, as well as associations dedicated to many of the more than 339 dog breeds recognized by the World Canine Organization, estimated life spans vary greatly. Further, as can be readily seen in the substantially abbreviated chart 1105, obesity has the effect of reducing life spans by approximately 15%.

Those skilled in the art will recognize that the percent of body fat considered healthy for dogs is not a generalized figure that can be applied to all breeds, and although not shown, the healthy body fat content for a Doberman is substantially lower than that for a Golden Retriever.

However, the important underlying information expressed in the chart is that as life spans vary by breed, and as the reduction in life spans caused by obesity also vary by breed, so too must nutritional modifications vary by breed.

FIG. 12 is an exemplary diagram showing a portion of an animal energy requirements chart, in particular illustrating the variable energy requirements of an animal based on changing conditions throughout the animal's life.

More specifically, the chart 1200 lists various Daily Metabolic Energy Requirements (MER), the requirements based on various conditions for dogs weighing between 10 and 20 pounds, as shown in the weight column 1201. It should be noted that a full chart would list dog weights between 1 pound, and up to 200 pounds, representing weights of more than 99 percent of the global canine population. For each weight, there is a corresponding energy modification as illustrated by the remainder of the chart.

Before the increase or decrease in energy requirements can be determined for any of the many conditions previously described herein, a baseline energy requirement for cats and dogs must first be determined, otherwise, there is no basis upon which condition-based energy change can be added or subtracted.

Although literature teaches various method of determining baseline energy requirements, the chart of FIG. 12 relies on a widely-used formula for estimating the Resting Energy Requirements (RER). The formula, RER=70 (W kg)¾, where RER is the pet's Resting Energy Requirement expressed in kilocalories (kcal), and W is the ideal healthy weight for the pet, estimated the daily energy requirement at rest, expressed in kilograms (kg).

Now, the RER 1202 is shown for ideal weight adult dogs weighing 10 to 20 pounds. By this chart, it can be readily seen that a 10 pound adult dog will "burn" 218 kcal per day, if they rest the entire day with an inactive digestion system. Of course, it's unreasonable to assume a dog will not move all day, and also unreasonable to assume that a dog will not eat of drink during the day.

Therefore, the formula provides for a consistent baseline from which increased energy expenditure can be estimated for all conditions and activities.

As previously described, the energy requirements for any given animal change with each of the different stages of life. Puppies 1203 between birth and 4 months old have one of the highest metabolic rates of all stages since they are on an exceedingly fast growth trajectory. As can be seen, if the puppy will ultimately become a 10 pound adult with an RER of 218 kcal/day, their actual MER will be approximately three times the RER. Recognizing that RER is based largely on weight, it can be readily seen that as a puppy grows from 2 to 5 pounds in just a few weeks, determining weight-based RER, and correspondingly MER, on a sliding scale becomes a daunting task.

One object of the system and method of the present invention is to provide the means to more accurately estimate the actual daily nutritional portion that a puppy would need each day along this growth trajectory. This level of portion predictability, and the ability to modify portions based on daily-changing weight during a high growth period, has never before been available to the millions of pet owners raising pets from their earliest weeks following birth.

One condition that will decrease the MER for adult animals is neutering. Neutered pets expend less energy each day when compared to pets with reproductive capabilities. By comparing the MER for 10 pound intact adult dogs 1205 to 10 pound neutered dogs 1204, it can be readily seen that the portions should drop 44 kcal immediately after neutering.

While 44 kcal may seem insignificant, it must be considered as food portion that is 44 kcal too high. A pet owner continuing to feed their pet the same portions before and after neutering will effectively cause a weight gain of approximately 4 pounds over a year—or a 40 percent overweight condition that is clinically considered obese for a 10 pound dog. Considering the unacceptably high pet obesity rate, the scenario just described is more prevalent than pet owners who appropriately modify the portions of their pet after neutering.

Upon a pet owner entering into the system and method of the present invention the fact that their pet is now neutered, the invention automatically re-computes and notifies the owner of the appropriate daily food portion based, in part, on this newly changed condition. For the first time, owners receiving prompt notification of modified portions based on changing conditions aids in averting overfeeding animals following neutering.

Figure 13:
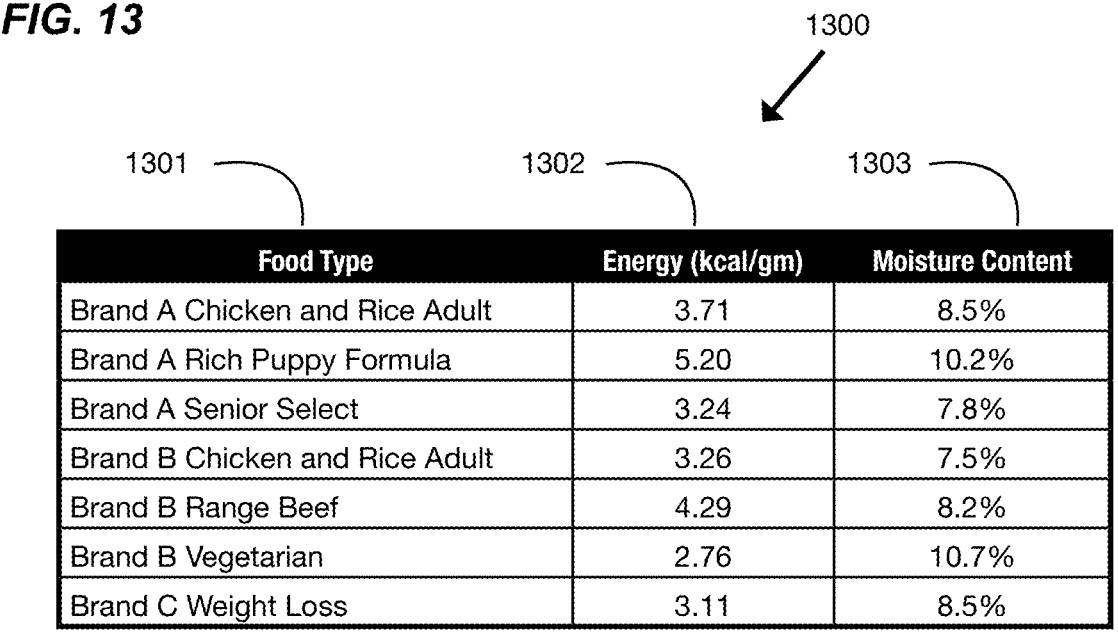
FIG. 13 is an exemplary diagram illustrating the energy content contained in one gram of food for various brands of dog food.

FIG. 13 is an exemplary diagram illustrating the energy content contained in one gram of food for various brands of dog food.

As previously described, food portions as used herein refer to the caloric content of a volume of food. Pet owners would be challenged to understand how to feed the 10 pound dog in the previous example 348 kcal of food each day. Pet owners are conditioned to use a measuring device to routinely prepare a certain volume of food.

The system and method of the present invention provides for a food database containing available pet foods correlated to the energy content of each food.

The chart 1300 is a list illustrating representative examples only seven different brands and types 1301 of food that may be purchased and served by a pet owner. In practice, literally hundreds of different brands and types of foods are commercially available for purchase through veterinarians, retail stores, and online.

As can readily be seen in the energy column 1302, the first and second food types, even though they originate from the same manufacturer, contain substantially different energy content per gram measurement of the food.

A pet owner feeding a specified volume of Chicken and Rice Adult type to their dog, then for any number of reasons, switching to Rich Puppy Formula, as an example, would be delivering over 50 percent more calories to their pet per similar volume.

Therefore, the system and method of the present invention provides for a pet owner to select the food they are feeding their pet from a plurality of brands and food types contained in the database, and after considering the caloric content of the selected food, delivers a message, not shown, to the pet owner a precise measurement of the portion that should be fed to the pet, for instance, a text to the owner's smartphone displaying a message: "Today's Portion is 10.5 grams".

At least one embodiment of the present invention eliminates guesswork on the part of the pet owner, remains flexible in serving the pet owner with portions based on any food type the owner purchases, and ensures establishing healthy and consistent food portion delivery. Similarly, the moisture content 1303 is a known value for each food brand, and following the volume of proper food portion, the volume of moisture can also be computed.

Figure 14:
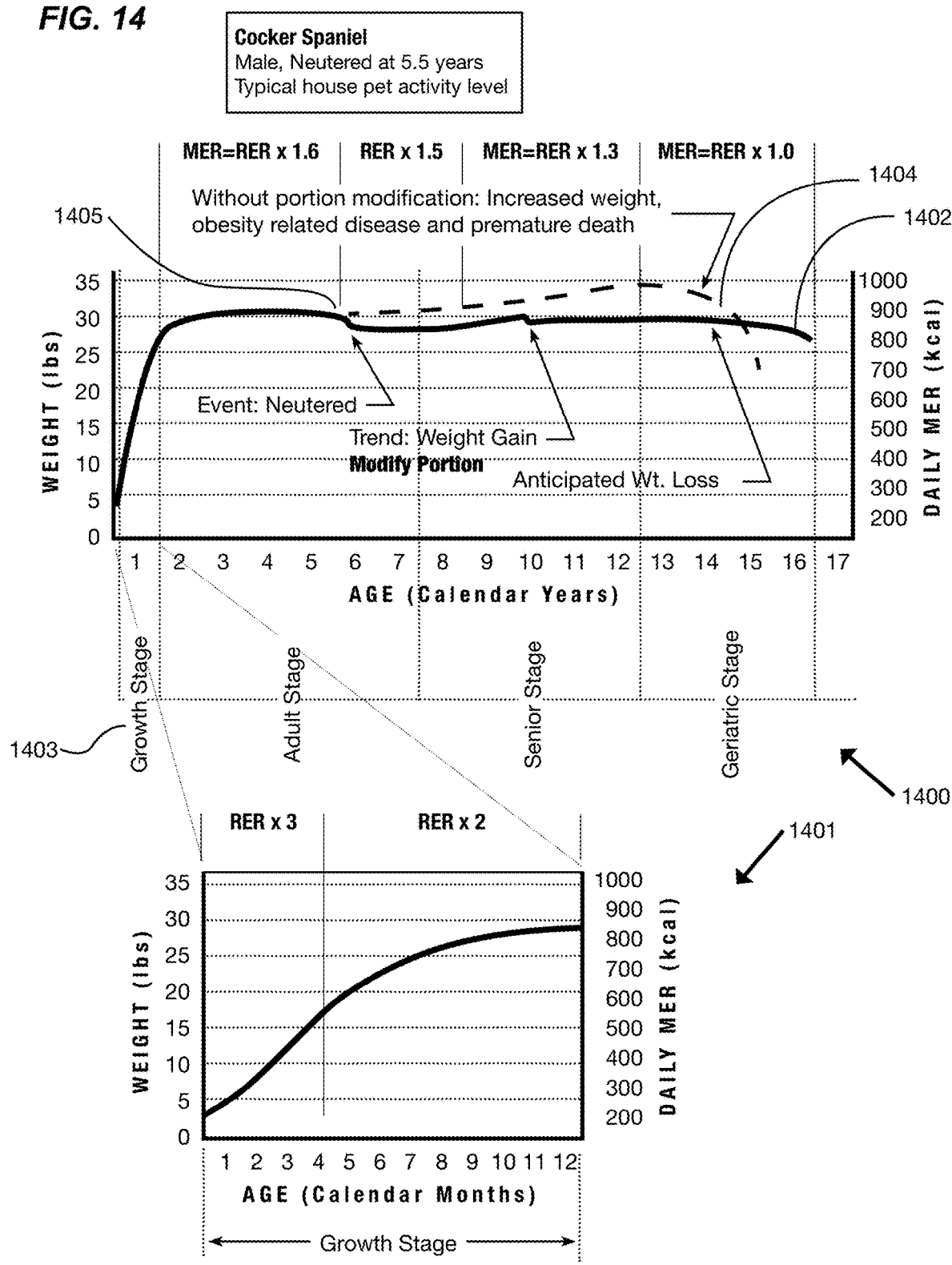
FIG. 14 is an exemplary diagram illustrating a graph correlating weight, age, and variable energy requirements for a Cocker Spaniel from birth to death, as being representative of ever-changing, condition-based energy requirements of all dogs and cats.

FIG. 14 is an exemplary diagram illustrating a graph correlating weight, age, and variable energy requirements for a Cocker Spaniel from birth to death, as being representative of ever-changing, condition-based energy requirements of all dogs and cats.

More specifically, a lifeline 1402 for a representative typical Cocker Spaniel with a healthy weight target of approximately 30 pounds is shown no the top graph 1400, the lifeline illustrating the representative animal's weight from birth to death. An estimated life span for a healthy, well-maintained dog of this breed is approximately 16 years.

A second dashed line is an alternative lifeline 1404 this representative dog would likely experience if it was fed unhealthy, unmodified food portions throughout its lifetime.

As previously discussed, this animal will experience up to four different life stages 1403, those being growth, adult, senior, and geriatric, the four stages being overlaid on the graph.

The left side of the graph shows the animal's body weight, the right side showing the daily MER for this pet experiencing a typical house pet level of activity. Because of the relatively low resolution of the 17 year scale of this chart, the non-typical fluctuations in daily activity and energy expenditure are not shown, but as previously discussed, a logical daily change in energy expenditure is expected.

Without being burdensome or repetitive, a brief look at the exploded chart 1401 of the puppy's growth stage shows a rapid weight gain, corresponding to an accelerating requirement for energy consumption. During the first 4 months, MER is expected to be three times the Cocker Spaniel RER. As it approached adulthood, MER drops off slightly to twice the RER.

Now, continuing on the first chart 1400, the adult weight and MER stabilizes somewhat in the adult stage. However, at about the sixth year, this representative animal was neutered, a condition that naturally reduces the MER. The healthy lifeline illustrates a recognition of this event, and correspondingly lowers the portion size from slightly higher than 900 kcal, to approximately 875 kcal daily portion.

On the other hand, in the alternative lifeline 1404, the owner has not recognized the MER reduction, and continues feeding the animal the same portion that the animal has been fed for the previous 3-4 years. Hence, a weight gain trend begins un-abated.

In the healthy lifeline, monitoring the ratio of food portions to weight as provided by the present invention, a weight gain trend is identified as the animal naturally begins to reduce its activity level. At such time as the system and method of the present invention determines the weight gain to be outside of the healthy range, illustrated on the lifeline at about the 10 year mark, the system generates an alert, and sends the message to the owner to modify portions, with specificity on the new portion measurement.

On the other hand, the alternative lifeline 1404 illustrates that the owner has continued to feed the same portions of food to the animal, and although perpetuating an imperceptible day-to-day weight gain, the lifeline shows that the declining activity level and lower ME requirements over the later life stages has pushed the animal into the obese category.

Therefore, the daily and long-term monitoring and food portion modification system of the present invention is a novel and improved method of maintaining optimum short and long-term health in response or anticipation of changed conditions throughout an animal's lifetime, thereby ameliorating the onset of obesity related diseases and medical conditions, maintaining a relatively higher quality of life, and extending the life span when compared to currently available methods of managing food portions.

Figure 15:
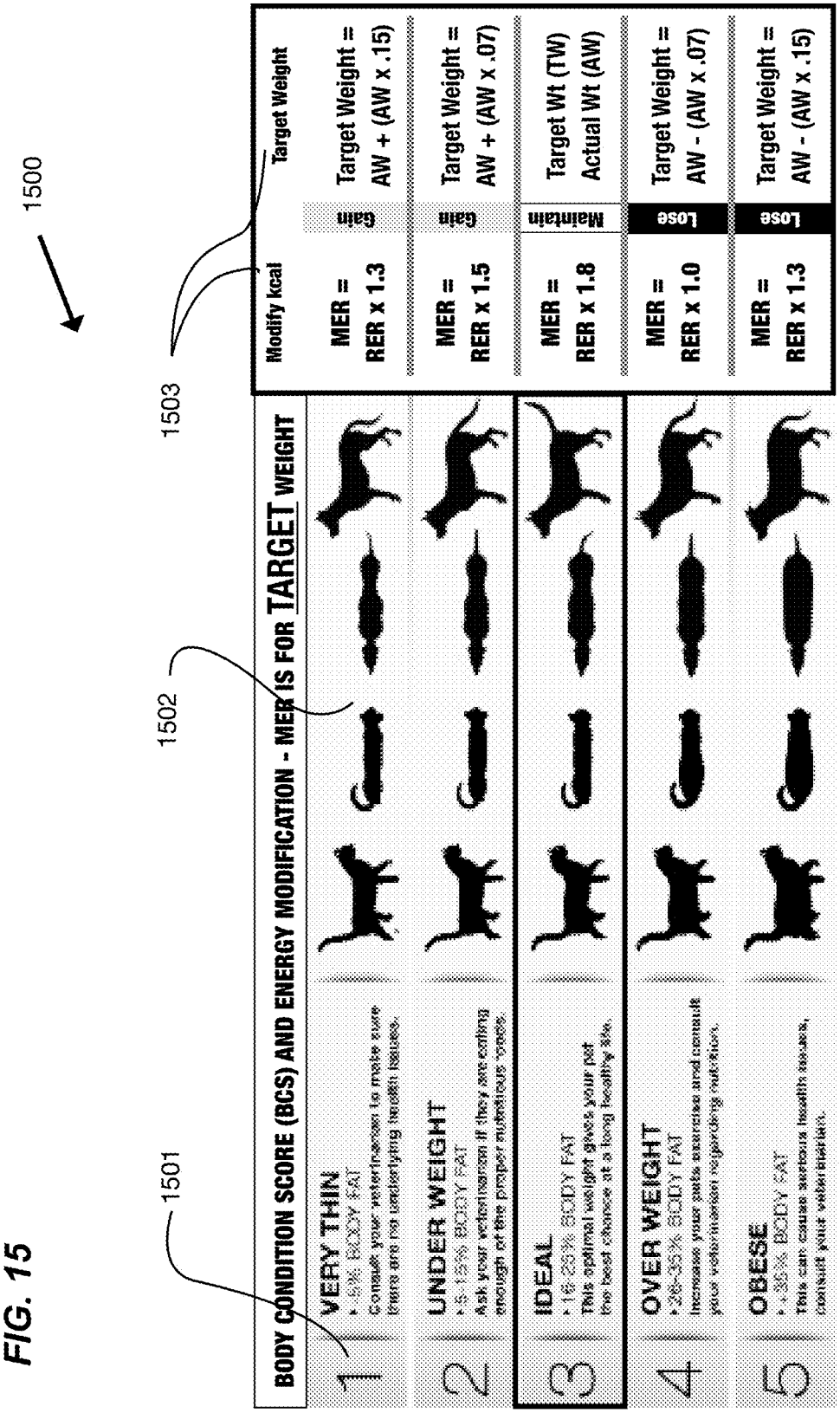
FIG. 15 is an exemplary diagram showing Body Condition Scores (BCS) for domesticated dogs and cats, and a food energy portion modification method to achieve the healthiest condition.

FIG. 15 is an exemplary diagram showing Body Condition Scores (BCS) for domesticated dogs and cats, and a food energy modification method to achieve the healthiest condition.

Therefore, the present system and method of modifying food portions provides for any animal of any condition to enter the system at any time.

Those skilled in the art will appreciate the many attempts to "score" body condition of pet dogs and cats in order to identify healthy and unhealthy conditions. In the chart 1500, one method widely used by the industry to determine an animal's current body condition is the Body Condition Score (BCS) system developed by Purina®. In one configuration, the Purina® system categorizes body condition in five levels, numbered 1-5 as illustrated 1501. In another higher resolution configuration not shown, a scale of 1-9 is used. A text description helps to identify body characteristics of each scoring number.

The body conditions for dogs and cats are additionally represented by silhouettes 1502 of each condition, thereby providing a visual reference for owners to more accurately determine the score for their animal.

At least one embodiment of the present invention introduces a new and novel method of establishing food portion modifications based on BCS, automatically generating an appropriate portion corresponding with a health-driven objective.

In other words, upon an owner entering the numerical score of their animal into the system of the present invention, the score being a number 1-5, along with other characteristics that may include breed, age, sex, and so forth as previously described, the system determines an underweight, overweight, or ideal weight condition, and modifies the animal's baseline MER to begin moving the animal's weight toward the ideal, and more healthy weight.

Although various formulae 1503 are shown, the formula being different for each numerical score, it is not the intention of the present invention to limit the formulae to those as shown, but to illustrate that a large number of formulae and/or algorithms may be used to the same effect of computing a modified nutritional energy consumption of a domesticated dog or cat to thereby modify the weight over a period of time considered to be safe for weight gain or weight loss for various animals.

FIG. 16 is an exemplary diagram showing weight fluctuations relative to unchanged food energy portions, and correlating to reduced food portions.

More specifically, in addition to the various methods and objectives of modifying food portions as previously described, two conditions related to weight loss and portion modification are also be considered by the system and method of the present invention. Until now, pet owners have not been able to monitor the correlation between weight loss and food portion consumption, and as a result, have not been able to detect potential medical problems in early onset. The result, as those skilled in the art appreciate, is the progression of many life threatening, and life span shortening diseases and declining health conditions.

In the drawing, a first condition 1600 is shown wherein, as monitored by the system of the present invention, weight loss over a non-specified time occurs while food portion remains constant. This correlation would generally be considered non-typical, and in many cases, unhealthy. Unfortunately, pet owners, previously having no widely available and reliable system to monitor and identify such anomalies, remain unaware of the possible causes, and are therefore unable to make the appropriate modification to portions, or to take action in seeking out veterinary advice.

In the right-hand chart to the first condition, a list of possible medically related causes for weight drop with consistent portions is shown, including hyperthyroidism, parasites, and so forth. Veterinarian evaluation is recommended in all of these cases, since the indicated diseases are all life threatening or life shortening. The system of the present invention, upon identifying the anomalous correlation, generates and alert to the pet owner identifying the problem, and listing possible causes with appropriate responsive action.

It should be noted that not all causes of this type of anomaly are disease related, and it is important for a pet owner to evaluate their pet upon receiving a notice from the present invention.

Namely, as can be seen in the right-most column, an animal exposed to sustained lower temperature, for instance, an outside dog encountering the winter months, will require more energy to keep warm at lower temperatures.

Another possible cause is a marked increase, and sustained increase in activity over previously traditional activity levels. For instance, if a new puppy is introduced into the household, the baseline activity level for the existing dog will likely increase as the demand for "playtime" by the puppy keeps the adult dog more on the go.

In these instances, and others, the change in conditions warrant a modification in food portion, namely, an increase in portions to compensate for the increased energy expenditure.

The system of the present invention, having computed the variable conditions, and evaluated possible causes and appropriate responses, provides guidance to the pet owner on seeking medical attention for their pet, or modifying food portions to a new and specific amount based on the food brand and type they are feeding the animal.

In a second condition 1601, weight loss is accompanied by a drop in portion consumption, as identified by the system of the present invention. The identification of correlating weight drop and portion reduction triggers a different set of cause and solution relationships when compared to the first condition just described.

As can be readily seen in the disease/illness column, a set of possible underlying medical causes are listed which are different from the previous medical conditions just described. Nevertheless, these conditions also warrant a veterinary check-up and possible medical intervention.

On the other hand, the correlating drop in weight and portion consumption maybe normal and expected in certain instances. As a screening tool to help an owner determine whether this condition is considered normal, or abnormal and requiring veterinary care, a list of qualifying questions may be posed to the owner, such as "has your pet been recently vaccinated?". In such cases, a short-term drop in weight and food consumption may be considered normal.

However, the present system and method acknowledges that such drop, if indeed related to a recent vaccination, should in fact be temporary. Upon continued monitoring, the present invention, upon determining that the condition is continuing beyond a specified period of time, will again alert the owner indicating that the weight and consumption drop may in fact, not be associated with the vaccination, but may be an indicator of an underlying medical problem, The present system and method therefore will notify the owner of the appropriate action to take to establish and correct the cause.

The system and method of the present invention provides for a new and novel approach of (a) monitoring pet animal weight ratio to food portions, (b) identify anomalies when compared to normal ratios, (c) correlate the anomaly to a database of possible causes, and (d) automatically generate and send alert messages to an owner's smartphone or email box as to the problem, possible causes, the appropriate action to take, and (e) importantly, the urgency with which the owner should take action.

Figure 17:
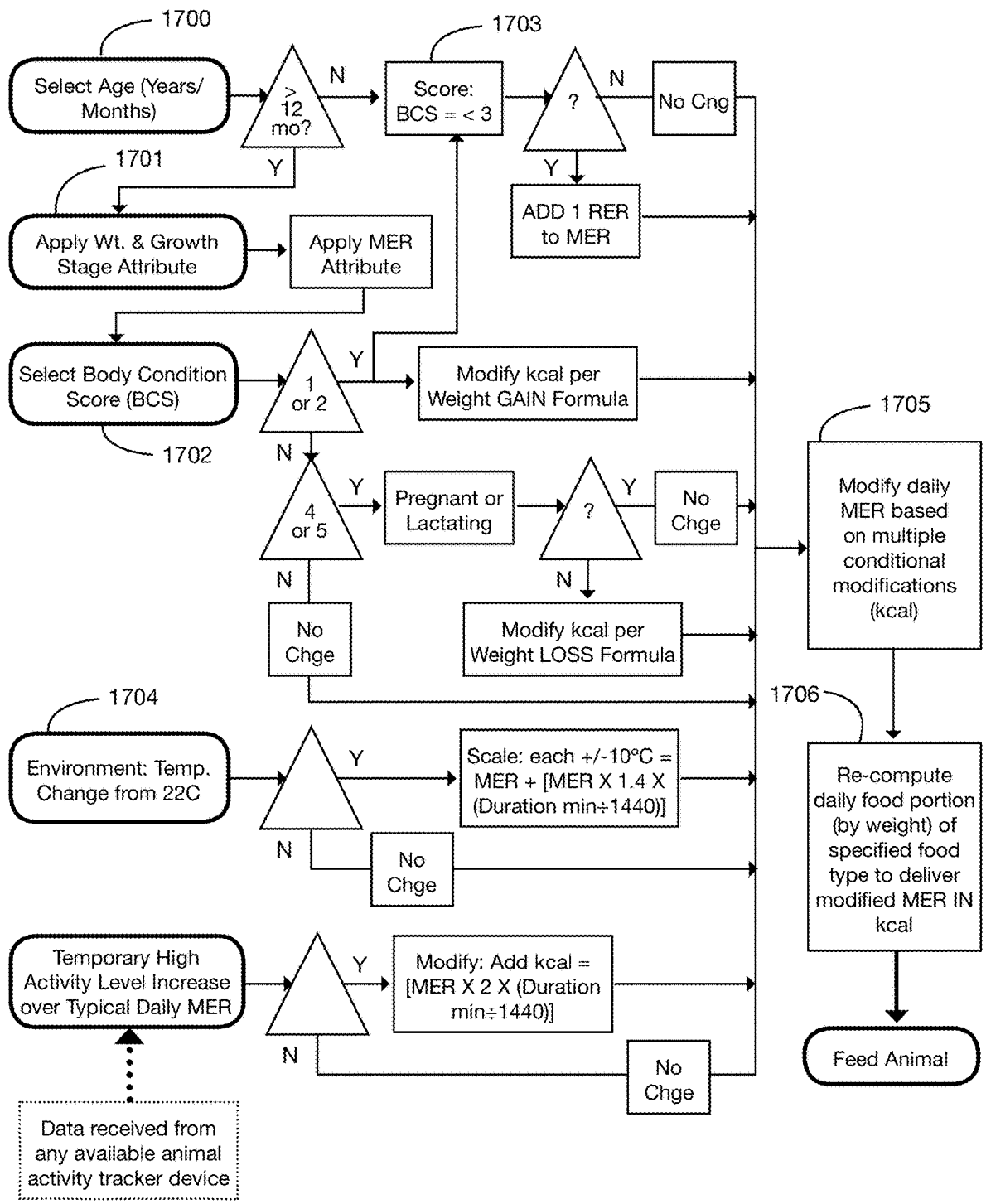
FIG. 17 is an exemplary diagram of a flow chart showing a plurality of change-in-condition inputs that can trigger an animal's daily food energy portion modification.

FIG. 17 is an exemplary diagram of a flow chart showing a plurality of change-in-condition inputs that can trigger an animal's daily food energy portion modification.

As previously described, a multitude of conditions may, and will likely change over the lifetime of an animal. In many instances, a plurality of conditions chance simultaneously, or at other instances, an overlap of conditions may occur, each with different starting and ending points.

The system and method of the present invention accommodates planned and unplanned changes, and establishes the correct portion modification based on not only a single change, but multiple changes.

In the drawing, a pet owner enters starting information on their pet, namely the pet's age 1700, weight 1701, upon which entry the present invention assigns growth stage attributes, and BCS 1702 which established the generalized health condition of the animal. During the process, an appropriate MER is established. As can be seen, and as previously described, upon establishing that BCS is ≤the ideal numeral 3, the present invention automatically modifies the nutritional portion by a factor of one additional RER.

The data entry just described 1700, 1701, 1702 are quantifiable and expected. However, other conditions, whether temporary or long-term, are less predictable, Nevertheless, these other conditions are know to those skilled in the art to have a direct, and occasionally significant and immediate impact on energy expenditure. Accounting for these condition changes requires an immediate modification of the daily food portion.

Namely, when the temperature 1704 drops 20° C. from a thermo-neutral temperature, energy requirements immediate increase.

It should be noted that the temperature change may be established by a wearable electronic tracking and recording device placed upon the animal, by manual input by a pet owner, or by real-time regional analysis of weather information as may be obtained on a smartphone or compute application via a weather data API.

Following the logic diagram from the temperature change 1704, it is found that the MER should be increased for each specified change, or may change on a sliding scale relative to temperature drop, and should be computed for the specific time of exposure to the changed temperature as a fraction of a 24 hour day. Thereafter, the increased MER is computed to be the difference between the total MER expected at thermo-neutral temperature, and the changed temperature, resulting in an quantified additional food portion modification. This modification is additive to any other recommended modifications resulting from other changed conditions experienced by the animal during the day.

Without exhaustively illustrating every additive or subtractive modification to MER in response to every possible condition, it can be readily seen that the novelty of the present invention accommodates a plurality of sequential and/or simultaneous conditions, and correlates all of the conditional changes, and the corresponding changes in MER, to one end-of-day MER 1705, then, based on the owner-selected food brand and food type, computes the food portion modification 1706 that is easily delivered to the pet owner via various means of messages or indicia at feeding time.

Figure 18:
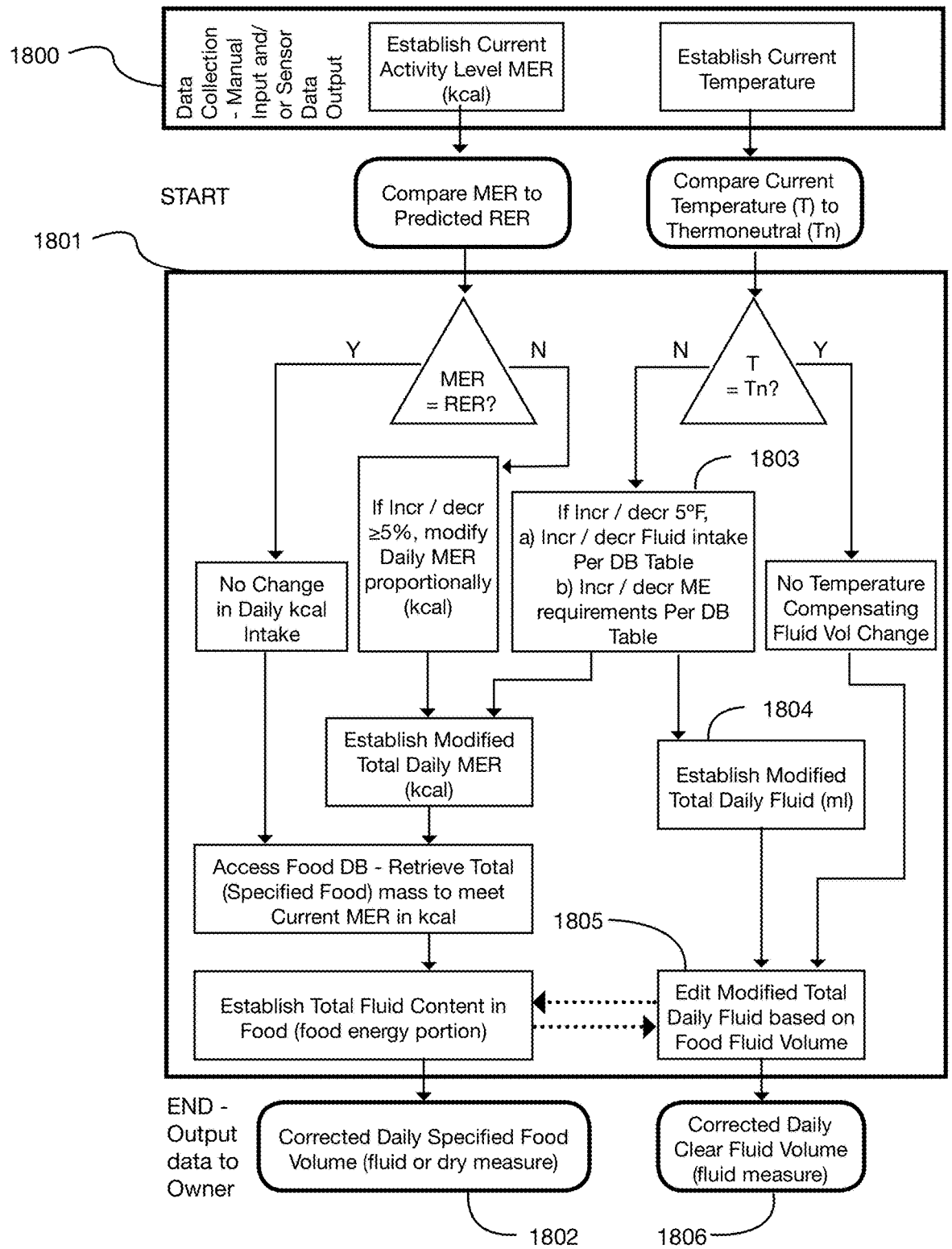
FIG. 18 is an exemplary diagram of a flow chart showing one process of modifying daily nutrition (energy and fluid) in response to changing environmental conditions.

FIG. 18 is an exemplary diagram of a flow chart showing one process of modifying daily nutrition (energy and fluid) in response to changing environmental conditions.

As another representative illustration of how the system and method of the present invention accommodates multiple change conditions in establishing an appropriate food portion modification, the present invention further correlates food to changes in hydration requirements.

Activity trackers, accelerometer and/or GPS driven devices worn on the body are increasingly migrating their way into dog and cat activity wearable devices. At least one embodiment of the present invention therefore accommodates input from any animal wearable device as a change input from which an appropriate food portion modification may be computed.

In the drawing, energy expenditure and temperature data 1800 is inputted into the input of the system of one embodiment of the present invention. The input may be by wired or wireless communication, or may be manually transferred from various devices and inputted by a pet owner.

The flow chart 1801 evaluates the inputted data against the baseline data, which includes among other data points, the animal's typical thermo-neutral temperature and MER, and determining whether the inputted data constitutes an actionable change condition, follows a logical course in computing the increased or decreased food portion modification as prescribed to approximate the energy content of the daily food portion with the total energy expenditure of the animal based on any change conditions.

Similar to the process of at least one embodiment of the present invention as previously described, the end result of a simple message or indicia sent to the owner, the message containing information specifying the total food portion 1802 that should be fed to the animal on that particular day.

It is well known throughout the pet industry that proper hydration is a critical component to maintaining health, and that dehydration or excessive drinking can, and often does, trigger life threatening medical emergencies that require veterinary care. Notwithstanding the extreme over drinking or dehydration conditions, the system and method of at least one embodiment of the present invention further assesses and recommends appropriate water portions, based in part on the modified food portions.

The wide variety of food types, namely dry food kibble, semi-moist foods, and canned dog and cat foods contain a wide variation of fluid content. Therefore, an animal eating only dry food which contains approximately 8 percent water, will require more clear water than an animal eating only canned food which contains approximately 80 percent water.

The amount of water intake for an animal will depend on the food portion and type of food consumed by the animal during the day.

Therefore, in the drawing, one can see that if the temperature difference has resulted in an increase or decrease in food requirements 1803, the novel system and method is the first method providing for establishing modifications in total hydration requirements as well 1804, using well know formula not shown.

Finally, by understanding the total fluid requirements, and further understanding the total food portions or modified food portions, and further understanding the fluid content in the determined food portion, the total clear fluid volume required by the animal can be determined 1805 by subtracting the food fluid volume from the total required fluid volume, thereby delivering a message to the owner recommending the appropriate modification in water consumption 1806.

Figure 19:
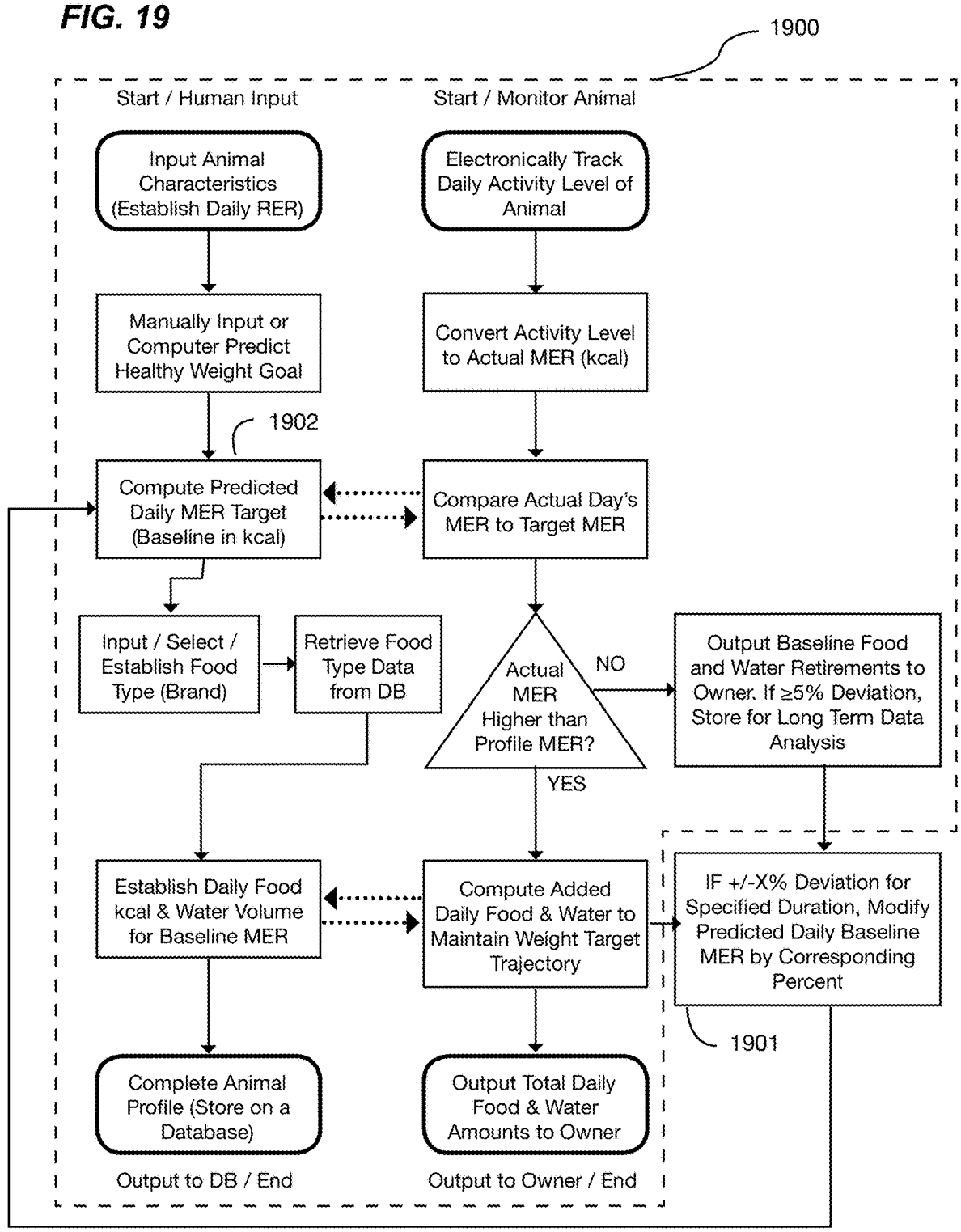
FIG. 19 is an exemplary diagram of a flow chart illustrating one method of self-correcting daily energy requirements of an animal based on dietary trends.

FIG. 19 is an exemplary diagram of a flow chart illustrating one method of self-correcting daily energy requirements of an animal based on dietary trends.

As has been clearly established in the foregoing description, and as is well know in the industry, conditions that effect nutritional and hydration requirements constantly change throughout an animal's life. Notwithstanding the day-to-day modifications in food portions, over time, the animal's requirements will slowly change. As a consequence, the actual dietary habits will change, and will require general modifications to baseline MER from time to time.

For the first time, the present system and method provides a process to automatically adjust the animal's baseline MER over time in response to long-term trend changes in dietary habits.

For efficiency, and in the interest in not being repetitive, the inputting processes, both manual and from automated devices such as activity trackers 1900, all of which having been previously described in detail FIG. 17, 18, are not described again.

At least one embodiment of the present invention provides for another analysis of modified food portions 1901 wherein long-term deviations between the actual portions consumed and the predicted portions are perpetually monitored, recorded and evaluated, and at such time that the amount of deviation meets preset parameters within the program of at least one embodiment of the present invention, the amount being a percentage of actual computed caloric content, the system and method will auto-correct the baseline MER 1902 from which future portion computations will be made.

Although the importance of this novel functionality would be evident to those skilled in the art, it should be noted that in instances when an owner incorrectly identifies the BCS of their pet, as a representative example, selects BCS score number 3 rather than the more accurate score of number 4, and further initially enters an activity level that is below the actual daily activity level of the animal, there will be a mis-correlation between the estimated MER of the animal based on initially incorrect inputted conditions and the actual MER as evidenced by the actual energy expenditure recognized by at least one embodiment of the present invention.

The deviation from the predicted MER based on the erroneously entered initial pet parameters and conditions may vary, and should not be considered to be a hard number or percent, and may additionally vary between cats and dogs, and further between certain breeds of cats or dogs. Therefore, by understanding the vagaries of what constitutes a deviation for different animals, one will appreciate that a large number of deviation parameters may exist within at least one embodiment of the present invention, and that the appropriate deviation parameters will drive the auto-correcting process for adjusting the MER depending on the individual animal.

Figure 20:
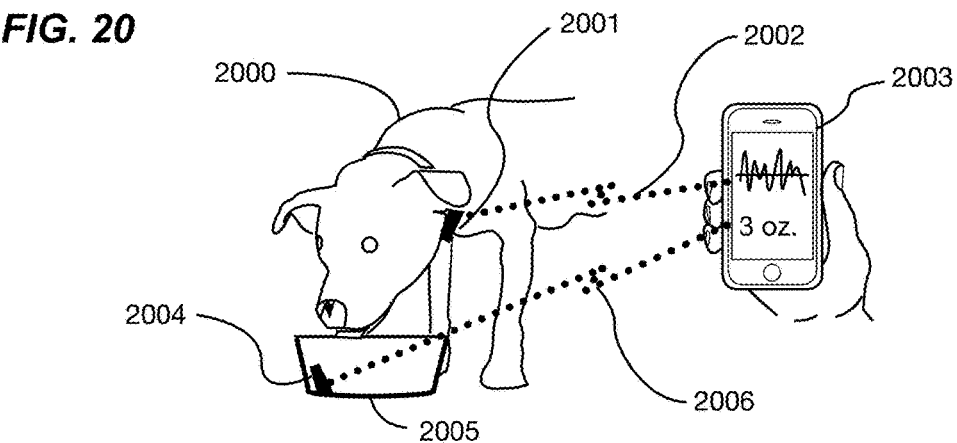
FIG. 20 is an exemplary diagram illustrating sensors and transmitters to communicate water consumption related data to a wireless device.

FIG. 20 is an exemplary diagram illustrating sensors and transmitters to communicate water consumption related data to a wireless device.

In the drawing, an animal 2000 is shown drinking water from a controlled and metered source. A sensor module 101 is affixed to the animal's neck, the sensor module comprising one or more EMG and/or position sensors and a transmitting means in wireless communication 2002 with a wireless handheld device 2003. Further, a water volume sensor module 2004 is affixed to a controlled water source, in particular, a water bowl 2005. The sensor module 2004 is shown to also be in wireless communication 2006 with the wireless handheld device 2003.

As a means to establish a baseline data sample by which the volume of water consumed from unmetered water sources by an animal can be predicted, the data from the collar sensor module 2001 and the metered water source sensor 2005 are simultaneously received by the handheld device 2003. During the period of time that the animal is drinking, the unique variations in collar sensor data that is received by the handheld device are first identified as the electronic "signature" associated with drinking. Secondarily, the difference between the starting water volume, and the ending water volume contained in the water source 2005 is computed by subtracting the volume related data received from the source sensor 2004 after drinking from the volume related data before drinking. The difference is the volume of water consumed during the instant drinking episode.

The water consumption over time value is then computed, the computation being performed by a software application installed on the handheld device, or by a software application installed on a network server to which the handheld device is in communication, the consumption over time value thereby becoming the baseline consumption during a period during which the electronic drinking signature occurs.

The display screen of the handheld device 2003 shows an electronic data stream received from the collar mounted sensor module 2001. In the drawing, the peaks and troughs shown are representative of signal level and/or signal amplitude changes that occur throughout the drinking period. Those skilled in the art will immediately appreciate that the data stream just described will differ significantly from the data stream received during other animal activities, for instance, when sleeping, or running vigorously. Therefore, the data stream received during the drinking cycle will be unique compared to other activities, and further will be unique to each animal.

The lower half of the display screen on the handheld device 104 shows the computed volume of water consumed by the animal during the drinking cycle, the computed volume being the difference between starting and ending data transmitted from the bowl sensor module 2004.

Therefore, by referring to the illustrative example, it can be immediately appreciated that the occurrence of the duration of the data stream correlating to a drinking signature has resulted in the consumption of 3 oz. of water.

Further, and merely as an example of how this information is applied to drinking form unmetered water sources, if the data stream of the drinking signature occurred for 6 seconds, during which time 3 ounces of water was consumed, then it is reliable to predict that at any time the animal produces the data stream signature associated with drinking, the animal will consume an estimated ½ ounce of water during each second that is continues drinking.

Figure 21:
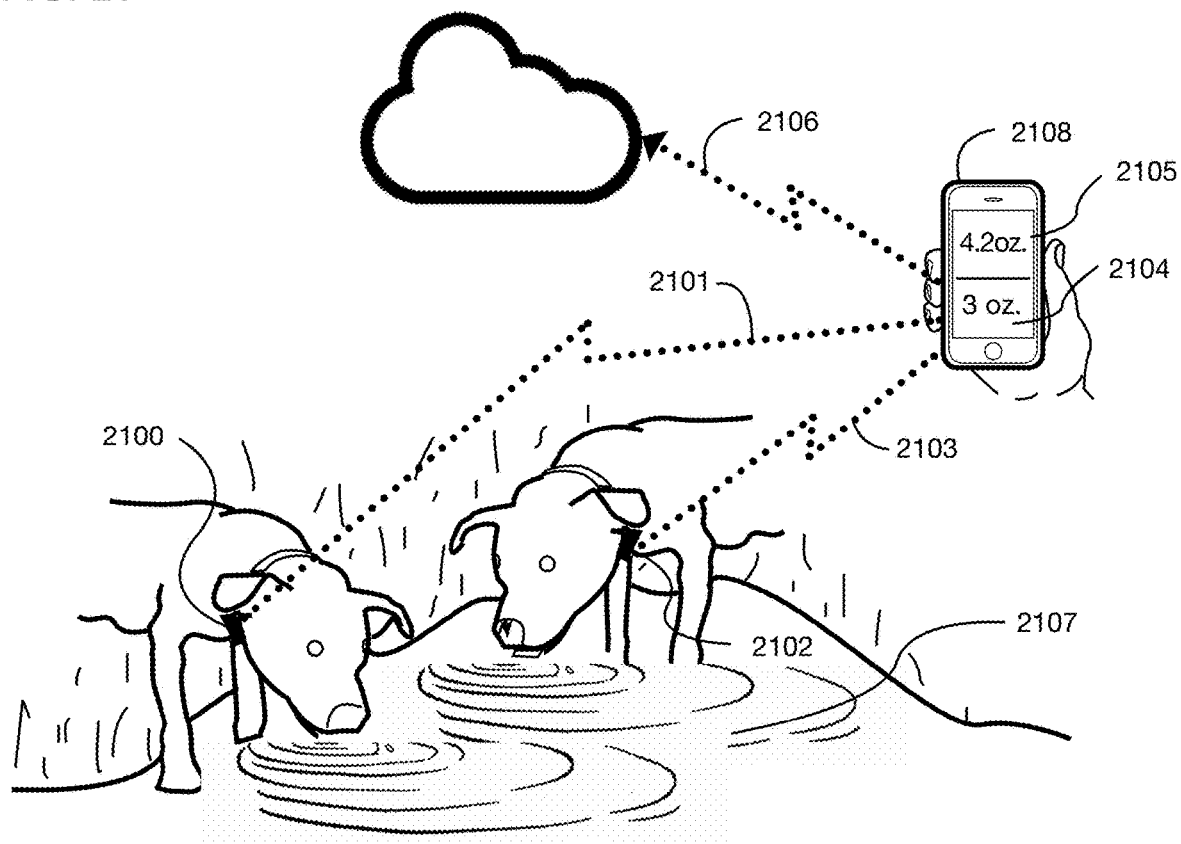
FIG. 21 is an exemplary diagram illustrating a plurality of animals to which sensors and transmitters are affixed, the sensors in communication with a wireless device and network.

FIG. 21 is an exemplary diagram illustrating a plurality of animals to which sensors and transmitters are affixed, the sensors in communication with a wireless device and network.

More specifically, a first sensor module 2100 is affixed to one animal, while a second sensor module 2102 is affixed to a second sensor. The sensors are shown to be in wireless communication with a handheld device 2108. Having been previously paired with the handheld device, the computed consumption volume of the animal wearing the first sensor 2100 is shown as 4.2 ounces 2105 on the display screen, while the consumption volume of a second animal wearing a second sensor 2102 is shown as 3 ounces 2104 on the display screen.

In one embodiment, the sensor modules affixed to animals drinking from an unmetered source of water 2107 while out of range of a wirelessly connected device store the drinking data until within range of the device, at which time, the sensor modules will upload the respective data streams that correlate to all drinking events that occurred since the last upload.

In another embodiment, the handheld device contains software to correlate the data stream to the predicted consumption over time, and compute the actual consumption relating to the just-uploaded data. In yet another embodiment, the data stream is uploaded to a network server in the cloud 2106 wherein water consumption computation occur, and the resulting consumption data communicated to the handheld device.

It should be noted that although the drawing shows two animals, the number of animals that can managed by at least one embodiment of the present invention is only practically limited by the desires of the owner. For instance, water consumption for each of an entire herd of horses or cows can be monitored on a daily basis.

Figure 22A:
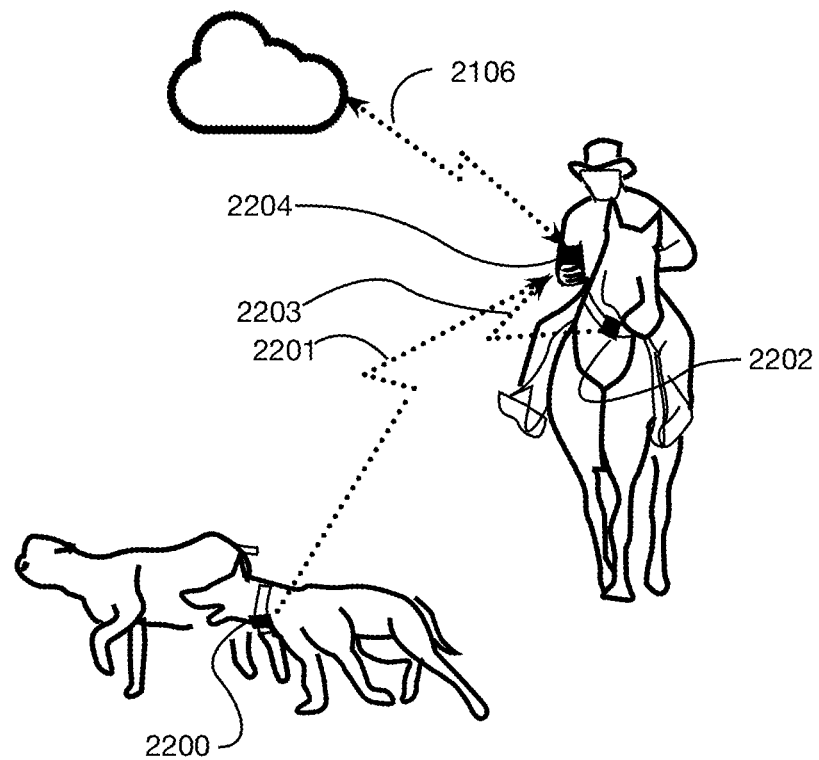
FIG. 22A is an exemplary diagram illustrating a variation of a network upon which a plurality of different species of animals are equipped with sensors and transmitters in wireless communication with a network.

FIG. 22A is an exemplary diagram illustrating a variation of a network upon which a plurality of different species of animals are equipped with sensors and transmitters in wireless communication with a network.

In some instances, it is preferable to monitor more than one species of animal. For instance, a sheep rancher must monitor hydration for his horse, as well as his working dog.

In the drawing, the rancher of the just described example uses a handheld device 2204 to monitor water consumption of the horse via wireless communication 2203 with a paired sensor monitor 2202 affixed to the horse's bit collar, while at the same time, monitoring the water consumption of his working dog via wireless communication 2201 with a paired sensor monitor 2200 affixed to the dog collar. In some instances, it is preferable to compute water consumption using software installed on the handheld device, while in other instances, it may be preferable to compute water consumption by wirelessly communicating the sensor data 2106 through the handheld device to a prescribed network server.

Figure 22B:
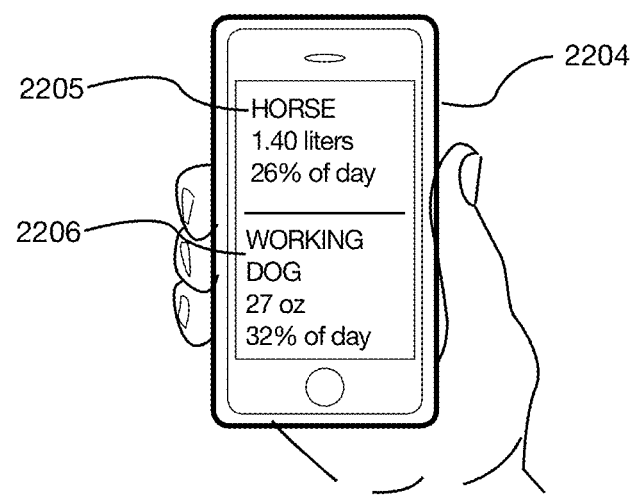
FIG. 22B is an exemplary diagram illustrating one variation of a display of water consumption information on a wireless device.

FIG. 22B is an exemplary diagram illustrating one variation of a display of water consumption information on a wireless device.

Those skilled in the art will appreciate that it is not only important to monitor the total water consumption of animals during a given time period, but to maintain the proper level of hydration throughout the day. In other words, working animals such as dogs and horses can become dehydrated during the hot periods of the day when they are highly active, even though they by actually consume the predicted amount of water by the end of a 24 hour time period.

In the drawing, a handheld device 2204 is shown displaying certain information that provides the owner with an understanding of the current hydration level of his animals. For instance, having previously predicted the total water consumption requirements of the horse using well-known formulae, the owner can, at any time, view at least the horse data 2205 comprising for instance, the total volume of water consumed during the current data recording period, and the percent of total predicted daily water requirements consumed so far.

Similarly, having previously predicted the total water consumption requirements of the dog using well-known formulae, the owner can, at any time, view at least the dog data 2206 comprising for instance, the total volume of water consumed during the current data recording period, and the percent of total predicted daily water requirements consumed so far.

By viewing the data periodically, or alternatively setting alerts indicating percent of water consumption over time, the owner can know whether he must stop work and find water to rehydrate the animals prior to them incurring the physically damaging effects of dehydration.

Figure 23:
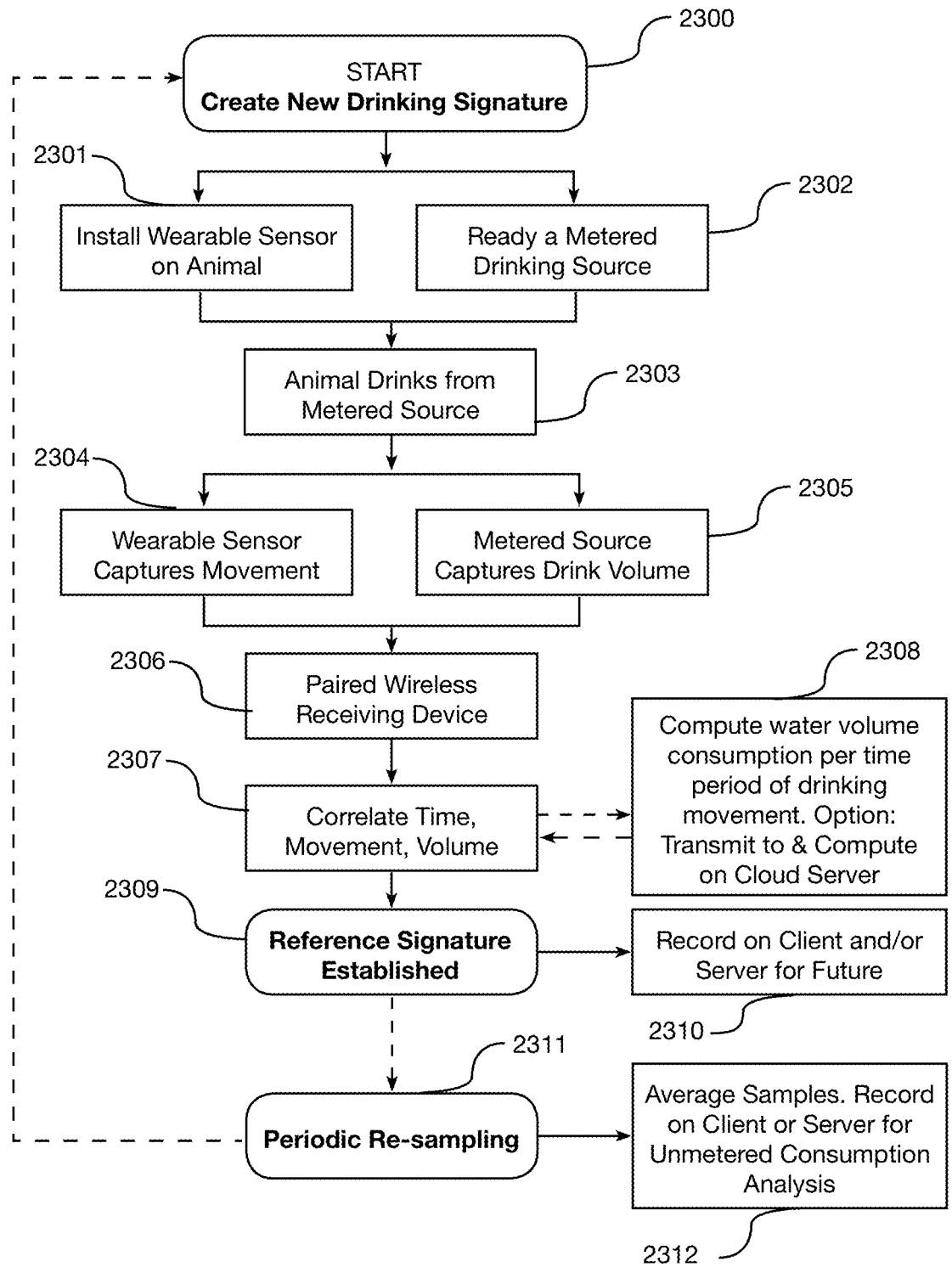
FIG. 23 is an exemplary diagram illustrating a flow chart of a method of monitoring water consumption from unmetered water sources.

FIG. 23 is an exemplary diagram illustrating a flow chart of a method of monitoring water consumption from unmetered water sources.

Upon setting up a new animal on the system of at least one embodiment of the present invention, an owner must establish a baseline drinking signature 2300 to which future sensor module data will be compared. At least two elements are required for setup, one being affixing a wearable sensor module to the animal 2301, the sensor being configured to collect electronic data streams associated with specific animal movements while drinking, and another element being a metered water source 2302 from which the volume of water consumed by the animal during setup can be determined.

As the animal drinks from the metered water source 2303, two data streams are received, one from the wearable sensor 2304, the other from the metered water source 2305. The two data streams are received from the two previously described elements by a paired receiving device 2306, for instance, a handheld device such as a tablet or smartphone.

As the owner interacts with the handheld device, specifically turning the data from the wearable sensor on during the period that the animal is drinking, and turning the data off after the animal finishes drinking, software will then correlate the two data streams 2307 so that computation of water consumption and be computed for the period of time that the drinking signature from the wearable device occurred. The computation 2308 is preferably performed by software installed on the handheld device, but may also be performed by a server on the network not shown.

Upon receiving the results of the computation, a reference signature is established 2309, and stored upon the handheld device or server 2310. Thereafter, future instances of electronic drinking data streams will be compared to and analyzed against the reference signature to compute the periodic consumption of water from unmetered sources.

Since those skilled in the art appreciate that averaging results from multiple sample testing results in higher accuracy, is preferable to periodically repeat 2311 the entire process just described, and average the samples 2312 and update the reference signature on the handheld device or server.

Figure 24:
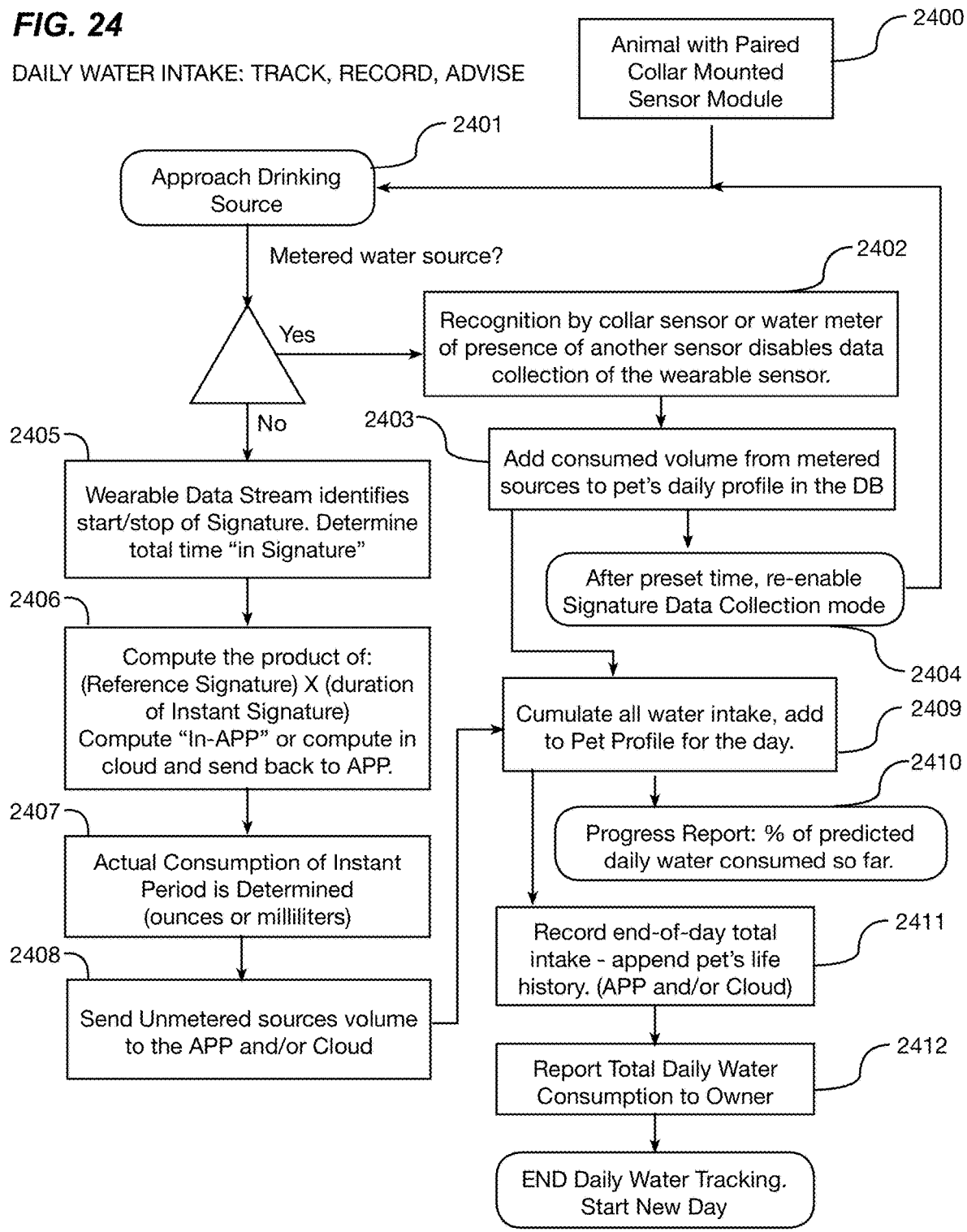
FIG. 24 is an exemplary diagram illustrating a flow chart of a method of evaluating, analyzing, and reporting on cumulative daily and long-term water consumption of a domesticated animal.

FIG. 24 is an exemplary diagram illustrating a flow chart of a method of evaluating, analyzing, and reporting on cumulative daily and long-term water consumption of a domesticated animal.

Animals may drink from both metered and unmetered water sources during any given time period. One embodiment of the present invention is a system and method of ignoring the drink monitoring data while an animal is drinking from a metered source, and opening the data collection stream when drinking from an unmetered source to eliminate erroneous double-counting of water while both data streams were received.

A sensor monitor is affixed to an animal 2400. At anytime during a data recording period, for instance, a 24-hour day, the animal will approach a water source 2401. The collar sensor, having been previously paired with a handheld device recognizes the presence of another Bluetooth device. When an animal approaches a metered water source, recognition by the collar sensor module 2402 of the proximity of a water metering sensor will disable data collection by the wearable sensor and yield to data collection by the water metering sensor. This process eliminates double counting of water consumption by the metered source and collar sensor when drinking from a metered source.

Upon a defined short period following completion of drinking from the metered water source, the data related to the animal's consumption from the metered source is transmitted using one of the means previously described to the animal's daily water consumption record, and added to the already recorded amounts to determine the cumulative consumption 2403. After a preset duration, the system recognizes that the animal has left the proximity of the metered water source, and resets the collar sensor 2404 to resume data collection of water consumed from unmetered sources.

On the other hand, if the animal approaches an unmetered source, the collar sensor module will identify the occurrence of the reference signature 2406 corresponding to the drinking activity of the animal and record the signature for the duration that the signature remains within the predefined tolerance range of the reference signature.

Thereafter, upon recognizing no additional reference signature data, the data is transmitted to a handheld device as previously described, or maintained in temporary memory until the paired handheld device is within communication range. The data is thereafter computed 2406 by comparing the duration of "in signature" data stream to the volume of water estimated to be consumed by the animal as defined by the reference signature. Upon computing the estimated water just consumed 2407, the data is communicated to the handheld device or the cloud 2408 and thereafter cumulated 2409 in the animal's daily water intake record of the animal's profile.

At the end of the preset recording period, for instance, a 24-hour day, the total water intake from metered and unmetered sources is combined, and the sum total of the daily water consumption is recorded as a daily intake 2411 in the animal's long-term water consumption history.

Upon completion of the daily water consumption being added to the animal's history, a report 2412 is delivered to the owner, such report containing various information relating to the volume, trend analysis, variations, or other water consumption related information deemed important to the owner. A new recording period begins at the end of the previous recording period.

Figure 25:
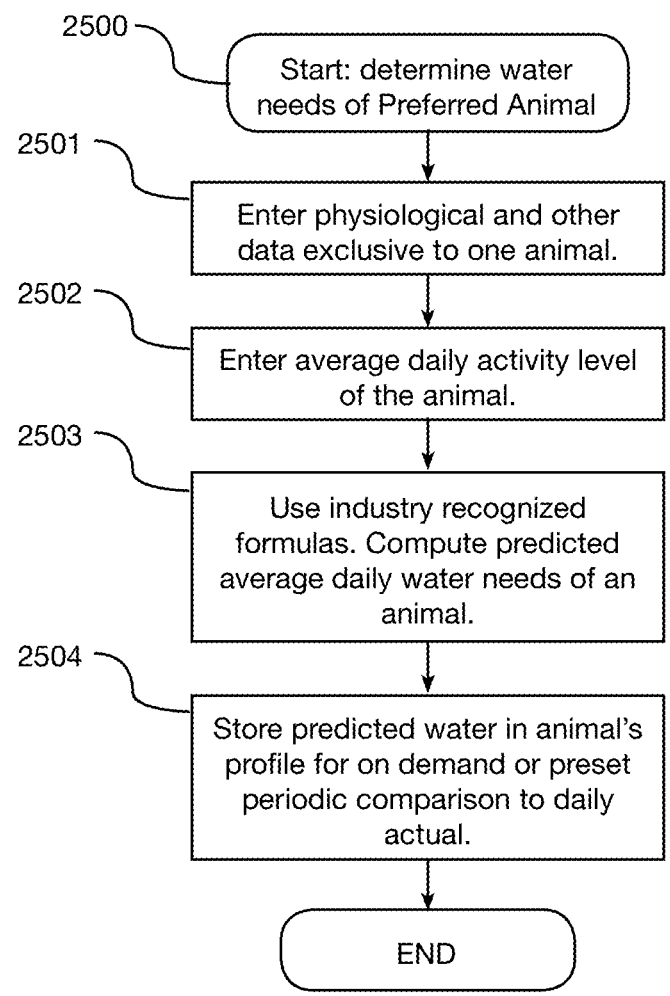
FIG. 25 is an exemplary diagram illustrating a flow chart of a method of predicting daily water consumption needs of an animal.

FIG. 25 is an exemplary diagram illustrating a flow chart of a method of predicting daily water consumption needs of an animal.

If an owner desires monitoring water consumption with the intention of preventing dehydration throughout the day, especially if the owner's animal is a working animal with a high energy output during various peak times of the day, it is preferable to first determine the estimated daily water requirements of the animal against which cumulative water consumption can be compared.

An owner being the process of estimating his animal's water needs 2500 buy opening a software application not shown, and entering physiological data 2501 exclusive to an individual animal. The physiological data may include but is not limited to animal species, sex, age, weight, and body condition score. Further, the owner may input the animal's average daily activity level 2502, or anticipated activity level.

The software application, using industry recognized formula computes the predicted water needs of the animal during the day 2503. For instance, it is well known that livestock require approximately 43 mL or water per kg of body weight each day, while pet dogs need approximately 80 mL of water daily per kg of body weight. Those skilled in the art will appreciate that average multipliers are reliably used to modify these hydration amounts based on increased activity levels, all of which may be incorporated into the software application to predict the estimated daily water requirements for each unique animal.

Upon determining the estimated water intake requirements of an animal, the daily requirements are stored in association with the individual animal's profile stored on a database on a network not shown, and/or upon a handheld device as previously described.

Upon completing the animal profile entry, the program is closed. During the future daily analysis of water consumption, the owner may elect to assess the percentage of water consumer at certain parts of the day as compared to the recommended consumption volume that should have occurred by that time using the estimated daily requirements stored in the animal's profile.

Figure 26:
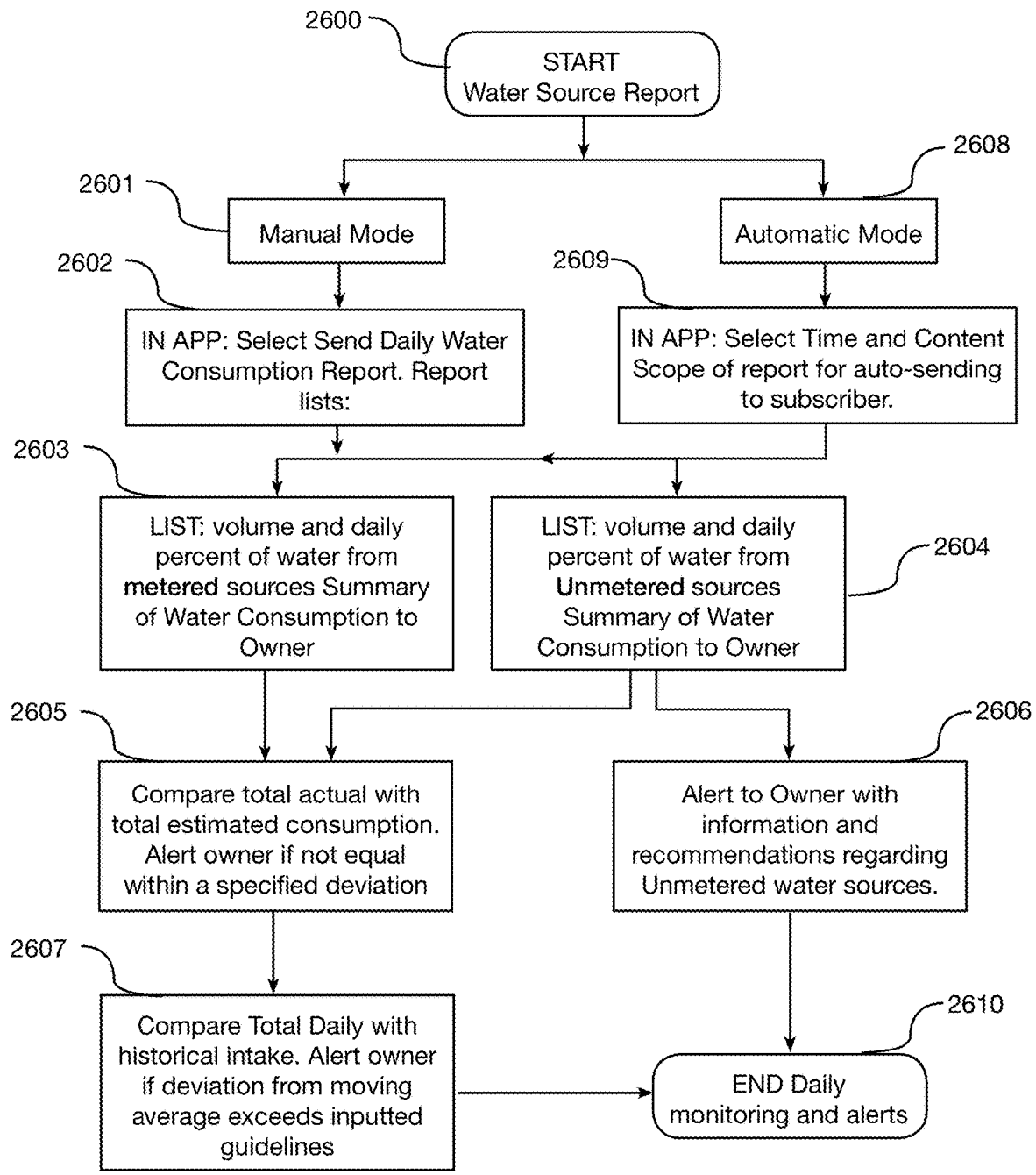
FIG. 26 is an exemplary diagram illustrating a flow chart of a method of communicating animal water consumption to an animal owner through a wireless network.

FIG. 26 is an exemplary diagram illustrating a flow chart of a method of communicating animal water consumption to an animal owner through a wireless network.

The value of water consumption tracking or analysis is diminished if the data is not timely communicated to the animal owner. It is preferable that a variety of animal consumption data are made available and delivered to the owner through digital and printable reports.

An owner may start the request for a report 2600 by selecting manual report extraction 2601, or setting up at least one embodiment of the present invention to generate one or more types of reports automatically 2608.

To generate a manual report, an owner may select the report type 2602 within a software application installed on the wireless device not shown. One report type may be a list 2603 of consumed water volumes from metered sources, a list 2604 of consumed water volumes from unmetered sources, or a combined list of total water consumed from all sources not shown.

Another report may be a comparison of actual consumption to predicted or recommended consumption 2606, an invaluable report if the owner desires such data to help prevent animal hydration throughout the day.

Yet another report may be a trend analysis 2607 report that compares long-term intake on a moving average, along with the analysis of any out of normal deviations that may indicate the onset of medical problems.

On the other hand, an owner may be busy with daily activities, and unable to generate a manual report at defined intervals throughout the day. In such instances it is preferable to set up an automated report generation option within the software application. A primary difference between the manual report and automated report is that an alert 2606 message is generated and sent to the owner as a text or email with recommendations. In the illustration, one example of information sent to the owner related to recommendations about water consumption from unmetered sources. However, this recommendation is not meant to be limiting, and automated reports may notify the owner that additional water is necessary to avert animal hydration, or that an animal's daily water consumption substantially differs from their recent normal daily consumption history, indicating possible animal distress or acute medical problems that may require urgent veterinary intervention.

The owner may pause, suspend or terminate report generation and alerts 2610 at any time.

Figure 27:
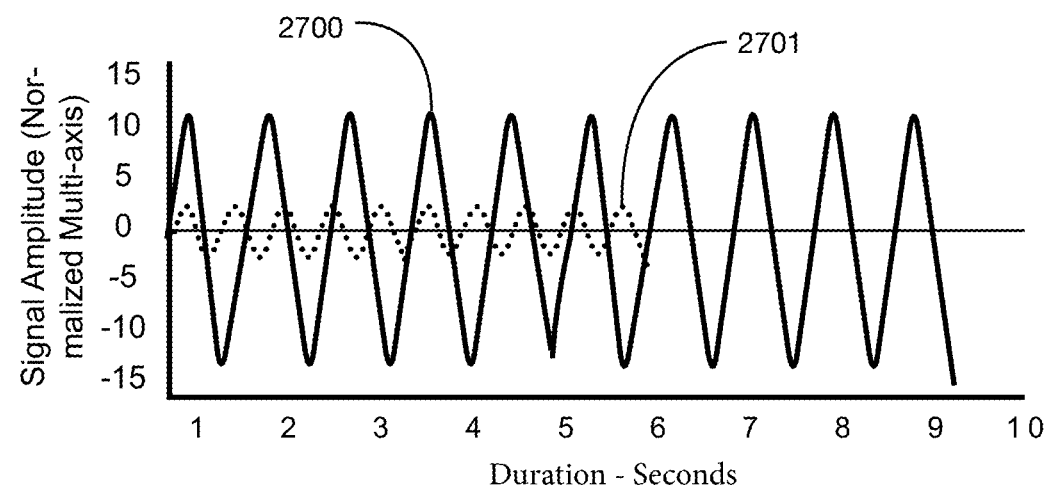
FIG. 27 is an exemplary diagram illustrating representative data sets from sensing collars while different animals are scratching.

FIG. 27 is an exemplary diagram illustrating representative data sets from sensing collars while different animals are scratching.

Multi-axis motion-sensing collars for pets are well known, and generally provide for the recording of movement of an animal for real-time or subsequent computer analysis. Therefore, pet animals not shown having been fitted with multi-axis motion-sensing collars not shown, move about while the sensing collar senses, processes, and transmits the recorded sensor data to a wirelessly connected storage device not shown.

In the drawing, two illustrative data sets are shown, a first accelerometer sine wave for a first data set 2700 being correlated to a large dog scratching itself for approximately nine seconds, and a second sine wave for a second data set 2701 correlating to a small dog scratching itself for a period of about six seconds.

It should be noted that the two sine wave forms are presented to illustrate the obvious differences between the large and small dog scratching signature due in large part to the differences in distance and duration of movement of the accelerometer sensors in three-axis space.

Those skilled in the art will appreciate that the wave forms, whether analog or digital, may repeatedly correlate to a given physical activity of any given pet animal, and that by observing the wave forms across the data collected from an motion sensing collar over a given period of time, the observance of a wave form 2700, 2701 will indicate that the pet has been scratching.

Figure 28:
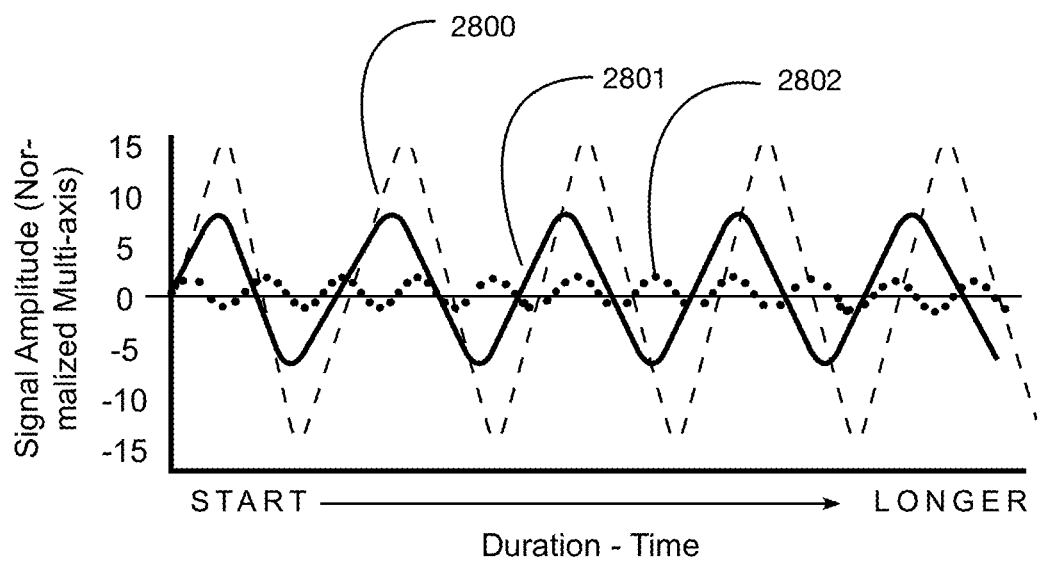
FIG. 28 is an exemplary diagram illustrating representative data sets from sensing collars while different animals are walking.

FIG. 28 is an exemplary diagram illustrating representative data sets from sensing collars while different animals are walking.

It is sometimes desirable to identify certain characteristics of pets based on analysis of data collected form sensing collars.

In the drawing, a device not shown is worn separately around a pet's neck or attached to a dog collar, the device comprising a circuit module capable of sensing, recording and temporarily storing data related to animal movements, the module further being in wireless communication with a paired Bluetooth device. A software application is installed upon the Bluetooth device not shown, for instance, a smart phone, the device being in wireless communication with a networked server. As large volumes of data are received by a server from a plurality of animal-mounted collars, the data is analyzed and compared to other known data sets to create baseline signatures that correlate specifically to different types of identifiable pets.

Data sets, having previously been loaded upon the network server or contained as reference data sets on the memory of the Bluetooth device, consist of multiple components at least including: (a) the data consistent with a movement typically expected of the animal, and (b) the duration of the movement. The set of data just described is referred to as a "signature".

In the illustrative example, following a large set of data related to dogs walking, and more specifically having the benefit of pet information, such as breed of dog correlated to the pet by the pet owner, the data related to walking by dogs of every breed may be grouped and normalized to determine the walking data generally related to each breed. The wave form 2800 is shown as an example for male Great Dane dogs, the movement of the accelerometer sensors, and the slow walking gait being immediately discernable from the wave form generally relating to male Golden retrievers 2801. Further, as one will immediately appreciate, the gait and speed of gait of a Toy Poodle are shown as a clearly differentiated wave form 2802.

Various mathematical formulae may be used to normalize the large, and persistently updating data correlating to any number of specific filters or know parameters selected for analysis.

Figure 29:
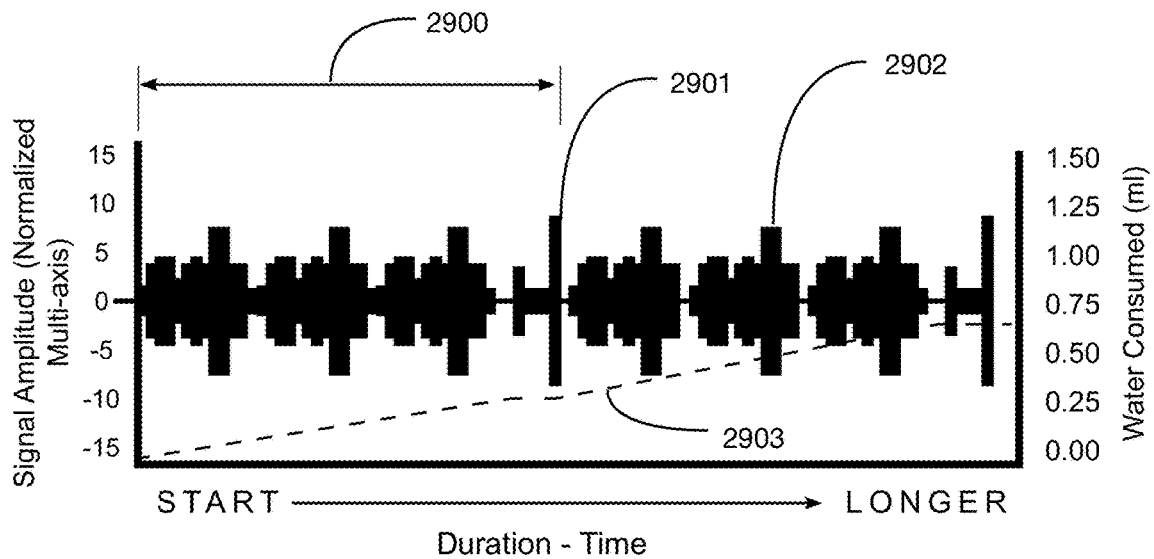
FIG. 29 is an exemplary diagram illustrating representative data sets from a sensing collar and a metered water bowl while a pet is drinking from the bowl.

FIG. 29 is an exemplary diagram illustrating representative data sets from a sensing collar and a metered water bowl while a pet is drinking from the bowl.

In the drawing, a motion sensing collar not shown is used to record the head, neck, esophagus, larynx, and other anatomy of a pet animal while drinking water. As previously discussed, it is important to monitor water consumed from un-metered water sources throughout the day in order to accurately assess fluid consumption trends over the life of the pet.

In the illustrative example, a wave form 2900 is determined to be the drinking signature unique to the pet animal that generated this form. It is well known that dogs and cats "lap" their water, with a variation in the number of laps between swallows, and the volume of water consumed with each swallow.

Therefore, at least two different wave forms comprise a signature, the form corresponding to the accelerometer data generated while swallowing, 2901, and the repeated wave forms that correlate to multiple "laps" 2902 that occur between each swallow.

The motion sensing collar, or a computer application wirelessly connected to the collar, having been trained to identify the drinking signature and the corresponding volume of water 2903 consumed during the occurrence of the drinking signature can closely approximate the volume of water consumed during the drinking session. The volume of water consumed from un-metered sources, such as a swimming pool or rain puddle, can therefore be combined with the daily water consumption from metered sources to cumulate a total water intake record for each pet animal.

Figure 30:
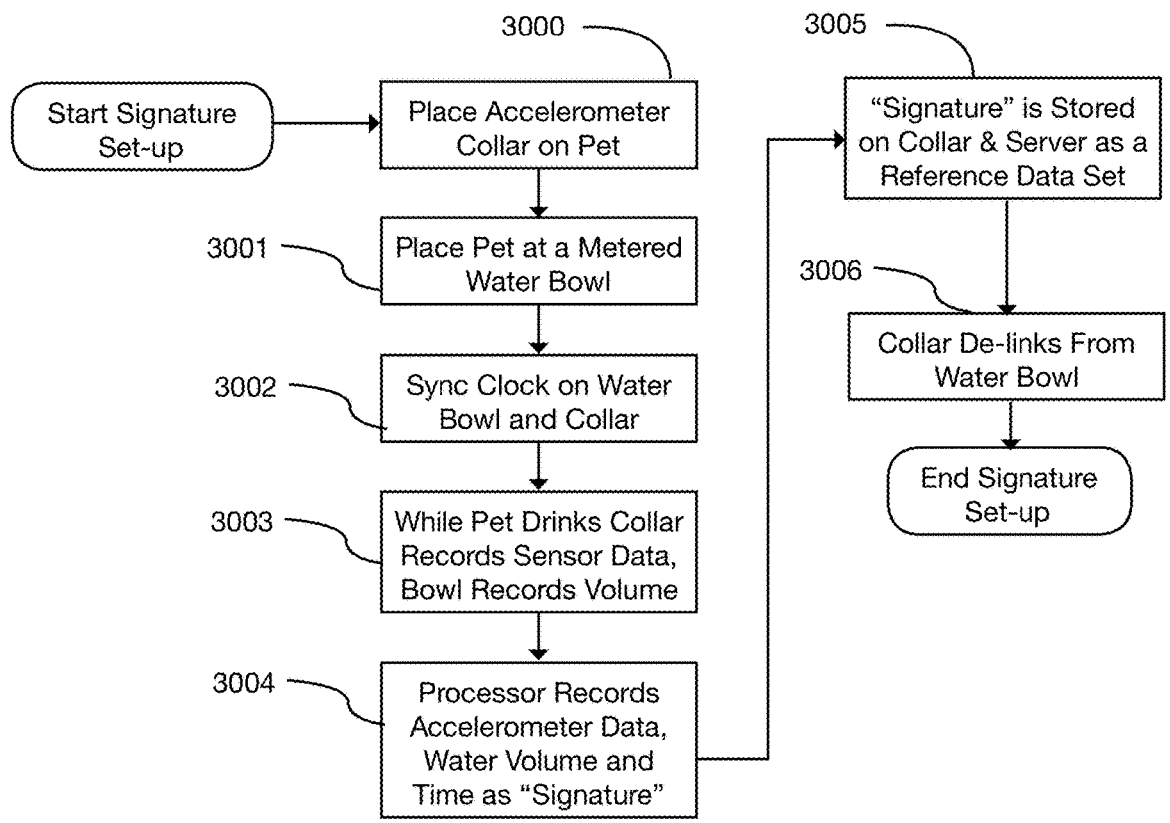
FIG. 30 is an exemplary diagram illustrating the process of training the system to recognize a pet's drinking signature.

FIG. 30 is an exemplary diagram illustrating the process of training the system to recognize a pet's drinking signature.

As previously described, a motion sensing collar and an associated computer program is used to determine the volume of water consumed by a pet from un-metered sources. To setup and train the collar, the collar is placed upon the pet 3000. The pet is placed in front of a metered water source, such as a water bowl that accurately computes the weight of the water in the bowl, or that determines water level, and correlates weight or levels to water volume.

Using a device in wireless communication with the collar and the metered water source, the timing clock is synced between the bowl and collar 3002. At such time as the pet begins to drink, the motion of the neck, throat and related muscles used to drink is recorded using multi-axis accelerometers, and at the same time, the volume of water drawn from the bowl is recorded 3003. Thereafter, a processor 3004 correlates the drinking volume to the drinking time to create a unique drinking signature for the pet. The signature is thereafter stored in one or more of the sensing collar, the wirelessly connected device, or servers on the cloud 3005.

Following the setup of the collar, the collar is de-linked 3006 from the metered bowl to prevent the system from double-counting water volume by adding the components of metered water consumed, and inferred water consumed during the presence of the drinking signature. After the signature is set up, the collar will only record the drinking signature when not in the immediate presence of a metered water source.

FIG. 31A is an exemplary diagram illustrating the side view of a canine bust highlighting selected anatomical features. More specifically, the drawing shows a profile of a representative pet dog 3100 comprising a tongue 3101, larynx 3102, sternohyoid muscle 3103 used to assist swallowing, esophagus 3104, trachea 3105, and primary neck muscles sternocephalic muscle 3106, brachiocephalic muscle 3107 and trapezius muscle 3108. It should be noted that the muscles just described are bilateral, so the drawing shows only the near side of each muscle.

As can be readily seen, a typical collar is located 3109 over the neck, encircling most all of the anatomical features just described. FIG. 31B is an exemplary diagram illustrating the underside of a canine head and neck.

As will be instantly appreciated, canine and feline anatomy, and more specifically the trachea, esophagus and muscles used for swallowing are located within a relatively small portion of a relatively wide neck. In the drawing, the underside of a typical dog is shown with the muscles of the left side of the illustration removed so as not to obscure relevant anatomy.

More specifically, the larynx 3102 and trachea 3105 are shown below the sternohyoid muscle 3103. The sternohyoid muscle 3103 is a bilateral muscle, therefore, a mirror image of the muscle shown would appear over the trachea and esophagus on the opposed side of the longitudinal centerline of the dog's neck.

For illustrative purposes, a dotted line 3110 is shown as a means to outline the approximate location of an electronic sensor module that would monitor specific movement and activity of the larynx, trachea, sternohyod muscle, the esophagus not shown, and other vital muscles as previously described.

Those skilled in the art will immediate appreciate that any failure to maintain the position of electronic sensors directly aligned and centered over these anatomical parts of a pet animal will result in lost signals, missed sensing and recording of the activity, and correspondingly, loss of important data that would be vital to animal health persistent monitoring.

Therefore, it can be appreciated that at least one embodiment of the present invention provides for the placement and retention of a pet monitoring collar sensor in a position substantially proximate to the ideally located area in the center, under-neck position of a companion animal.

FIG. 32 is an exemplary diagram illustrating an improved pet collar comprising a left side length 3200 of the collar shown with an enlarged front section 3202 that would be positioned proximal to the throat, and a right side length 3203 of the collar, the left and right sides 3200, 3203 being terminated in a buckle 3204 substantially positioned on the centerline CL that is aligned with the longitudinal axis of the pet's spine. A center pull D-ring 3206 is shown affixed to the termination buckle, the D-ring being used for attaching a leash or lead line.

In the drawing, the enlarged front section 3202 functions as first part of a two-part latching means, the second part of the latching means being integral to the right side length 3203 of the collar.

The center of the termination buckle 3204 is positioned such that the circumferential distance of the right and left length of the collar 3200, 3203 between the horizontal mid-point of the front of the enlarged front of the collar 3202 is substantially the same.

It is well known to those skilled in the art that certain anatomical features of mammals are located within the neck, and substantially aligned about the center anterior portion of the neck, such features including the trachea 3105, esophagus 3104, and the bilateral sternohyoid muscles 3103. As can be readily understood, the wider portion of the front of the collar 3202 compared to the narrower back portion of the collar would more advantageously distribute the force exerted on the front of the neck as a result of pulling on a leash not shown attached to the center pull D-ring 3205 over a larger surface area. Lower point-loading in the throat area thereby minimizes the risk of damaging those front-of-neck muscles and organs previously described.

As can be appreciated, in order for the enlarged section of the collar to remain positioned proximate to the throat area, it is the intention of at least one embodiment of the present invention to rely on the increased size and corresponding weight of the front of the collar compared to the back of the collar. Additionally, at least one embodiment of the present invention provides for the centered attachment of one or more traditional pet identification tags 3207 by means of a centered tag loop 3206 affixed to the collar.

Figure 33:
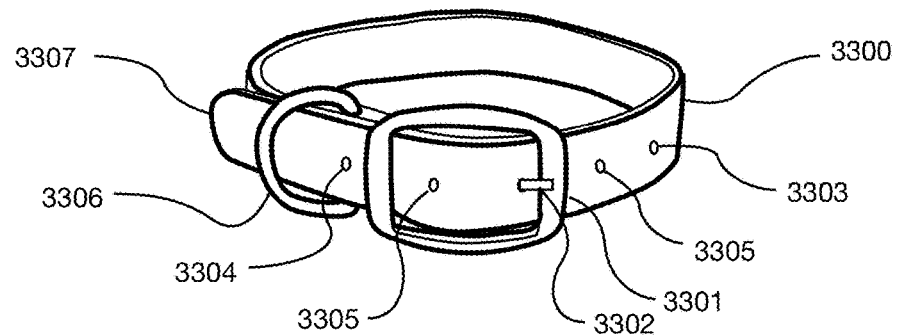
FIG. 33 is an exemplary diagram illustrating a traditional pet collar 3300.

FIG. 33 is an exemplary diagram illustrating a traditional pet collar 3300. It is not coincidental that the drawing appears to be of a design substantially similar to a belt typically threaded through belt loops on pants worn by pet owners. In fact, the operation of the collar 3300 is identical to belts used as apparel accessories.

In the drawing, the collar 3300 is of a certain length designed to accommodate a range of pet neck sizes. The range of neck sizes this particular collar would fit is determined by which buckle hole is used. For instance, to fit the collar properly on the smallest neck size for which this collar would be recommended, the owner would tighten the collar through the buckle frame 3301 until the buckle prong 3302 is fitted through the last hole 3307. On the other hand, to lengthen the collar to fit the largest neck size within the allowable range for this collar, the owner would loosen the collar so that the prong 3302 could be fitted through the first hole 3304. As can be appreciated, fitting this collar to other neck sizes within the allowable range can be accommodated by inserting the prong 302 through any of the appropriate remaining adjustment holes 305.

A multi-function D-ring 3306 is shown permanently affixed to the collar 3300, the D-ring providing for (a) retaining the loose end of the collar 3307 as a keeper when excess projects beyond the buckle frame, for affixing pet identification tags not shown, and for attaching a leash or lead line when the owner desires controlling the movements of the pet.

Figure 34A:
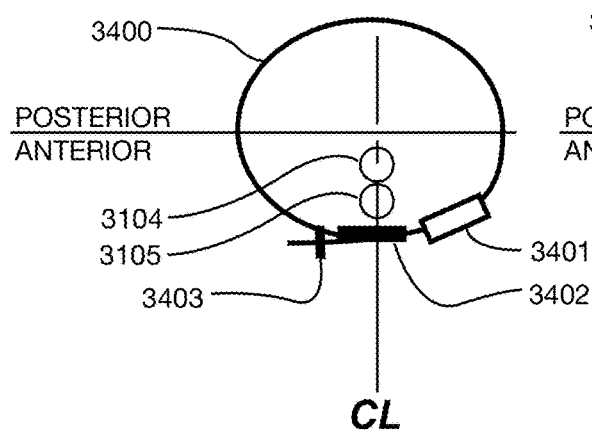
FIG. 34A is an exemplary diagram illustrating a top view of a traditional collar 4300 without a leash attached.

FIG. 34A is an exemplary diagram illustrating a top view of a traditional collar 3400 without a leash attached.

For positional reference, the anterior and posterior orientation of the collar is shown, the anterior portion being that section of the collar that will typically be positioned proximal to the pet's throat.

In the drawing, a buckle 3402, D-ring 3403, and pet identification tags not shown, but that would be affixed to the D-ring, together increase the weight of that lower portion of the collar, biasing the position of the collar to the position shown even if the collar is manually rotated about the neck such that the buckle is positioned elsewhere on the circumference. Therefore, the collar will naturally roll about the neck until the position shown is achieved. This position would be considered a default position.

In this position, the buckle is positioned anterior to the pet's trachea 3105 and esophagus 3104.

However, additional accessories are often attached to pet collars, for instance, pet activity trackers comprising accelerometer sensors, processors, a power supply, and Bluetooth communication circuits. Another popular accessory typically attached to traditional collars is a "find my pet" GPS tracker comprising circuitry for communicating with cell phone towers and the like.

In the drawing, one of the devices 3401 just described is positioned on a collar wherever the owner deems appropriate, and where there is sufficient collar length to which the accessory may be attached. As can be appreciated, the additional weight of such a device, when added to the collar, increases the weight of one portion of the collar so that the collar would assume its default position more readily in response to the total increased weight.

Figure 34B:
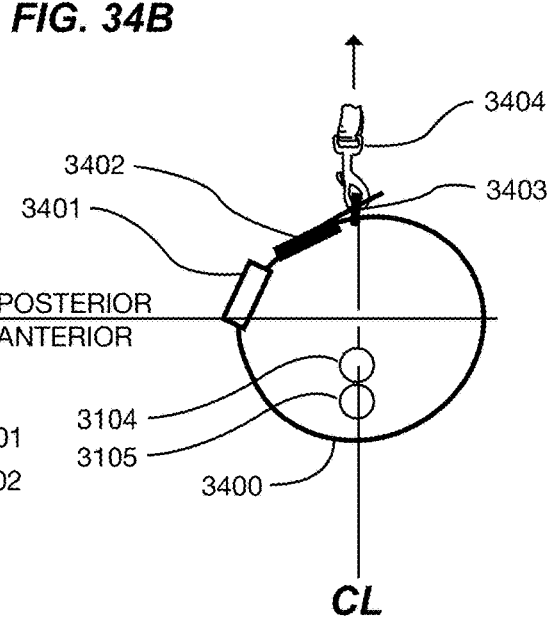
FIG. 34B is an exemplary diagram illustrating a top view of a traditional collar with a leash attached.

FIG. 34B is an exemplary diagram illustrating a top view of a traditional collar with a leash attached.

When a leash 3404 is attached to the D-ring 3403 for purposes of controlling the movement of the pet relative to the leash holder, it can be instantly seen that the collar 3400 rotates about the neck to that the buckle 3402 and D-ring become positioned proximate to the posterior portion of the neck, or nearly one half circumference from its default position.

Further, it can be seen that the attached electronic device 3401 previously describes concurrently rotates about the neck, retaining its position on the collar relative to the buckle.

One problem with the collar and electronics device assembly just described is that the electronics and associated sensors have moved distal to the throat area. In the event the device 3401 is intended to sense changes relating to events or movements of the trachea 3105 or esophagus 3104, the device would no longer function as intended, and would be unable to capture physiological activities in the throat area.

Even if the device could continue to sense and record throat area physiological activity, the electronic signature would be substantially different from the signature that would be sensed and recorded when the device is positioned directly over the throat area, and would therefore not provide the consistency in signal level necessary for persistent health monitoring.

FIG. 35A is an exemplary diagram illustrating a top view of a center pull collar with adjusted to the largest diameter.

As previously described, collars with leash D-rings proximate to the adjustment buckle require the collar to be rotated approximately 180 degrees about the neck in order to attach the leash.

However, another type of commercially available collar provides for a separate leash D-ring permanently affixed to a portion of the collar intended to be positioned 180 degrees from the buckle. In other words, the leash D-ring is intended to be positioned in the center or the posterior arc of the collar, and is referred to in the industry as a "center-pull" collar.

As previously discussed, collar lengths are selected so as to fit the highest number of different neck sizes with the fewest number of SKUs. Therefore, even center-pull collars provide for a length adjustment means.

In the drawing, the collar 3500 is shown adjusted to accommodate the largest diameter pet neck, for instance, the buckle prong is inserted into the first adjustment hole of the collar. As a consequence, the longer length of collar between the fixed center pull D-ring 3501 and buckle 3402 cause the buckle to rotate to an obtuse angle 3503 clockwise relative to the default buckle centerline CL when a pulling force 3502 is exerted on the collar by the leash not shown.

FIG. 35B is an exemplary diagram illustrating a top view of a center pull collar with adjusted to a median diameter.

In the position shown, the length of the right and left lengths of the collar 3500 relative to the center pull D-ring 3501 are coincidentally substantially equal. This is not the result of functional design, but a result of the pet's neck being of such a circumference that the buckle prong was inserted through the center collar length adjustment hole.

In this instance just described, the center pull D-ring 3501 and buckle 3402 will remain substantially vertically aligned.

FIG. 35C is an exemplary diagram illustrating a top view of a center pull collar with adjusted to the smallest diameter.

In the drawing, the collar 3500 is shown adjusted to accommodate the smallest diameter pet neck, for instance, the buckle prong is inserted into the last adjustment hole of the collar. As a consequence, the shorter length of collar between the fixed center pull D-ring 3501 and buckle 3402 cause the buckle to rotate to an obtuse angle 3504 counter-clockwise relative to the default buckle centerline CL when a pulling force 3502 is exerted on the collar by the leash not shown.

FIG. 36 is an exemplary diagram illustrating an exploded isometric view of an improved collar assembly.

More specifically, a collar assembly comprises a left length of collar 3601, a right length of collar 3600, the right and left lengths being of substantially equivalent lengths when installed on a pet. As can be readily seen, a plurality of male fastening projections 3606 are integral to the inside surface of the left length of collar 3601, while a plurality of mating female portions are integral to the outer surface of the right length of the of collar 3600, the mating details just described comprising a latch for installing or removing the collar from a pet.

A latch block 3606 is depressed by the outer mail portion of the latch, and once the two halves of the latch are slid into the latched position, the retaining block pops outward to retain the latch halves together securely, preventing unwanted unlatching.

Another novel improvement of at least one embodiment of the present invention is the integration of a pet identification tag retaining loop 3603 removably attached to one half of the latch. When unlatched, the tag retaining loop may be easily removed for adding or removing tags from the collar. For instance, tags are frequently changed to reflect renewed pet licensure, renewed or updated vaccinations, or to incorporate updated contact information for the pet owners. Therefore, those skilled in the art will immediately appreciate the nearly instant ability to add or remove tags from the tag retaining loop.

Finally, a collar end keeper 3602 provides for precise centering of the leash D-ring 3607 integral thereto. Positioned at the ends of the substantially equal length right and left lengths of collar, the keeper provides, for the first time, the ability of the owner to precisely align the enlarged latch area of the collar proximal to the throat, and the center pull D-ring substantially centered on the posterior portion of the pet's neck.

Various alternatives for positioning the center-pull D-ring on collars of different lengths and configurations will be discussed in more detail in upcoming figures.

Figure 37:
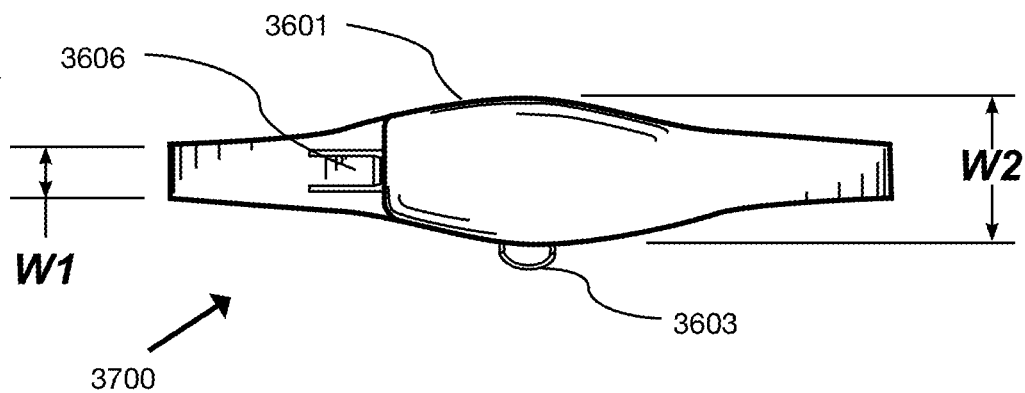
FIG. 37 is an exemplary diagram illustrating a front view of an improved collar assembly.

FIG. 37 is an exemplary diagram illustrating a front view of an improved collar assembly 3700.

It should be noted that "front view" is the collar as viewed by looking at the front of the pet. Reference to "right" or "left" side of the collar correlate to the anatomical right or left side of the pet, respectively.

In the drawing, a substantially enlarged portion of the collar 3601 is positioned substantially over the throat area of the pet. It can be readily seen that the width W2 of the front portion of the collar is a substantially larger dimension compared to the remainder of the collar W1. The enlarged portion of the collar comprises a latch that, once engaged, is retained in the latched position by the latch block 3606.

An appropriately small, yet durable identification tag ring 3603 is shown suspended from the collar latch, and substantially aligned with the center of the collar. It is well known to those skilled in the art that identification tags that typically weight but one-half ounce, and do not require the overdesigned structural weight or size of the traditional leash D-ring. Therefore, another improvement of the present tag attaching loop over the art is that the rind is minimally sized to prevent unwanted noise from dangling identification tags, and further reduces the opening sizes of collar attached rings that can become snagged on fences, sticks or other projections that can ensnare dogs.

Figure 38:
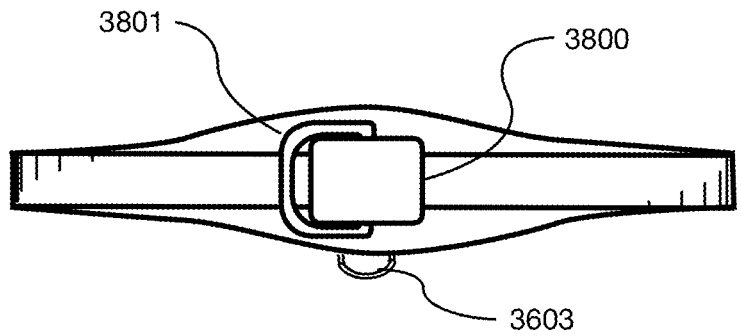
FIG. 38 is an exemplary diagram illustrating a back view of an improved collar assembly.

FIG. 38 is an exemplary diagram illustrating a back view of an improved collar assembly.

A collar ends keeper 3800 and a leash D-ring 3801 are appropriately centered in the back of the collar. A leash, once attached to the D-ring and pulled, will not rotate the collar substantially from its intended position with the enlarged front of the collar remaining proximal to the throat area. A tag loop 3603 is shown substantially centered and aligned with the keeper 3800.

Figure 39:
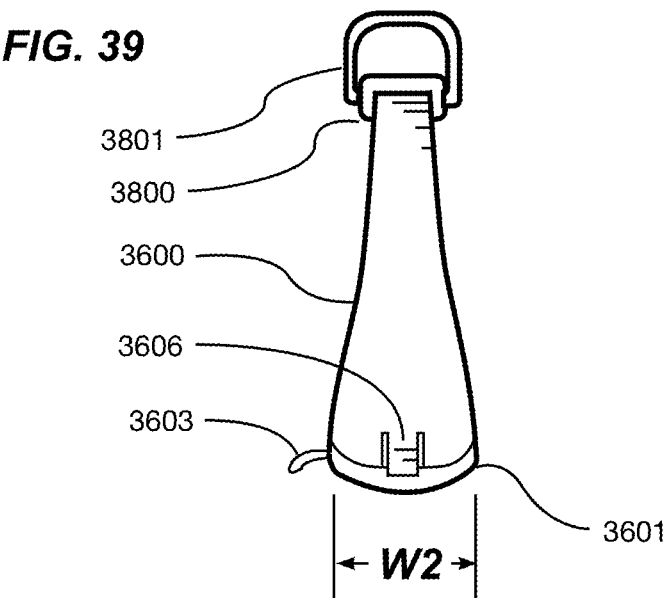
FIG. 39 is an exemplary diagram illustrating a side view of an improved collar assembly.

FIG. 39 is an exemplary diagram illustrating a side view of an improved collar assembly 3600 comprising a D-ring 3801 hingably attached to a keeper 3800, an outer portion 3601 of the latch, a latch block 3606, and a tag loop 3603.

As can be appreciated, the mass at the widest portion W2 at the bottom of the illustration is substantially larger than the mass at the upper end of the collar assembly providing for the lower portion of the collar to bias downward, and therefore remain substantially centered over the throat portion of the pet.

Figure 40:
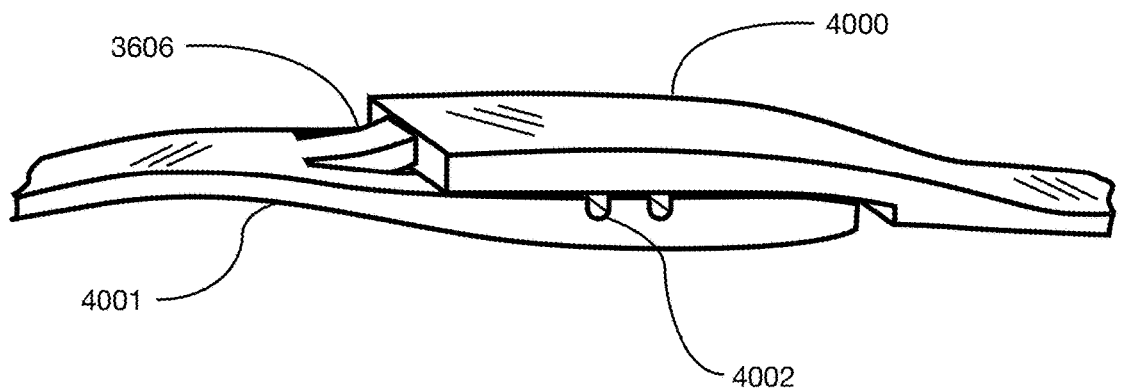
FIG. 40 is an exemplary diagram illustrating an isometric view of a latched collar fastening device.

FIG. 40 is an exemplary diagram illustrating an isometric view of a latched collar fastening device.

First, it should be noted that the latch components taught in at least one embodiment of the present invention FIGS. 40, 41, 42, 43, 44 are not meant to be limiting, but may be:
 a) stand-alone components with one end affixed to the end of a collar by means of threading the collar end through a loop on the proximal end of the latch component,
 b) integrally molded with the collar being of the same material, or
 c) insert molded over a non-moldable material, for instance, nylon webbing.

A first end 4000 of a collar is shown mated in the attached position to a second end 4001 of a collar, the latch being retained in the locked position by means of a resilient latch block 3606.

To un-mate the two portions of the latch, the latch block 3606 is first depressed so that the first end of the latch 4000 is allowed to slide over the depressed latch block. Once the first end of the latch is slid over the latch block, interlocking male details not shown on the underside of the first end are disengaged from their female counterparts, allowing the two ends of the latch to be separated.

Channels 4002 provide for the insertion of a tag retaining loop of a cross sectional geometry that fits snugly within the loop channels. The tag loop is captured between the first and second ends of the latch when engaged, thereby being retained in its intended position.

Figure 41:
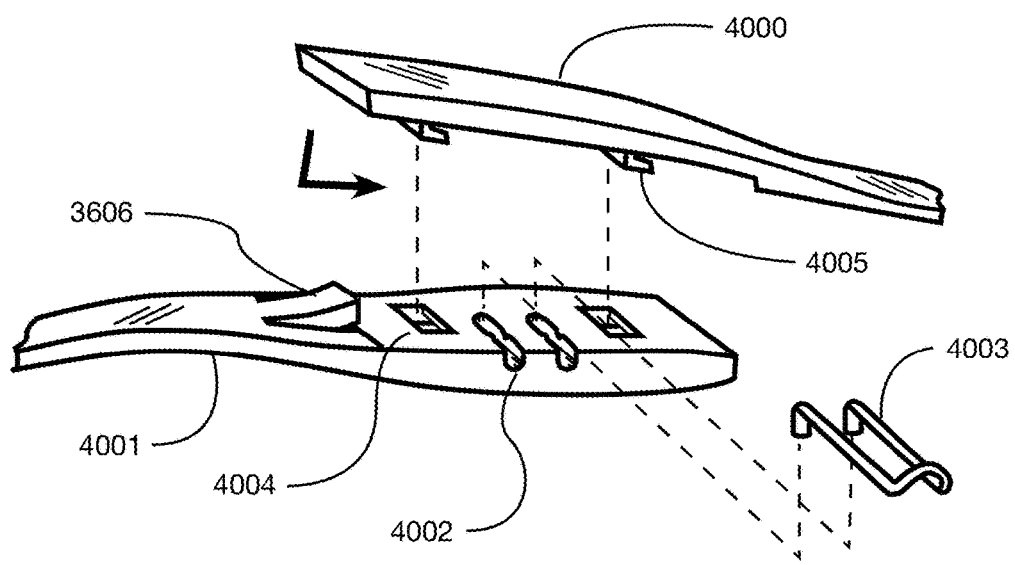
FIG. 41 is an exemplary diagram illustrating an exploded view of a variation of an improved collar fastening device.

FIG. 41 is an exemplary diagram illustrating an exploded view of a variation of an improved collar fastening device.

An un-latched first end 4000 of a collar is shown with a plurality of male latching fingers 4005 projecting downward from the underside of the latch. To engage the latch, the downward projecting male details are mated with a plurality of female receptacles 4004 provided for in the second end 4001 of the collar latch.

A plurality of tag loop channels 4002 are shown integral to the lower second end of the collar latch, the channels thereby dimensioned to accept a tag loop 4003 therein, the tag loop, shown in the illustration as a wire form being retained by the two opposed mated latch portions when the latch is secured.

The latch is closed by aligning the male projections 4005 with the female receptacles 4004, then pressing the two latch halved together cause the latch block 3606 to depress, thus allowing the top first end of the latch to slide distal to the second lower end of the latch until the latch block returns to the non-depressed position. The latch is thereby locked and unable to be unlocked until the latch block 3606 is forceably depressed to that the first upper end of the latch can slide in a direction proximal to the second lower end of the latch, allowing the male projections to disengage from the female receptacles.

Figure 42:
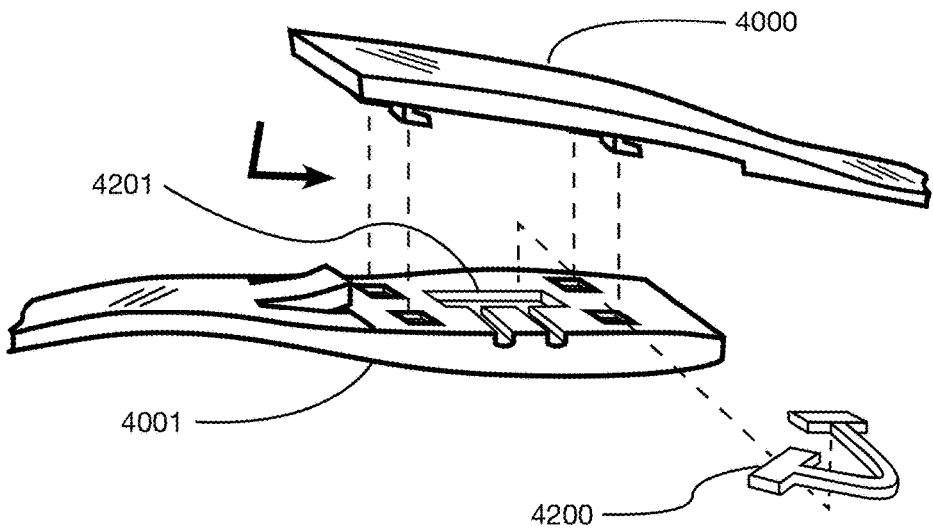
FIG. 42 is an exemplary diagram illustrating an exploded view of a variation of an improved collar fastening device.

FIG. 42 is an exemplary diagram illustrating an exploded view of a variation of an improved collar fastening device.

As previously described, the first upper end 4000 of the latch engages and disengages from the second lower half of the latch 4001 by engaging or disengaging the male projections from the mating female receptacles.

A resilient identification tag loop 4200 is shown with ends comprising enlarged sections designed to mate into a matching receptacle 4001 integral to the second lower half of the latch. A resilient tag loop, for example, a tag loop molded of flexible nylon, is preferable over a rigid loop material for two reasons, the first being that a resilient loop yields to pressure, the flexing thereby minimizing the potential for injury to the pet, and the second being that a resilient materials provides an improved level of sound dampening, minimizing the annoyingly loud "jangling" of pet identification tags when compared to pet tags affixed to traditional leash D-rings.

Figure 43:
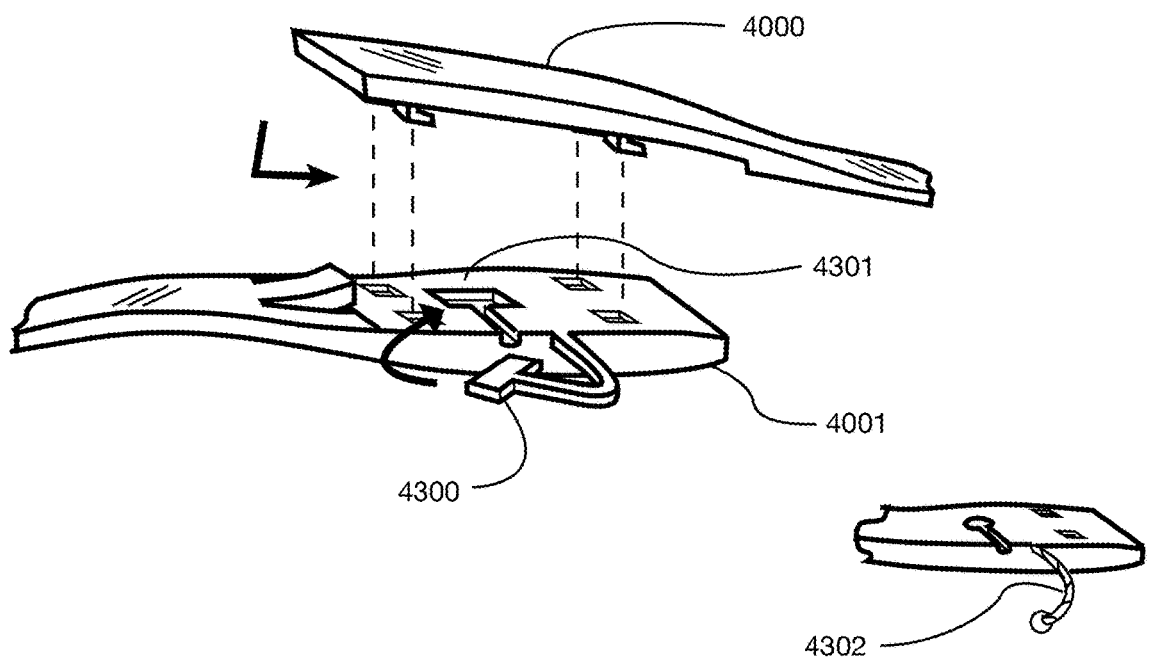
FIG. 43 is an exemplary diagram illustrating an exploded view of a variation of an improved collar fastening device.

FIG. 43 is an exemplary diagram illustrating an exploded view of a variation of an improved collar fastening device.

More specifically, as previously described, the first upper end 4000 of the latch engages and disengages from the second lower half of the latch 4001 by engaging or disengaging the male projections from the mating female receptacles.

In the drawing, a tag loop is formed within the mold in which the second lower latch 4001 is formed, with one end of the loop being integral to the materials of the latch, and a second end formed with an enlarged end 4300 that is inserted into a receptacle 4301 within the body of the second lower end, the second end being retained in the receptacle by the mated first top portion of the latch.

Molding one end of the loop concurrently with molding the adjoined latch end may be preferable in instances when users do not want the tag loop and tags to easily separate from the latch, and further as a means of reducing separate part costs and secondary assembly by either the manufacturer or user.

It should be noted that as an alternative, a separate material, such as a flexible cable with a swedged terminal end 4302 may be insert molded into the second lower end of the latch, thereby providing advantages similar to those just described.

Figure 44:
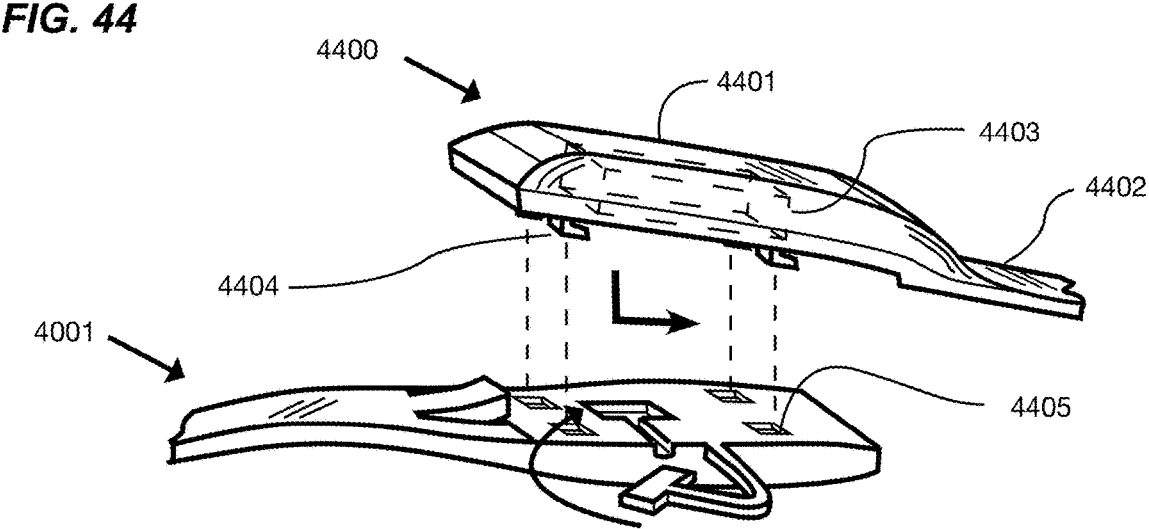
FIG. 44 is an exemplary diagram illustrating an exploded view of a variation of an improved collar fastening device.

FIG. 44 is an exemplary diagram illustrating an exploded view of a variation of an improved collar fastening device.

More specifically, the illustration shows a first upper end of the latch 4400 affixed to a first collar end 4402, and matable with a second lower patch portion 4001 by engaging a plurality of male projections 4404 with female receptacles 4405 as previously described.

In many instances, it is preferable to increase the thickness, or depth of the first upper portion of the latch to provide for the installation of electronics, for instance, a module comprising a power source, processor, accelerometer, Bluetooth communication circuit or other electronic, electrical or electromechanical components.

In order to accommodate such functional electromechanical modules, at least one embodiment of the present invention provides for integrating an enlarged cavity 4403 into at least one portion of the latch, thereby creating a slightly higher profile dimension 4401 of the respective latch portion.

Figure 45:
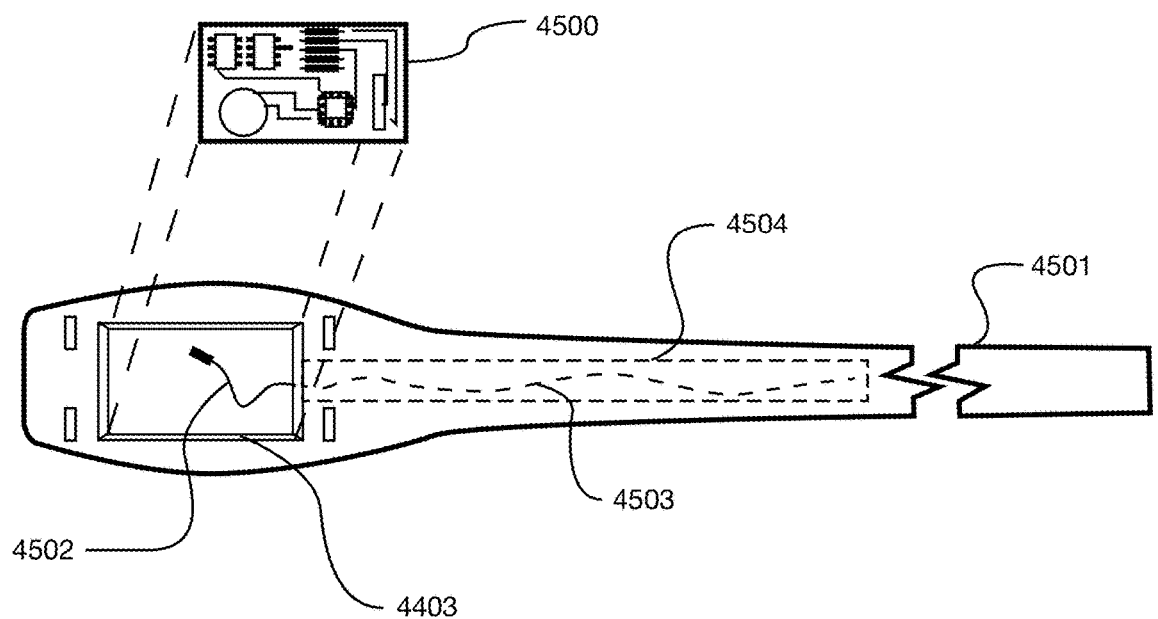
FIG. 45 is an exemplary diagram illustrating a top view of one half of an improved collar with integrated electronics.

FIG. 45 is an exemplary diagram illustrating a top view of one half of an improved collar with integrated electronics.

More specifically, one length of a collar 4501 is shown with an integrally molded cavity 4403 sized to accept an electronics module 4500, the size being determined by the dimensional requirements of the module and related components.

Although the IoT devices in the pet industry, specifically pet activity trackers and GPS pet locating devices are well known, those skilled in the art will recognize that the communication range of such devices that are attached to existing collars is limited because (a) the electronics cannot be optimally positioned and maintained in the desired position relative to the pet's neck, for the many reasons already discussed, and (b) that the animal's body, if positioned between the sending and receiving devices, appreciably attenuates the communication signal, resulting in reduced communication range.

At least one embodiment of the present invention overcomes these two major problems in the art by (a) maintaining a prescribed position of the collar on the pet using the means previously described, and (b) optionally, integrating a coaxial antenna and and secondarily, a ground plane into a substantial length of the collar, the antenna being connected to the electronics module by means of a connector 4602 or soldering, and the antenna length being at lease one quarter wave length of the communication signal. The antenna, having the benefit of being of a length sufficient to traverse the animal's under neck, beside the neck, and in some cases wrapping to the top side of the pet's neck provides substantially unobstructed line of sight for communication signals, not filtered or attenuated by the animal's body. Further, the integrally molded antenna reduces the transmission power necessary to achieve the presently acceptable communication range, and thereby reduces the battery power requirements and/or increases the battery life of the product in use.

The advantages of a collar with integrally molded electronics module cavity and antenna are novel and commercially and functionally significant, providing for higher efficiency performance at lower power when compared to any commercially available consumer pet tracking or locating electronics product.

Figure 46:
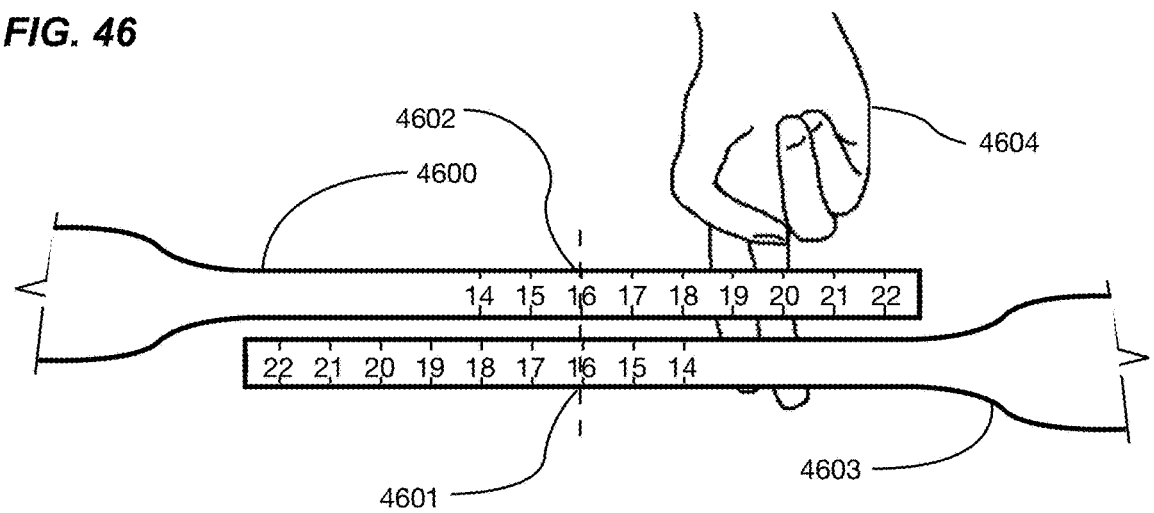
FIG. 46 is an exemplary diagram illustrating top view of a collar ends with measuring indicia.

FIG. 46 is an exemplary diagram illustrating top view of a collar ends with measuring indicia.

Properly sizing a traditional dog collar can be frustrating, and being forced to select one of the limited number of adjustment positions often results in a poor fit. Collars installed too loosely allow the pet to pull its head through the collar, thereby removing it.

In the drawing, a more precise method is shown, illustrating a reversal of the long-standing tradition of trial and error sizing. By first locking together the mating ends of an under-the-neck latch, proper measurement can then be made quickly and easily by wrapping a first collar end 4600 and a second collar end 4603 around the neck, crossing the two ends. Inserting two fingers of a hand 4604 so that they fit snugly under the wrapped collar ends ensures the preferred tightness. The proper sizing is instantly determined where the indicia 4602 on a first collar end matches the indicia number 4601 of the second collar end.

It should be noted that the objective of determining the correct collar size using indicia of at least one embodiment of the present invention is to ensure that the latch is ultimately centered under the neck of the animal. Therefore, the first collar end and the second collar end, and correspondingly the indicia provided thereon, are equally distant from the distal latch portions of the first collar length and second collar length.

In the illustration, the matching indicia is the number "16", in the exemplary drawing "16" representing that the circumference of the pet's neck is "16" inches when the number 16 on both lengths of the collar align. In other words, if the ends of the two lengths of collar wrapped further such that the numbers "14" were aligned, then the circumference of the neck would be 14 inches as indicated by the indicia. Therefore, in the illustrative example, number "16" indicates both the appropriate total length of the assembled collar, and will be where both collar ends will be cut and eliminated. By matching the indicia, the pet owner is ensuring that once the keeper not shown is installed, the true and accurate center pull location on the pet's posterior neck will have been established. It should be noted that the indicia may be numbers, letters, color bands, changes in texture, or any other method of tactile of visual means whereby a match of the corresponding indicia on both collar ends can be readily determined.

Figure 47A:
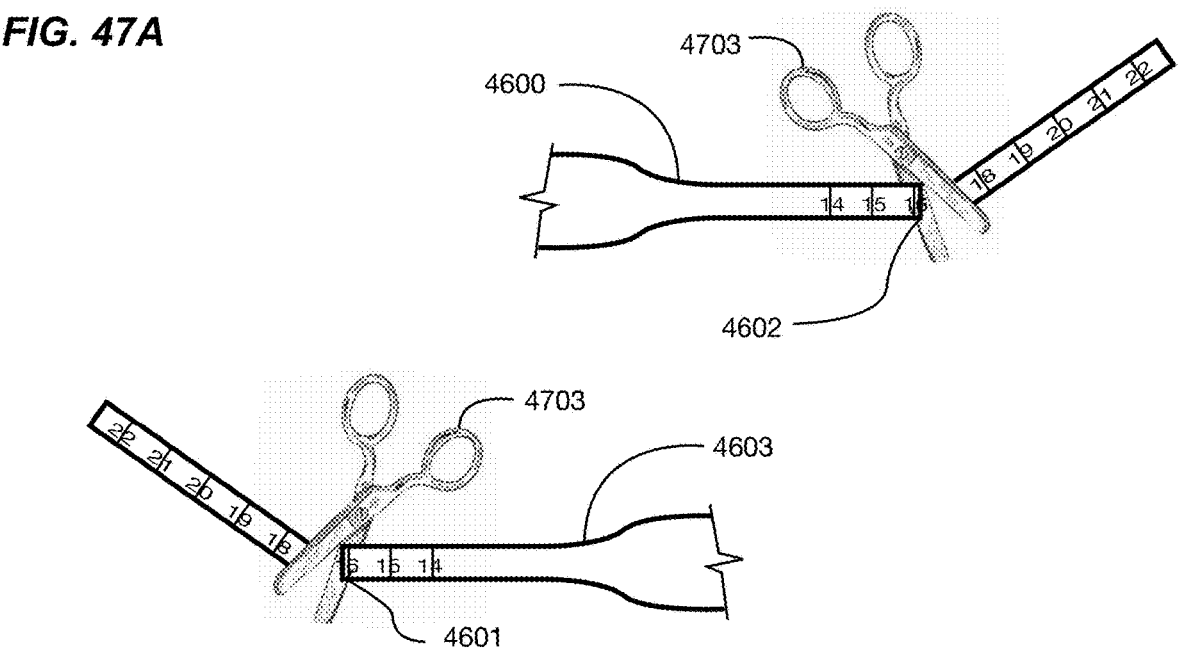
FIG. 47A is an exemplary diagram illustrating cutting of opposed ends of a collar at a preferred indicia.

FIG. 47A is an exemplary diagram illustrating cutting of opposed ends of a collar at a preferred indicia.

As previously described, in the illustrative example, the preferred length of the collar is 16 inches, as determined by the number "16"s aligning with one another when both ends of the latched collar are wrapped around the animal's neck.

It should be noted that the keeper as described herein is not intended to serve as the primary mechanism for attaching and removing the collar from the animal, but to serve as a permanent clasp to establish the proper length of the installed collar. An opposed latching means distal to the cut ends of the collar lengths is intended to serve as the primary means to attach and remove the collar.

The drawing shows the use of scissors 4703 being used to cut the distal end of a first length of collar 4603 at the line indicating number 16. Further, a second illustration shows the use of scissors 4703 being used to cut a distal end of a second length of collar 4603 at the line indicating number 16. The two cuts having been made at the number "16" indicia result in both lengths of collar being substantially equal in length as measured from the center of the latch that connects the two lengths, the latch being substantially centered under the neck of the animal.

Figure 47B:
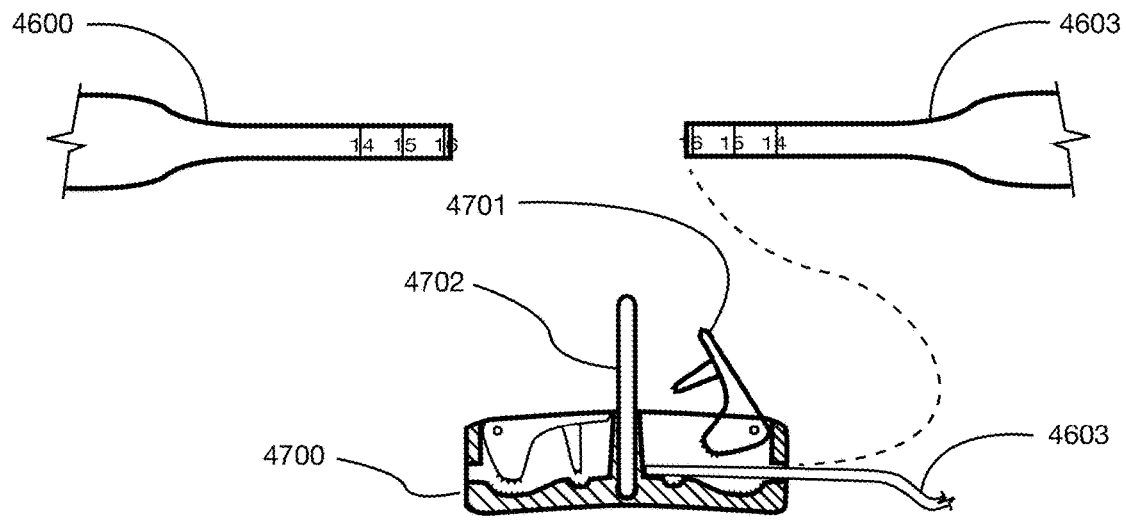
FIG. 47B is an exemplary diagram illustrating a sectional view through a cut end of a first collar length and a termination device.

FIG. 47B is an exemplary diagram illustrating a sectional view through a cut end of a first collar length and a termination device. In the drawing, the cut end of the first collar length 4603 is inserted into one slot in the keeper 4700, the cam lock lever 4701 having been moved to the unlocked position and opened to accept the first cut end. For reference, a center pull D-ring 4702 is shown installed at the approximate centerline of the keeper.

Figure 47C:
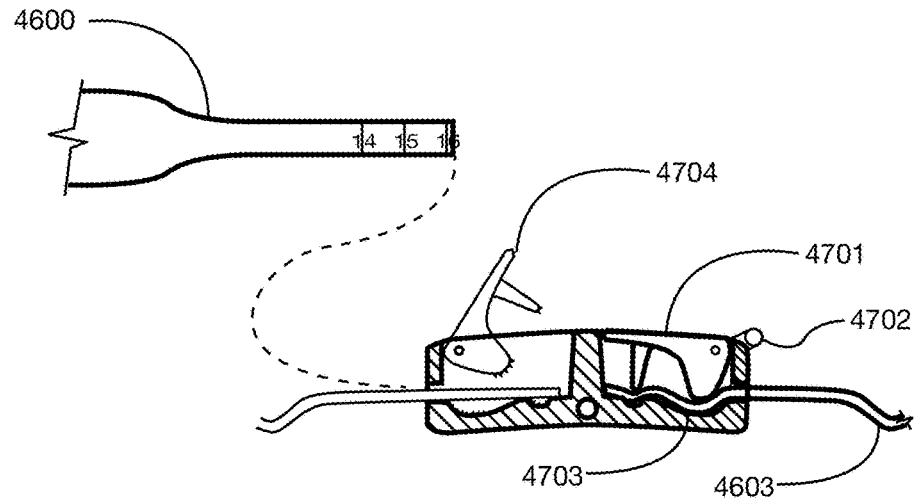
FIG. 47C is an exemplary diagram illustrating a sectional view through a cut end of a second collar length and a termination device.

FIG. 47C is an exemplary diagram illustrating a sectional view through a cut end of a second collar length and a termination device. More specifically, the previously opened cam lever 4701 having been closed upon the cut end of the first collar length 4603 securely retains the cut end within the keeper. Upon closing the cam lever 4701, the lower end of the lever depresses the cut end of the collar against friction-enhancing gear teeth 4703 integral to the keeper.

Further, the process just described is repeated by inserting the cut end of a second collar length 4600 into the remaining open slot in the keeper 4700, a second cam lock lever 4704 having been moved to the unlocked position and opened to accept the first cut end.

Figure 47D:
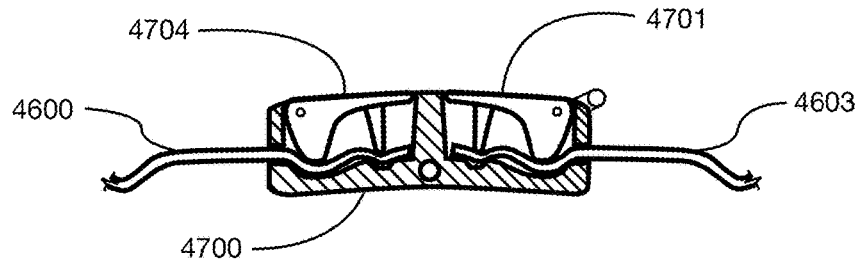
FIG. 47D is an exemplary diagram illustrating a sectional view through two collar ends retained in a termination device.

FIG. 47D is an exemplary diagram illustrating a sectional view through two collar ends retained in a termination device. Closing and locking the second cam lever 4704 completed the sequence, resulting in the cut ends of both collar lengths 4600, 4603 being clamped and retained by the respective cam levers 4704, 4701 within the keeper 4700.

Figure 47E:
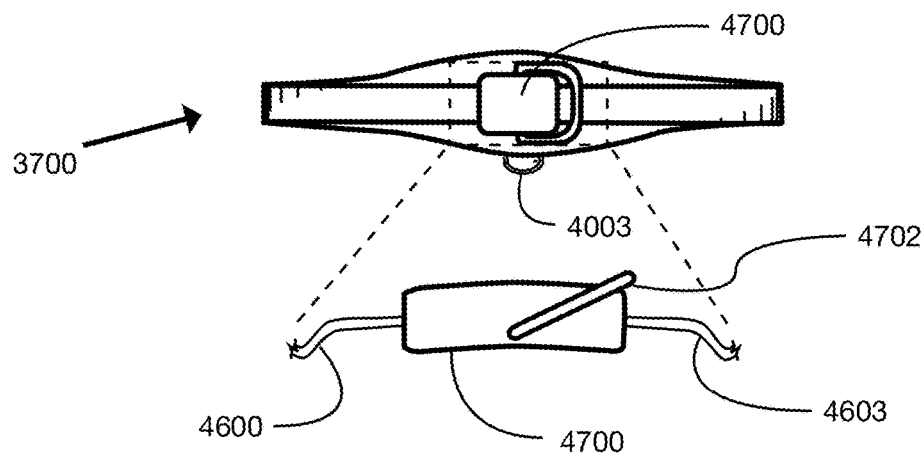
FIG. 47E is an exemplary diagram illustrating a centered collar termination device.

FIG. 47E is an exemplary diagram illustrating a centered collar termination device. More specifically, having secured both cut ends of each of two collar lengths to a keeper, it can be readily seen in the back view of the collar assembly 3700 that the just-installed keeper 4700 is substantially centered on the collar assembly, and aligned with the anterior collar portion and the identification tag loop 4003.

In a second side view, it can be seen that the installed assembly comprises a collar first length 4603 and a collar second end 4600, both being retained within the keeper 4700, and a center pull D-ring 4702 positioned substantially centered with respect to the keeper and opposed collar ends.

Figure 48A:
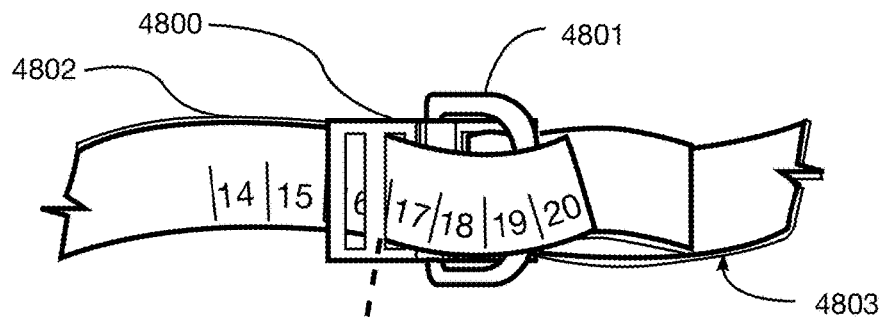
FIG. 48A is an exemplary diagram illustrating a top view of an alternate center pull D-ring, collar ends with indicia and a termination means.

FIG. 48A is an exemplary diagram illustrating a top view of an alternate center pull D-ring, collar ends with indicia and a termination means. A novel double ended buckle 4800 is disclosed with a hingably attached D-ring 4801 positioned substantially centered between the opposed buckle ends. Those skilled in the art will appreciate that it is sometimes preferred to install a collar comprising collar lengths manufactured of a traditional flexible material, for instance, nylon webbing. Further, it may be preferable to not require a customer to cut the ends of collar lengths, but to provide a means to center and secure a center pull D-ring without the required use of any tools, such as scissors.

Therefore, a first collar length 4802 is shown with indicia applied thereon. After determining the indicia on the first collar length matches with the indicia not shown on the already installed second collar length 4803, using the length determining method as taught in FIG. 46, each end of each length of collar is threaded through the slot on each end of the buckle, the slot being proximal to the D-ring so that the preferred indicia aligns with the slot or other prescribed aligning detail on the buckle.

The centering of the buckle 4800 and leash D-ring 4801 relative to the total length of the collar assembly is achieved by aligning the same preferred indicia with the alignment features on each of the opposed slotted ends of the buckle.

Figure 48B:
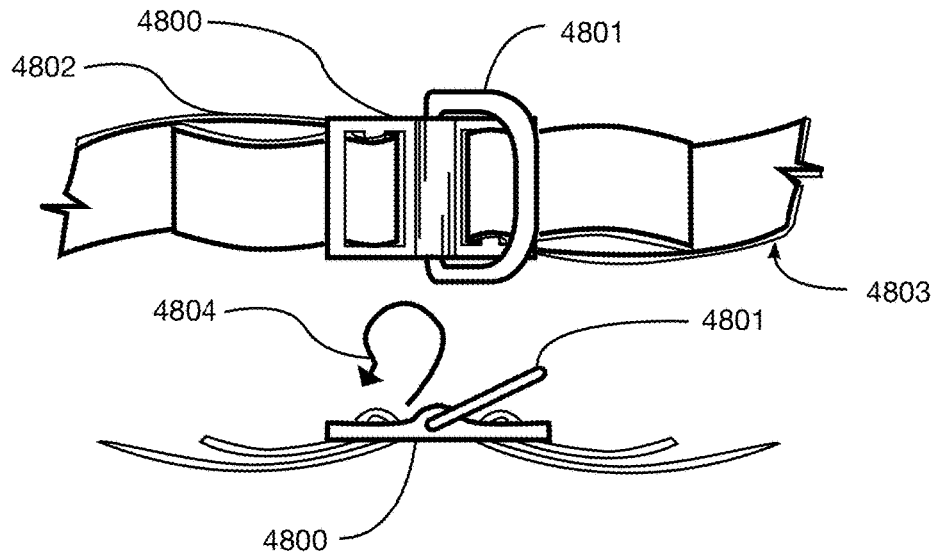
FIG. 48B is an exemplary diagram illustrating a top and side view of an alternate center pull D-ring and collar ends termination means.

FIG. 48B is an exemplary diagram illustrating a top and side view of an alternate center pull D-ring and collar ends termination means. In the drawing, opposed ends of a collar 4802, 4803 are inserted through opposed ends of a strap buckle 4800 such that the opened D-ring 4801 is positioned in the center of the pet's posterior neck, the opposed ends of the collar lengths being drawn through their respective buckle slots to align the preferred indicia with the alignment features. Having inserted the first end of the first collar length 4802 upward through the slot proximal to the D-ring 4801, the end is then threaded downward through the slot distal to the D-ring as shown 4804, and pulled to remove slack material from the top surface of the buckle. Repeating the process just described on the second collar length completes the installation of the buckle and center pull D-ring.

Figure 49:
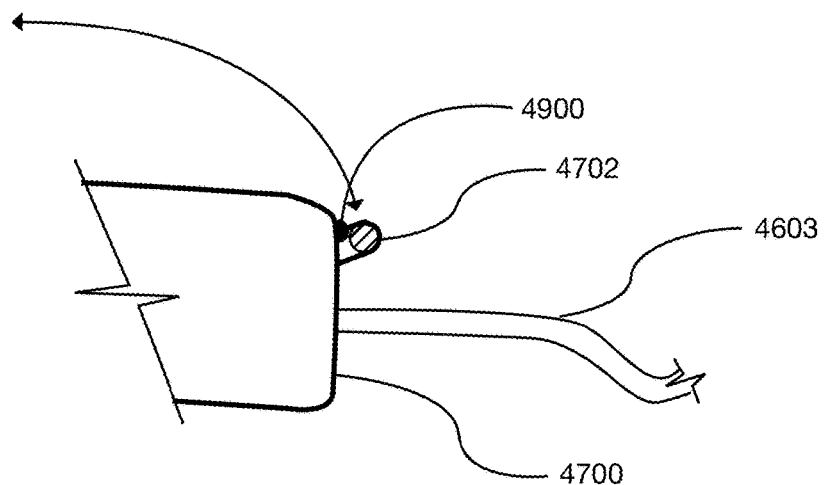
FIG. 49 is an exemplary diagram illustrating a side view of a collar termination device with a D-ring retaining means.

FIG. 49 is an exemplary diagram illustrating a side view of a collar termination device with a D-ring retaining means. It is well known that large rings projecting from a pet collar can be dangerous to the pet. The hanging rings can become tangled in tree limbs, fences or other objects that can project through the ring, causing the pet to become ensnared. On the other hand, those skilled in the art will appreciate that keeping a large open leash D-ring in a closed position substantially reduces the probability that the pet will become ensnared as a result of objects projecting through such ring. In the drawing, a keeper 4700 is shown with a first collar end 4603 having been terminated therein, and projecting therefrom.

A D-ring 4702 is shown, having been hingably rotated from its open position. A detent 4900 is shown as a projection from, and integral to the keeper 4700. A pet owner can swing the hingably attached D-ring to a closed position by rotating it relative to the keeper to a position that forcibly snaps past the detent 4900. In the position just described, the D-ring is held proximate to the collar first end 4603, thereby minimizing the open space between the keeper and D-ring through which objects can unwontedly project.

Figure 50:
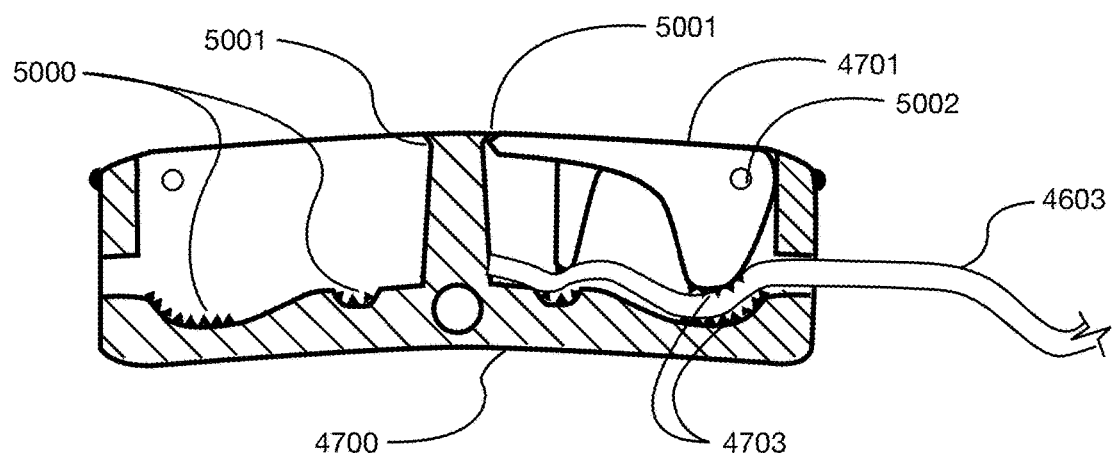
FIG. 50 is an exemplary diagram illustrating a sectional view of a collar termination device with a D-ring retaining means and cam lever locking means.

FIG. 50 is an exemplary diagram illustrating a sectional view of a collar termination device with a D-ring retaining means and cam lever locking means. Cam levers are well known to those skilled in the art, and are frequently used as a means to clamp strapping material after positional adjustment. Cam lever clamps are typically used on nylon webbing that has ridges appearing axially throughout the webbing as a result of the traditional weaving process. These ridges aid in providing interference between the closed cam lever and webbing. On the other hand, use of a relatively smooth-surfaced material, such as a pet collar, may require a more aggressive clamping and interference interface between the smooth surfaced collar ends and cam lock. In the drawing, a keeper 4700 is shown with a cam lever 4701 closed upon a first collar end 4603. Gear teeth 4703 are shown on the cam lobe in a position that is compressed against the collar material, and further the gear toothed inner surface of the keeper.

As a means of increasing the gripping strength of the keeper to collar end, additional gear teeth 5000 may be provided on the inside bottom of the keeper. By closing the cam lever upon the collar end, gear teeth on the upper and lower surfaces of the collar end are penetrated by the opposed gear teeth, securely and permanently clamping the collar end within the keeper.

Further, as a means of maintaining the cam levers permanently in a closed, clamped and locked position, an undercut 5001 is provided on the interior of the keeper as shown. The closed cam lever 4701 is shown with the edge of the lever distal to the cam hinge point 5002 being snapped beyond the undercut, thereby being retained in the closed position by the closed interference fit between the cam lever and keeper undercut.

Figure 51:
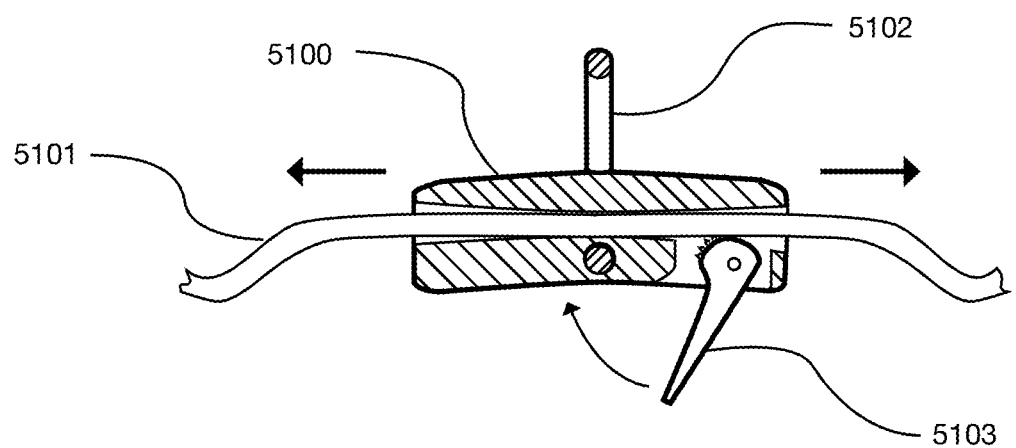
FIG. 51 is an exemplary diagram illustrating a sectional view of an alternate center pull D-ring and cam lever locking means.

FIG. 51 is an exemplary diagram illustrating a sectional view of an alternate center pull D-ring and cam lever locking means. In some instances, it may be preferable to install a keeper 5100 on a continuous collar length 5101, the collar length not being cut to be retained in the keeper as previously described.

As a means for centering the center pull D-ring 5102 with the pet's posterior neck, a cam lever 5103 is opened so that the keeper 5100 may slide along the collar length 5101 to a centered position as determined by the installer. Upon electing the centered position, the installer will close the cam lever 5100 to retain the keeper, and correspondingly the center pull D-ring 5102 in the centered position.

It should be noted that the D-ring 5102 is held within the keeper with the portion of the D-ring that projects through the keeper does so on the underside of the collar length 5101. The positioning of the D-ring on the underside of the collar length provides for a structure that more soundly resists breakage in instances where a strong pet exerts a high force against the leash. The D-ring, encircling the collar materials ensures that even with breakage of the keeper, the leash remains attached to the collar.

Figure 52:
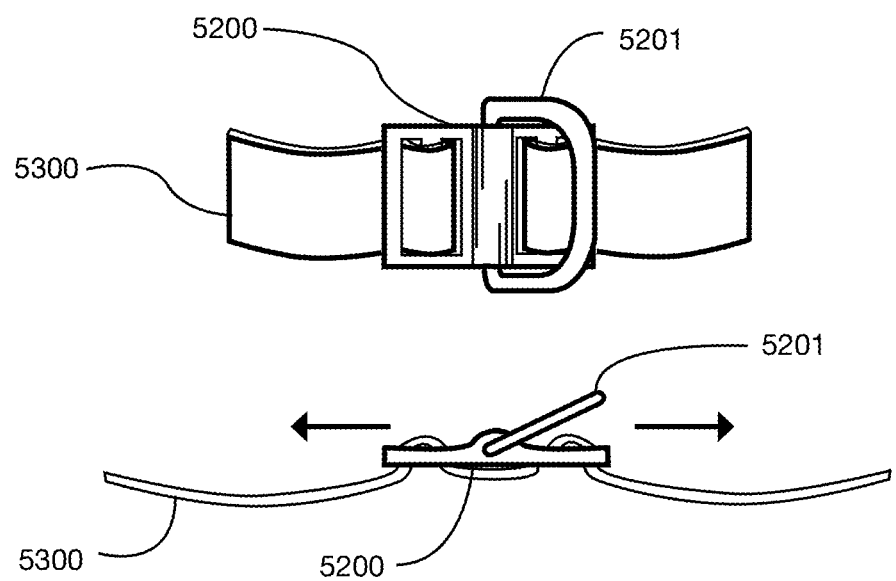
FIG. 52 is an exemplary diagram illustrating a top and side view of an alternate center pull D-ring.

FIG. 52 is an exemplary diagram illustrating a top and side view of an alternate center pull D-ring. In instances where a continuous collar length 5300 is preferably used, as opposed to two collar ends as previously described, the collar strap may be threaded through both opposed loop holes of the buckle 5200 as shown, with the D-ring 5201 projecting outward therefrom.

As can be appreciated, the drawing illustrates that the novel buckle and D-ring assembly may be slid along the length of the collar material to the position where the D-ring is centered in the posterior neck area of the pet.

Figure 53:
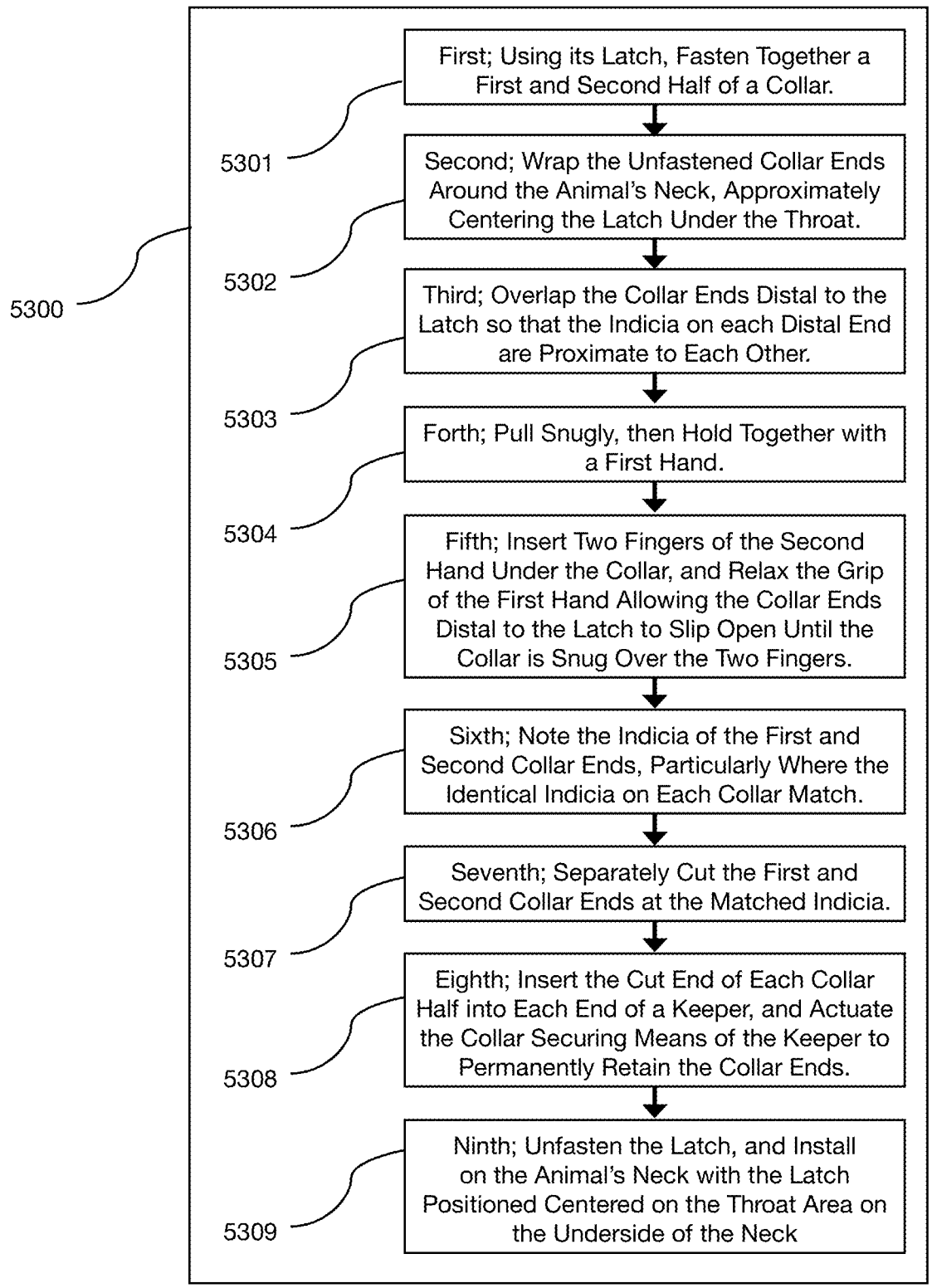
FIG. 53 is an exemplary diagram illustrating the method of sizing and installing a pet collar.

The process just described ensures that the D-ring is properly centered on the back of the pet's neck as a center pull leash ring. FIG. 53 is an exemplary diagram 5300 illustrating the method of sizing and installing a pet collar. Fitting traditional pet collars typically requires trial-and-error size adjustments, culminating with the fastening of the buckle or latching means. Sizing a collar or at least one embodiment of the present invention begins with fastening the buckle or latching means as illustrated in the first sizing step 5301. The unfastened ends of the latched collar are then wrapped 5302 around the pet's neck approximately where the collar will be installed. The wrapping continues until the lose ends 5303 of the collar cross. Pulling snugly 5304, the lose ends are held together with one hand, while two fingers of the second hand 5305 are inserted under the collar lengths, thereby allowing the two lose ends of the collar to loosen relative to each other.

The collar ends now slightly loosened represent the preferred collar circumference. By observing the indicia on the collar 5306, the installed can readily determine the specific point on both lose collar ends where the specific indicia on a first lose end matches and aligns with the corresponding indicia on the second lose end. Having observed the point at which the indicia match and align 5306, the collar is removed so that the ends may be cut 5307 at the indicia matching point for installation into a keeper 5308. The proper sizing now having been determined and established, the latching means is disconnected 5309 so that the collar can be installed on the pet, the installation ensuring that the latching means is positioned substantially centered in the throat area of the pet.

Figure 54:
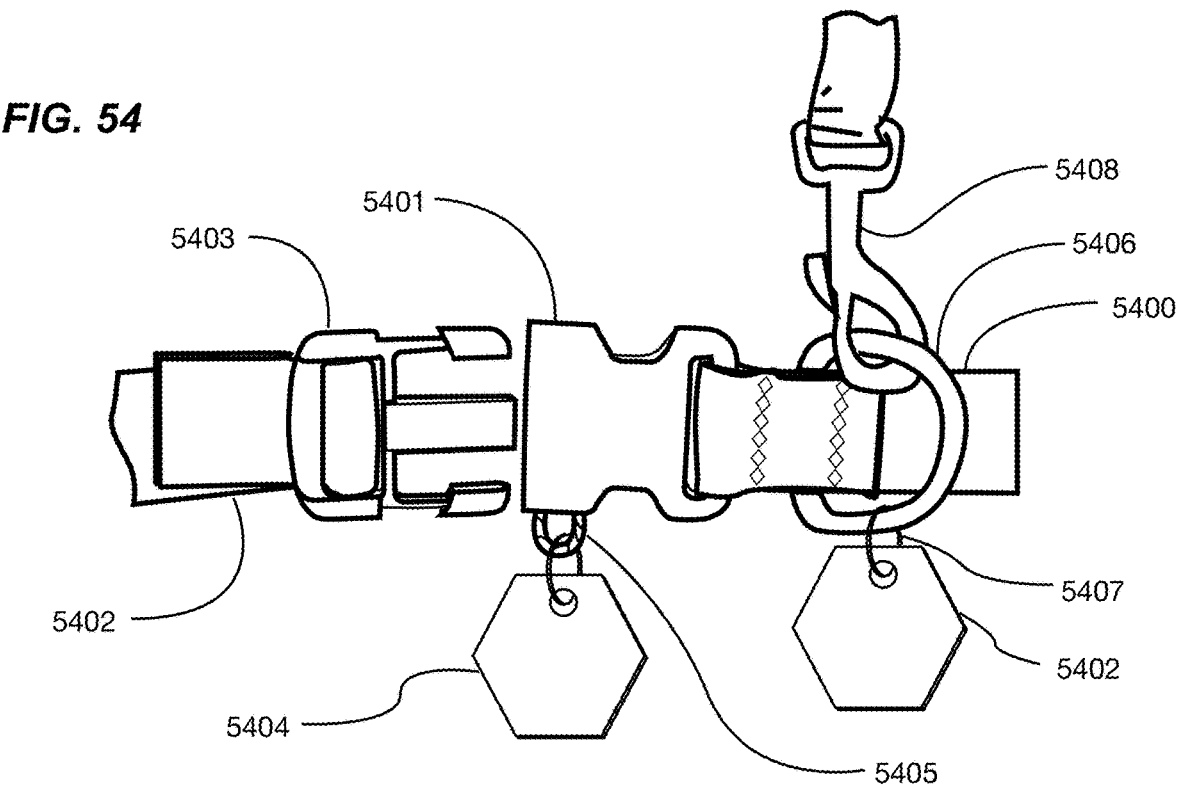
FIG. 54 is an exemplary diagram illustrating a front view of a collar latching means with a pet identification tag retaining ring.

FIG. 54 is an exemplary diagram illustrating a front view of a collar latching means with a pet identification tag retaining ring. The components of a typical assembly for a dog collar are well known, comprising a collar materials with a first end 5400 typically sewn to permanently attach one buckle receiver 5401 and a D-ring 5406 to which a leash hook 5408 can be removably attached. The opposed end of the collar material 5402 is typically adjustably terminated into a second half of a buckle 5403.

As can be readily seen, the D-ring 5406 typically provides a secondary function as a ring to which pet identification tags 5402 may be affixed by means of a split ring 5407. As preciously discussed, the use of a D-ring for both a leash connection and tag holder is not preferred, at least one embodiment of the present invention teaching away from this long-standing practice as a means to eliminate unnecessary collar rotation about the pet's neck each time a leash is attached, and as a means to appropriately restrict the movement of the tags on an oversized D-ring, thereby substantially reducing the loud and annoying noise of metal tags banging against the D-ring.

An improved buckle is shown with a designated tag loop 5405 being integrally molded as a projection from a first half of a traditional buckle 5401, through which the tag split ring can be inserted in order to attach the tags 5404.

The illustration is not meant to be limiting, and a tag loop may be fabricated as a buckle mold insert-molded cable or wire form, or as an open-ended loop that would be closed and captured by the latching of two parts of a buckle as previously described.

Figure 55A:
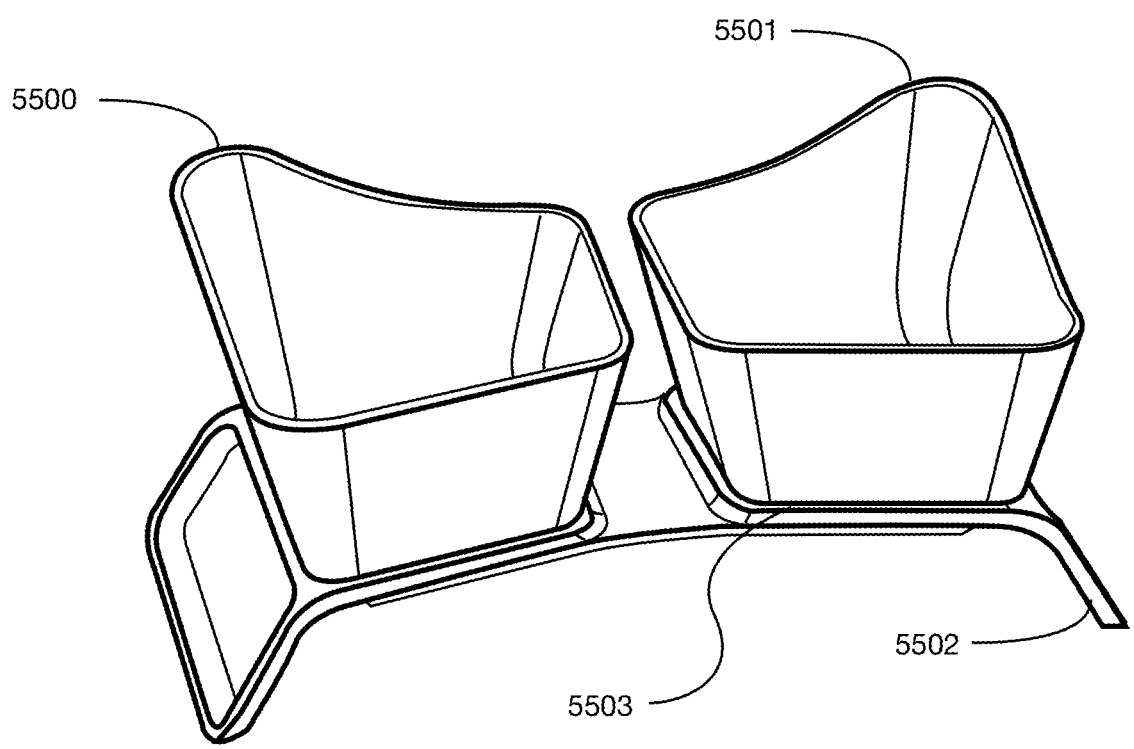
FIG. 55A is an exemplary diagram showing a perspective view of one variation of an improved pet feeding station.

FIG. 55A is an exemplary diagram showing a perspective view of one variation of an improved pet feeding station. In the drawing, a left pet bowl 5500 and a right pet bowl 5501 are positioned atop a continuous surface of a base 102 of an improved feeding station.

It should be noted that the left and right bowls are mirror images of once another, but the right and left bowls having shaped bottoms substantially matching the geometry of the locating ridge 5503 of the base platform may be (a) identically shaped, (b) of different geometries, and/or (c) of different or identical volumetric capacities. The feeding station top-level assembly therefore comprises the base 5502 with a top surface at a fixed height above the feeding surface, for example, the residential floor, and a plurality of pet bowls 5500, 5501 which may be food bowls or water bowls removably attachable to the base top surface.

Figure 55B:
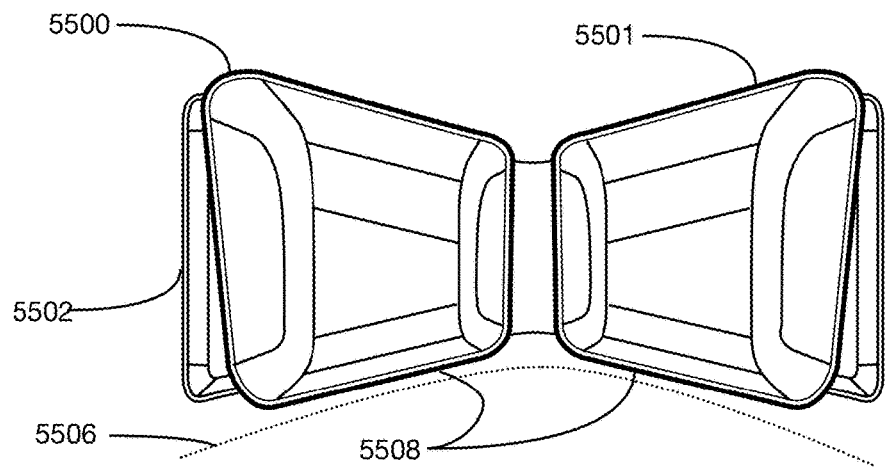
FIG. 55B is an exemplary diagram showing a top view of one variation of an improved pet feeding station.

FIG. 55B is an exemplary diagram showing a top view of one variation of an improved pet feeding station. A left bowl 5500 and a right bowl 5501 are shown sitting atop a base 5502 comprising a continuous top surface. In the drawing, the right and left bowls are substantially mirror images of each other. Further, as can be readily seen, the geometry of the new and novel bowls differ significantly fro all known prior art in that their animal-facing top rims 107 are generally positioned proximate to the feeding animal, and further are generally aligned with the imaginary arc 5506 through which a feeding pet's head will move towards the left and right of the longitudinal axis of the pet's body while positioned in one location during feeding and drinking.

The bias of the bowls' front rims 5508 being generally arcuate relative to the radius of the feeding animal's neck represents a significant improvement over traditional multi-bowl systems because it supports a more natural ergonomic positioning of the rims closer to the feeding animal thereby providing for easier food and water access by the animal positioned at the front of the feeding station.

Figure 55C:
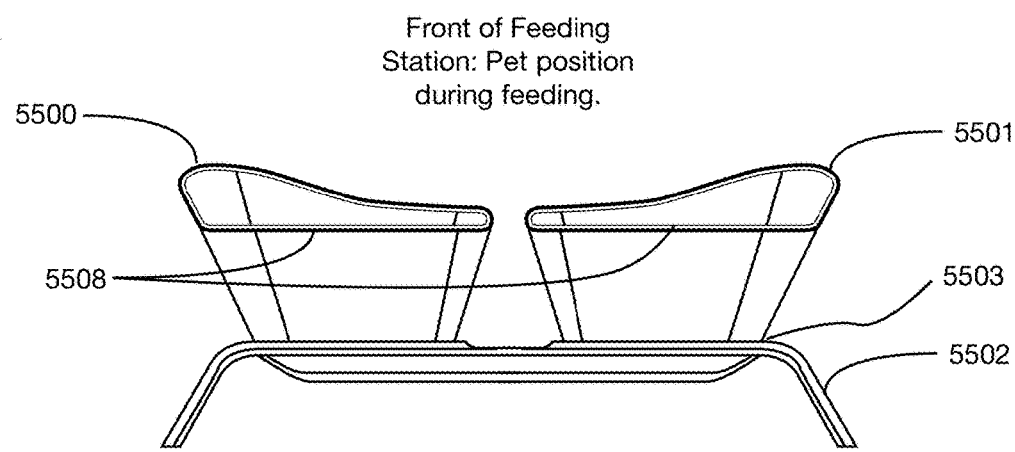
FIG. 55C is an exemplary diagram showing a front view of one variation of an improved pet feeding station.

FIG. 55C is an exemplary diagram showing a front view of one variation of an improved pet feeding station. A left bowl 5500 and a right bowl 5501 can be readily seen removably affixed to the top surface of a feeding station base 5502. A nominal ridge 5503 protruding upwardly from the top surface of the base is used to position and align the bowls with the attaching means not shown.

Further, the top rim of the bowls at the front, or animal facing edge of the bowls 5508 is shown being lower than the distal rim of the bowls positioned at the back edge of the feeding station. Ensuring that the front rim is at an equal or lower elevation than all other parts of the bowl rim provides for the easiest possible access by the pet to food and water contained in the bowls.

Figure 55D:
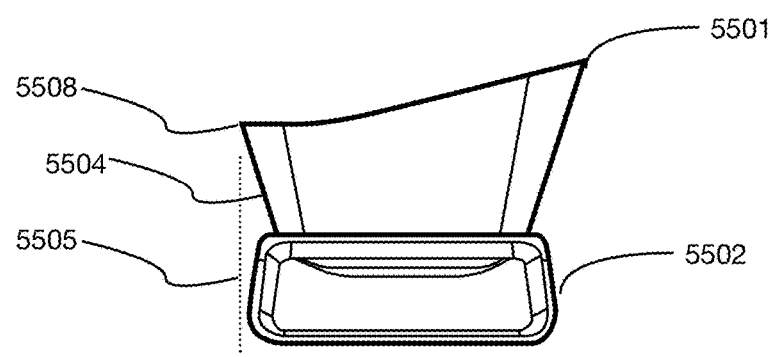
FIG. 55D is an exemplary diagram showing a right side view of one variation of an improved pet feeding station.

FIG. 55D is an exemplary diagram showing a right side view of one variation of an improved pet feeding station. More specifically, the right side of the right bowl 101 of the feeding station assembly as previously described is shown positioned on the top surface of the base 5502. The front, animal facing wall of the bowl 5504 is angled from the bottom of the bowl such that the top, animal-facing rim 5508 is positioned as close to the animal as possible, providing for the easiest access to food and water.

As can be readily seen, the top rim 5508 of the front of the bowl extends horizontally towards the animal to a vertical plane 5504 that is nearer the animal than the animal-facing edge of the base 5502, ensuring that no parts of the base structure interfere with the animal's access to the bowls and their contents.

The configuration of the multi-bowl and base assembly of the feeding station just described represents an entirely new and novel feeding station configuration that solves many of the well known problems of traditional feeding stations, namely providing for bowls of varying geometry that align the animal-facing edges of the bowls generally along the arcuate line created by a feeding animal's necks, and extending the animal-facing edges of the top rims of the bowls towards the feeding animal such that no parts of the base structure interfere with the animal's access to the bowls and their contents.

Figure 56A:
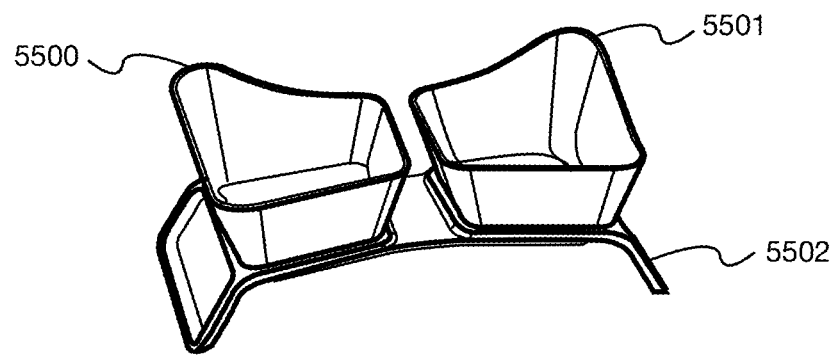
FIG. 56A is an exemplary diagram showing a perspective view of a medium-size bowls variation of an improved pet feeding station.

FIG. 56A is an exemplary diagram showing a perspective view of a medium-size bowls variation of an improved pet feeding station. It is well known to those skilled in the art that a puppy will have a smaller physiology than when the puppy grows to a mature adult. To ensure continual ease of access to food and water while the puppy graduates from shorter, lower capacity bowls to taller and higher volume capacity bowls, the bowl geometry of a plurality of different sized bowls is substantially similar to the geometry of the positioning details of the mounting top surface of a one-size-fits-all base.

Therefore, the drawing shows a medium capacity left bowl 5500 and a medium capacity right bowl 5501 removably attached to a standard base 5502. The medium-sized bowls may be removed from the base, and replaced with purpose-designed bowls of different front rim heights and volume capacities.

Figure 56B:
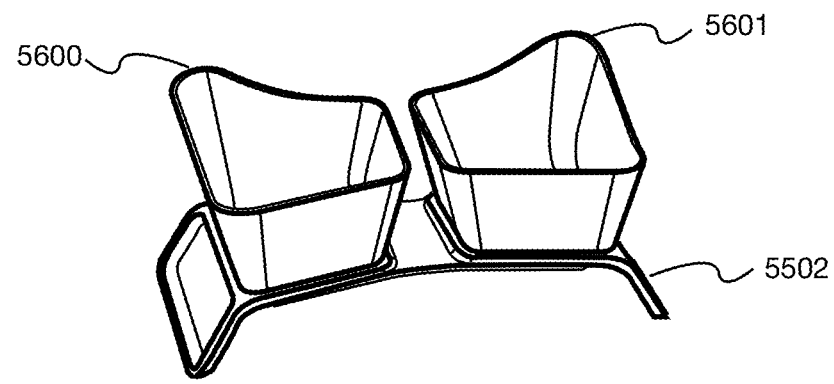
FIG. 56B is an exemplary diagram showing a perspective view of a large-size bowls variation of an improved pet feeding station.

FIG. 56B is an exemplary diagram showing a perspective view of a large-size bowls variation of an improved pet feeding station. More specifically, a large capacity left bowl 5600 and a large capacity right bowl 5601 are shown removably attached to the top surface of the same base 5502 previously described as supporting two medium-sized bowls.

Figure 56C:
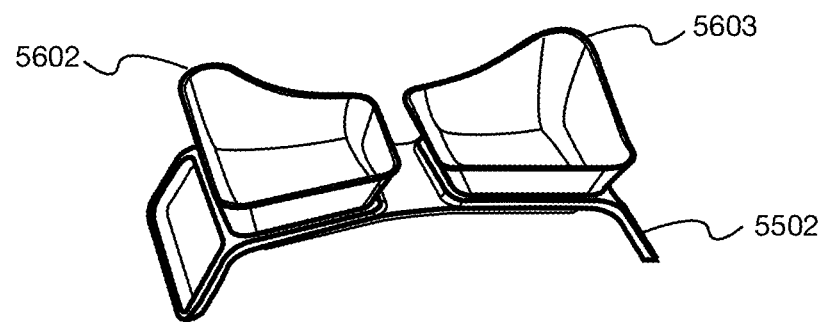
FIG. 56C is an exemplary diagram showing a perspective view of a small-size bowls variation of an improved pet feeding station.

FIG. 56C is an exemplary diagram showing a perspective view of a small-size bowls variation of an improved pet feeding station. It is well known that physical size dimensions of small dogs, puppies of medium-sized dog breeds, and adult cats are substantially similar insofar as the animals just described would all comfortably access food and water from the same bowl and base configuration.

In the drawing, it can be readily seen that the right bowl 5603 and left bowl 5602 are substantially smaller in size and capacity than the previously described medium-capacity and large-capacity sized bowls. Nevertheless, the small bowls 5602, 5603 comprise bowl bottom geometries substantially similar to the bowl bottom geometries of the medium and large bowls, thereby providing for interchangeability of bowl sizes upon the same one-sized base 5502.

Figure 56D:
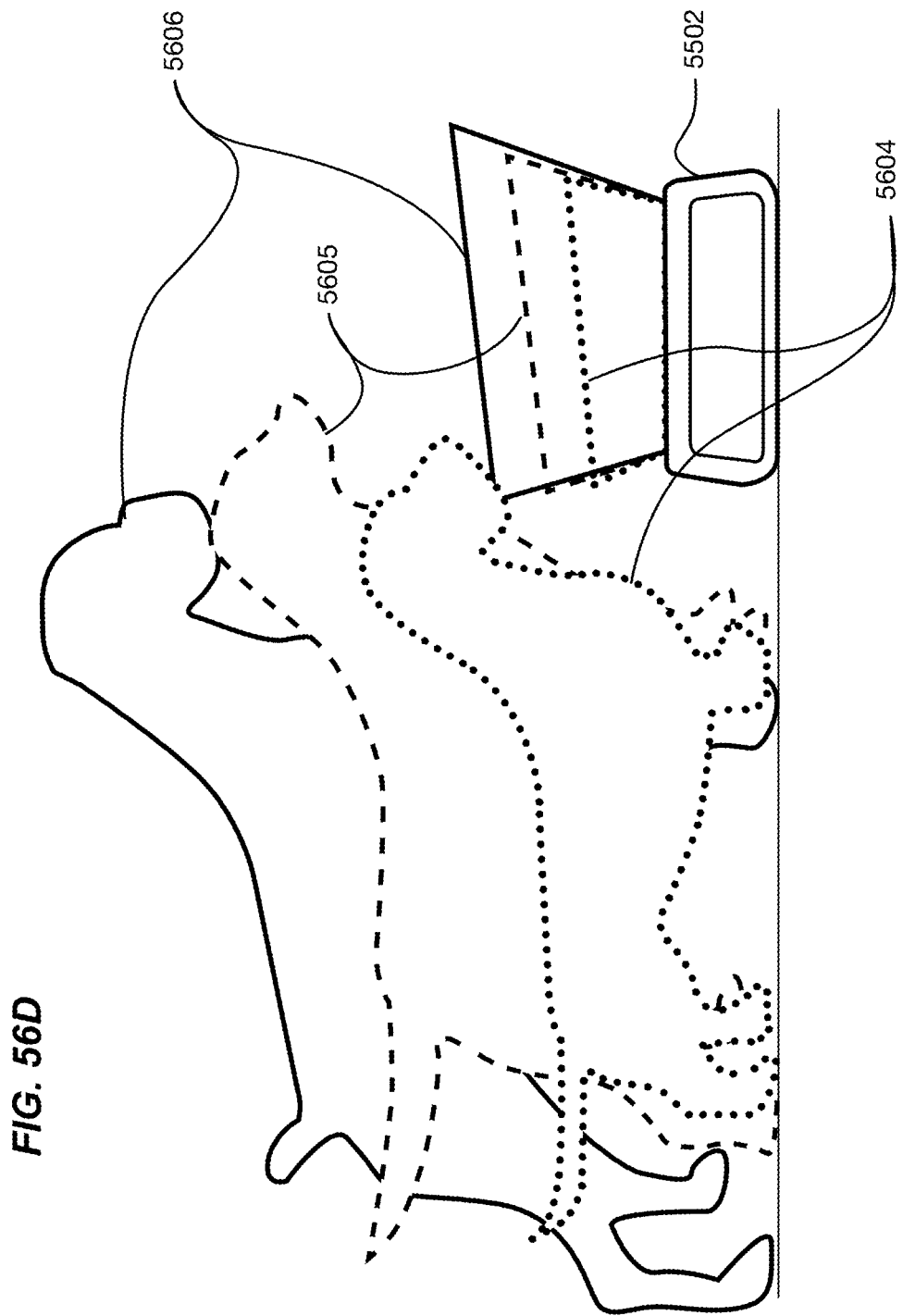
FIG. 56D is an exemplary diagram showing a side view of different sized dogs and correspondingly the preferred bowl sizes interchangeably attachable to the base of an improved pet feeding station.

FIG. 56D is an exemplary diagram showing a side view of different sized dogs and correspondingly the preferred bowl sizes interchangeably attachable to the base of an improved pet feeding station. More specifically, a standard-sized base 5502 is shown with the outlines of a plurality of bowls positioned thereupon. Merely as an illustrative example, a dog of short stature is shown with the preferred short, limited capacity bowl size. The small dog and small bowl are paired 5604 to provide for the best access to food and water for the small dog. Further, a dog of medium stature is shown with the preferred medium sized and capacity bowl size. The medium dog and medium bowl are paired 5605 to provide for the best access to food and water for the medium dog. Still further, Further, a dog of large stature is shown with the preferred large sized and capacity bowl size. The large dog and large bowl are paired 5606 to provide for the best access to food and water for the medium dog.

By changing the geometry of the bowls, it can be readily seen that at least one embodiment of the present invention provides for variable capacities of different sized bowls, although the wall angles and wall heights of the bowls change. As can also be noted, the base of all bowl sizes remain substantially the same geometry so as to be removably and interchangeably attached to one standardized base structure.

Figure 57:
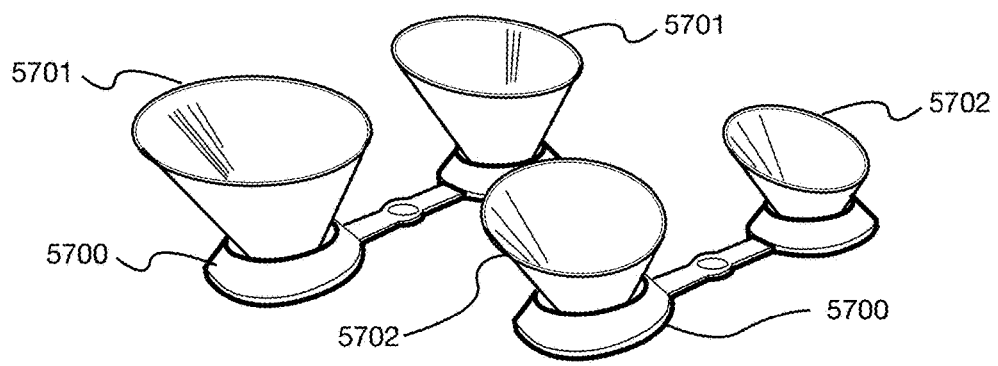
FIG. 57 is an exemplary diagram showing perspective views of medium-sizes and large sized bowls affixed to a variation of a base of an improved pet feeding station.

FIG. 57 is an exemplary diagram showing perspective views of medium-sizes and large sized bowls affixed to a variation of a base of an improved pet feeding station. At least one embodiment of the present invention is not meant to be limited to asymmetrical rectilinear shaped bowls, but includes as one variation conically shaped bowls. More specifically, a variation of a standardized base 5700 is shown with substantially horizontal bowl mounting surfaces not shown on the upper side of the base. In one variation, two identically shaped large bowls 5701 are each removably affixed to a left and right mounting platforms of a standardized base. In another variation, the large bowls are replaced by medium bowls 5702 which are each removably attached to the left and right mounting platforms of a standardized base. In order to maintain the appropriate heights of the front lip of the different sized bowls, the height of the bowl varies.

Those skilled in the art will appreciate that the head and muzzle diameter of larger dogs is often much larger than the head and muzzle diameter of smaller dogs. Therefore, larger bowls must be sufficiently wade at both the top and bottom of the bowls to allow for easy access. As can be seen in the drawing, the conical angle of walls the larger bowls is less acute than the conical angle of walls the smaller bowls. The wider, less acute the angle of the walls of the larger bowls provides for substantially increased capacity for food and water without creating an overly deep bowl that would frustrate a dog's ability to easily reach food or water at the bottom of the bowl.

Figure 58:
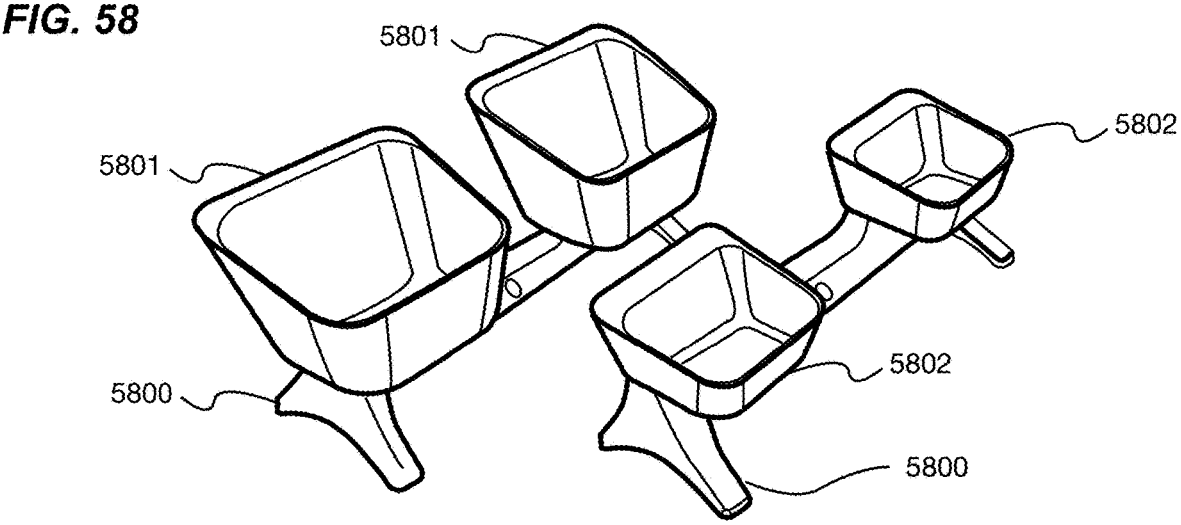
FIG. 58 is an exemplary diagram showing perspective views of medium-sizes and large sized bowls affixed to a second variation of a base of an improved pet feeding station.

FIG. 58 is an exemplary diagram showing perspective views of medium-sizes and large sized bowls affixed to a second variation of a base of an improved pet feeding station. More specifically, a variation of a standardized base 5800 is shown with an opposed set of legs connected by a bridge. In one variation, large bowls 5801 of substantially rectangular design are removably affixed to the base. In another variation, small bowls 5802 replace the large bowls by removably attaching to the same base.

It is important to note that the top mounting surface of the bowl supporting points remain a fixed dimension from the floor surface. However, in the illustrative example just described, the front, animal facing lip of the bowl, and the capacities of the various bowl sizes van be easily accommodated by changing the interior and exterior geometry of the bowls as would be immediately appreciated by those skilled in the art.

Figure 59:
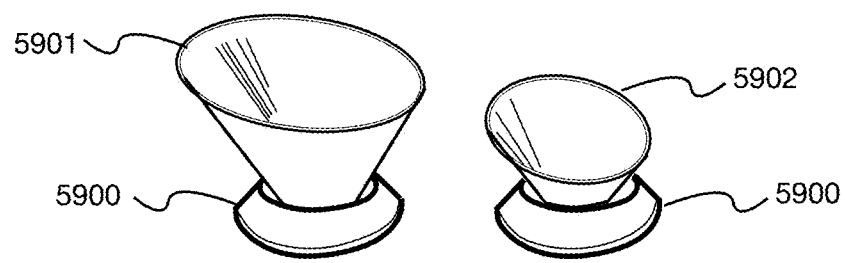
FIG. 59 is an exemplary diagram showing perspective views of medium-sizes and large sized bowls affixed to a variation of a single-bowl base of an improved pet feeding station.

FIG. 59 is an exemplary diagram showing perspective views of medium-sizes and large sized bowls affixed to a variation of a single-bowl base of an improved pet feeding station. It is sometimes preferred that water and food bowls be physically separated. For instance, many pet owners are advised to place a bowl containing food in the feeding area only for a limited time as a training process to teach dogs or cats when to eat. On the other hand, it is well known that access to water should be provided for throughout the day. In such instances, a smaller food bowl 5902 may be fitted on a single bowl base 5900, while a larger water bowl 5901 is fitted on a similarly-sized standardized base 5900. One advantage of removably affixing bowls to a relatively heavy, non-slipping, standardized base is that nearly empty bowls better resist being tipped over when dogs or cats apply lateral pressure to the bowls.

Figure 60:
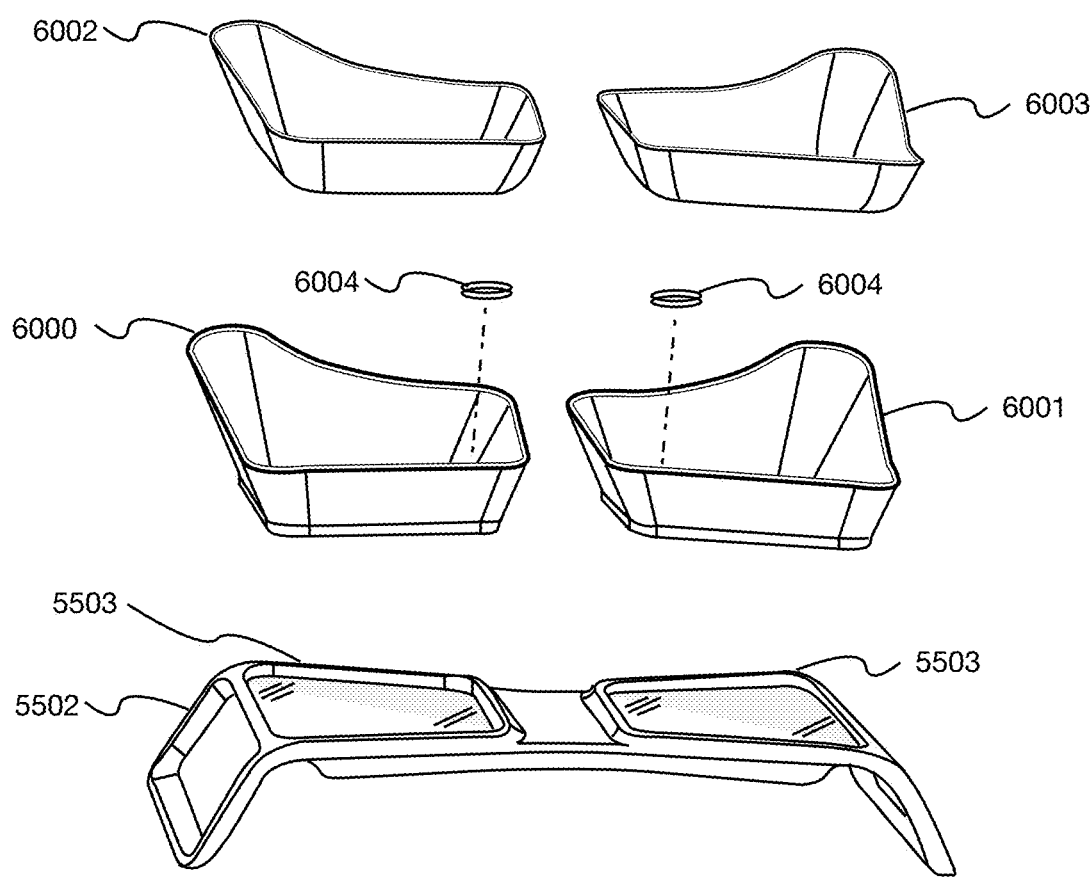
FIG. 60 is an exemplary diagram showing an exploded view of one variation of the bowl and base assembly of an improved pet feeding station.

FIG. 60 is an exemplary diagram showing an exploded view of one variation of the bowl and base assembly of an improved pet feeding station. As one skilled in the art will appreciate, increasing the vertical dimension of the top rim of a large bowl relative to the fixed top surface of the mounting base will increase capacity, but does not inherently raise the feeding area. However, to make the bottom of the food or water bowl more accessible for larger dogs, the floor of the food or water bowl is preferably raised.

Raising the floor of the inside of a bowl relative to the bottom exterior of the bowl can be accomplished by a variety of well-known means, including the assembly of an inner bowl shell within an outer bowl shell, creating a vertical distance between the bowl bottom and the bottom of the food or water area.

Therefore, the drawing shown a standardized base 5502 with a left and right positioning ridges 5503 into which the bottom geometry of the exterior shell of the left bowl 6000 and right bowl 6001 will closely engage. One means of removably attaching the food and water bowls to a substantially flat surface of the base is the integration of a high tension magnet 6004 positioned within the exterior bowl shell, a more detailed description of which is provided later. The bowl assembly further provides for a left bowl inner shell 6002 and a right bowl inner shell 6003, the inner shells just described comprising the food or water containing areas.

By aligning the top edges of the inner and exterior shells 6000 and 6002, and 0601 and 6003 respectively, the inner shells 6002, 6003 being of a shallower dimension compared to the exterior shells 6000, 6001, one will immediately appreciate that the bottom of the food containing area has been elevated above the top surface of the base 5502.

Therefore, instances where small capacity bowls are required for shorter stature animals, the distance between the top of the base and the bottom of the bowl inner shell will be minimized to keep the elevation of the food area low. On the other hand, instances where high capacity bowls are desired for larger dogs, it is preferable to raise the bottom of the feeding area for easier access. In such instances where bowls are assembled for larger dogs, the vertical distance between the top of the base and the bottom of the bowl inner shell will be increased to elevate the food area.

By varying the vertical distance between the bowl base and the bottom of the inner food and water containing area of the bowl, multiple elevations and capacities of different sized bowls can be realized, all bowls having common base mounting geometry to as to interchangeable fit on one standardized base.

Figure 61A:
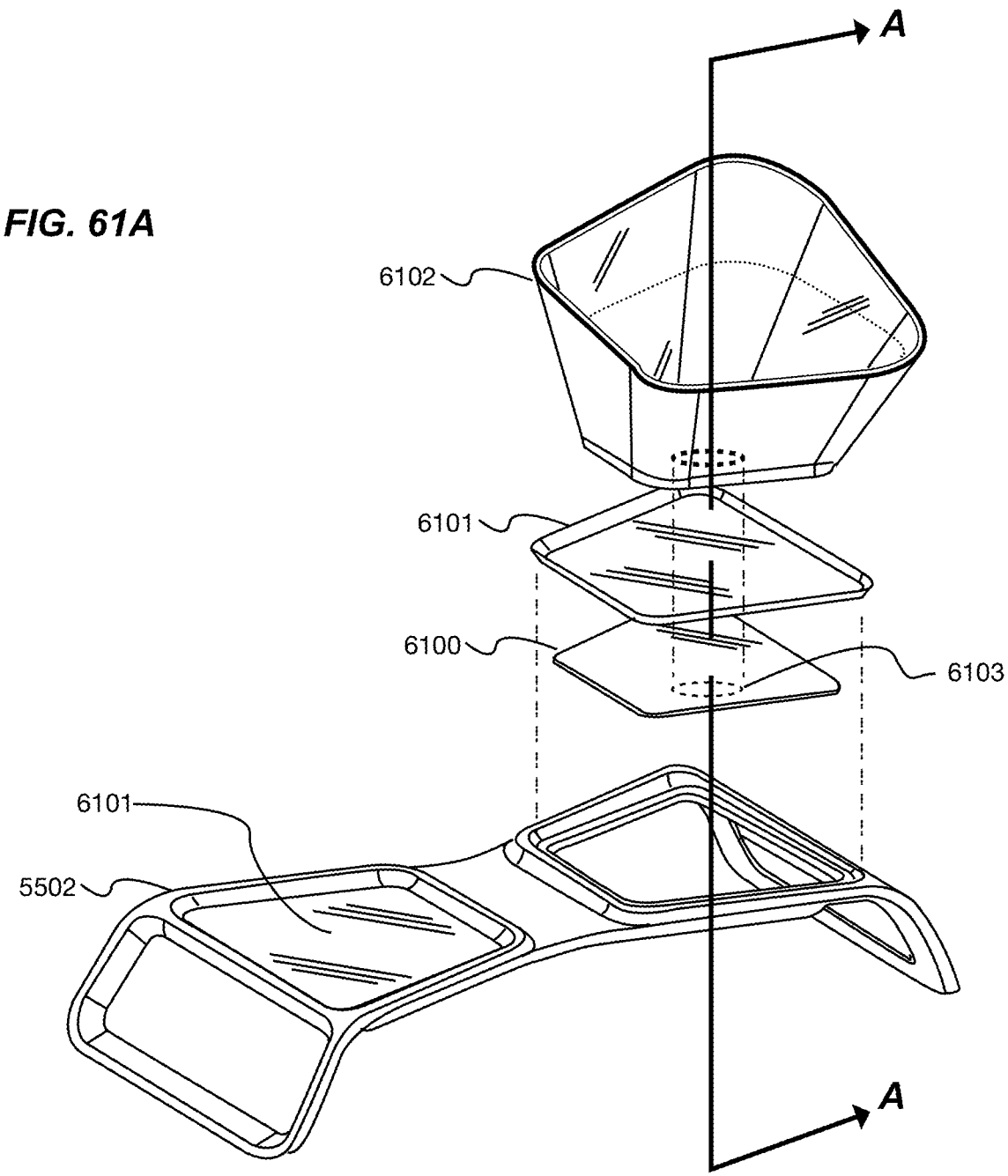
FIG. 61A is an exemplary diagram showing an exploded view of one variation of the bowl and base assembly and method of removably attaching a bowl to the base of an improved pet feeding station.

FIG. 61A is an exemplary diagram showing an exploded view of one variation of the bowl and base assembly and method of removably attaching a bowl to the base of an improved pet feeding station. More specifically, the components of a pet feeding station is shown comprising a base 5502 with a plurality of substantially horizontal closed top surface 6101 upon which a plurality of bowls, one of which is shown 6102 that are placed upon the base top surface. As one means of improving sanitary conditions of a bowl platform, when compared to traditional raised food bowl platforms, the top surface 6101, which may be a thermoformed material, is affixed to the base 5502 in such a manner so as to form a completely sealed, water-tight top surface upon which the bowl 6102 will be placed.

Those skilled in the art will appreciate that a bowl sitting upon a substantially flat raised surface is prone to being tipped over or otherwise displaced from its position by a dog or cat, unless of course, there is a means provided to removably attach the bowl to the raised platform. In the drawing a dotted line connects oval shaped lines indicating the approximate location of a high tensile strength magnet not shown, but which is permanently installed on the underside of the bowl 6102. Further, under the thermoformed top surface 6101 of the base, a ferromagnetic plate 6100, for instance steel, being permanently affixed to the base, provides for the attraction of the magnet.

The magnet provides for removably affixing a bowl to a substantially flat top surface, and further provides the benefit of not requiring mechanical attaching details that would inherently break the otherwise flat top surface of the base. It is well known that holes, undercuts, or other geometries create "nooks and crannies" into which food or contaminated water will fall, thereby creating an environment that promoted bacterial and mold growth.

Therefore, as one method of attaching a bowl to a raised base of a feeding station, all the while ensuring the flattest, most sanitary top surface, a bowl with an installed magnet may attract to a ferromagnetic material positioned on the underside of a flat, sealed, and sanitary base top surface.

Figure 61B:
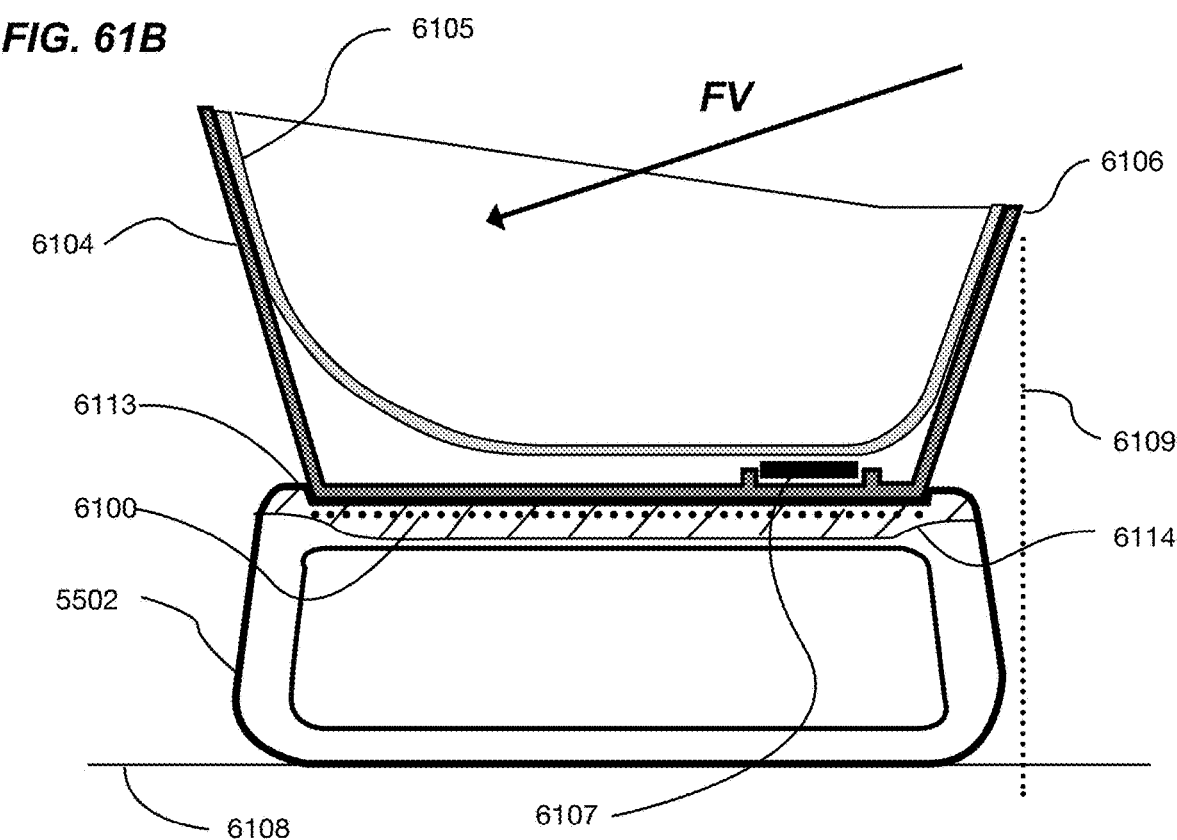
FIG. 61B is an exemplary diagram showing a sectional view through a bowl and base assembly of an improved pet feeding station.

The sectional view "AA" through the a assembly just described is illustrated in FIG. 61B. FIG. 61B is an exemplary diagram showing a sectional view through a bowl and base assembly of an improved pet feeding station. First, is should be noted that a means of mechanically or magnetically securing a food or water bowl to a raised platform is required to resist the typical forces exerted upon a bowl by a feeding dog or cat. In the drawing, a dotted line 6109 signifies the vertical plane of the top rim edge 6106 of a typical bowl of at least one embodiment of the present invention that is proximate to a feeding animal. In other words, the bowls have a defined "front" and "back", the front being the side of the bowl facing the feeding animal. When eating, animals "push" the food with their tongue towards the back of the bowl, thereby creating a force vector FV substantially along the vector arrow as shown in the drawing.

Now then, those skilled in the art will appreciate that two major forces combine to create the force vector, those being a front-to-back lateral "pushing" force, and the other being a counter clockwise rotational force about an interference point 6113 intended to resist the front-to-back sliding lateral force just described. The use of "counter clockwise" is merely a reference when viewing the sectional view of the drawing, and the same rotational force would be considered to be clockwise if viewing the bowl and base section from the opposite end of the feeding station assembly.

In the drawing, a base 5502 is shown, with a sectional view of the base material 6114 of the substantially horizontal bridge section suspended between the distally positioned base legs. A ferromagnetic material 6100 is shown encapsulated within the bridge material, however the ferromagnetic material may be positioned within a designated space above, or below the bridge material, so long as the ferromagnetic penetration is sufficiently attracted to a magnet affixed to the food and water bowls.

A pet bowl is shown with an exterior structure 6104 and an interior structure 6106, the interior structure being a designated area that will contain food or water. As can be readily appreciated, the top rims of the interior structure and exterior structure are aligned to as to create a single wall bowl structure where the interior and exterior structures are adjoined. Ultrasonic welding, adhesives, or mechanically interlocking features may be used to adjoin the interior and exterior structures. The interior structure is therefore of a shallower depth than the exterior structure, a feature that provides for bowls of various sizes and capacities to elevate the food area above the top of the base structure 102 as may be preferred.

A permanent magnet is shown 6107 permanently affixed to the bottom of the bowl. The position and pull force of the magnet are a factor of the desired resistance to the rotational force applied as a component of the FV vector. The straight-up pull force of the magnet must exceed the largest reasonable upward force that the bowl would be subjected to under normal operating conditions, thereby ensuring secure but removable attachment between the bowl and base structure.

Figure 61C:
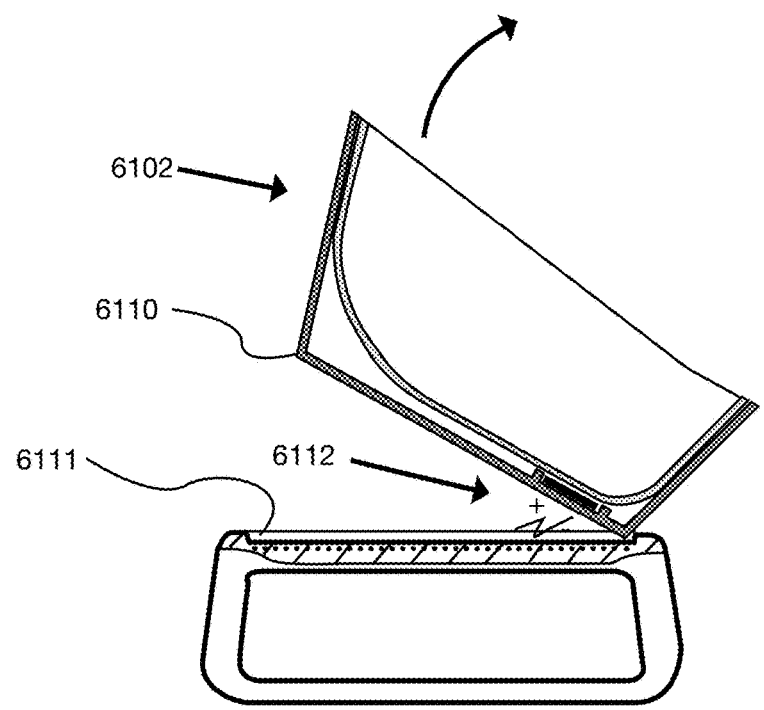
FIG. 61C is an exemplary diagram showing a sectional view through a bowl being removed from the base assembly of an improved pet feeding station.

FIG. 61C is an exemplary diagram showing a sectional view through a bowl being removed from the base assembly of an improved pet feeding station. More specifically, a small locating ridge 6111 is positioned at the back, non pet-facing edge of the raised platform base. In addition to providing a bowl locating point of reference, the short ridge provides a stopping element for the bowl when the back lower edge of a food bowl 6110 is pushed laterally backward by a feeding animal positioned in front of the bowl. The ridge therefore prevents the bowl from sliding from front to back in response to the lateral vector of the FV vector previously described.

Therefore, the small ridge 6111 that engages the back edge of the bowl 6110, together with a magnet positioned towards the front half of the bowl are sufficient to resist the counter clockwise rotational force and the front to back lateral force to which the bowl will be subjected under normal use.

On the other hand, although permanent magnets exhibit significant resistance to straight-line pulling force, they can be positioned so that the magnetic flux map allow for relatively easy separation from the ferromagnetic material 6112 when subjected to a shearing force, for instance, the forward, or clockwise rotation of the bowl in the illustration. IN other words, as the bowl 702 is lifted from its position against the locating ridge 6111 on the base, the magnetic force is easily overcome, allowing for easy retrieval of the bowl from the base structure.

Figure 62A:
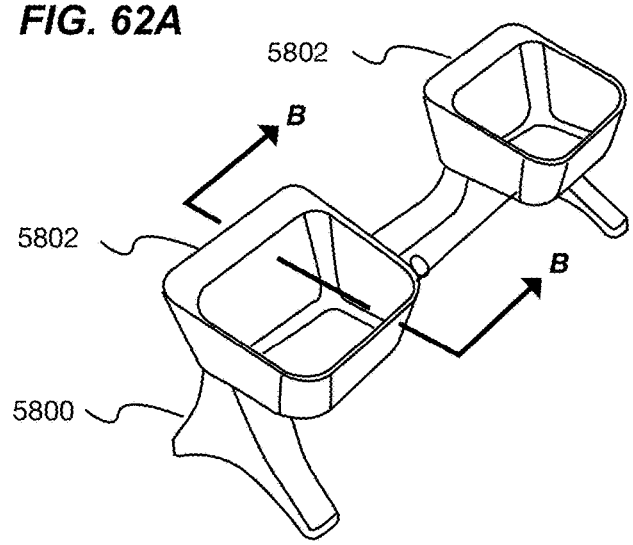
FIG. 62A is an exemplary diagram showing an exploded view of another variation of the bowl and base assembly and method of removably attaching a bowl to the base of an improved pet feeding station.

FIG. 62A is an exemplary diagram showing an exploded view of another variation of the bowl and base assembly and method of removably attaching a bowl to the base of an improved pet feeding station. Merely presented as a variation to the raised platform and interchangeable bowl feeding station previously described, a plurality of bowls 5802 are shown removeably attached to a base structure 5800. Bowls of various sizes and capacities not shown may be used in place of the bowls shown.

Figure 62B:
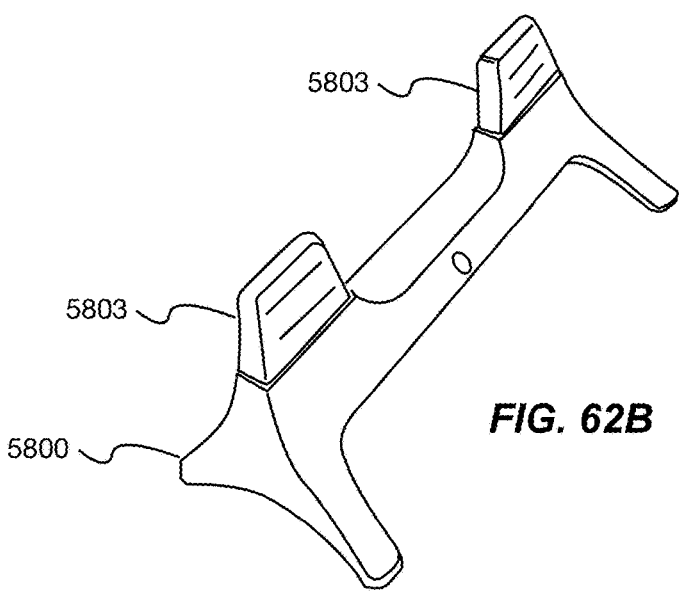
FIG. 62B is an exemplary diagram showing an exploded view of another variation of the base assembly of an improved pet feeding station.

FIG. 62B is an exemplary diagram showing an exploded view of another variation of the base assembly of an improved pet feeding station. In the drawing, a base 5800 with two substantially vertically projecting blades 5803 is shown. The blades are of such mechanical geometry as to provide a tapered, secure fit with a mounting pocket area of the bowl.

Figure 62C:
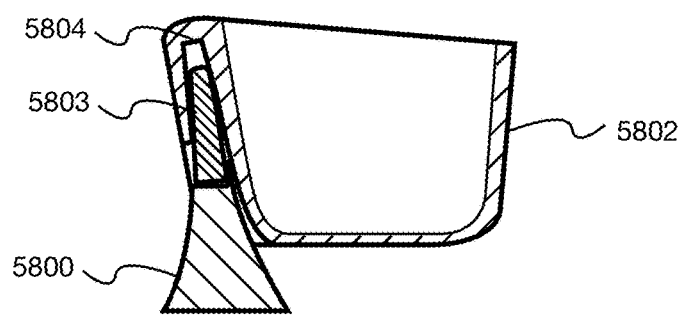
FIG. 62C is an exemplary diagram showing a section view through the bowl and base attachment means of an improved pet feeding station.

FIG. 62C is an exemplary diagram showing a section view through the bowl and base attachment means of an improved pet feeding station. As can be readily seen in the section B-B, a blade 5803 extends vertically upward from the cross bridge of a base structure 5800. An owner mounts the bowl 5802 to the base by placing the pocketed area 5804 integral to the back edge of the bowl over the mating blade 5803. No other attachment means is required since the blade-an-pocket structure adequately resists the FV forces exerted upon the bowl by a feeding animal.

Figure 63:
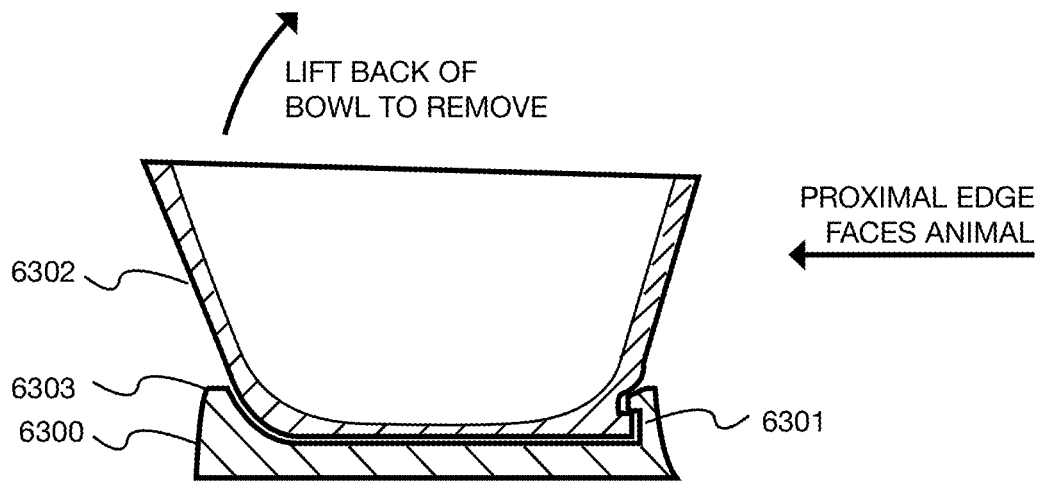
FIG. 63 is an exemplary diagram showing a section view of one variation of a bowl to base attachment means of an improved pet feeding station.

FIG. 63 is an exemplary diagram showing a section view of one variation of a bowl to base attachment means of an improved pet feeding station. More specifically, the top surface of a raised platform 6300 incorporates a slightly raised positioning ridge 6303 at the substantially back edge of the platform. The lower back radius of the bowl 6302 substantially matches the inside radius of the raiser ridge, thereby providing resistance to any front-to-back lateral forces exerted upon the bowl by a feeding animal.

Further, an interlocking male feature 6301 on the substantially front edge of the bowl interlocks with a mating female feature on the front of the bowl. The interlocking feature provides for a mechanical resistance to a counter clockwise rotational force that may be exerted upon the bowl by a feeding animal.

Although the interlocking male feature 6301 of the base creates one area that may promote the growth of harmful bacteria and mold, the feature need not extend the full width of the bowl, and may be easily cleaned by simply sponging the area with a germicide soap, and rinsing the entire base structure under a kitchen faucet.

To remove the bowl from the base, an owner applies a minimal upward force in a forward rotational movement as indicated by the remove arrow. This movement first separates the bowl from the mating detail on the substantially back edge of the base 6302, thereby allowing the bowl to slide slightly rearward, disengaging the interlocking features 6301 on the front edge of the bowl.

Figure 64:
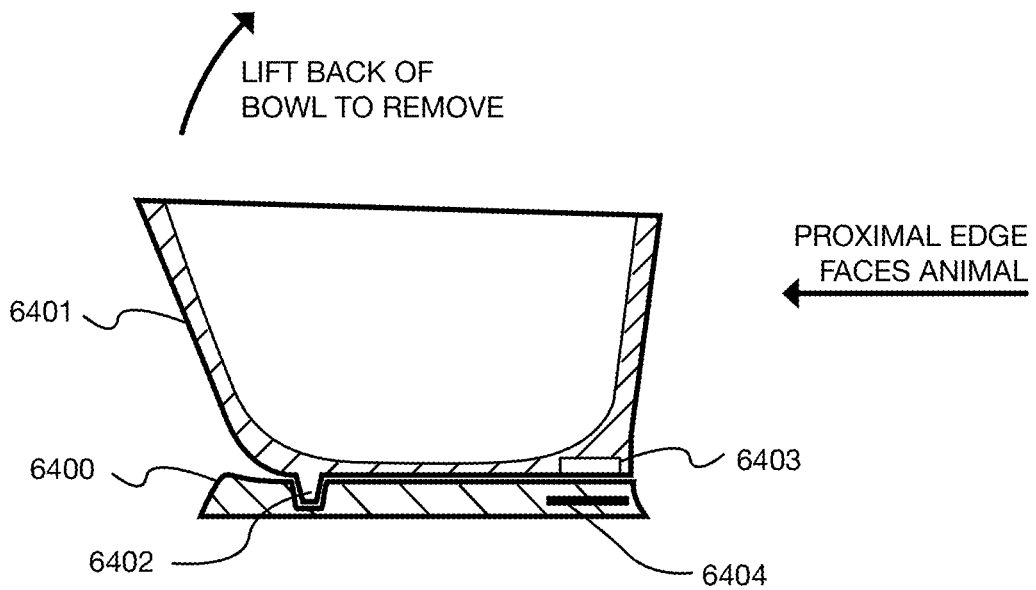
FIG. 64 is an exemplary diagram showing a section view of another variation of a bowl to base attachment means of an improved pet feeding station.

FIG. 64 is an exemplary diagram showing a section view of another variation of a bowl to base attachment means of an improved pet feeding station. As another variation of a means to removably attach a bowl 6401 to a substantially horizontal, sealed and raised base structure 6400, a combination of a magnet 6401 and ferromagnetic material 6404 is used to resist rotational forces against the bowl by a feeding animal as previously described. Further, as an alternative to a raised ridge at the substantially back edge of the base structure engageable with the back edge of the bowl as previously described, a simple pin-and-notch 6402 configuration may be used. Although the drawing shows the pin as a male projection from the underside of the bowl 6401, and the notch as a female feature of the top of the base 6400, these features may be reversed so that the pin projects upward from the base, and the notch is a female feature on the underside of the bowl. Either configuration as just described provides for resistance to the front-to-back lateral forces that may be applied to the bowl by a feeding animal.

To remove the bowl from the base, an owner applies minimal upward force on the back of the bowl in a forward rotational movement as indicated by the remove arrow. This movement decouples the pin and notch engagement, and creates a shear force upon the magnet, thereby easily breaking the magnetic attraction between magnet 6403 and ferromagnetic material 6404 located in the base.

Figure 65A:
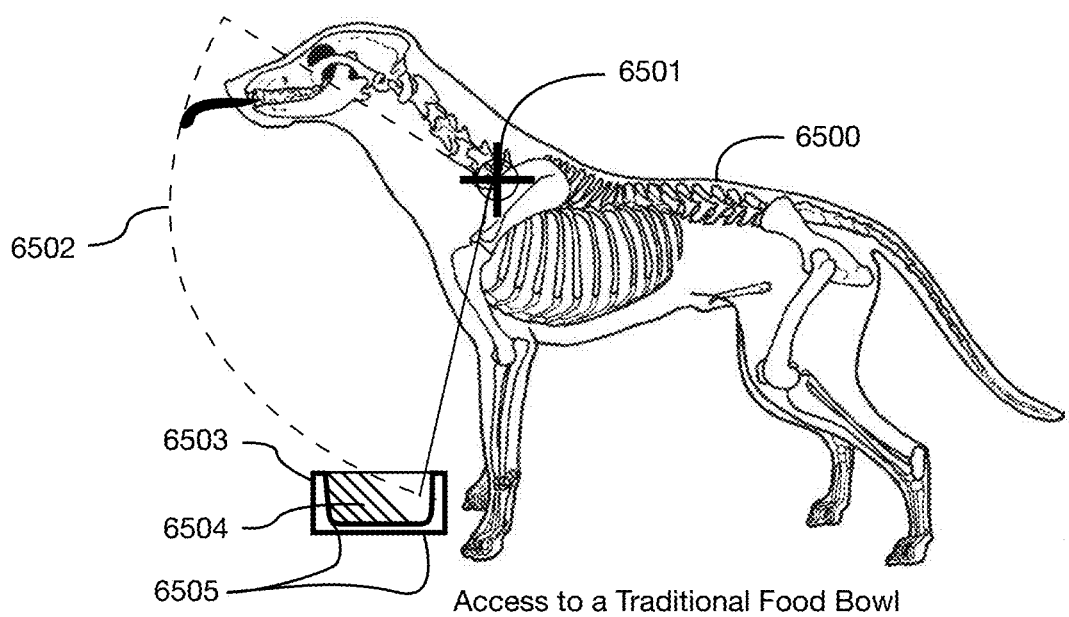
FIG. 65a is an exemplary diagram illustrating the skeletal structure of a domesticated animal with a traditional food bowl.

FIG. 65a is an exemplary diagram illustrating the skeletal structure of a domesticated animal with a traditional food bowl. More specifically, the natural arc of the neck of a domesticated dog reaching for a food bowl is shown. It is well known that domesticated cats and dogs share the genetic pool with their wild, carnivorous ancestors. These animals are efficiently designed to eat captured prey from the ground. In a perpetual, misguided effort to vicariously impart human personalities upon their pet dogs and cats, humans interfere with nature's designs.

More specifically, humans consider that since they eat from symmetrically designed bowls, their pets should also, or perhaps using a standard dining bowl to feed their pets is merely a convenience.

Literature teaches us many variations of animal feeding bowl designs, the great majority of which point to their human bowl roots; they are generally symmetrical, have a top rim generally coincident with a substantially horizontal plane parallel to the bowl bottom, and a generally symmetrical perimeter wall extending between the bottom interior surface of the bowl and the top rim.

In the drawing, a standard food bowl of the design just described is shown 6500 positioned in front of a skeletal representation of one type of dog 6500. All healthy dogs and cats have neck lengths generally defines as the distance between a point 6501 located at or about where the cervical vertebrae meet the thoracic vertebrae near the animal's shoulder.

As illustrated in the drawing, the animal's neck flexes at the shoulder point just mentioned, as well as throughout the cervical vertebrae and where the spine meets the skull, such that the dimension between the shoulder and mouth is intended to move in an arc 6502 in order to easily reach food placed on the ground, in the illustration, the food being a dog bowl 6503.

As can readily be seen the dog is able to reach the interior of the portion of the bowl closest to its feet, but is unable to reach the opposite side of the interior of the bowl 6504 without moving closer to the bowl, or lowering the shoulder point 6501 by crouching of bending its front legs.

Further, the majority of bowls have a traditionally small radius formed between the interior side-wall and bottom 6505 as illustrated. These radii form areas that are oftentimes smaller than an animal's muzzle, thereby preventing the animal from easily accessing food contained in these bowl bottom "nooks and crannies". Food remaining in these areas after the animal eats foster bacteria growth, and attract unwanted insects and vermin.

It should be noted that some bowls have larger radii between the side walls and bowl bottom, but the increased radii are generally arbitrary with regard to feeding efficiently, and are more reasonably attributed to lower cost manufacturing process that use less material, or that are more easily formed when large radii are introduced.

Figure 65B:
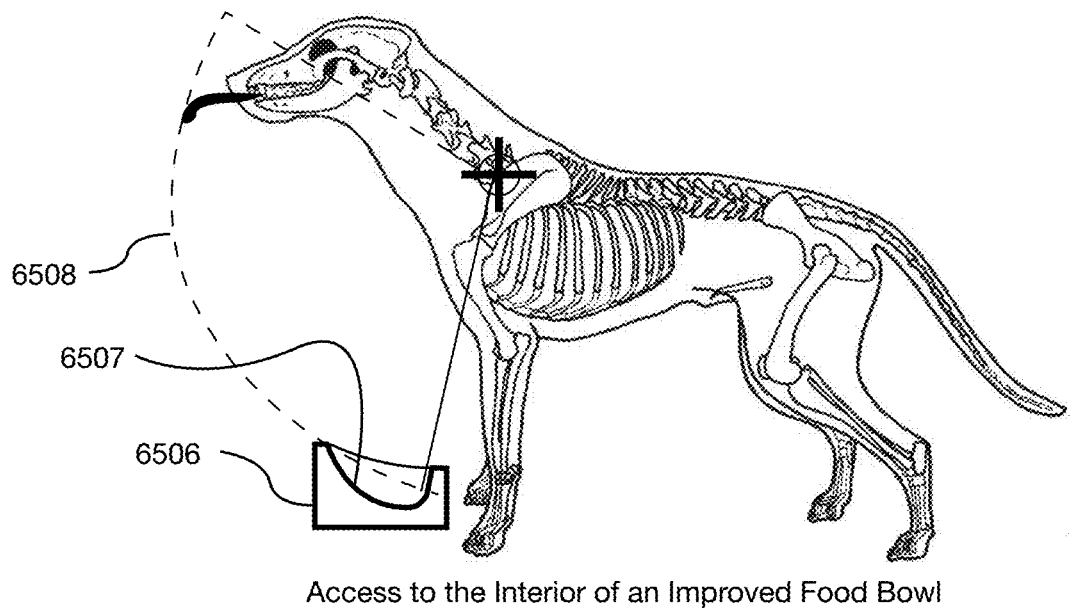
FIG. 65b is an exemplary diagram illustrating the skeletal structure of a domesticated animal with an improved food bowl.

FIG. 65b is an exemplary diagram illustrating the skeletal structure of a domesticated animal with an improved food bowl. More specifically, an improved feeding bowl 6506 is shown with a line 6507 indicating an improved geometry of the interior food surface of the improved bowl.

As one means of improving animal access to food in a manner that accommodates the animal's skeletal structure, the curve of the food surface 6507 is therefore more closely aligned with the arc 6508 formed by the natural neck-bending movement used by dogs and cats when naturally eating prey.

More specifically, not shown is the fact that animals also flex their necks at the point where the cervical spine meets the skull. The arc formed by the animal's nose when flexing the scull as just described is of a smaller radius than the arc 6508 shown. Therefore, the surface geometry of the food surface 6507 of the bowl of at least one embodiment of the present invention, anticipating a secondary arc radius, is further modified based on converging radii, as may be represented by a portion of a traditional drawing tool, the French Curve.

Those skilled in the art will immediately appreciate that the apparent center of the bottom of the interior food surface is not co-located with the apparent center of the bowl structure, the center of the food surface therefore being positioned closer to the feeding animal than the center of the bowl structure. This provides for a more natural access to food, and further eliminates the hard-to-reach areas of traditional food bowls as previously described FIG. 65*b*, 6504, 6505.

As will become more apparent, the food bowl of at least one embodiment of the present invention therefore provides for a feeding surface correlating more closely to the normal range of motion exhibited by feeding carnivores, eliminates or substantially reduces inaccessible portions of the interior of the bowl thereby reducing inaccessible food that attracts insects and vermin, and provides for substantially increased radii between the bowl bottom and sidewalls that can reduce manufacturing tooling costs.

Notwithstanding the benefits of the improved feeding surface of a food bowl, it is sometimes preferred to slow the actual rate of consumption in order to avert the onset of certain medical conditions as previously described.

Figure 66A:
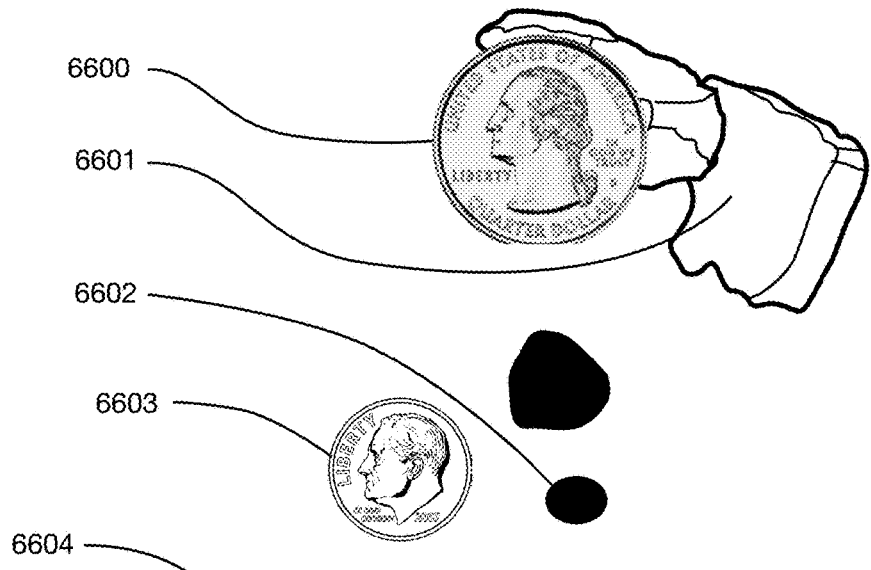
FIG. 66a is an exemplary diagram illustrating the size of dry kibble food relative to coin sizes.

FIG. 66*a* is an exemplary diagram illustrating the size of dry kibble food relative to coin sizes. More specifically, carnivores can exhibit aggressive eating habits such as food gulping that can result in life-threatening conditions. In the wild, carnivores typically dine on natural food that is moist. The higher moisture content can aid in easing consumption, provide increased satiation and be easier to swallow when compared to the ubiquitous dry food currently manufactured and sold for dogs and cats.

Special consideration should be given by pet owners to method of slowing the rate of consumption of manufactured food to thereby decrease the incidence of GDV and food aspiration.

In the drawing, two coins are shown, a US dime 6603 and US quarter 6600. As a means to illustrate the wide range of nugget sized of manufactured dry food, one piece of one exemplary dry food 6601 is shown next to the quarter, the quarter providing a dimensional point of reference.

In the same drawing, two additional pieces of dry food are shown, with one piece 6602 being a dimension that is approximately ⅒th of the size of the dime 6603.

By comparing the two food nuggets 6601, 6602, one can readily see that the larger nugget is estimated to be approximately 20 times the size of the smaller nugget. Further, it can readily be seen that the larger nugget has sharp, jagged edges compared to the smaller, well-rounded nugget.

Figure 66B:
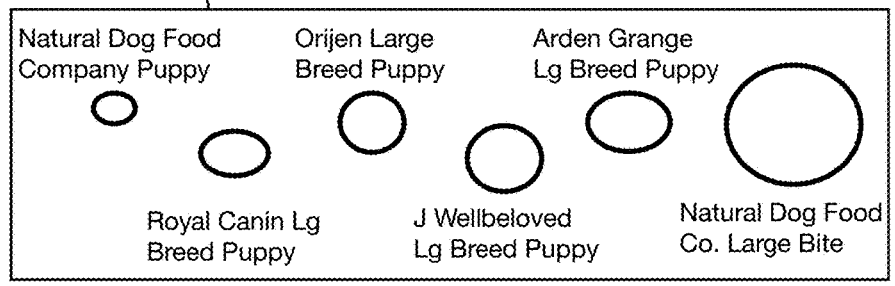
FIG. 66b is an exemplary diagram illustrating the size of dry kibble food relative to other kibble sizes.

FIG. 66*b* is an exemplary diagram illustrating the size of dry kibble food relative to other kibble sizes. As a further comparison of the small nugget 6602, the drawing 6604 shows six additional nuggets representing just six of the literally hundreds of nugget brands and sizes. Methods intended to slow consumption of dry food should reasonably consider the size variations of nuggets. Although not shown, the significant body of art related to protrusions or obstacles within the feeding bowl teaches the functional design requirements of such protrusions or obstacles being the size of a dog's or cat's snout, or muzzle. This teaches away from food kibble size being the driving design parameter for devices intended to slow food consumption, and disregard the vagaries in food nugget differences that can actually interfere with the intended functionality of the art.

It should be noted that in some teachings, the space between protrusions would be insufficient to accommodate the large nuggets just described, while allowing the small nuggets to fall so deeply between protrusions that it remains unreachable by animals with short tongues—the only method they have to extract food from between protrusions. Further, the current body of art teaches protrusions that are largely of non-resilient construction that can cause irregularly sized or shaped nuggets to become lodged between or around the protrusions, the art remains silent as to intended functionality being useful when feeding highly irregular shapes and sizes of nuggets.

Figure 66C:
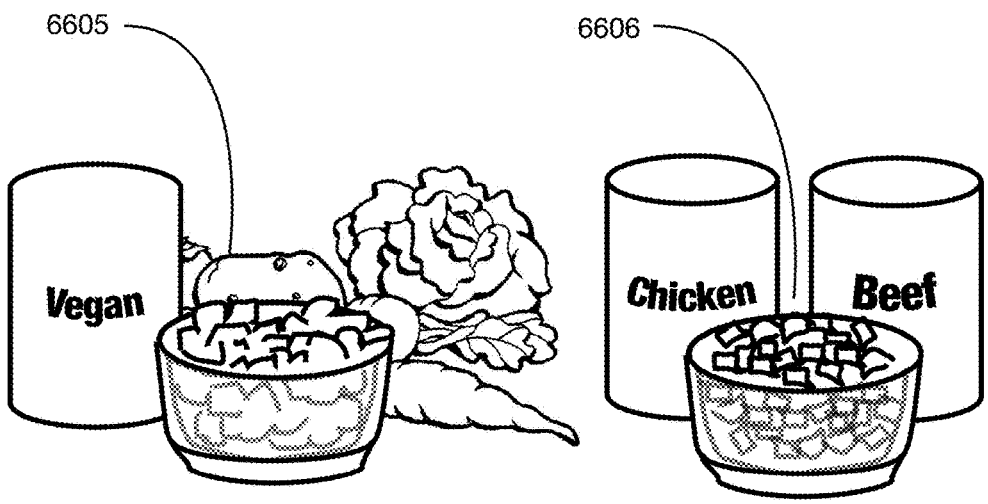
FIG. 66c is an exemplary diagram illustrating the two variations of canned dog food.

FIG. 66*c* is an exemplary diagram illustrating the two variations of canned dog food. By comparing the consistency of the wet canned food 6605, 6606 to the dry kibble nuggets just described, it can be readily seen that wet food can be messier, and leave considerably more residue and un-eaten food bits stuck to the food surface. As can further observed in the exemplary examples of just two of the hundreds of versions of canned dog and cat food, consistency and "chunkiness" varies considerably even between canned food, with one version 6605 being of a "mashed potato" consistency, and the other 6606 being more of a chunky "meat stew" consistency.

The current body of art related to devices intended to slow food consumption teaches away from the use of canned food since use of canned dog and cat food for obvious commercial reasons, those being that an owner would be required to first "pack" the canned food between or around protrusions or obstacles, then after the animal finishes eating, would then be required to clean the un-eaten food and wet food residue from in and around each obstacle. Therefore, suppliers of such products focus general recommendations only on the use of dry food nuggets, further remaining silent on issues related to nugget size as just mentioned.

Skilled artisans will immediately appreciate that the body of food-slowing art fails to solve the problems just described, and in some cases cause or exacerbate feeding problems, and will further appreciate the device of at least one embodiment of the present invention that preferably slows food consumption while accommodating all of the various sizes, shapes and consistencies of dry, moist or wet dog or cat foods.

FIG. 67 is an exemplary diagram illustrating three views of an improved food bowl 6700. In the drawing, the top view of the bowl shows a substantially circumferential perimeter, not unlike traditional round bowls. The bowl of at least one embodiment of the present invention also comprises a top rim 6702, and an interior food surface 6701 therein providing a reservoir for holding food.

Deviating from traditional animal food bowls not shown, but comprising a substantially concave or recessed food surface of substantially symmetrical geometry about the centerline of the bowl, it can be readily seen that the centerline of the approximate bottom food surface 6704 is offset to the front of the bowl relative to the actual center of the bowl structure 6703. The function behind the offset, and the advantages thereof, will soon become known.

Now, in the side view, the dotted line 6707 indicating one view of the interior food surface, shows a sharper drop into the bowl on the front, while a longer, sweeping arc as it rises to the back side. Consistent with the correlation to an animal's natural neck arc, the deeper front correlates to the ease with which an animal can reach its mouth closer to the ground on the proximal side of the bowl, and less ease with reaching food at the same level when the food is on the distal side of the bowl.

As can be realized in this view, the long sweep of the back end of the bowl, extending from the higher rim 6706, moves the actual centerline 6704 of the bottom of the interior bowl to a point closer to the animal when compared to the actual center of the bowl exterior 6703.

It should be noted that the distance of the actual offset between the interior center and center of the exterior structure is not a defined distance, and may change depending on the overall dimensions of the bowl, as well as the intended type and size of animal for which the bowl is designed. However, those skilled in the art will appreciate that the offset of at least one embodiment of the present invention represents a new and novel positioning of food that corresponds more closely to a carnivore's natural head and neck movements when compared to traditional, symmetrically structured food bowls.

It should also be noted that the front end of the top rim 6705 is positioned at a distance above the bottom edge of the bowl when compared to the top rim 6706 at the back end of the bowl. The new and novel invention positions the food in a bowl wherein the natural feeding action tends to push food from the front, to the back of the bowl, where the animal reaching for food at the back of the bowl more easily ingests the food since it is higher along the natural neck and head arc.

Figure 68:
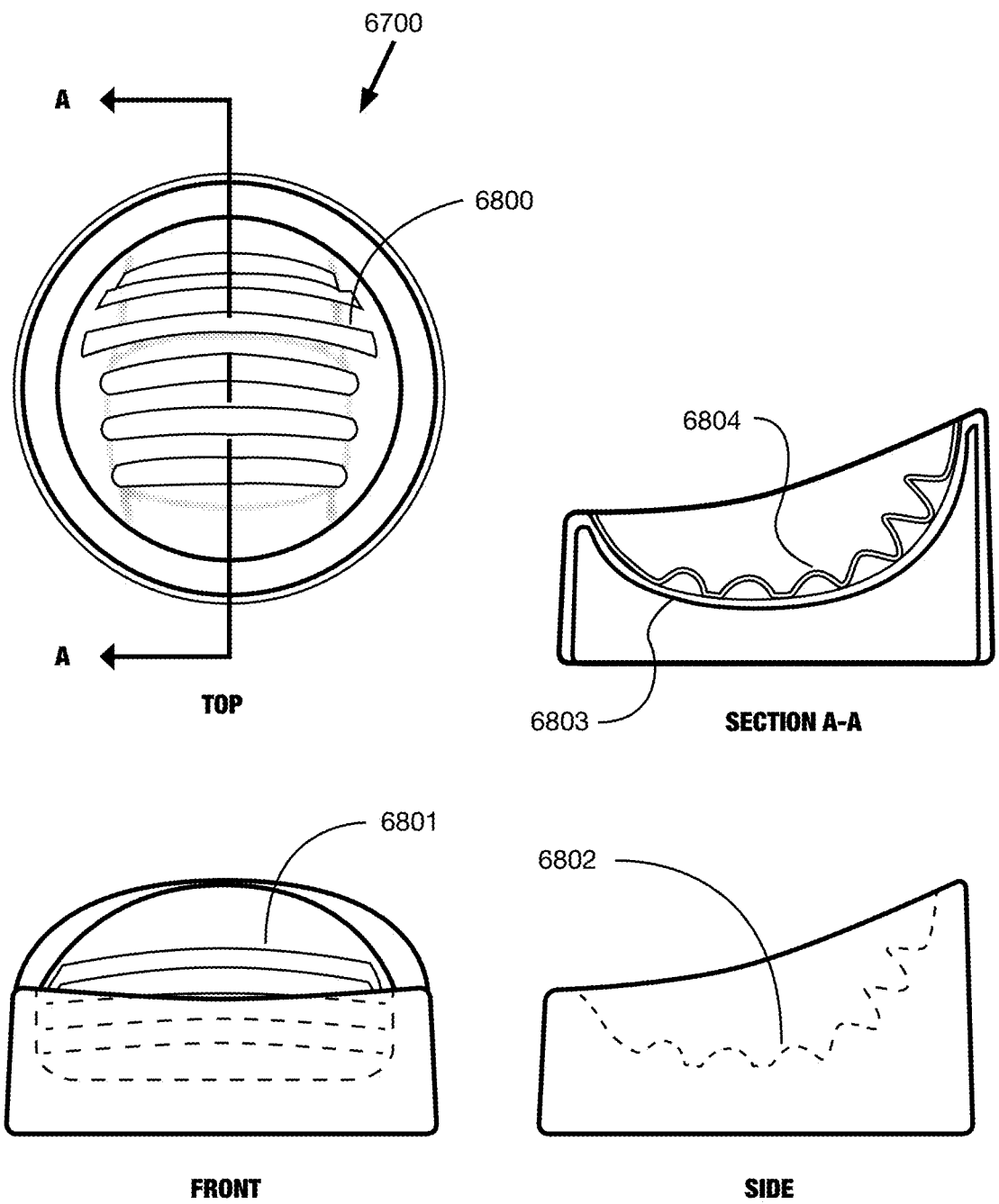
FIG. 68 is an exemplary diagram illustrating three views of an improved round food bowl with a food obstacle.

FIG. 68 is an exemplary diagram illustrating three views of an improved round food bowl with a food obstacle. In the drawing, a food bowl 6700 of at least one embodiment of the present invention is shown with a food obstacle 6800 introduced into the interior of the food containing area. The obstacle is intended to separate food into a plurality of troughs within the food area, thereby requiring an animal to separately extract food from a multitude of discrete food partitions. This requirement achieves the objective of discouraging the dangerous practice of food gulping, and helps minimize food aspiration.

At least one embodiment of the present invention further solves previously described problems, namely obstacles not accommodating different dimensions of dry food nuggets, not accommodating wet foods, and un-reachable food resulting in unsanitary conditions that attract insects and vermin.

In consideration of the above, it can be immediately seen that the obstacles are uniquely arranged as terraces 6801, and/or crests and troughs with the major longitudinal axis of the terraces and troughs arranged substantially perpendicular to the axis now shown, but which axis runs from the front to the back of the bowl. The bottom of the terraces and troughs, as shown in the imaginary line 6802 in the side view of the drawing, generally follows the interior geometry of the novel food surface as previously described.

More specifically, either as a component of the formation of the food surface 6803, or an insert 6804 placed in communication with a curved structure approximating the desired food surface of at least one embodiment of the present invention as shown in the sectional view, it is readily apparent that the obstacles extend substantially from the front of the bowl, to the higher portion of the food surface arc at the back of the bowl. This ensures that as the animal inherently pushes food away from them, as their head and tongue extend from the natural arc as previously described, the intended consumption-slowing function will continue to perform as intended even as food is pushed away onto higher levels, and into higher-positioned troughs and terraces.

Obstructions arranged in a pattern generally perpendicular to the direction an animal would naturally push food while eating are substantially more effective in extending the time required to consume a specified volume of food when compared to troughs with a primary axis parallel to the front-to-back axis of the bowl. In such a non-preferred arrangement, the animal would have the ability to gulp or lap up food quickly simply be cleaning out each trough by running their head and tongue from front to back in a natural movement, thereby cleaning out each trough with a minimum of effort, and in a minimum of time.

Therefore, while the troughs, crests and terraces just described run generally perpendicular to the major front-to-back axis of the bowl, the specific orientation is not meant to be limiting, and that variations not shown, such as chevron configurations, basket-weave configurations, or angles of the obstacles relative to the front-to-back axis of the bowl ranging from an acute angle relative to the front of the bowl, to an obtuse angle relative to the front of the bowl maybe used, so long as the front-to-back pushing of food by the animal inhibits the animal's use of troughs as furrows from which it can quickly gulp or scoop food.

It should be further noted that the geometric shape of the food surface 6803, the terraces and troughs of the insert 6804, or the precise orientation of the obstacles relative to the front-to-back axis of the bowl are not meant to be limiting. These dimensions are a function of the size of, and neck length of various animals, and additionally a function of the food an owner intends to feed their animal. Therefore, there can be more or fewer obstructions, obstructions placed further apart or closer together, or obstructions that have a height dimension that is greater or smaller than shown, all without deviating from the spirit or intention of the novel function provided by at least one embodiment of the present invention.

Figure 69:
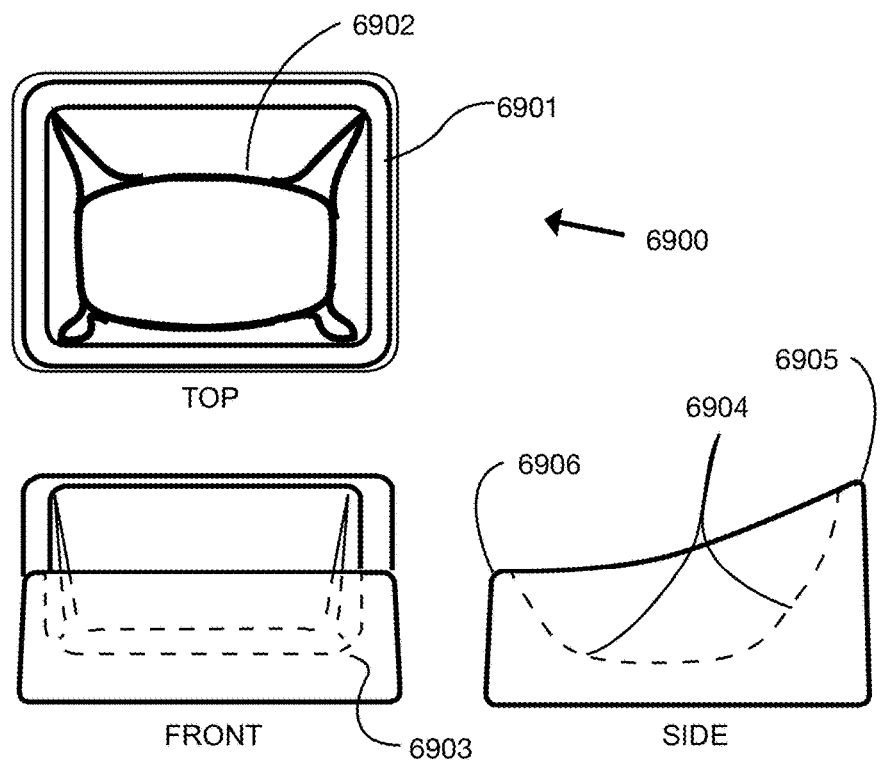
FIG. 69 is an exemplary diagram illustrating a variation of an improved food bowl.

FIG. 69 is an exemplary diagram of one version of an improved food bowl. More specifically, the drawing shows a food bowl 6900 of at least one embodiment of the present invention as a rectilinear variation, thus retaining all of the foregoing beneficial improvements previously described, but incorporated into a rectilinear top rim 6701 and structure, rather than a circumferential structure.

One will immediately see that the approximate centerline of bottom of the food surface 6902, as measured between the front and back of the bowl, is offset towards the front of the bowl as previously described.

Further, the variation of the improved food bowl comprises a top rim 6906 at the front of the bowl, and a top rim 6905 positioned at the back of the bowl, the top rim at the back of the bowl being positioned at a dimension from the bottom of the bowl that is larger than the dimension of the front rim.

In order to follow the natural neck and head arc of an animal feeding from the improved bowl, the feeding surface, as indicated by the dotted line 6904 shown in the side view, the arc of the feeding surface towards the back of the bowl must accommodate a longer sweep that lifts the food to a higher position more aligned with the position of the animal's mouth as it extends its neck and head further toward the back of the bowl.

In order to solve one previously discussed problem with traditional feeding bowls, the radii 6903 that create the curved feeding surface between the interior side walls of the bowl, and the bottom food surface, are increased to a dimension such that easy access by animals with wide muzzles is maintained, and so that food is easily accessible, and therefore does not collect and create unsanitary conditions in the "nooks-and-crannies". It will be further appreciated that the large radii of the entirety of the interior food surfaces of the improved bowl are all maintained as a generally larger dimension when compared to interior radii of traditional food bowls, thereby making it easier for the bowl to be rinsed or cleaned.

Figure 70:
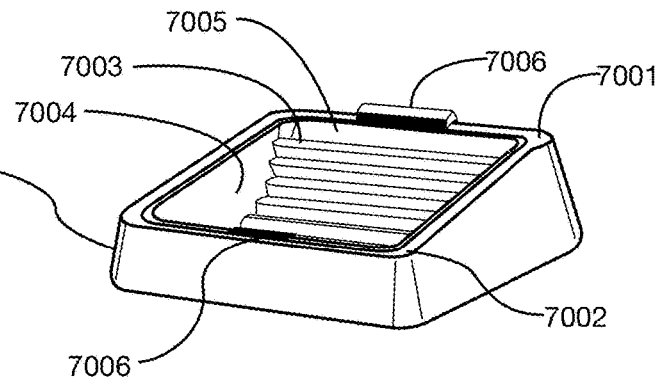
FIG. 70 is an exemplary diagram illustrating an isometric view of an improved rectilinear food bowl with an insert comprising food obstacles.

FIG. 70 is an exemplary diagram illustrating an isometric view of an improved rectilinear food bowl with an insert comprising food obstacles. In the drawing, an improved food bowl 7000 is of a generally rectilinear footprint upon a floor surface not shown, comprises a lower top rim 7002 towards the front edge of the bowl, and a higher top rim 7001 towards the back edge of the bowl, the different heights from the bottom plane of the bowl being responsive to the natural neck and head arc exemplified by a dog or cat eating from the bowl.

An insert 7005 comprising food consumption obstacles is shown positioned within the interior surface of the bowl, the insert therefore conforming to the interior food bowl geometry as previously described. Although the insert is shown being retained within the interior surface of the bowl by a front latch and a back latch 7006, the latches are shown merely as one exemplary example of many possible mechanical and electromechanical means of removably retaining one component in communication with another component, those being electromagnets, mating detents and posts on the mating parts, edges of a resilient insert being retained under the inside edge of an outer bowl shell, mating hook and loop fastening systems, or any other number of removable fastening or mating devices or mechanisms well known to those skilled in the art.

Therefore, the form and method of retaining an obstacle insert within the interior feeding area of a pet food bowl are not meant to be limiting, and any appropriate method or device that retains an obstacle insert within the improved food bowl may be used without deviating from the object of at least one embodiment of the present invention.

Now, it can be readily seen that the insert 7006 comprises a plurality of obstacles 7004 that may further comprise terraces or troughs with a primary longitudinal axis substantially perpendicular to the axis of the front-to-back centerline of the bowl, the orientation of the terraces and troughs intended to create a plurality of food retaining areas. The requirement of an animal to separately remove food from each food retaining area, either separated by terrace-like structures on the back wall as the surface transitions from substantially horizontal in the bowl bottom, to a more vertical orientation along the back surface, or separated by troughs, provides for slower food consumption, and therefore acts to diminish or eliminate the previously described problems associated with good gulping.

Further, sidewalls 7004 are shown on the obstacle insert, thereby providing for complete coverage of the food surface geometry of the improved food bowl by the insert. The full and complete coverage of the bowl interior by an insert is a preferred method of ensuring that food is not accidentally repositioned to the space between the insert and bowl by the animal's act of eating.

Therefore, the entire obstacle being a single food surface, the removable insert, preferably being of a slightly resilient and bacteria-inhibiting material such as silicone generally of a Shore A range of 40 to 60, can be easily removed and cleaned. The resiliency prevents food particles from becoming lodged into or otherwise retained by the rigid protrusion food obstacles taught by traditional slow food consumption products, and further provides for sanitation by high temperature washing systems such as a dishwasher.

It should be noted that the materials just mentioned are not meant to be limiting, and rigidly formed materials may be used provided the obstacle sizes and positioning of obstacles upon the insert provide the preferred function of at least one embodiment of the present invention as described.

Figure 71:
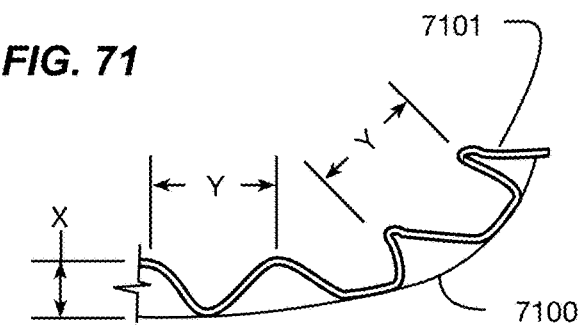
FIG. 71 is an exemplary diagram illustrating a sectional view through a typical insert with integral obstacles.

FIG. 71 is an exemplary diagram illustrating a sectional view through a typical insert with integral obstacles. More specifically, a series of terrace-like and trough-creating structures 7101 extending substantially upward or outward from the bottom portion of the insert 7100 into the interior food space of an improved food bowl are shown. The positioning of each trough or terrace relative to the other as indicated by dimension "Y", and the dimension that each terrace or crest between troughs extends inward into the food area "X" are not arbitrary, and change based on a plurality of factors as previously described.

Merely by example, if dry food nuggets of the type 6601 of FIG. 66*a*. are being fed to an animal, the dimensions just mentioned will be considerably larger than the dimensions required to appropriately separate food containing areas for dry nuggets of the smaller size 6602 of FIG. 66*a*.

Figure 72:
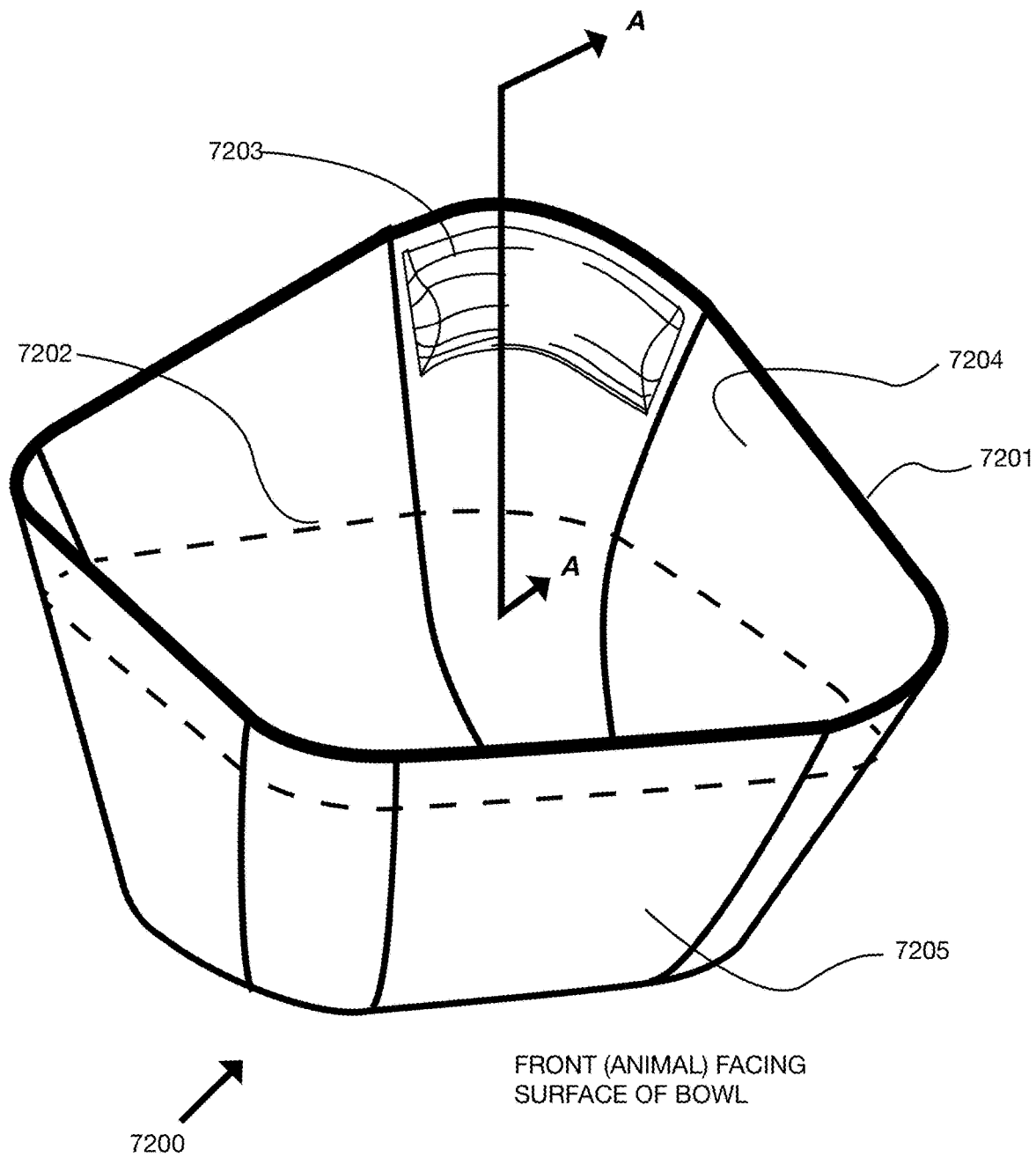
FIG. 72 is an exemplary diagram illustrating one variation of an improved food or water bowl.

FIG. 72 is an exemplary diagram illustrating one variation of an improved food or water bowl. More specifically, a pet bowl 7200 is shown with a defined first bowl wall surface 7205 proximate to a feeding domesticated animal, referred to as the "bowl front", and a top rim 7201 with a dimension between the top rim and substantially horizontal plane of the bowl bottom that varies from a smaller dimension at the bowl from compared to a larger vertical dimension towards the back of the bowl.

A water line 7202, indicated by a dotted line, is shown as a means to approximate the location of the full capacity of the bowl, the water line being substantially parallel to the bowl bottom. As can be readily seen, the rim 7201 is substantially above the water line towards the back of the bowl, but slightly above the water line at the front of the bowl.

As a grabbing feature, a contrasting surface 7203 is shown proximate to the back wall of the bowl. Now, it should be noted that the contrasting surface may comprise various materials and/or configurations, any and all of which provide novel function never before incorporated in a pet bowl.

As one variation, the contrasting surface 7203 is located above the water line 7202 as a means to allow a human to grasp the bowl when picking up an empty bowl from the feeding surface, placing a full bowl down upon a feeding surface, or moving the bowl about. Further, the location of the contrasting surface, being located above the water line, provides for handling of the bowl by the owner without the necessity of placing a hand, or any parts of the hand into the area of the bowl traditionally containing water or food. By eliminating the necessity of placing the hand within the food or water area, the owner is prevented from soiling their hands by immersing hands or fingers in water or food, either before or after the pet has fed or drunk from the bowl.

As those skilled in the art will immediately appreciate, this new and novel feature promotes a healthier and more sanitary condition for both owner and pet. The contrasting surface 7203 it not limited to the illustration as shown, and may therefore comprise a material with a higher friction surface compared to the smooth, bacteria-preventing surface of the bowl, a contrasting geometry that provides an enhanced gripping and carrying features, a contrast with the interior surface or exterior surface or geometry of the bowl, or any combination of materials and geometry on the interior or exterior of the bowl, all of which would be positioned above the bowl water line.

Figure 73A:
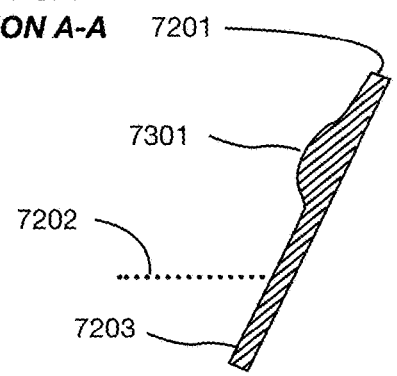
FIG. 73A is an exemplary diagram illustrating a sectional view of a portion of the back wall of a food or water bowl with a convex protrusion on the interior of the wall surface.

FIG. 73A is an exemplary diagram illustrating a sectional view of a portion of the back wall of a food or water bowl with a convex protrusion on the interior of the wall surface.

More specifically, a section of the back wall of a pet bowl is shown with a top rim 7201, an interior surface 7204, a "water line" 7202 representing the horizontal plane of the filled capacity of the pet bowl, and a portion of the interior surface of the bowl that is protruded 7301 toward the bowl interior and relative to the surrounding bowl surface, thereby providing for an improved gripping surface on the interior of the bowl.

In particular, it should be noted that the new and novel functional features of at least one embodiment of the present invention provide for an improved gripping surface, and correspondingly, improved handling of a pet bowl above the water line 7202, thereby allowing the owner to handle the bowl without putting their hands or fingers into the region of the bowl that contains, or previously contained, food or water.

Figure 73B:
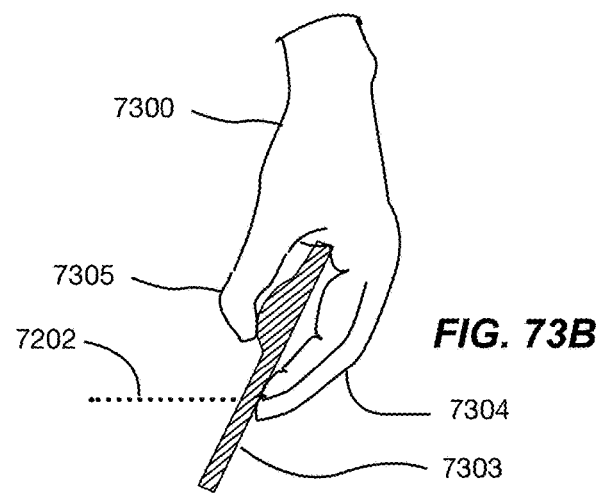
FIG. 73B is an exemplary diagram illustrating hand placement on a food bowl with a convex protrusion on the interior of the wall surface.

FIG. 73B is an exemplary diagram illustrating hand placement on a food bowl with a convex protrusion on the interior of the wall surface. One hand 7300 of the pet owner is placed on a portion of the back wall 7203 of a pet bowl, with the distal end of the thumb 7205 positioned over and around the protruded gripping surface. As can be readily seen, the thumb located on the interior of the bowl remains above the water line 7202, and therefore does not contact food or water contained in the bowl. To aid in single-hand lifting of the bowl, a plurality of fingers 7304 of the hand are placed against the outside surface 7303 of the bowl, contacting the bowl at a position lower than the position of the thumb, thereby providing for the appropriate leverage required to maintain the substantially horizontal plane of the water line throughout the lifting and handling processes. The gripping surfaces as just described are of such geometry that they can be inexpensively and easily formed using progressive die stamping, or a variety of thermoforming processes.

Figure 74A:
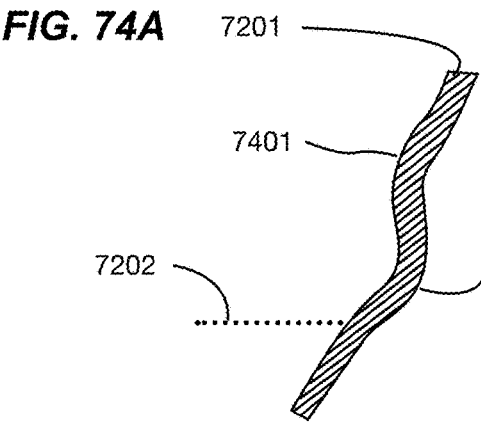
FIG. 74A is an exemplary diagram illustrating a sectional view of a portion of the back wall of a food or water bowl with convex and concave portions of the wall surface that facilitate handling of the bowl with one hand.

FIG. 74A is an exemplary diagram illustrating a sectional view of a portion of the back wall of a food or water bowl with convex and concave portions of the wall surface that facilitate handling of the bowl with one hand. As one variation to the gripping surface detail just described, the outer wall of a pet bowl is shown with a portion of the wall positioned above the water line 7202 shaped to form a gripping means to allow for lifting and moving with one hand. More specifically, the outer wall geometry above the water line 7202 and below the top back rim 7201 is formed to create a portion of the wall 7401 projecting inwardly towards the bowl interior. Further, the wall is formed to reverse the inwardly protruding section to form an outwardly protruding portion 7402, together which form an effective gripping surface.

Figure 74B:
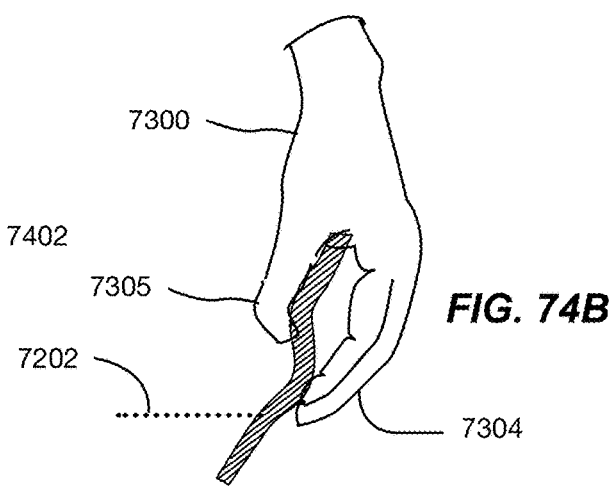
FIG. 74B is an exemplary diagram illustrating hand placement on a food bowl with convex and concave portions of the back wall structure.

FIG. 74B is an exemplary diagram illustrating hand 7300 placement on a food bowl with convex and concave portions of the back wall structure. The hand of a pet owner is positioned upon the top rim of the bowl with the thumb 7305 placed against the inside wall, and the distal end of the thumb 7305 wrapping over the inwardly protruding formed section of the wall as previously described. Further, a plurality of fingers 7304 are placed upon the exterior wall surface, specifically engaging the exteriorly protruding section of the bowl surface geometry, thereby providing for the appropriate leverage required to maintain the substantially horizontal plane of the water line 7202 throughout the lifting and handling processes. The gripping surfaces as just described are of such geometry that they can be inexpensively and easily formed using progressive die stamping, or a variety of thermoforming processes.

Figure 75A:
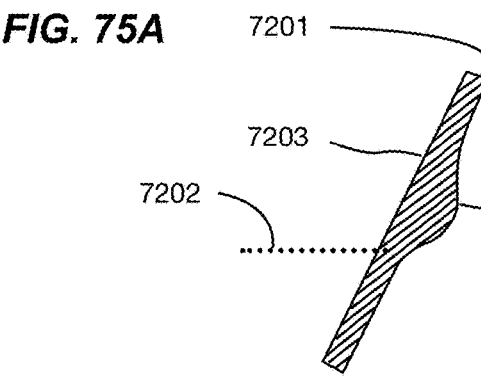
FIG. 75A is an exemplary diagram illustrating a sectional view of a portion of the back wall of a food or water bowl with a convex protrusion on the exterior of the wall surface.

FIG. 75A is an exemplary diagram illustrating a sectional view of a portion of the back wall of a food or water bowl with a convex protrusion on the exterior of the wall surface. As yet another variation of the gripping surfaces previously described, the novel gripping surface is positioned on the bowl surface above the water line 7202 such that the handling portion of the bowl does not come into contact with food or water contained within the bowl.

More specifically, a gripping surface 7501 is positioned between the top rim 7201 of the substantially back wall of the bowl and the water line 7202. As a variation to the inwardly protruding detail as described FIG. 73A, the protrusion is on the wall surface opposed to the inner bowl surface 7203.

Figure 75B:
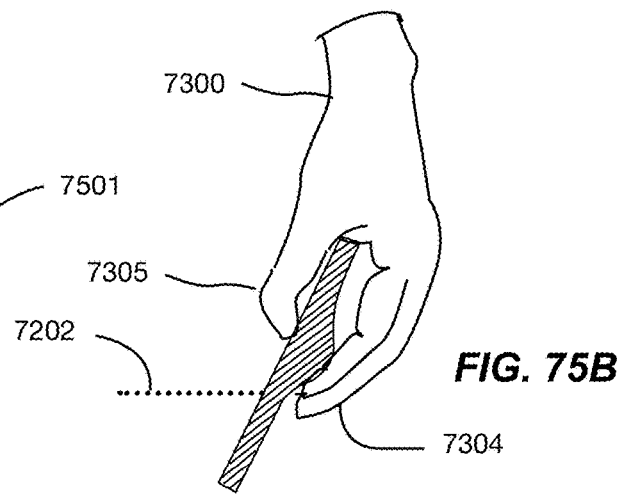
FIG. 75B is an exemplary diagram illustrating hand placement on a food bowl with a convex protrusion on the exterior of the wall surface.

FIG. 75B is an exemplary diagram illustrating placement of a hand 7300 on a food bowl with a convex protrusion on the exterior of the wall surface. As is readily seen, the thumb 7305 of the hand is placed on the substantially straight inner wall of the bowl, positioned between the top rim 7201 and the water line 7202 such that the thumb will not engage with water or food contained in the bowl.

To aid in gripping the bowl, a plurality of fingers 7304 are positioned to engage with the outwardly protruding wall surface, and preferably as a point beyond the thickest part of the protrusion, proximate to the bowl bottom. The use of the thumb on the inside of the bowl, together with the fingers under the protruded gripping surface no the exterior of the bowl provide for an improved non-slip surface that further provides an advantageous leverage allowing an owner to grip, lift and otherwise manage a bowl containing food or water.

The gripping surfaces as just described are of such geometry that they can be inexpensively and easily formed using progressive die stamping, or a variety of thermoforming processes.

FIG. 76 is an exemplary diagram illustrating a representative hand removing an improved water or food bowl from a purpose-designed elevated food or water bowl stand. In many cases, it is preferred that the bowl is retained by various means to prevent the pet dog or cat from pushing and moving the bowl while eating. The drawing shows a bowl base 7605 which supports one or more food bowls. The bowl is retained upon the base by various means, including but not limited to a detachable mechanical interconnect or magnet 7603, and further a top surface of the base with a raised portion 7604 that substantially follows the perimeter of the bowl, thereby encircling at least the back of the bowl. To disengage the bowl from the elevated perimeter top surface of the base, the owner places a hand 7300 upon the bowl with the thumb 7600 being placed around the lifting feature located on the inner surface 7203 the bowl, but above the water line 7202. The owner further places a plurality of fingers 7601 on the exterior surface of the bowl, thereby allowing the fingers and thumb to pinch against the lifting means, providing for an advantageous leverage to counterbalance a bowl containing food or water. To remove the bowl from the base, the bowl is lifted in the direction shown, a first movement that lifts the bowl above the encircling raised portion of the base, and at the same time, detaching the attaching means.

As can be appreciated, in order for the top rim 7201 of substantially a back portion of the wall of the bowl to be sufficiently above the water line 7202, the rim rises from the lower elevation at the bowl front 7602, towards the substantially back portion of the bowl where one variation of a lifting means is positioned.

FIG. 77A is an exemplary diagram illustrating a sectional view of a portion of the back wall of a food or water bowl, above the water line, with a high friction material applied to the inner surface of a bowl wall. As yet another variation of an improved lifting means, a high friction surface material 7700 is positioned on the interior surface 7203 of the bowl preferably between the top substantially back rim 7201 and the water line 7202, thereby preventing the fingers of the gripping hand to contact food or water contained in the bowl.

It should be noted that the high friction surface may comprise a smooth material such as a low durometer silicone overmolded on a thermoformed bowl, or a molded or stamped surface containing a plurality of small concave or convex shaped domes, such as dimples on a golf ball. Further, the high friction surface may be applied to the bowl interior at a location where the thumb would preferably engage with the inner surface, or to the exterior surface of the bowl preferably where the fingers of the hand would engage the bowl exterior, or both on the inner and outer handling surfaces of the bowl.

FIG. 77B is an exemplary diagram illustrating hand placement on a food bowl with a high friction material applied to the inner surface. As can be readily seen, a thumb 7305 of a hand 7300 engages a high friction surface of the bowl interior, the surface being positioned below the top rim, but above the water line 7202. The fingers 7304 being positioned on the outer surface of the bowl provide an opposing force to the thumb, and when pinched, cause the thumb to forceably engage the high friction surface, thereby allowing the hand to lift the bowl without the thumb slipping on the inner surface.

As yet another variation, the improved gripping surface as just described may be used on combination with the surface geometry variations as described in (FIGS. 73A-75B).

FIG. 78 is an exemplary diagram showing a traditional food distribution channel, and an improved distribution channel. A traditional pet food distribution channel 7800 is shown comprising the well-known chain extending from a food producer, to a wholesaler, to a retailer, and ultimately to a consumer who feeds the pet food to their pet. Variations of this model provide for the wholesaler to also be the retailer, or a distributor that can replace the wholesales. Additionally, a distributor may also act as a retailer.

The distribution model just described necessarily separates the pet from direct communication between a food manufacturer and the consumer. In other words, the up-line food producers or distributors do not have any direct or real-time knowledge of the actual amount of food consumed by the pet.

Because of this inherent separation between actual pet food consumption data and the up-line entities' ability to track it, the up-line must depend on various means of gathering market data 7801 through the different entities within the channel. This data collection is unreliable and seldom complete or comprehensive. The lack of precise market knowledge by the up-line entities leads to unnecessary inventory costs, inaccurate production planning, and an inability to track the actual consumers of the food in the event a food recall is warranted.

In the drawing, the producer is in direct communication with the consumer, allowing the consumer to order and pay for pet food through the improved system. The minimum number of entities handling the food product between producer and consumer is reduced to one, namely, the entity responsible for order processing and logistics.

A new and novel device never before available to the pet food industry, a pet feeding device 7804 measures the precise daily amount of food that should be eaten, or that is eaten by the pet. Further, the device and the network not shown, but upon which the device is a client may store daily consumption data for each individual pet, compute the average daily consumption, and communicate the data directly to the producer.

Those skilled in the art will immediately appreciate the economic and marketing value provided for by the knowledge of precisely what pet animal is eating what quantity of food each day. Namely, the actual pet consumption 7803 is computed based on data received from sensors affixed to, in association with, or integrated into the feeding and watering bowls. The data is provided for in real time, or at a minimum, within a 24-hour time frame, thereby informing the up-line of the actual food amount consumed by each unique animal within a 24 hour day.

By eliminating the normally elastic and inefficient up-line entities that reside in traditional distribution channels from the improved system of at least one embodiment of the present invention, for the first time, producers may have access to the actual consumption volume of each product that may be fed to the pet. Geographically broad, yet precise based on individual pet consumption data as provided for by at least one embodiment of the present invention represents a new level of marketing intelligence previously unavailable to up-line links in the traditional distribution channels.

Figure 79:
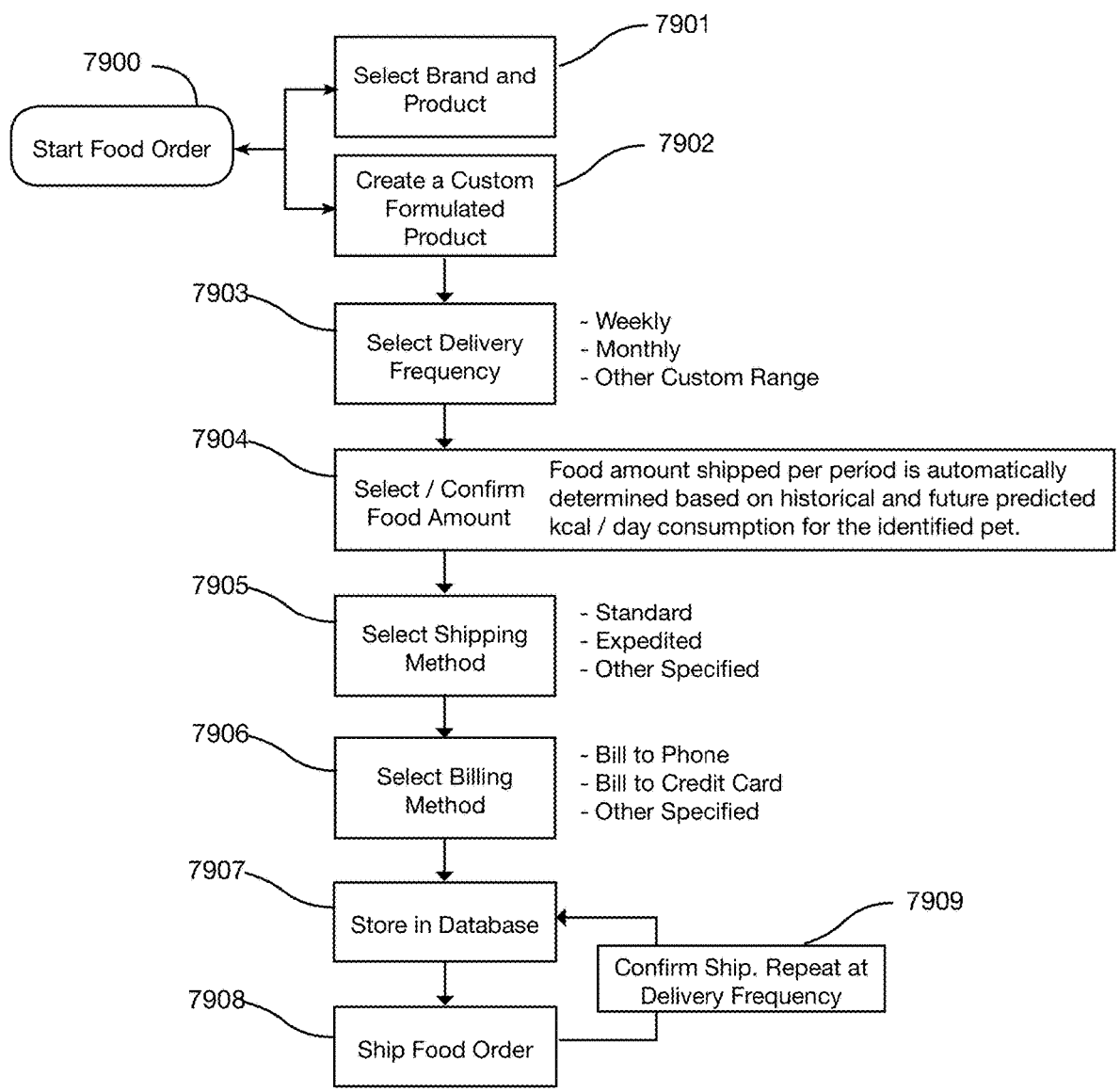
FIG. 79 is an exemplary diagram showing the operational flow chart of an improved sales and distribution channel.

FIG. 79 is an exemplary diagram showing the operational flow chart of an improved sales and distribution channel. It is well known in the industry that no industry-wide means exist whereby producers or up-line entities precisely know how quickly a pet will consume a given portion of their food, nor when the production of more food is required prior to exhaustion of that particular food throughout the distribution channel. The consequence of the inefficiencies require producers to produce more than is actually estimated so that there is a certain volume of each brand of food stored throughout the distribution channel. Excess inventory throughout the channel ties up valuable working capital, and increases the ultimate consumer cost of the food.

Not shown, at least one embodiment of the present invention provides for a pet owner to enter into a database a profile of their pet, the profile including such unique identification data such as age, weight, and activity level of the animal for which they intend on purchasing food. Thereafter, at least one embodiment of the present invention provides for each pet owner to initiate a food order 7900, then select the food type and/or brand 7901 of food from a list of available pet foods previously entered into a database. In some instances, it may be desirable that a consumer be provided the opportunity to create a customized formulation of pet food 7902. In such instanced, a consumer may, for instance, select the kibble size, wheat-based or gluten free, high or low protein, and flavor, for instance, chicken, beef, or salmon.

After selecting the food type, the consumer may select the preferred frequency 7903 for receiving delivery of the food, for instance, food delivery recurring each week, each month, or at some user-defined period. It would be appreciated that a longer duration between deliveries would necessarily cause the producer to ship larger packages of food intended to last at least until the next scheduled delivery. On the other hand, they will appreciate that more frequent deliveries of smaller packages would provide enhanced control over the production-to-consumption period, an important element in consumer relationship, especially in instances where a food recall may be required.

Now the previously described database having analyzed the average daily portion of food consumed by each pet performs an algorithmic function that incorporates the food type 7901, 7902 and delivery frequency 7903 to compute the approximate food amount to be shipped 7904 so that the food portion will last at least the same number of days as the delivery frequency as selected by the consumer.

Optionally, the consumer may select the preferred method of shipping 7905 depending on the desired cost/time tradeoffs between speed of delivery and cost of delivery. Although three methods of payment 7906 are shown, between which the customer may select the preferred billing method, the list of billing and payment methods are not meant to be limiting. However, requiring a customer to pay for a product such as pet food is a well-recognized process in the industry. Further, if the consumer prefers to keep the payment method on file, they may elect to store it upon the server in the payment database 7907, the billing/payment method thereby being applied to a single order, or to be established as a default payment method to be used by the producer for each future delivery 7909 as the consumer-selected shipping frequency. Upon completion of the order, and future recurring orders, the producer ships the order 7908 to the consumer following the consumer's preferred shipping method.

Figure 80:
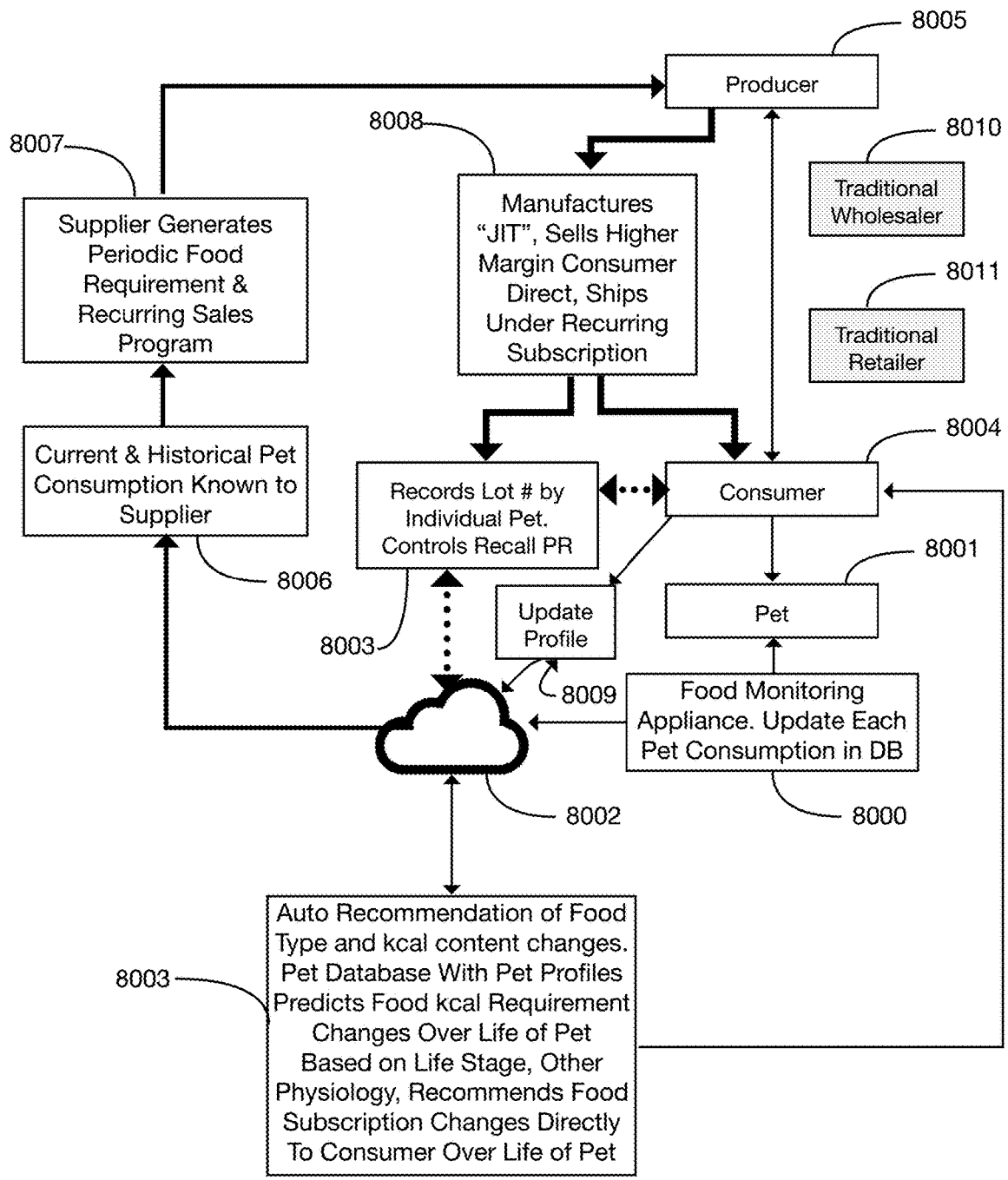
FIG. 80 is an exemplary diagram showing an interactive system for pet food subscription purchases and automated correction of the amount of food shipped during each subscription delivery interval.

FIG. 80 is an exemplary diagram showing an interactive system for pet food subscription purchases and automated correction of the amount of food shipped during each subscription delivery interval. In the diagram, a food monitoring device 8000 measures the actual amount of food contained in a pet feeding bowl. The measurement may be conducted by sensors that measure weight, or that measure volume. Subtracting the weight or volume of food at the end of the pet's meal from the total food weight or value at the beginning of the pet's meal thereby determined the actual amount of food consumed by the pet during that particular meal. If the pet 8001 normally fed one meal per day, then the amount of food consumed would define the daily food consumption.

Not shown, certain physiological and biological conditions of the pet having been previously entered into a pet database 8002 for each pet within the network, establish baseline estimations of the pet's daily food energy requirements. For instance, if the pet is a female dog that has just become pregnant, the energy requirements, typically expressed in kilocalories, or more commonly, "kcal", increase three to four times the energy requirement when she is not pregnant.

Now then, the caloric content of one or more types of food having been previously entered into the database 8002, the one or more types of food being the food that a consumer 8004 will feed to the pet 8001, it can be appreciated that a computer can thereby calculate the weight of a food of a particular kcal/kg of food weight to determine the estimated amount of food that should be given daily to the animal. The food monitoring appliance 8000 therefore may be used as a means to determine when the appropriate amount of food has been entered into the food bowl, according to the computer recommendations for the particular food fed to the animal, or alternatively may be use to compute the actual consumption by determining the different between the before eating weight and after eating weight, then convert the weight back into the actual kcal consumed during the meal.

It should be noted that known changes in caloric requirements are attached to each pet's profile. For instance, a four month old puppy will require four times the kcal per pound of body weight at it will as an adult, Therefore, a declining kcal per body weight is programmed into the pet's profile for the remaining eight months until the puppy reached adulthood. It would be required that the pet's owner periodically update 8009 the dog's weight so that the computed kcal can be updated based on body weight.

As can be immediately recognized, the process just described requires the owner to only update certain parameters in order to discover the actual daily kcal requirements to maintain the pet's optimum health, and removes all subjective determination of how much food to feed the pet on a daily basis.

Now then, first using a predicted kcal requirement for the pet based on current physiological and biological conditions of the pet, and correspondingly, the generally accepted guidelines of kcal requirements based on those conditions, an estimated daily meal portion can be determined, the estimated meal size being recorded in the pet's profile upon a database 8002. Thereafter, and at the conclusion of each day, the actual daily consumption is recorded in the pet's profile just described, and averaged with a predetermined number of immediately preceding days to formulate the average daily kcal consumption. The data analysis just described therefore creates a known average daily kcal consumption by the pet 8006. A producer 8005 upon the network, and more specifically a producer persistently accessing the pet's record in the database 8002 can therefore project the production volume to satisfy the pet's estimated real time food requirement 8007 in the near future, and periodically produce, sell and ship that projected food volume to the consumer.

In other words, if a producer 8005, having completed the process just described, determines that a particular pet registered upon the network consumes an average or 2,100 kcal per day, and that the pet eats food rated at 4,200 kcal/kg, the pet would consume ½ kg of the specified food per day. Therefore, if the consumer requested weekly delivery of the food, the producer can determine that it would have to produce precisely ½ kg×7 days, or 3.5 kg. of the specified food to satisfy actual consumption requirements of the pet for the upcoming week.

By combining all food requirements of all network registered pets eating the same food product, the producer can, for the first time, determine with precision the total production volume requirements for the next seven days, most importantly knowing that it will not over-produce or under-produce.

The process just described defines a novel Just in Time "JIT" manufacturing, sales and logistics process 8008 provided for my the novel system and method of at least one embodiment of the present invention, the process thereby creating higher margin sales, reduction in overproduction and warehousing costs, and establishing a production baseline going forward, the baseline being perpetually updated based on actual and projected daily food consumption of pets registered upon the network. The process cycle ends when the correct food amount is ultimately shipped to the consumer 8004.

As a responsible means of tracking each production batch, the lot numbers of each production run are recorded 8003 in the database and associated with each pet animal for which the production batch was manufactured. Thereafter, in the event that the producer later discovers any quality problems with the food, it will instantly know which consumers received the food of concern. The producer may then instantly contact each of the consumers to recommend an appropriate course of action to solve any newly discovered food problems.

The ordered combination of processes just described, especially when applied to food consumption as measured by a food monitoring device, eliminated the importance of a traditional wholesaler 8010 or retailer 8011 from the sales, distribution and logistics chain.

Figure 81:
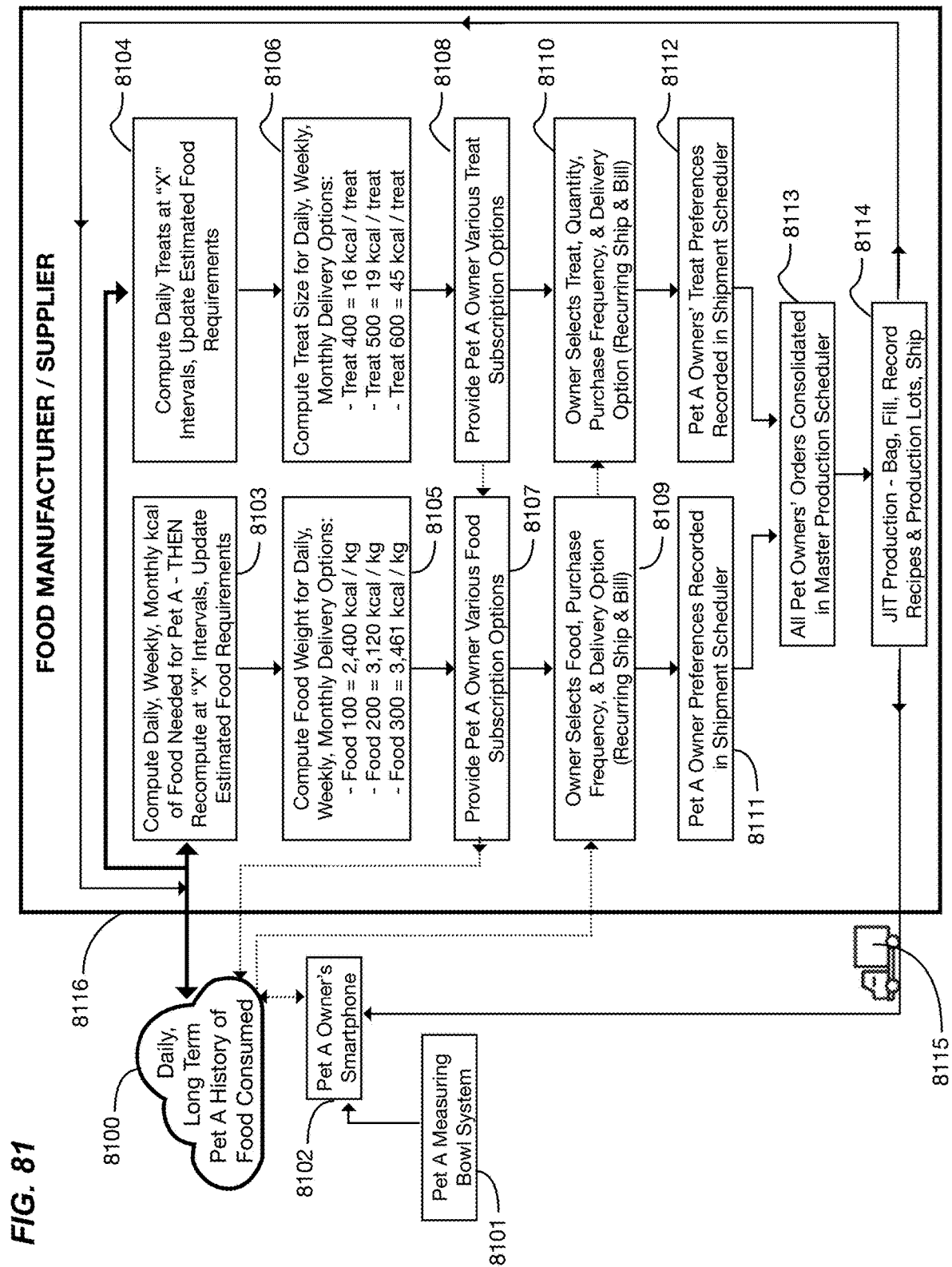
FIG. 81 is an exemplary diagram illustrating a flow chart for a system of determining multiple food products for a subscription for recurring pet food purchasing and delivery.

FIG. 81 is an exemplary diagram illustrating a flow chart for a system of determining multiple food products for a subscription for recurring pet food purchasing and delivery in a just in time manufacturing and logistics system. More specifically, a pet food measuring bowl system 8101 in wireless communication with a pet owner's wireless device such as a smartphone 8102 provides for a pet's daily food consumption data to be transmitted to the pet's unique pet record in a database 8100 upon a network. Those skilled in the art will appreciate that pet dogs and cats typically eat a variety of foods and treats during an average day. Therefore, a preferred method of estimating pet food production is to give consideration to the production requirements for each and every different type of food consumed by each pet animal during the day.

In the drawing, a pet food manufacturer 8116 is in electronic communication with the registered pet database 8100, the database also being in wireless communication with each pet bowl registered on the network. The system just described provides, for the first time, a direct pet food consumption data link between pet feeding device and food producer.

It is preferred that a pet owner enter into a purchasing and delivery system of at least one embodiment of the present invention a pet food order, the order comprising a variety of foods that may include a main meal food that is delivered routinely to a pet a meal time, and pet food treats that are given to the pet at various times during a typical day.

The pet owner having entered into the database 8100 the preferred food and treat products, and further, the pet's predicted daily food consumption as previously described, provide to the manufacturer the necessary data to then facilitate corporate food production scheduling.

A manufacturer may desire various production schedule options, and using the pet consumption food data 8103 computes the average food requirements for "Pet A" for various intervals, such as each day, week, month, or other interval. Production interval planning allows the producer to interleave production of multiple products using the same production equipment, understanding that if the most economic production quantities satisfy two weeks of estimated production, then two weeks of the selected food for Pet A will be produced before changing machinery over to a different food. A total production order quantity of the food for Pet A is determined by consolidating all predicted quantities of the same food for all pets during the same period.

Further, it would be well understood that each pet eating the produced food will invariably eat different amounts of that food during any given day. Therefore, each order of food will correspond to different energy densities, the energy densities thus defining the food amounts for each pet 8105. By computing the total consumption requirements in kcal/day for each pet on the network, and further determining the food amount corresponding to each different food type, the pet owner may select any of the offered foods 8107 from the list of foods produced by the manufacturer.

After selecting the food type, the owner then selects the frequency of delivery and shipping option 8109. The options just described may be selected from a list of options as provided by the manufacturer, or may be entered by the consumer using open data fields, thereby providing a fully customized option for the consumer. These preferences, along with other food preferences described above are recorded in the pet's unique profile 8111 on the database. Understanding that the pet owner desires the purchase of treats that can be fed to the pet at various times during the day, the owner enters the average number of times per day that treats are delivered to the pet 8104. Understanding that treats contain calories, and food contains calories, it is important to consider the total estimated caloric needs for each pet, and adjust the average daily food to account for the additional treats. A computer updates the previously entered food order by subtracting the estimated total caloric intake provided by the treats from the total food calories. The consumer may have the option of selecting the treat size from a list of available treats 8106 offered by the manufacturer. A recurring treats order may be entered by the owner under one or more of the manufacturers' suggested subscription option 8108. Finally, the owner selects the treat, quantity, purchase frequency and other options 8110, all of which constitute an oner preference for "Pet A", and recorded in the unique profile for "Pet A" 8112.

Thereafter, the manufacturer consolidates all food and treat preferences for "Pet A" into a master scheduler program, cumulating other food and treat orders from other pet owners for other pets, thereby creating a precise production requirement. The production run of food and treats is considered a JIT production run 8114 comprising production orders being delivered to various departments responsible for food production, food recipe formulation, packaging, production lot quality control and test lot testing results, and logistics. Upon completion of the production run, the logistics department immediately distributes the pre-ordered food to the consumer using well-known delivery means 8115. Food production lot information is then directed back to the database 8100 where the food lot data is associated with each animal to which the food was or will be shipped.

Any updates to each pet profile, either by computed and estimated future physiological or biological changes, any modifications made to the pet profile or food preferences by the consumer 8102, or changes in daily consumption as determined by actual consumption measurement by wirelessly connected food measuring devices 8101 are automatically updated in the database 8100 which automatically communicates updates throughout the manufacturers' JIT system.

Figure 82:
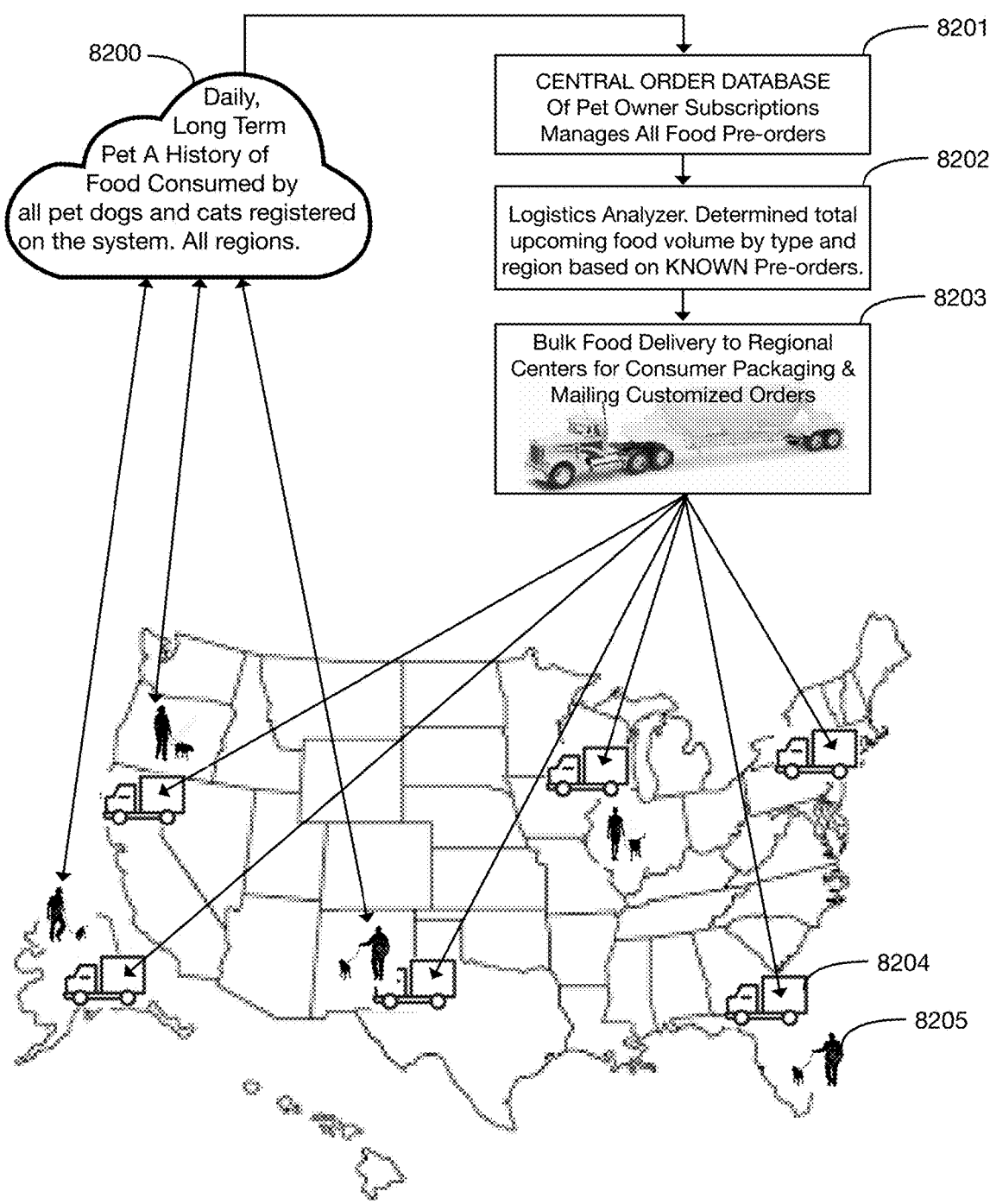
FIG. 82 is an exemplary diagram illustrating a decentralized production system.

FIG. 82 is an exemplary diagram illustrating a decentralized production system. Regional differences in production capacity, manufacturing expertise or materials availability, seasonal weather conditions, or logistics costs militate for disciplined management decisions relating to where, when and how production should occur in order to maximize profits, minimize costs, and most rapidly process food from production to consumption.

In the drawing, a centralized database 8200 contains all pet food preferences of all pets registered on a network, the food manufacturer being in persistent communication with the database. A central order database 8201 is used to consolidate all like orders within a production period based on new plus recurring food sales and delivery subscriptions. Well known to those skilled in the art, a software application 8202 to analyze all logistical options is employed as a means to determine a most economical production process.

As one illustrative example not meant to be limiting, the present invention may allow a radical departure from the traditional "produce, bag, palletize, warehouse, and distribute model by decentralizing some of the production processes to other geographic locations. For instance, if paper bags and dry food packaging labor is less expensive in Florida than at the company's Midwest manufacturing plant, it may be preferred to bulk ship 8203 dry food in truck or rail tankers directly to a packaging and shipping facility where precisely the correct number of bags are produced to fulfill the pre-orders from the designated south eastern region. Under a JIT system the food may be received in Florida 8204 on one given day, then packaged, labeled, and shipped to the consumers 8205 within the region within 24 hours—completely eliminating all costs related to warehousing, palletizing, over-packing, and rehandling finished goods after pallet break-downs.

As can be readily seen in the drawing representative of the United States, the plurality of courier vehicles and regionally located consumers may provide for increased corporate earnings, and fresher food delivery to consumers if the same decentralization of certain production processes as just described are repeated in other geographic regions throughout the country. This model of JIT production to consumer deliver may be applied as well on a global scale.

Figure 83:
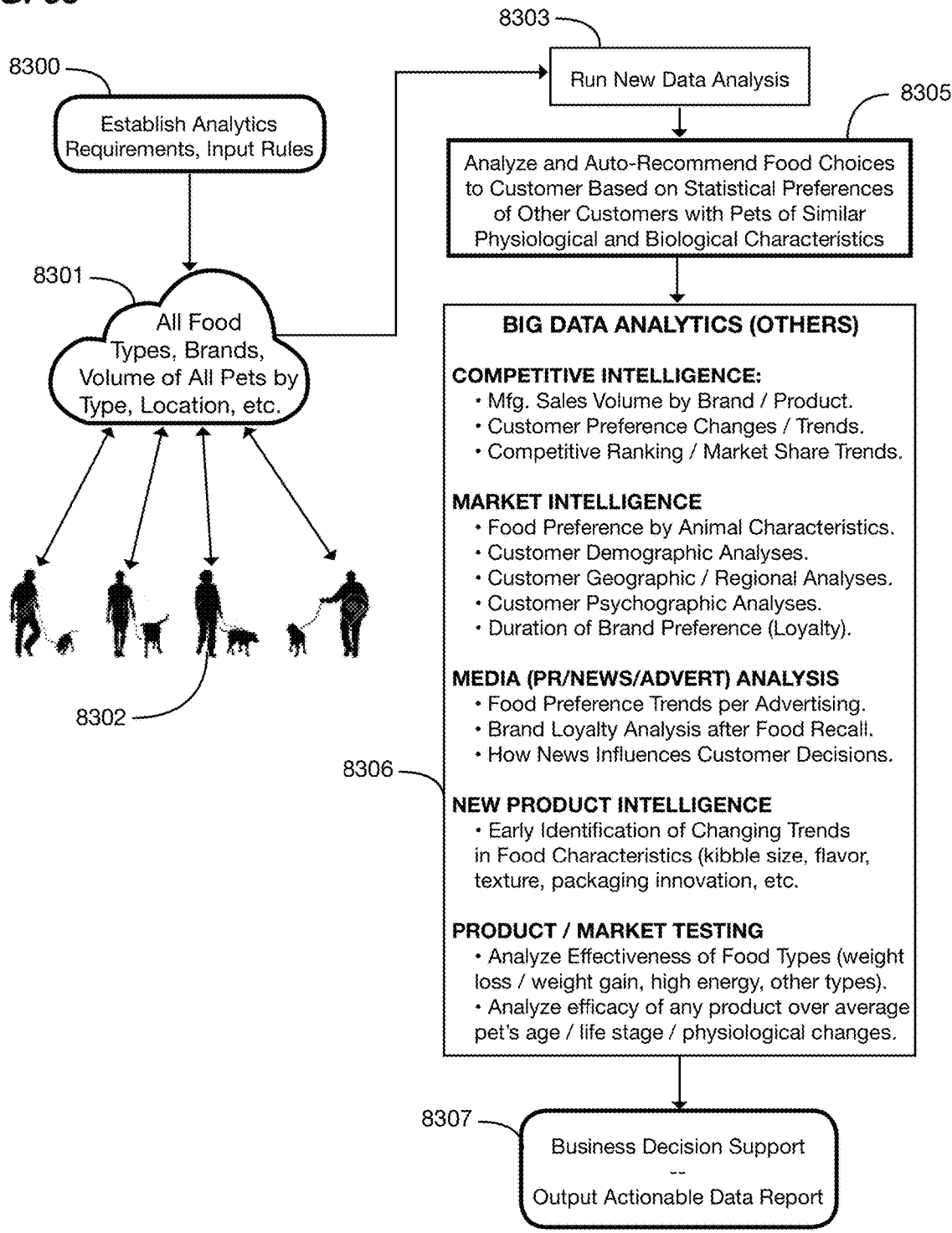
FIG. 83 is an exemplary diagram illustrating database of registered pets, and the analysis of data corresponding to each pet owner.

FIG. 83 is an exemplary diagram illustrating database of registered pets, and the analysis of data corresponding to each pet owner. More specifically, for the first time, at least one embodiment of the present invention comprising a plurality of customers 8302, each of which feeds their pet using food metering devices earlier described but not shown in communication with a database 8301, the data from which is anytime available to a food manufacturer, provides for an extremely high value, previously unavailable view of the marketplace for competitive intelligence, food production planning, and new foods market testing, as well as providing for an analytical look at all aspects of their customers, customers' pets, and pet food.

A manufacturer may, in many instances, desire information related to the pet animals registered on a network, and creates a specific query based on prescribed rules 8300. The rules are applied to the data in a database 8301 where a data analysis 8303 is performed. For instance, and merely as one example of important market data that can be extracted from the closed food subscription system, but which can be applied across a geographically and demographically similar market, a manufacturer desires an analysis 8305 of consumers who do not have pet members registered on the network. However, knowing generally the population of a region by means of third party data sources, for example the US Census Bureau, a manufacturer planning food production for that region can look to the data from the control group up the network. Again, merely by example, if the control group shows a preference of 50 percent beef flavor food, 30 percent chicken flavored food, 10 percent lamb flavored food, and 10 percent turkey flavored food, the manufacturer can assume that a similar food preference would occur for other pets and owners within that region, and plan production accordingly.

Beyond this just described illustrative example, a variety of other data analyses 8306 are instantly possible as a result of the manufacturer connection directly to pet food consumption measurement. By analyzing various and different data elements, the manufacturers have available data to support production decisions 8307 previously unavailable through the traditional pet food production, sales and distribution channels.

Figure 84:
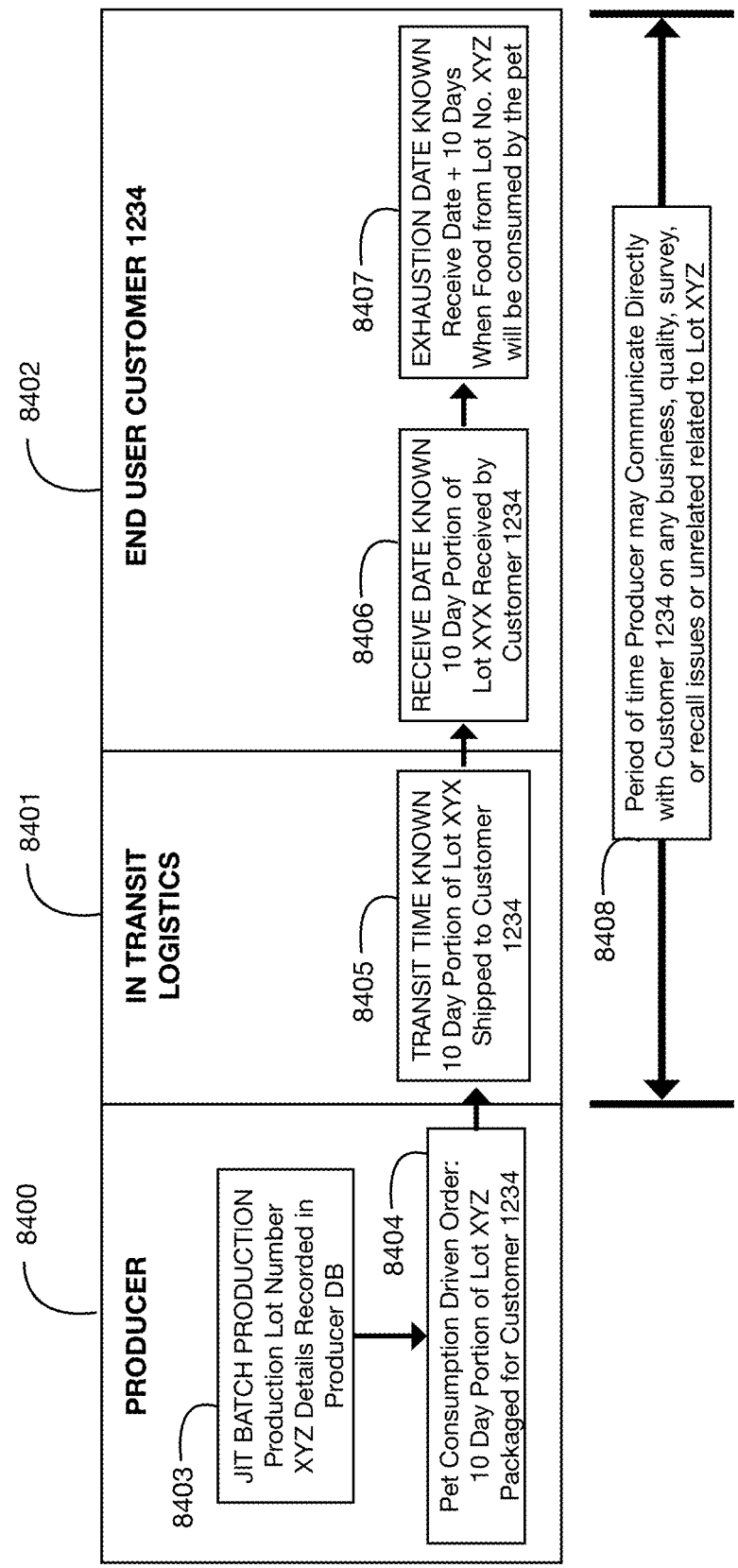
FIG. 84 is an exemplary diagram showing a system and method of tracking food production lots from packaging through pet consumption.

FIG. 84 is an exemplary diagram showing a system and method of tracking food production lots from packaging through pet consumption. As previously mentioned, recalls of tainted pet food imparts a heavy cost on manufacturers that have to track down the location of all of the recalled food lot numbers throughout the traditional distribution channel. In all likelihood, the recalled food would have been manufactured over a specified period of time, after which the food entered wholesaler distribution, and secondarily retail distribution, and ultimately consumer purchases. Food from the tainted lot will be scattered throughout warehouses, on retail shelves, and in some consumers' homes. The manufacturer will have absolutely no way of tracking how much tainted food was actually consumed by pet animals.

As a consequence, manufacturers have absolutely no reliable method to substantially reduce its exposure to economic damages, and in broadcasting a recall effort throughout the distribution channel, create a secondary economic catastrophe as a result of widespread negative public relations. At least one embodiment of the present invention provides the means to substantially reduce the enormous economic toll that food recalls take on manufacturers.

In the drawing, a food manufacturer 8400 is shown manufacturing a batch of food 8403 to which a specific lot and tracking number is assigned. Since this lot was manufactured based upon pre-orders placed through the system, the consumers, and more specifically the consumers' pets 8404 are already known to the manufacturer.

In the ordered combination of processes, the individual packages of preordered food from the just described production lot are shipped directly to the consumer, bypassing all of the storage and handling steps required in traditional food distribution channels. Historically reliable transit times 705 are well known to courier or postal services contracted to deliver the food directly from source to user.

Most importantly, the manufacturer knows the amount of food delivered to each customer, and per the reorder frequency entered by the consumer, the manufacturer knows precisely how many feeding days that food will last before exhaustion.

Therefore, the manufacturer knows with close approximation when the end user consumer 8402 will receive the food delivery 8406, and with a statistically reliable precision how much food will be consumed each day after receipt by the consumer. With the approximate date known 8407 by which all food from the specified lot is removed completely from the distribution channel, manufacturers can then control and weigh all public relations risks, animal health risks, and most importantly, can recall the food nearly instantly by contacting each consumer directly throughout the total expected life of the just produced lot of food 8408, thereby mitigating or preventing risk of injury or death to the consuming pets.

Figure 85:
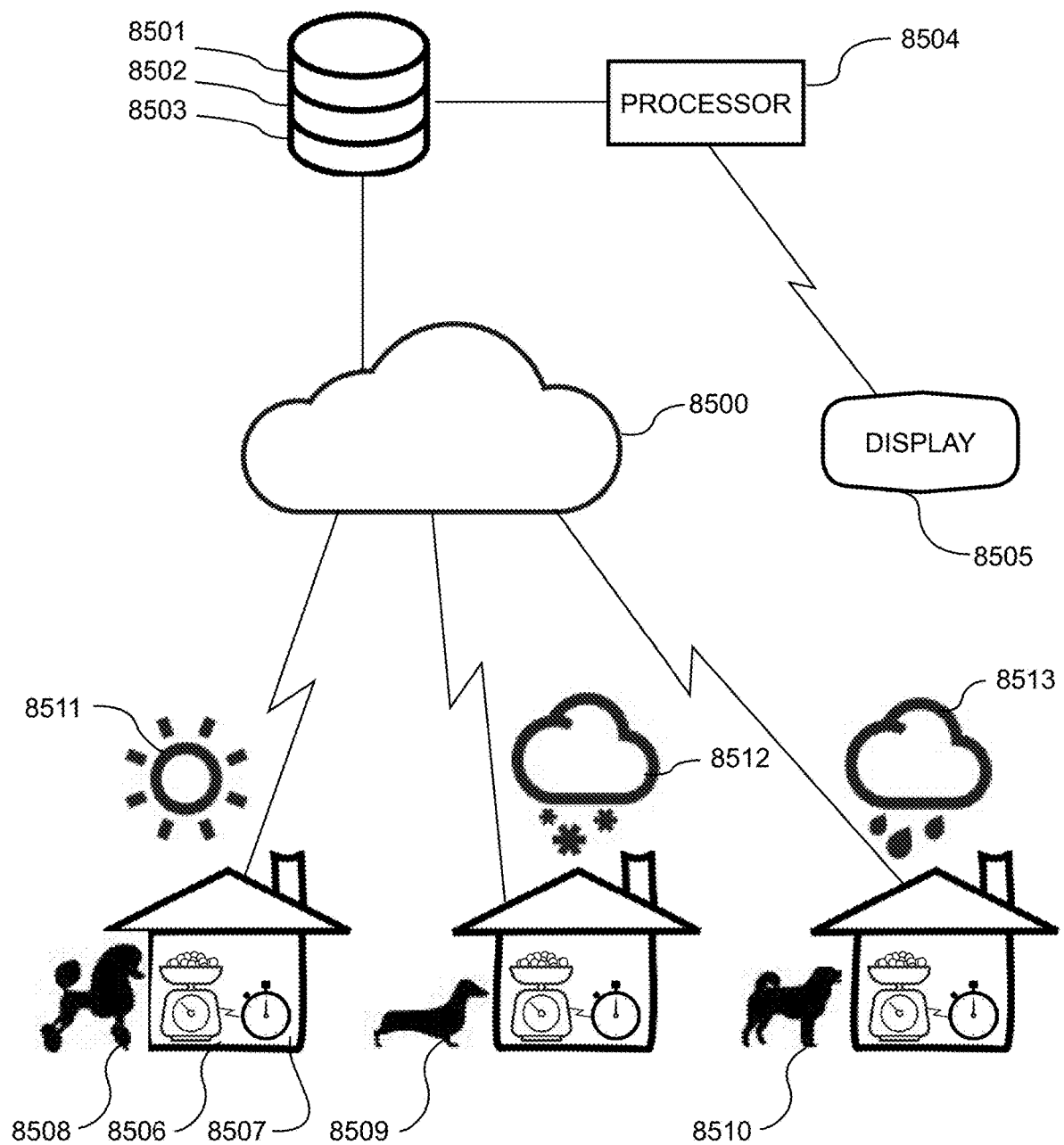
FIG. 85 is an exemplary diagram illustrating a pet-monitoring network.

FIG. 85 is an exemplary diagram illustrating a pet-monitoring network cloud 8500 based network comprising a plurality of databases, a processor 8504, and a human readable output means such as a digital display 8505.

Further, the network comprises a plurality of pet "feeding stations" as used herein, meaning a new and novel in-home feeding appliance connected to a computer network, the feeding station comprising at least a food weighing food bowl 8506 and a timing means 8507 providing for the timing the duration that a pet eats the pet food. Together, the food bowl 8506 and timer 8507 output for recording upon the network at least the duration of time corresponding to the time at which a full food bowl is presented for eating, and the time at which the food bowl is emptied, or in the alternative, the point tin time that the pet stops eating from the bowl. In the later condition, the feeding station will record upon the network the duration of the eating cycle, and the weight of any food remaining in the food bowl.

It is well known that while pet dogs are typically "meal fed", that is, they typically consume their food upon presentation at their meal time, pet cats graze on their food throughout the day, rather than consuming the daily food portion in a single sitting. Therefore, the feeding station provides for the recording of all time throughout a defined time period, such as 24 hours, as well as any corresponding changes in food weight that would correlate to the consumption amount, and duration of consumption of food consumer throughout the defined recorded time period.

The databases include at least a database of a plurality of individual pets 8501 and data relating at least to pet eating histories, and a database of a list of pet foods 8502 consumed by the pets. One or more additional databases 8503 may contain a list of pet owners associated with the pets on the pet database 8501.

Further, the network provides for the identification of individual pets, for instance, a feeding station associated with a representative poodle 8508, a representative dachshund 8509 and a representative Norwegian Elkhound 8510. There is no practical limitation to the number of different breeds or species of pet animals that may be associated with a correspondingly unlimited number of feeding station devices in communication with a network.

Optionally, the network may contain a weather API service, or a weather database 103, the service or database providing for real-time weather conditions associated with the geographical location of each food bowl and timer device. For instance, on any given day, a poodle 8508 may be consuming its meal in a warm and sunny 8511 location, the dachshund consuming its meal in a cold and snowy 8512 location, and the elkhound 8510 consuming its meal in a humid and rainy 8513 location.

It is well known by those skilled in the veterinary arts that pets' appetites change with changes in environmental conditions. Therefore, at least one embodiment of the present invention, recognizing the need to incorporate weather variables into any statistical analysis of pet food palatability, provides for a new and novel method of correlating pet food consumption with the weather conditions at the time of consumption for each pet and bowl-timer device on the network.

In practice, the system and method of at least one embodiment of the present invention comprises a database with a list of pets 8501, the data entered into the database by each pet owner upon registering each pet upon the network, the stored data for each pet consisting of one or more data fields including, but not limited to breed, sex, neuter status, age, physiological condition such as Body Condition Score ("BCS"), activity level, whether the pet lives in a multi-pet household, geographic location of the pet and feeding station, and whether the pet is pregnant or nursing or has been diagnosed with food allergies or chronic medical conditions.

It should be noted that all of these data fields represent factors that influence pet food palatability in the real world, nearly all of which are categorically ignored by manufacturers relying on traditional palatability tests previously described.

The pet owner first selects the food by brand and product name from an available food database 8502, the food database containing ingredient and nutritional information for each food.

It is important to note that palatability tests in general test how excited a pet is about the taste and aroma of the food based on the rate or frequency of consumption, but does not account for the proper or recommended daily caloric intake of the food. Therefore, it is important to correlate the volume of food consumed during any test by any animal with the recommended caloric value of the food, further recognizing that the weight of one food compared to a substantially equivalent weight of a second food may represent a two-fold difference in caloric content.

Upon setup of the feeding station, the pet owner enters into the bowl the appropriate weight of food based on the recommended caloric content, and not based merely on food volume. The food is then placed on the feeding station at which time, the feeding station commences recording changes in weight over time throughout the predefined time period.

At the end of the time period, a processor 8504 correlates the consumption data, consisting of caloric intake, food brand, and associated time, and records the processes information as an appended data record in the pet's individual pet profile, specifically, appending food and moisture consumption.

At any time, a pet food manufacturer or pet owner not shown may submit instructions to the processor 8504 to retrieve any information in any configuration from the database, the information thereby presented in a human readable output such as a printable document, or a digital presentation on a display 8505.

Those skilled in the art will appreciate that the broad base of data made available by means of novel feeding stations in communication with a network reflects, for the first time, provide for tracking real world conditions of a large population of highly diverse pets and their individually unique living, environmental, and physiological conditions, and that comparatively, the limited and narrow data collected from traditional palatability testing methods cannot even presume to account for these variables as a means of more reasonable, reliable and accurate feedback reflecting real world food palatability.

Figure 86:
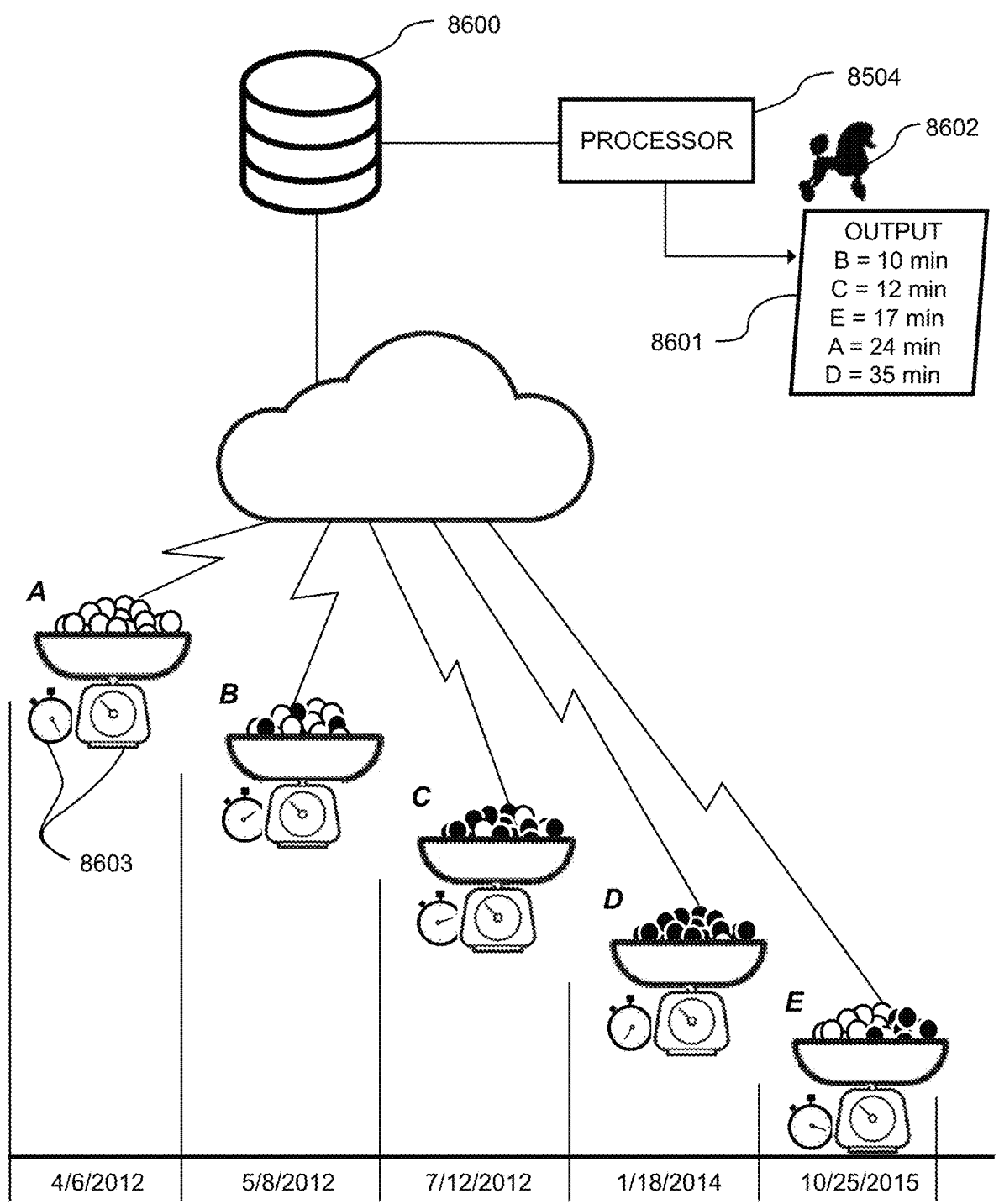
FIG. 86 is an exemplary diagram illustrating food consumption history of one representative pet within a population of pets on a pet-monitoring network.

FIG. 86 is an exemplary diagram illustrating food consumption history of one representative pet within a population of pets on a pet-monitoring network.

As previously discussed, the standardized "one-bowl" test is conducted over a multi-day period, and usually to compare food consumption data between two foods for each animal within a relative small cohort of animals. The one-bowl test is not a perpetual test, and cannot compare any animal's preference between a large number of foods fed to the animal over an extended period of time.

At least one embodiment of the present invention provides for the manufacturer's discovery of food preferences between any large number of foods consumed by one or many animals on the pet monitoring network, and allows the tracking of consumption preferences, and therefore presumed relative food palatability over an extended period of time.

In the drawing, a representative 42-month record between April, 2012 and October, 2015 is shown.

More specifically, a first food A is selected by a pet owner from a database 8600 containing a list of pet food products. The food is consistently presented to the pet on a feeding station 8603. Each day, the time and consumption data previously described is recorded on the pet's individual record upon the database.

It is well known that many pet food products are frequently recalled, go out of production, or are simply out of local stock when the pet owner needs to purchase more food. In such cases, it is common for the owner to change foods.

In the drawing, the food A was changed to food B on our about May of 2012. As previously described, the new food is presented to the pet on the feeding station, and the corresponding consumption and time are recorded on the pet's individual record on the database 8600.

Continuing the perpetual recording, the drawing shows a new food C being introduced to the pet in July 2012, that food being replaced by food D in January, 2014, and finally a new food E being introduced to the pet in October, 2015, together providing a more than 3-year history of relative food palatability.

As one will immediately appreciate, manufacturers typically cannot know what foods introduced years ago should be palatability tested against newly introduced foods. At least one embodiment of the present invention therefore is the first palatability test that provides for large scale data collection and analysis over the long term of foods consumed throughout a pet's life, and more importantly, data collected under in real world, in-home conditions that are otherwise not even available to food manufacturers.

Now therefore, at any time, a pet owner or manufacturer can submit instructions to a processor 8504 with a request to retrieve a comparative analysis 8601 of palatability of the referenced foods as consumed by an individual pet 8602.

However, not shown, at least one embodiment of the present invention provides for a manufacturer to submit a request upon the processor to retrieve any combination of multiple animals' history, consumption of specifically defined foods by the respective consuming pets, or data related to any specific time period.

In fact, at least one embodiment of the present invention, comprising at least two relational databases, provides for a manufacturer to retrieve and analyze any or all available data fields stored upon the databases.

Figure 87:
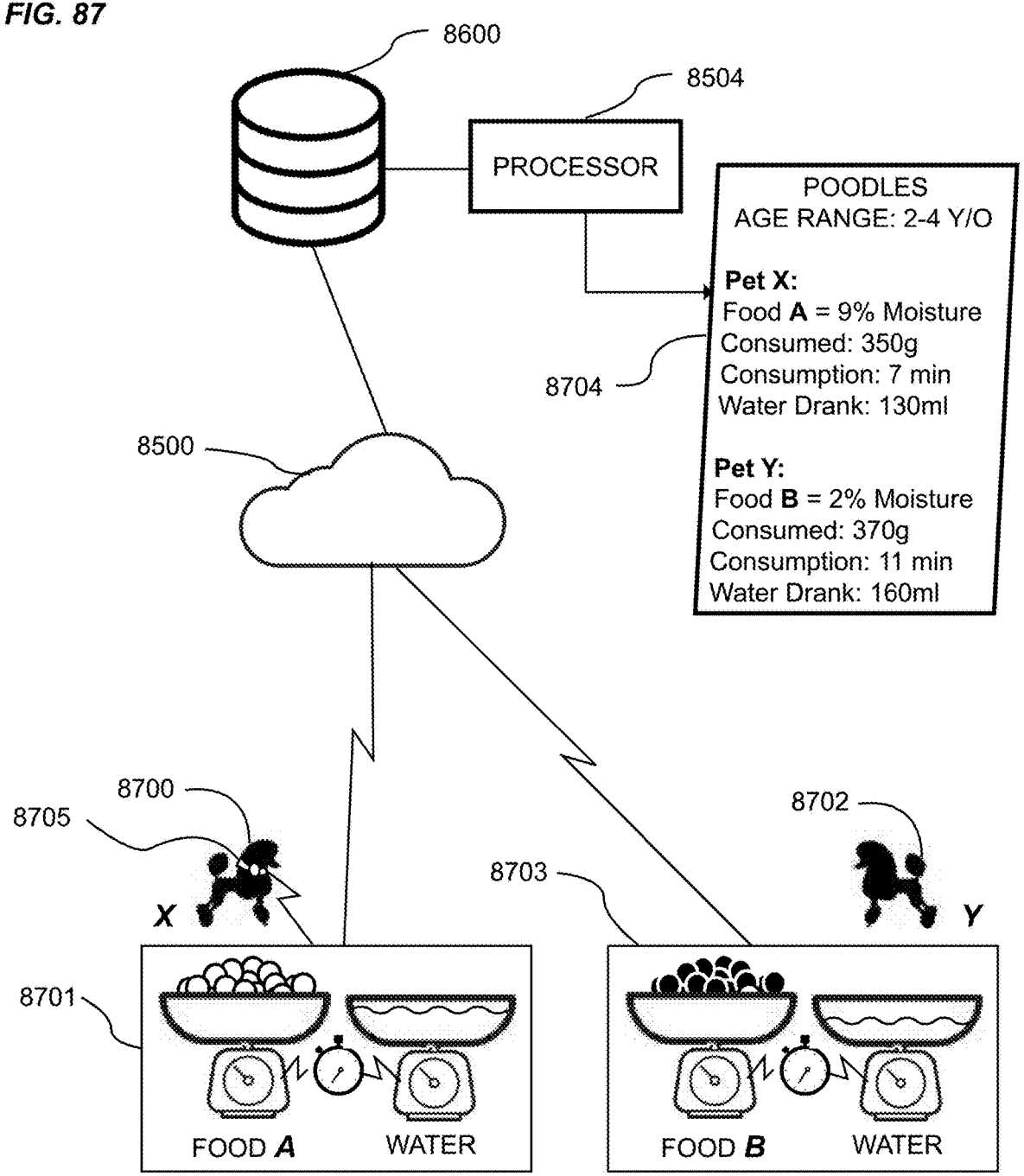
FIG. 87 is an exemplary diagram illustrating multiple pets and multiple food types of differing moisture content on a pet-monitoring network.

FIG. 87 is an exemplary diagram illustrating multiple pets and multiple food types of differing moisture content on a pet-monitoring network.

Presently, no currently available palatability assessment protocol, system or method correlates moisture content in different foods, while at the same time recording the volume of water consumed by the pets eating the foods of various moisture content.

Therefore, at least one embodiment of the present invention provides for a pet feeding station comprising a food weighing bowl, a water weighing bowl, and a timing device, together which records the consumption of food and water, and the corresponding time and duration of consumption of food and water throughout the feeding period.

In the drawing, a first feeding station 8701 is used to feed and water a first pet dog 8700. As a means of illustrating multiple feeding stations upon a network, each feeding station provides for the recording of food and water consumption data from pets feeding from their respective feeding stations, a second feeding station 8703 is shown as being used by a second pet dog 8702. The data from each pet feeding station is communicated to the cloud 8500 wherein the data is appended to each pet's personal pet profile on the pet database 8600. A continuum of data is appended to each pet's personal consumption profile and cataloged on a periodic basis, for instance, each day.

As an optional component to the pet monitoring network, a pet collar 8705 may be attached to any pet, the collar relying on well-known means of communicating with a network by Bluetooth or WIFI transceivers. As one important means of identifying which animal within a multi-pet household is eating or drinking, and as a means of associating the food and water consumption data to individual pets, the pet monitoring system therefore provides for the additional pet identifying collar in communication with the network.

At any time as preferred by a person interested in reviewing consumption data, the person may submit a query to the database through a processor 8504, the processor thereafter using well-known means to compile and present the data in a human readable format. As one example, the data from pet X and pet Y is desired for comparison. As can be seen, a display 8704 illustrates details regarding food and water consumption for the specified pets. Those skilled in the art will appreciate that palatability analysis comparing food A and food B, each of which contains different moisture content, would be incomplete without further recognizing the water content of the food consumed, along with the corresponding water consumed separately.

As one representative example of the need to qualify palatability of dissimilar foods as just described, without the water data being considered in the calculus, in one instance the water contained in the higher moisture food A may deliver a feeling of "fullness" to the pet, thereby causing the pet to slow down it's eating. In this instance, the increase in duration of consumption time for food A may be a false negative as to the palatability of that food compared to food B.

Therefore, as can be readily understood, at least one embodiment of the present invention provides for the creation, recording and analysis of food moisture content, food volume, water volume, and the consumption of food and water over a specified time as one new and novel means to analyze palatability of foods of different moisture content.

Figure 88:
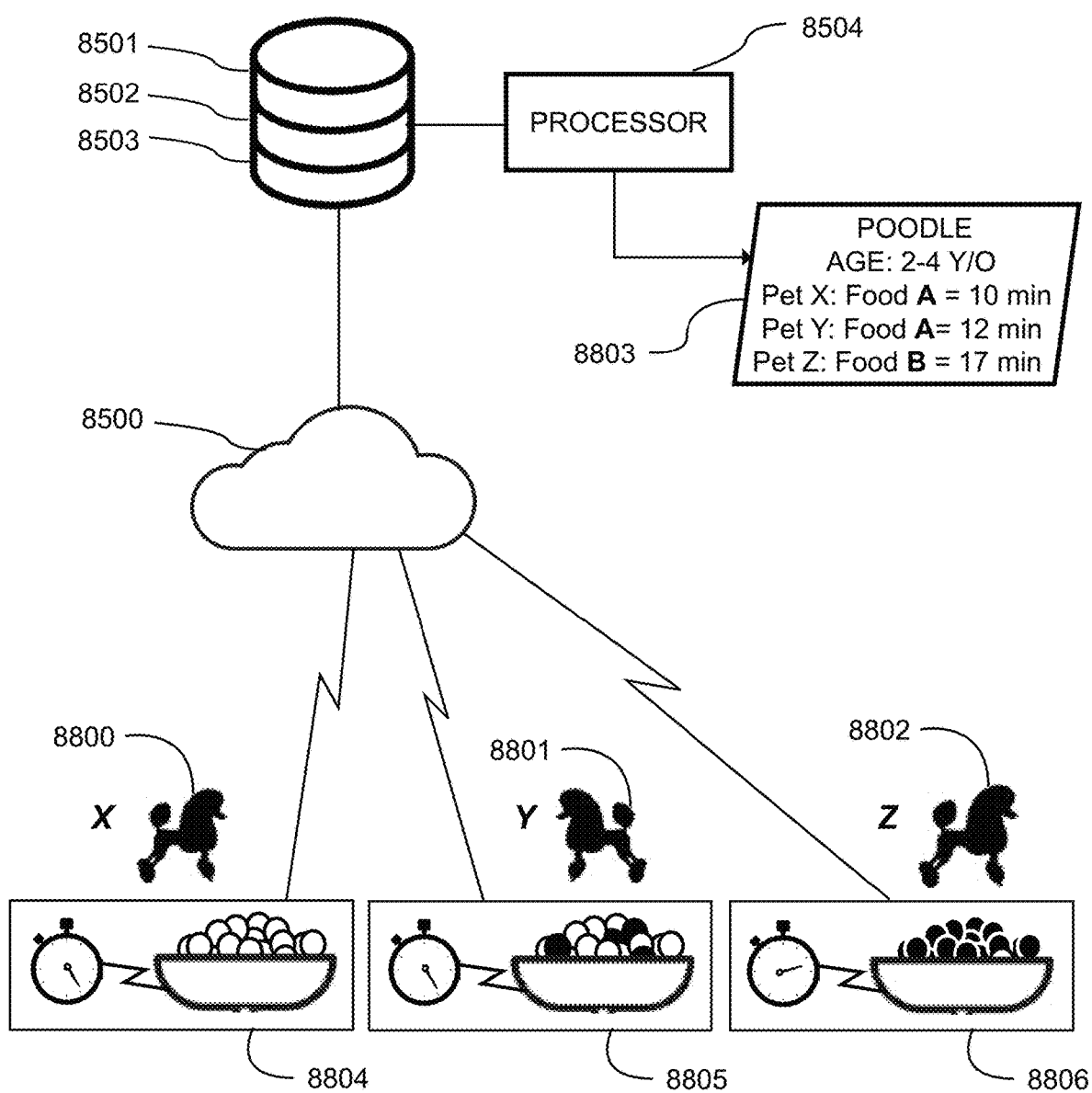
FIG. 88 is an exemplary diagram illustrating multiple pets and multiple food types on a pet-monitoring network.

FIG. 88 is an exemplary diagram illustrating multiple pets and multiple food types on a pet-monitoring network.

It is well known that significant differences exist between the eating habits and food preferences of cats versus dogs. It is further well known that additional differences exist between different dog breed and different cat breeds. For instance, differences between different dogs may include different nutritional needs based on genetic makeup, activity levels, different predilection to high calorie or fat consumption, and different chewing techniques—all of which reach back to the genetic makeup of each dog or cat breed.

Therefore, it is sometimes preferred to test the food palatability preferences of one or many individual breeds as a means to develop and market breed-specific food choices to customers.

In the drawing, a database 8501 on the network 8500 contains the unique identification of a plurality of pets being monitored on the network, a sub-set of all pets on the network may include poodles, and within this subset, poodles may be further filtered by age. As one example, three poodles 8800, 8801, 8802 are the result of the sub-set filtering just described, all of the poodles being between two and four years old. It should be noted that the three poodles are merely representative of a large population of similar pets on the database. In practice, the database 8501 may contain hundreds to 10s of thousands of poodles that are between two and four years old, the larger population being required in order to develop statistically reliable data and inferences from that data through mathematical analysis.

Further, as a means of illustrating different foods being fed to each the poodles, the food differs in each of the respective feeding stations 8804, 8805, 8806, each good being cataloged in a list of pet foods stored on a database 8502, the database containing nutritional, ingredient and moisture content information for each of the foods.

A person desiring to identify the pet foods most palatable to the filtered sub-set of poodles as just described may submit a query upon the processor 8504, and retrieve a list of foods and the corresponding consumption times of those foods. Now then, a highly simplified result of a regression analysis performed on a large data set is shown on the display 8803, specifically identifying the respective consumption times of food A which was consumed by ⅔ of the population, and food B that was consumed by ⅓ of the population, with results indicating that food A is more palatable, and therefore consumed more quickly, by 2-4 year old poodles.

As those skilled in the art will immediately appreciate, the various combinations of pet and food characteristics that may be retrieved from a plurality of databases and analyzed on demand is enormous, and not available with any standard palatability testing system, method or protocol currently available to the pet food industry. Illustrating every possible combination of pet and food characteristics that may be retrieved and analyzed would be unduly cumbersome and burdensome, and therefore are not separately illustrated, but to do so would more profoundly illustrate the significant commercially important advantages of the pet monitoring and food palatability system of at least one embodiment of the present invention.

Figure 89:
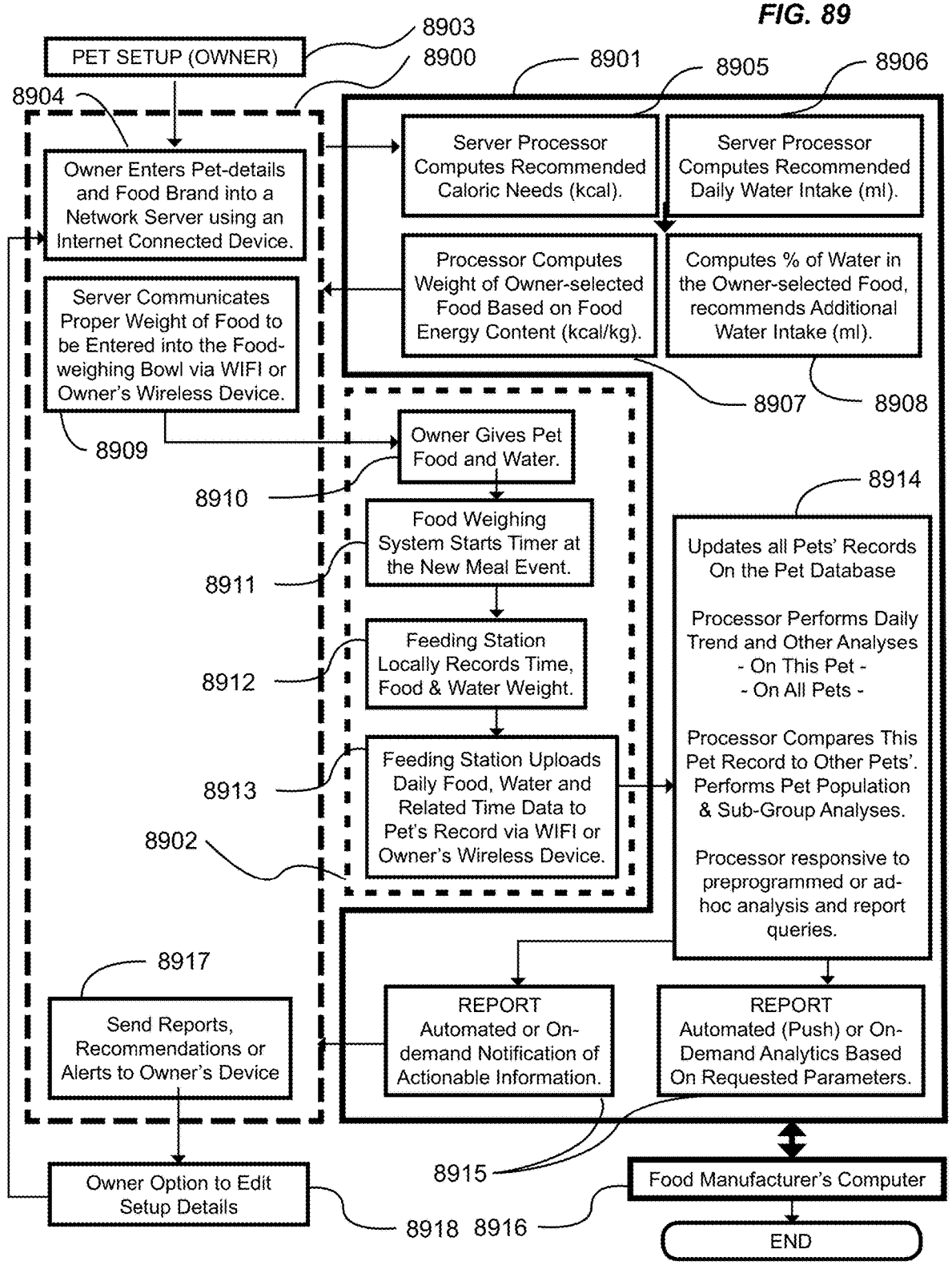
FIG. 89 is an exemplary diagram illustrating a block diagram of a pet monitoring network.

FIG. 89 is an exemplary diagram illustrating a block diagram of a pet-monitoring network. The pet monitoring network comprises at least three components: an Internet connected computer application 8900, a pet-monitoring network 8901, and an in-home wirelessly connected Internet appliance, namely a pet feeding station 8902 comprising one weighing food bowl and optionally one weighing water bowl, data storage, a timer, and a processor. The Internet connected computer application 8900 is preferably a mobile application (APP) installed on a pet owner's smartphone, such APP providing for Bluetooth communication to the pet feeding device 8902, and to the owner's individual pet profile stored on the database on the pet-monitoring network 8901 as previously described.

It should be noted that the pet feeding device 8902 is the food and water consumption data collection device. The pet feeding device periodically transmits connected data to the owner's smartphone mobile app 8900, the APP thereby providing for onward transmission of the data to the pet-monitoring network.

The pet owner enters a new pet upon the pet monitoring system by opening a setup form 8903 on the mobile APP, or alternatively through an equivalent web app, entering specific data 8904 related to each pet in the owner's household, the data including pet characteristics such as species, breed, sex, age, neuter status, activity level, weight, body condition score (BCS), allergies, pregnancy or weaning status, home address as the means to identify the geographic location, the brand and product name of the feed typically fed to the pet, the brand and product name of the treats typically fed to the pet, and known chronic medical problems such as diabetes or arthritis for example.

The data just entered is loaded onto a database of the pet-monitoring network where at least one processor computes the recommended daily food and water portions.

The food portion is computed based on the food energy requirements of the pet 8905, the energy consumption expressed in kilocalories, or kcal, and the daily water consumption 8906 is computed on a plurality of pet characteristics. The processor further retrieves the kcal content in the pet's food and treats as necessary to compute the equivalent weight of the daily food portion 8907, and further analyzes the moisture content contained in the daily portion of the preferred food as a means of computing the clear water volume 8908 that should be consumed separately from and in addition to the food.

The data just described is communicated from the pet monitoring network back to the owner's mobile APP 8909, specifically instructing on the food and water portions for the given pet.

Responding to the instructions 8909, the owner prepares the prescribed food and water and feeds the pet 8910, the feeding action initiating the timer function 8911 so that the rate of food consumption may be determined, the data being stored locally 8912. Upon the owner's mobile APP being in communication range with the Bluetooth feeding device, the data is transmitted to the mobile APP 8913, the APP thereafter communicating the data to the pet's data record 8914 on the pet monitoring network. Each time additional data appends the pet's record, processors perform various analyses on the daily data, as well as performing analyses on the pet's growing base of historical food and water consumption data.

As will be understood by those skilled in the art, computers may be preprogrammed to analyze any combination of data fields, and the results of any analysis or reports may be stored in the database for instant retrieval.

At least one embodiment of the present invention further provides for manufacturers to query the data with specific parameters or filters, the queries producing on-demand retrieval of data matching the manufacturer's parameters, and further performing the appropriate analyses upon the data in order to generate a report responsive to the query.

The analyses and reports responsive to preprogrammed or on-demand queries just described, and similarly, reports intended for the pet owner, may be automatically pushed or retrieved from the pet-monitoring network 8915, the manufacturer's reports being preferably communicated through the Internet to the manufacturer's computer 8916, and the owner's report preferably being communicated to owner's mobile APP 8917.

The reports, are therefore deemed to have satisfied the objective of at least one embodiment of the present invention, with new analyses and reports available as needed by those with access to the pet-monitoring network.

In some cases, a report sent to the owner, may contain an alert notifying the owner of recommended changes that should be made to the pet's feeding regimen, or may contain recommendations regarding a different food that may be more palatable for the owner's pet. In such instances, the owner may modify the pet's data by editing the setup details 8918 by re-entering the setup or pet record editing screen not shown, but which may be in integral function of the APP 8904.

FIG. 90 is an exemplary diagram illustrating a population of pets a pet-monitoring network.

It is well known that pet owners are nearly as concerned about the type and quality of food they feed their pets, as the food they eat themselves. Therefore, a poodle owner located in New York City, as a representative, real-world example, rescues a poodle from a pet shelter in December, and desires to know what food his or her new poodle 9001 may be most palatable. The owner's poodle is a 10-year old male that has been neutered.

Those skilled in the art will appreciate that appetite, and food preferences differ slightly between males and females of the same species, with the differences sometimes accentuated when the pets are neutered, females in heat, females that are pregnant or nursing a new litter. Therefore, specificity as to not only breed, but other pet characteristics as well are necessary to understand palatability to a finer resolution than if currently available with any palatability analysis tools known to the pet food industry.

Therefore, the pet owner just described enters upon the network his or her pet's profile and location which is considered the Northeast United States region 9000. The owner's food query is then submitted to databases 9003 having previously stored locations and characteristics of a large population of pets 9004 similar to the owner's pet, and a database or API that contains regional climate data that is referenced within the historical data related to any palatability changes of any pets on the pet monitoring network during the Northeast US snowy winters 9005.

Merely as a means to illustrate the scale, scope and granularity of data that may be used as referencable data for analysis in response to any query, a chart 9002 of filtered sub-set of poodles in the Northeast United States is shown to contain yet deeper detail with regard to the poodle population including age, neuter status, and sex, to name just a few unique characteristics. Now then, the owner's pet just described has characteristics that substantially correlate with similar poodles 9008, with the most preferred food being a food represented at M, and a second most preferred food being represented at D, the actual identity of these food products being contained in the database 9003, and displayed in human readable form to the owner such that the owner can then purchase the preferred food product.

Figure 91:
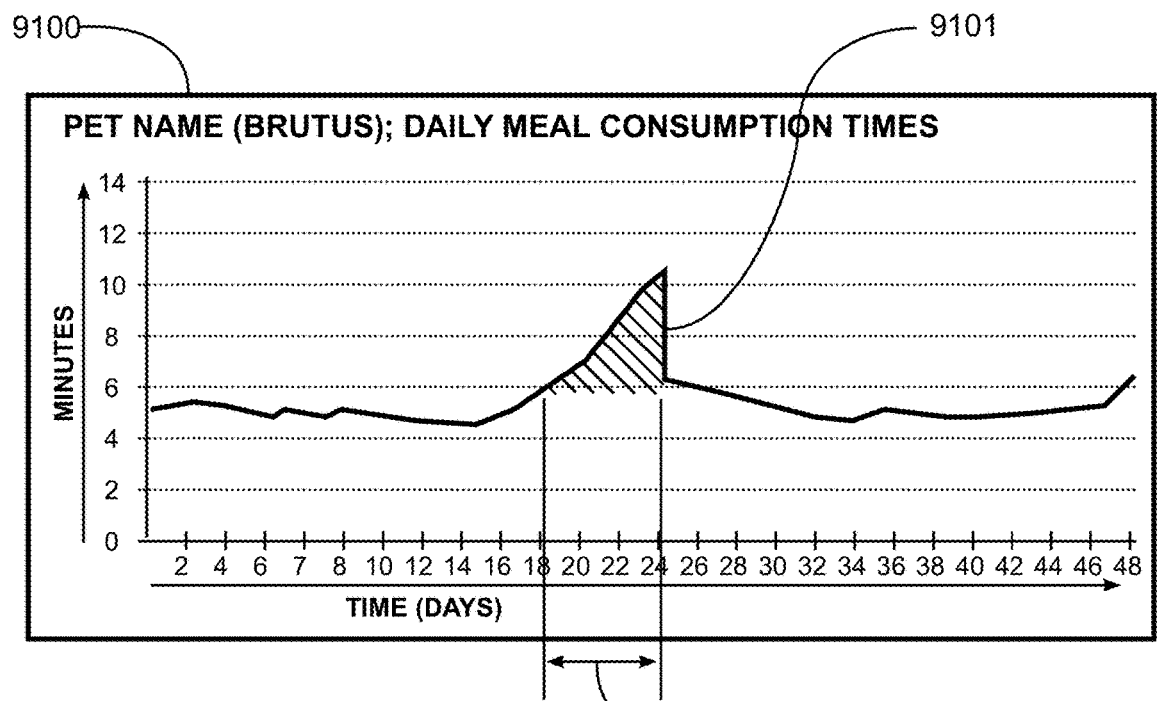

FIG. 91 is an exemplary diagram illustrating pet food consumption trends for a pet upon a pet-monitoring network. Food palatability for any given pet frequently changes over time for may different reasons including dental disease that increases the desire for softer foods over previously preferred crunchy foods, the onset of a chronic disease, or other often unknown reasons. It is therefore preferred that the pet owner understand changing preferences for foods with different palatability attributes.

In the drawing, the historical trends 9100 of each pet are stored on the pet monitoring system previously described. During a one-week period 9102, the pet monitoring system recognizes that food consumption time has substantially increased compared to the historical consumption time for the same pet eating the same food. The system recognition is based on previously programmed analytics that automatically analyze a plurality of data metrics for each pet, including acceptable variance ranges of each of the metrics. The pet owner is automatically notified through the network whenever the variance in any metric exceeds the acceptable range, creating an actionable event for the pet owner.

Now then, recognizing the out-of-variance increase in consumption time during the period 9102, the owner is alerted through the network using a text means to their smartphone not shown, indicating that their pet may now prefer a different food.

The alert 9103 may contain a plurality of data extracted from the databases including a reference to the food product 9104 currently fed to the pet, and a current palatability rating based on historical consumption data.

The system, understanding characteristics of the owner's pet, may include in an alert purchase recommendations for a new food based on palatability preferences of all dogs located in his region 9105, for poodles in his region 9106, and any medical alert information 9107 that may relate to a substantial change in food consumption, the medical alert information being retrieved from a medical conditions and symptoms database not shown, but which is in communication with the pet monitoring network.

Upon feeding the pet the new purchased food, the system of at least one embodiment of the present invention records, analyzes and informs the owner of the consumption time 701 of the new food, that consumption time approaching the long-term historical normal for that pet.

FIG. 92 is an exemplary diagram illustrating a food manufacturing planning analysis 9200 extracted from food consumption data recorded from a pet-monitoring network.

More specifically, food manufacturers often forecast food production volumes based on incoming purchase orders, most often not knowing how much of each product is actually consumed by pets. However, if a volume of food does not sell through the distribution channel prior to the "sell by" date, manufacturers may occasionally be required to remove or replace the product throughout the channel. This process is expensive and inefficient.

On the other hand, in some cases, manufacturers may desire forecasting production based on actual consumption trends by the pets actually eating that food.

The system, method and process of at least one embodiment of the present invention provides for manufacturers to follow actual consumption trends in real time, thereby eliminating the inaccuracies in forecasting by manufacturers that rely on the often inaccurate forecasting by distributors or retailers of their products.

The drawing shows an illustrative, yet simple forecasting chart extracted from the databases previously discussed, and specifically lists each of the manufacturer's stock keeping units 9202 and the historical trends 9201 of the actual end-user consumption of each of those food items by pets within the analyzed territory during the first, second and third quarters of the production year.

The processor of the pet monitoring network not shown, responding to queries submitted by the requestor, forecasts the predicted change in consumption for each product based on the previous consumption trend. In the drawing, one line item is shown with a recommendation to discontinue production 9203 based on a substantially declining trend, while another line item, a newly introduced product 9204 is suggested at higher production levels in order to meet a predicted demand.

Figure 93:
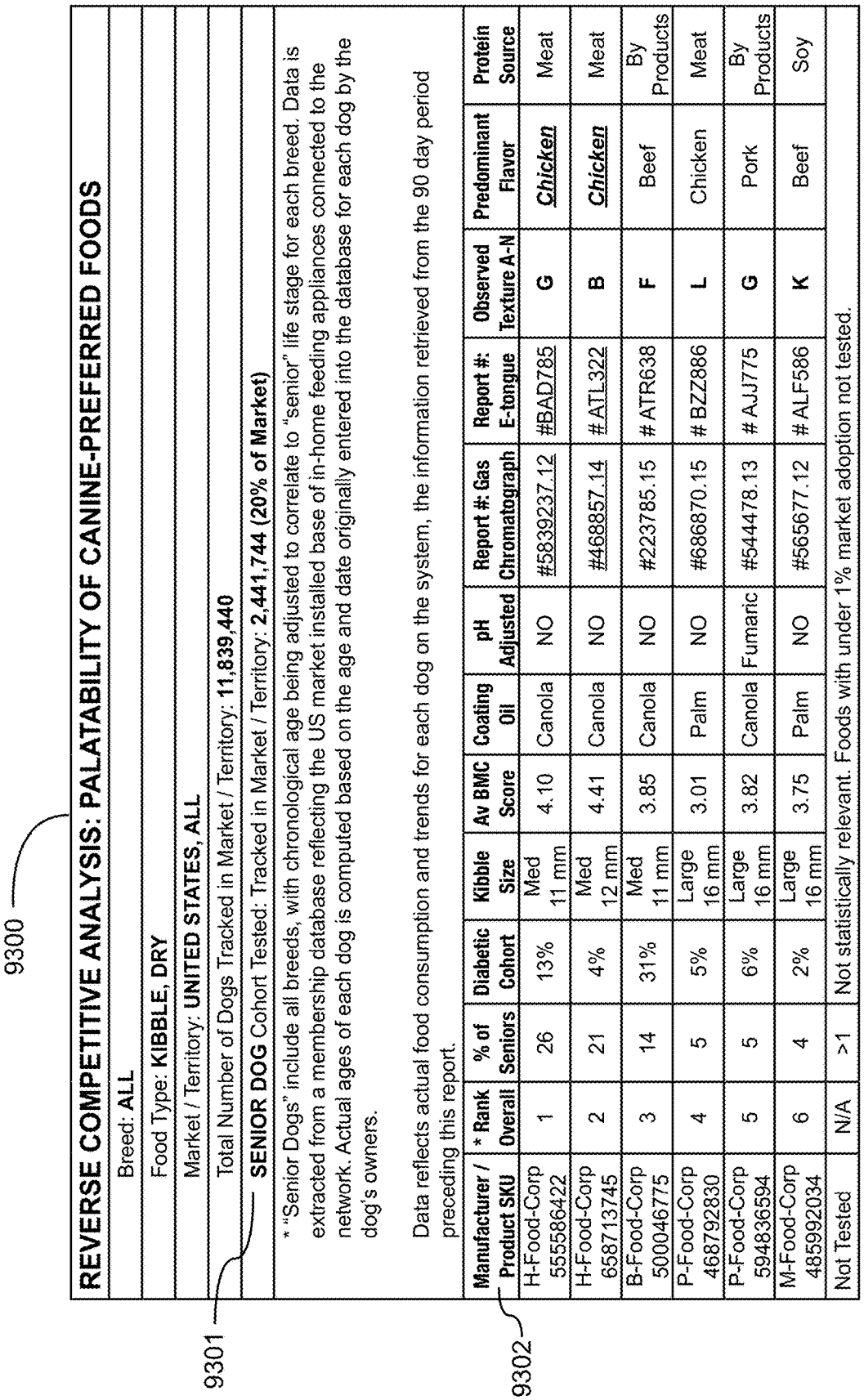

FIG. 93 is an exemplary diagram illustrating a food manufacturer competitive analysis 9300 extracted from food consumption data recorded from a pet-monitoring network. Data analysts have long known that the closer that the number of data points of a data sampling approach 100% of the population for which the data is being analyzed, the more statistically reliable the analytic results will be.

As previously discussed, the industry standard A-B two-bowl testing it typically performed on less than 100 pets. The results of this data are then extrapolated to a population of perhaps many millions of pets, not accounting for the many variables which cannot be tested for in a small, controlled test panel.

On the other hand, as shown in the representative example of an analysis of competing pet food companies and brands 9302, a manufacturer may prefer to identify characteristics contributing to the pet food most palatable specifically to senior dogs 9301 as a means to guide R&D for new food product lines for seniors.

One will appreciate that the total population of dogs on the pet monitoring network is represented as over 11 million, and that the sub-set of senior dogs within that population is over 2.4 million, or approximately 20% of the total dog population.

If the total population of senior dogs in the United States is, for illustrative example, 10 million, analysts will immediately understand the advantages of at least one embodiment of the present invention that provides for extrapolating data from food preferences of 2.4 million senior dogs on the pet monitoring network to a total senior dog population of 10 million, compared to obtaining data from 50 or 100 senior dogs in standard A-B tests and extrapolating that data to 10 million dogs.

Now then, upon identifying the highest palatability foods for senior dogs as mined from the databases previously discussed, the individual food products are presented for further analysis by manufacturers' food scientists, including a presentation of the many palatability attributes, food compositions, recipes, additives, nutritional components including macronutrients and micronutrients, and an indication of the percent of the senior population prefers each of the foods. These data provide manufacturers with a statistically reliable outline of the components that are most likely to contribute to competitive superior palatability of foods intended for a specific market.

The scale and scope of this competitive analysis data is not currently available in any reasonably retrievable form within the pet food industry, and is certainly not available on demand from any source. At least one embodiment of the present invention therefore provides for the nearly instant retrieval of highly valuable competitive data related to pet foods, the data providing a cost cutting means to pet food manufacturers that are challenged with rapid development of more palatable foods for a target market, in the instance just described, the senior dog market.

FIG. 94 is an exemplary diagram illustrating a food manufacturer competitive analysis report 9400 extracted from breed-specific food consumption data recorded from a sub-set of pets on a pet-monitoring network. More specifically, the drawing shows a reverse competitive analysis chart that may be developed by a pet food manufacturer's research team to identify the foods of apparent high palatability for poodles in the Western United States. It is well known that breed-specific foods represent a high revenue/high profit opportunity for pet food companies. Therefore, scanning the market to identify foods already considered most palatable to poodles could provide a competitive advantage to pet food companies endeavoring to enter the poodle-specific food market.

By submitting a query upon the pet monitoring network of at least one embodiment of the present invention, the query polling dry food preferences (kibble) of all poodles in the Western United States, the pet food scientists will be immediately presented with the query results that list all foods 9401 fro all manufacturers that are consumed by poodles in the Western US, the listing preferably presented in descending order with the food ranking highest in palatability first.

After obtaining the reliable list of the most palatable foods preferred by poodles, the scientists may then decompile food attributes such as the oil coating the kibble 9402 or the many other attributes as a means of identifying the attributed best correlating to high palatability.

It is not the objective of the system to displace the expertise of food scientists tasked with formulating new foods, but recognizing that many food formulations turn on the subjective expertise of food researchers, it is the object of at least one embodiment of the present invention to provide the researchers the more reliable data relating to the most palatable pet foods being consumed by pets upon the pet monitoring network.

FIG. 95 is an exemplary diagram illustrating a food manufacturer competitive analysis report based on data extracted from breed-specific food consumption data recorded from a senior-aged subgroup population of pets contained on a pet-monitoring network.

To illustrate another dimension of information provided for by at least one embodiment of the present invention from which valuable business information may be deduces, and more specifically decision-support information not provided by any currently available pet food palatability testing system or method, a reverse engineered recipe 9500 is shown as an illustrative example of corporate business case materials that may be routinely developed by pet food manufacturers to justify the creation of new products to address specific pet food market opportunities.

In the example, palatability data having been first collected from 2.4 million senior dogs from an illustrative total population of about 11 million dogs monitored on the network, is deemed highly reliable based on the extraordinarily large sampling size as a ration to the total dog population.

From the retrieved information, manufacturers 9502 and correspondingly the identified pet food SKUs are statistically determined to represent the most palatable foods 9503 for senior dogs based on the consumption analysis of all senior dog palatability data extracted from the databases as previously described.

As can be readily seen in the illustrative example, key attributes of palatability appearing in the top rated examples are kibble size (11-12 mm), coating oil (canola), flavor (chicken), and protein source (meat), together which create a baseline understanding of food components concurrently appearing in the top palatability foods.

Armed with the knowledge of the foods considered most palatable by senior dogs, an engineering analysis 9504 by the manufacturer's new product development team can begin instantly by reverse engineering the specific foods statistically determines to be the most palatable. The analysis and tests performed during reverse engineering lie outside the scope of at least one embodiment of the present invention, however, at least one embodiment of the present invention provides for the crucial starting point for the engineering process.

As highly beneficial information for planning production volumes of food for senior dogs, at least one embodiment of the present invention, for the first time, provides daily average food consumption volumes 9505 of senior dogs on the pet monitoring network, thereby illuminating various options for retail package sizes or periodic production volumes relative to the general dog populations—highly valuable information that cannot be reliably generated by any currently available palatability system or method.

Although the business case 9506 is developed entirely by the manufacturer's personnel, the data provided for by at least one embodiment of the present invention is invaluable in supporting baseline calculations relating to projected food consumption of each senior dog, and the projected percent of dog food production requirement for senior dogs relative to the dog food production targeting the general dog population—a figure that is dynamic since more new dogs are being born than are presently dying.

Other information may be inferred by the data available from at least one embodiment of the present invention, but to list all of the pet food reverse engineering objectives, or all production or marketing scenarios would be burdensome. However, illustrating each of them would nevertheless support the novelty of real-time, highly reliable and actionable data provided for by at least one embodiment of the present invention that is not available from any other food palatability data source.

FIG. 96 is an exemplary diagram 9600 comparing the palatability testing features and capabilities of at least one embodiment of the present invention to the features and capabilities of all palatability test methods in standardized use in the pet food industry. For efficiency, the details of the various palatability test methods and protocols practiced by the pet food industry will not be exhaustively detailed, however certain data collection capabilities and test results outcomes will be highlighted to illustrate the valuable improvements of at least one embodiment of the present invention.

As was previously discussed, the typical test panel for the various known testing methods engage a cohort 9601 of well under 100 dogs or cats, compared to the cohort of at least one embodiment of the present invention that is virtually limitless. Each time another pet owner deploys the feeding and watering bowl system of at least one embodiment of the present invention, the corresponding pet is added to the total test panel, and becomes a test subject for as long as the pet continues to feed from the feeding station in communication with the pet monitoring system. The advantage of at least one embodiment of the present invention over all known palatability test methods therefore is an ever increasing size of the population of available test subjects, and with it, an increasing quality, accuracy and reliability of test data.

Another advantage of at least one embodiment of the present invention is that pets used in testing do not have to be trained 9602 in order to conduct the test. As can be readily seen, the reliability and predictability of existing test protocols require the use of pets that are selected and conditioned to perform the test. Those skilled in the art will appreciate that palatability testing on trained dogs and cats used as proxies for in-home pets do not reflect the actual palatability preferences experienced in real world conditions wherein in-home pets are not trained to perform tests. At least one embodiment of the present invention relies completely on untrained pets, therefore reflecting the real and actual palatability preferences of in-home pets, the in-fact intended consumers of the food.

Another major advantage of the testing methods of at least one embodiment of the present invention is that the need for a trained test moderator 9603 is completely eliminated. Training employees to become test moderators is time consuming and expensive, and carries the additional disadvantage of not being reasonably scalable to the point of being able to perpetually conduct tests applicable to the population of 180 million US dogs and cats, or to be able to conduct test with the speed or pace at which manufacturers are introducing new food formulations (about 15 new pet food products introduced daily worldwide). At least one embodiment of the present invention relies on retrospective big data analysis, and actually thrives on the increasingly large number of pets and pet food formulations to deliver faster, more insightful data without the limitation of requiring a moderator to set-up, conduct, and interpret the results of lengthy food tests.

Yet another advantage of at least one embodiment of the present invention if that it can deliver reliable data even in multi-pet households 9604. Multi-pet households account for a highly valuable segment of the total pet market, projected by most pet research organizations as 29 percent. Food manufacturers cannot discount nearly ⅓ of the market, yet have no reliable means to test food palatability within multi-pet households. It is well known that a first pet may have a more voracious appetite than a second pet, or that a first pet merely has different food preferences based on relative size, different genetic predisposition to fat consumption, or any list of other factors. Therefore, at least one embodiment of the present invention, when pets are outfitted with the optional pet identification collar in communication with the pet monitoring network, provide reliable palatability data on individual pet preferences even if pets are members of a multi-pet household.

Still another stark advantage of at least one embodiment of the present invention is that testing is perpetual 9605, and does not require the traditional start-stop sequence of conducting discrete tests with a discrete test cohort to test preferences between a discrete number of specified pet foods. The advantage of at least one embodiment of the present invention is that as the pet population changes, for instance age, rate of neutering, or the relative increase/decrease of certain breeds relative to other breeds, at least one embodiment of the present invention provides for the collection of ever evolving data related to any changes in the pet population, a more accurate perspective on real world pet food preferences.

Still another advantage of at least one embodiment of the present invention is that testing, and retrieval of reliable results can be conducted on demand 9606. All other test protocols practiced by the pet industry require preparation, study, and interpretation of the test results—a process that requires weeks or months of process for each and every palatability test conducted. More importantly, the test parameters of testing with at least one embodiment of the present invention may be changed at-will. For instance, palatability testing of a certain food relative to 20 other foods may be conducted on senior female poodles, while the very next day, a completely different test on those same foods can be conducted on neutered male 2 year old Great Danes. No other palatability testing system or method can provide the flexibility, speed or on-demand capabilities provided for by the novel system and method of at least one embodiment of the present invention.

Another extreme limitation of current test methods overcome by at least one embodiment of the present invention is the ability to simultaneously test a practically unlimited number of foods 9607, a capability outside of the most imaginary wish list of any food researcher skilled in the art. Because there is no traditional set-up of foods for an A-B test, or even an extreme testing of an A-B, A-C, A-D, A-E, B-C, B-D, B-E, C-D, C-E multiple iteration 2-bowl test, at least one embodiment of the present invention provides for polling of every food fed to every pet feeding from every feeding station in communication with the pet monitoring network, an advantage unmatched by any presently available test method or system.

Statisticians have long known that the more data they can collect, they can provide more detailed and reliable analysis. At least one embodiment of the present invention provides for the collection of more data 9608 than any other available food palatability test system or method, the voluminous data thereby allowing for large-scale analysis of an previously unavailable large population of pets and an extreme number of test variables relating to each pet, the new analytics capabilities including but not limited to regression analysis, analysis of standard deviation, and higher confidence in identifying irrelevant outliers. Regression analysis therefore provides for higher confidence probability distribution, improved prediction or outcomes, and more reliable forecasting than any presently available palatability testing system or method.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the animal health monitoring, diagnosis and maintenance system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the animal health monitoring, diagnosis and maintenance system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the animal health monitoring, diagnosis and maintenance system, suitable methods and materials are described above. Thus, the animal health monitoring, diagnosis and maintenance system is not intended to be limited to the embodiments shown, but is to be accorded the widest scope consistent with the principles and features disclosed herein.

What is claimed is:

1. A pet food material bowl system, comprising:
   a food bowl adapted to receive a food material for consumption by a pet; and
   a scale configured to measure an actual food weight in real time of the food material in the food bowl;
   wherein the scale is configured to receive and store a desired food weight of the food material in the food bowl;
   wherein the scale is configured to compare in real time the actual food weight with the desired food weight;
   wherein the scale or a device in communication with the scale is configured to determine in real time if (a) the actual food weight is greater than the desired food weight, (b) the actual food weight is less than the desired food weight or (c) the actual food weight equals the desired food weight;
   wherein the scale or the device is configured to initiate an alert based on comparison of the actual food weight with the desired food weight;
   wherein the desired food weight is adjusted based on a daily energy expenditure of an animal;
   wherein the daily energy expenditure of the animal is calculated by a sensor module worn by the animal;
   wherein the device transmits an adjusted desired food weight to the scale.

2. The pet food material bowl system of claim 1, wherein the alert is comprised of an audible alert.

3. The pet food material bowl system of claim 1, wherein the alert is comprised of a visual alert.

4. The pet food material bowl system of claim 1, wherein the alert is comprised of an audible alert and a visual alert.

5. The pet food material bowl system of claim 1, wherein the food bowl provides the alert.

6. The pet food material bowl system of claim 1, wherein the alert is comprised of an alert message delivered to a computer or smartphone.

7. The pet food material bowl system of claim 1, wherein the scale is adapted to be in communication with a computer network to receive the desired food weight.

8. The pet food material bowl system of claim 1, wherein the scale is integrated with the food bowl.

9. The pet food material bowl system of claim 1, wherein the scale is in physical communication with the device.

10. The pet food material bowl system of claim 1, wherein the desired food weight is adjusted based on weather conditions.

11. The pet food material bowl system of claim 1, wherein the device stores an animal profile for an animal and a food material profile for the food material, wherein the desired food weight is adjusted based on the animal profile for the animal and the food material profile for the food material.

12. The pet food material bowl system of claim 1, wherein the device is a smartphone or a computer.

13. A pet food material bowl system, comprising:
- a food bowl adapted to receive a food material for consumption by a pet, wherein the food material is comprised of a dry food material or a wet food material, wherein the food bowl includes an indicator light to provide a visual indication to a user filling the food bowl with the food material, wherein the visual indication provides an indication as to whether the user should add additional food material to the food bowl or remove a portion of the food material from the food bowl; and
- a scale configured to measure an actual food weight in real time of the food material in the food bowl, wherein the scale is in communication with the indicator light;
- wherein the scale is integrated with the food bowl;
- wherein the scale is configured to receive and store a desired food weight of the food material in the food bowl;
- wherein the scale is configured to compare in real time the actual food weight with the desired food weight;
- wherein the scale is configured to determine in real time if (a) the actual food weight is greater than the desired food weight, (b) the actual food weight is less than the desired food weight or (c) the actual food weight equals the desired food weight;
- wherein the scale is configured to activate the visual indication provided by the indicator light based on comparison of the actual food weight with the desired food weight.

14. A pet food material bowl system, comprising:
- a food bowl adapted to receive a food material for consumption by a pet; and
- a scale configured to measure an actual food weight in real time of the food material in the food bowl;
- wherein the scale is configured to receive and store a desired food weight of the food material in the food bowl;
- wherein the scale is configured to compare in real time the actual food weight with the desired food weight;
- wherein the scale or a device in communication with the scale is configured to determine in real time if (a) the actual food weight is greater than the desired food weight, (b) the actual food weight is less than the desired food weight or (c) the actual food weight equals the desired food weight;
- wherein the scale or the device is configured to initiate an alert based on comparison of the actual food weight with the desired food weight;
- wherein the scale or the device is configured to predict a daily food material requirement for an animal, wherein the scale or the device initiate an alternative alert if abnormal deviations in the daily food material requirement occur for the animal.

15. The pet food material bowl system of claim 14, wherein the alert is comprised of a visual alert.

16. The pet food material bowl system of claim 14, wherein the alert is comprised of an alert message delivered to a computer or smartphone.

17. The pet food material bowl system of claim 14, wherein the device stores an animal profile for an animal and a food material profile for the food material, wherein the desired food weight is adjusted based on the animal profile for the animal and the food material profile for the food material.

18. The pet food material bowl system of claim 14, wherein the device is a smartphone or a computer.

19. A pet food material bowl system, comprising:
- a food bowl adapted to receive a food material for consumption by a pet; and
- a scale configured to measure an actual food weight in real time of the food material in the food bowl;
- wherein the scale is configured to receive and store a desired food weight of the food material in the food bowl;
- wherein the scale is configured to compare in real time the actual food weight with the desired food weight;
- wherein the scale or a device in communication with the scale is configured to determine in real time if (a) the actual food weight is greater than the desired food weight, (b) the actual food weight is less than the desired food weight or (c) the actual food weight equals the desired food weight;
- wherein the scale or the device is configured to initiate an alert based on comparison of the actual food weight with the desired food weight;
- wherein the scale or the device are configured to compute a volume of water within the food material.

20. The pet food material bowl system of claim 19, wherein the device is a smartphone or a computer.

* * * * *